United States Patent
McNelley et al.

(10) Patent No.: US 10,298,877 B2
(45) Date of Patent: *May 21, 2019

(54) COMMUNICATION STAGE AND DISPLAY SYSTEMS

(71) Applicants: Steve H. McNelley, San Juan Capistrano, CA (US); Jeffrey S. Machtig, Lake Forest, CA (US)

(72) Inventors: Steve H. McNelley, San Juan Capistrano, CA (US); Jeffrey S. Machtig, Lake Forest, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/891,912

(22) Filed: Feb. 8, 2018

(65) Prior Publication Data
US 2018/0176506 A1  Jun. 21, 2018

Related U.S. Application Data

(63) Continuation-in-part of application No. 15/593,711, filed on May 12, 2017, now Pat. No. 9,930,290, which is a continuation-in-part of application No. 14/497,228, filed on Sep. 25, 2014, now Pat. No. 9,819,907.

(51) Int. Cl.
  *H04N 7/14* (2006.01)
  *G06F 3/147* (2006.01)
  *H04M 3/56* (2006.01)

(52) U.S. Cl.
  CPC ............ *H04N 7/142* (2013.01); *G06F 3/147* (2013.01); *H04M 3/567* (2013.01); *H04N 7/144* (2013.01); *H04N 7/147* (2013.01); *H04M 2203/359* (2013.01)

(58) Field of Classification Search
  CPC ........................................................ H04N 7/14
  See application file for complete search history.

(56) References Cited

U.S. PATENT DOCUMENTS 6,386,985 B1 * 5/2002 Rackham .................. A63J 1/00
                                                           472/75
7,136,090 B1    11/2006 McDuffie White
(Continued)

OTHER PUBLICATIONS

International Search Report for Interntaional Application No. PCT/US15/52270, dated Sep. 25, 2015.

*Primary Examiner* — Olisa Anwah
(74) *Attorney, Agent, or Firm* — Jeffri A. Kaminski; Venable LLP

(57) ABSTRACT

Enterprise communication display systems enable life-like images for videoconferencing and entertainment productions. Life-like images appear in a 3D environment where imaged people are visible through the use of specially configured see-through displays. Imaged people can also be viewed amongst a reflected foreground. A dual mode large high-resolution display is inventively configured for watching and working. Methods for enterprise wide deployments for corporate, healthcare, education, and government communications, including hotel properties and a property management system are shown. The invention further discloses an online production system for events. Further, a black void illusion is described and is applicable to numerous displays including event and live theater stages and movie theaters. Numerous inventive features are described enabling and advancing the black void illusion.

43 Claims, 40 Drawing Sheets

(56) References Cited

U.S. PATENT DOCUMENTS

| | | |
|---|---|---|
| 7,697,053 B2 | 4/2010 | Kurtz et al. |
| 7,714,923 B2 | 5/2010 | Cok et al. |
| 8,154,583 B2 | 4/2012 | Kurtz et al. |
| 8,957,942 B2 | 2/2015 | Ryckman |
| 9,007,418 B2 | 4/2015 | He et al. |
| 9,099,021 B2 | 8/2015 | Yu |
| 9,143,724 B2* | 9/2015 | Tan ............... H04N 7/147 |
| 2005/0024484 A1 | 2/2005 | Leonard et al. |
| 2005/0041286 A1 | 2/2005 | White |
| 2006/0126173 A1 | 6/2006 | Yakushiji et al. |
| 2006/0181607 A1 | 8/2006 | McNelley et al. |
| 2007/0201004 A1* | 8/2007 | O'Connell ............ A63J 25/00 |
| | | 353/10 |
| 2007/0291466 A1* | 12/2007 | Krestakos ............ H04N 7/142 |
| | | 362/33 |
| 2008/0304018 A1 | 12/2008 | Tanis-Likkel et al. |
| 2009/0231414 A1* | 9/2009 | Graham ............... H04N 5/2224 |
| | | 348/14.08 |
| 2010/0123770 A1 | 5/2010 | Friel et al. |
| 2010/0238265 A1 | 9/2010 | White |
| 2011/0002036 A1 | 1/2011 | Perotti et al. |
| 2011/0071862 A1 | 3/2011 | Cator et al. |
| 2011/0304735 A1* | 12/2011 | Van Eaton ............ G06F 3/011 |
| | | 348/159 |
| 2013/0010053 A1 | 1/2013 | Daddi |
| 2014/0022331 A1 | 1/2014 | Bansal |
| 2014/0104368 A1 | 4/2014 | Tan |
| 2014/0168134 A1 | 6/2014 | Bolle et al. |
| 2015/0227035 A1 | 8/2015 | Joseph |
| 2015/0304360 A1 | 10/2015 | Ge et al. |
| 2016/0021350 A1 | 1/2016 | Schultz et al. |
| 2016/0124295 A1 | 5/2016 | Montgomery |
| 2016/0129365 A1 | 5/2016 | Crowder et al. |
| 2016/0142676 A1 | 5/2016 | Berini et al. |
| 2016/0187654 A1 | 6/2016 | Border et al. |
| 2016/0381330 A1 | 12/2016 | Wu |
| 2017/0064295 A1* | 3/2017 | Stolzberg ............ E04H 3/22 |
| 2017/0184953 A1 | 6/2017 | Su et al. |

* cited by examiner

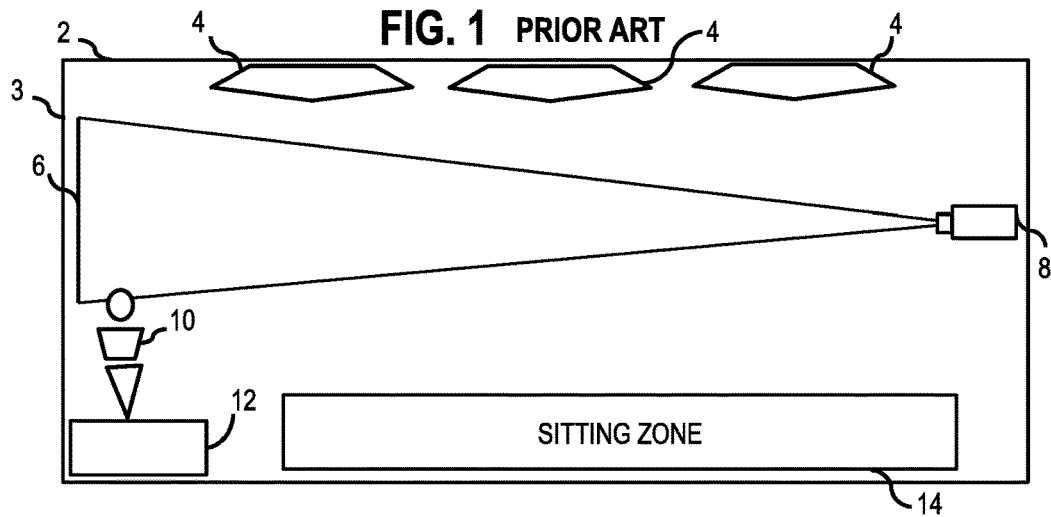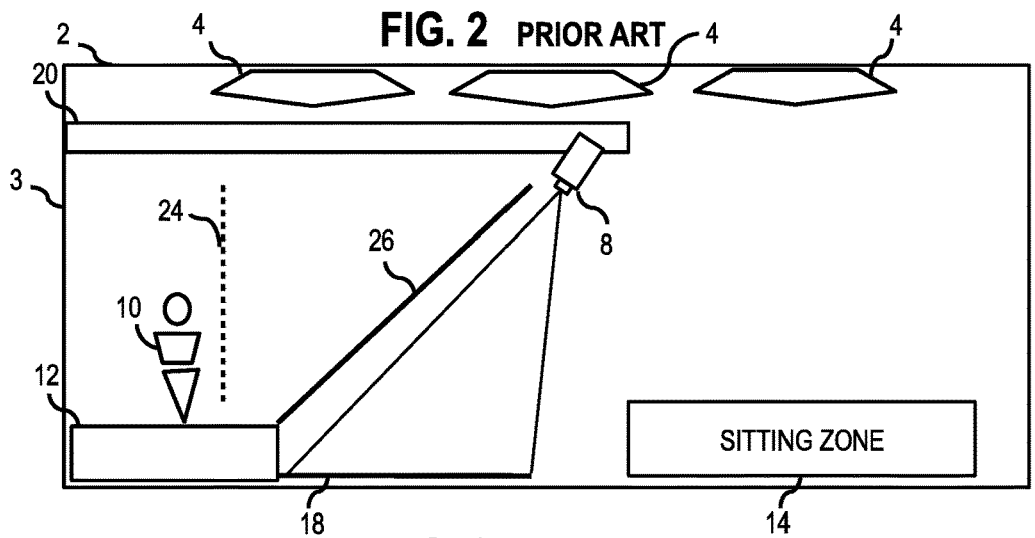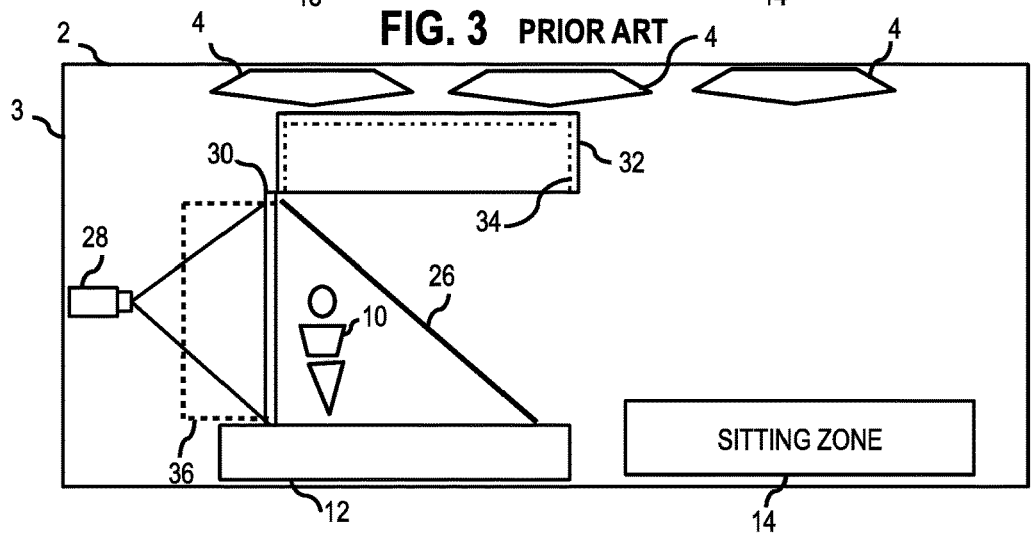

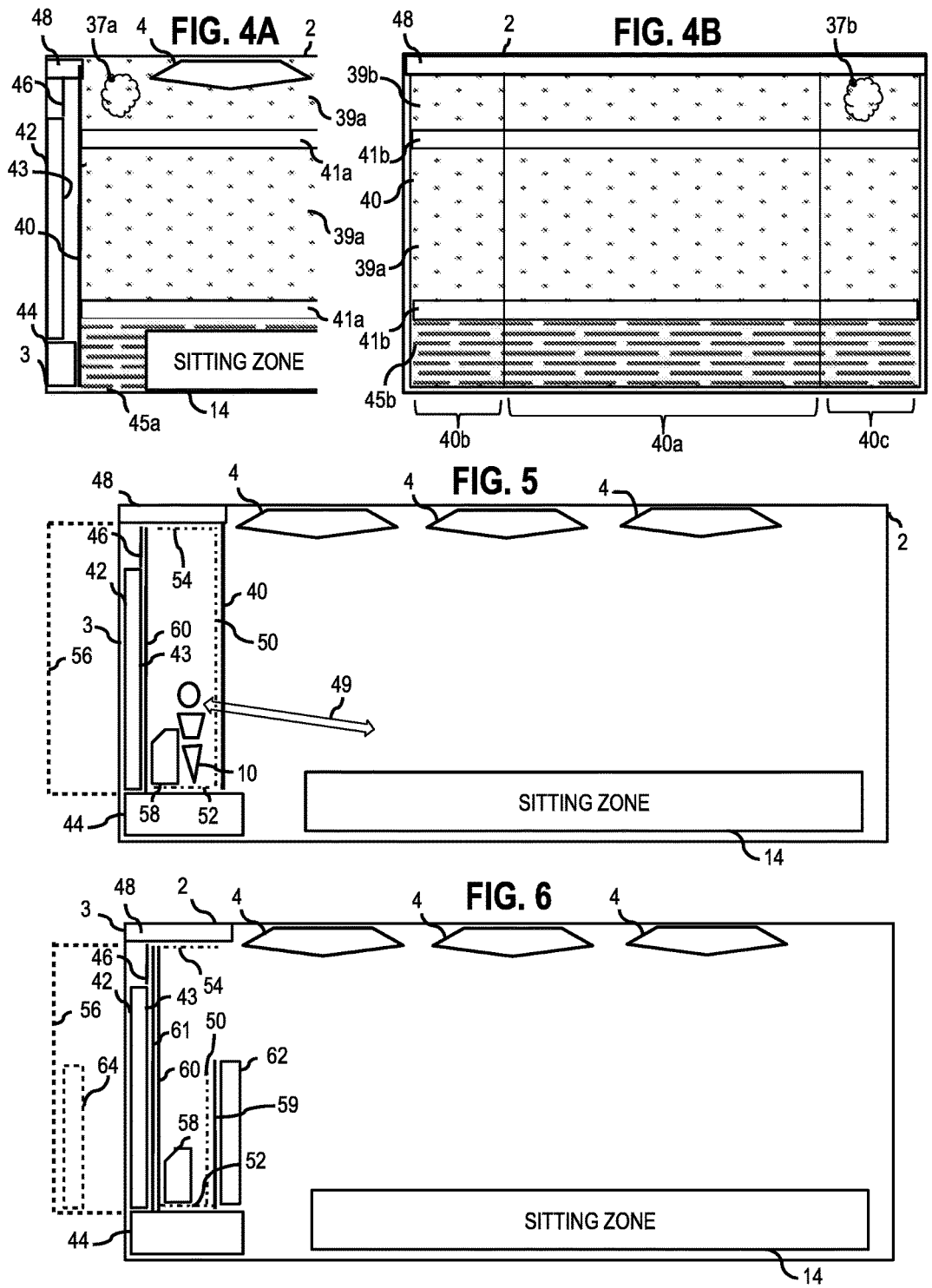

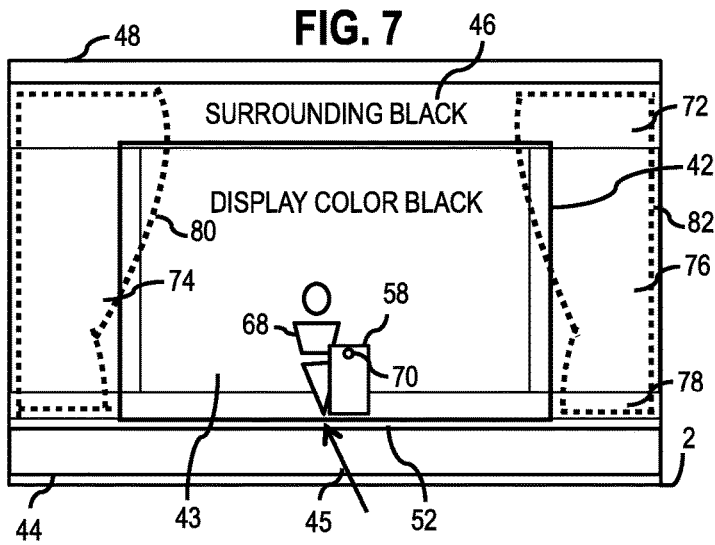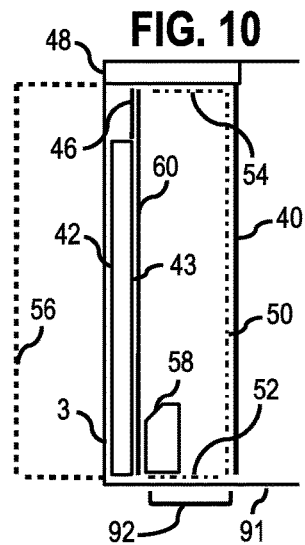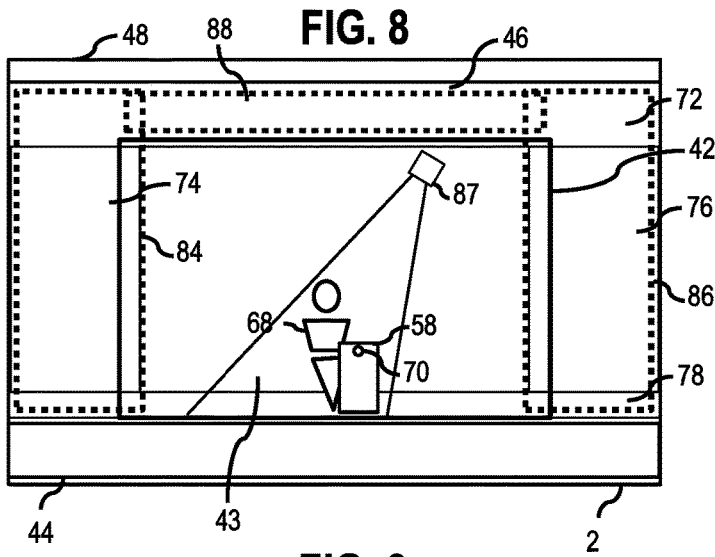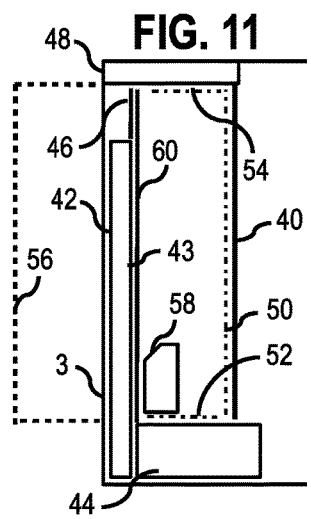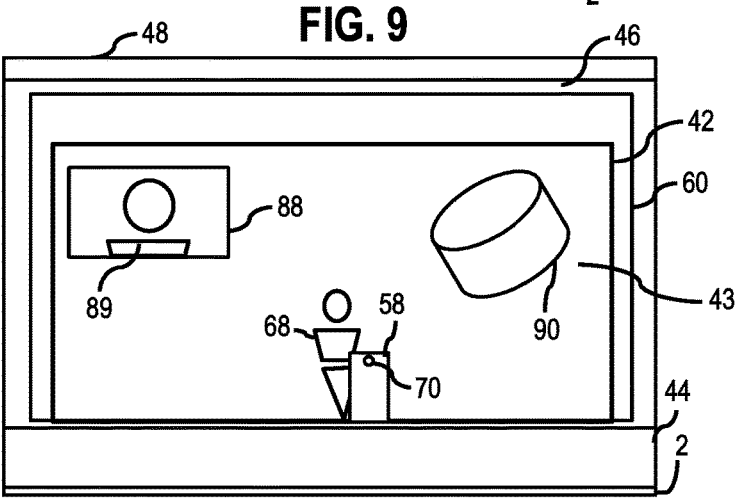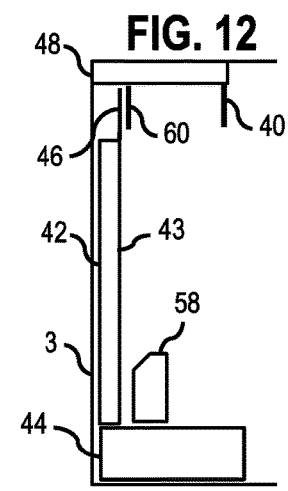

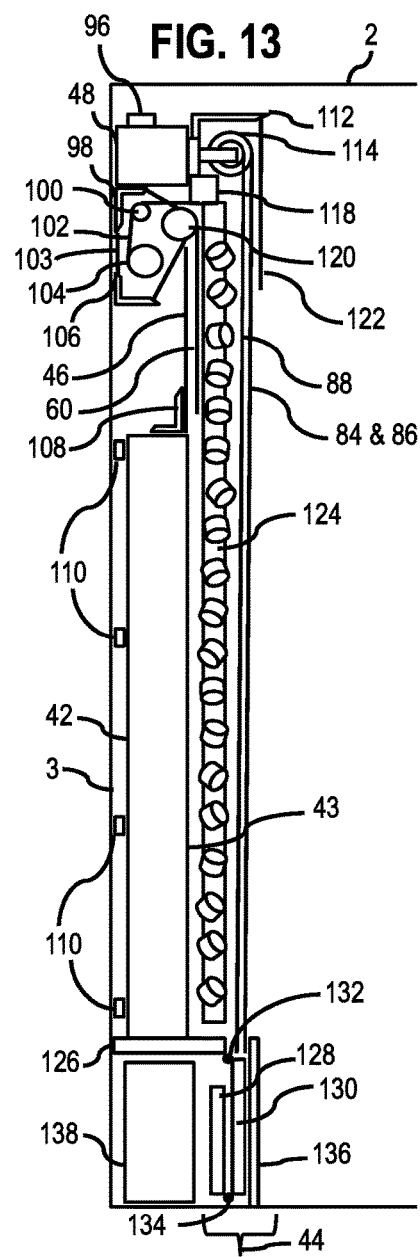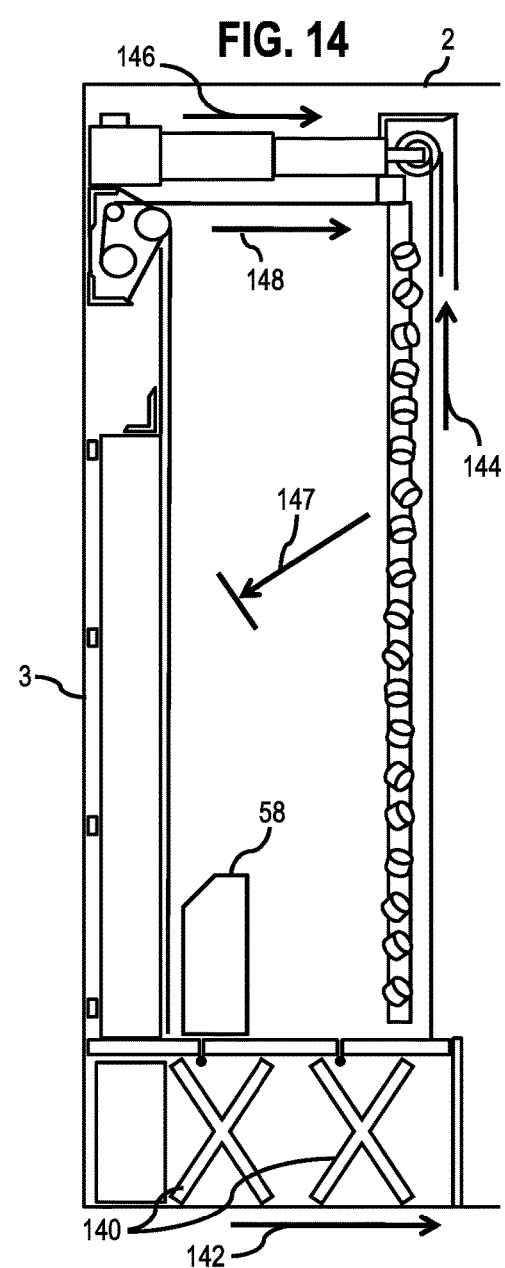

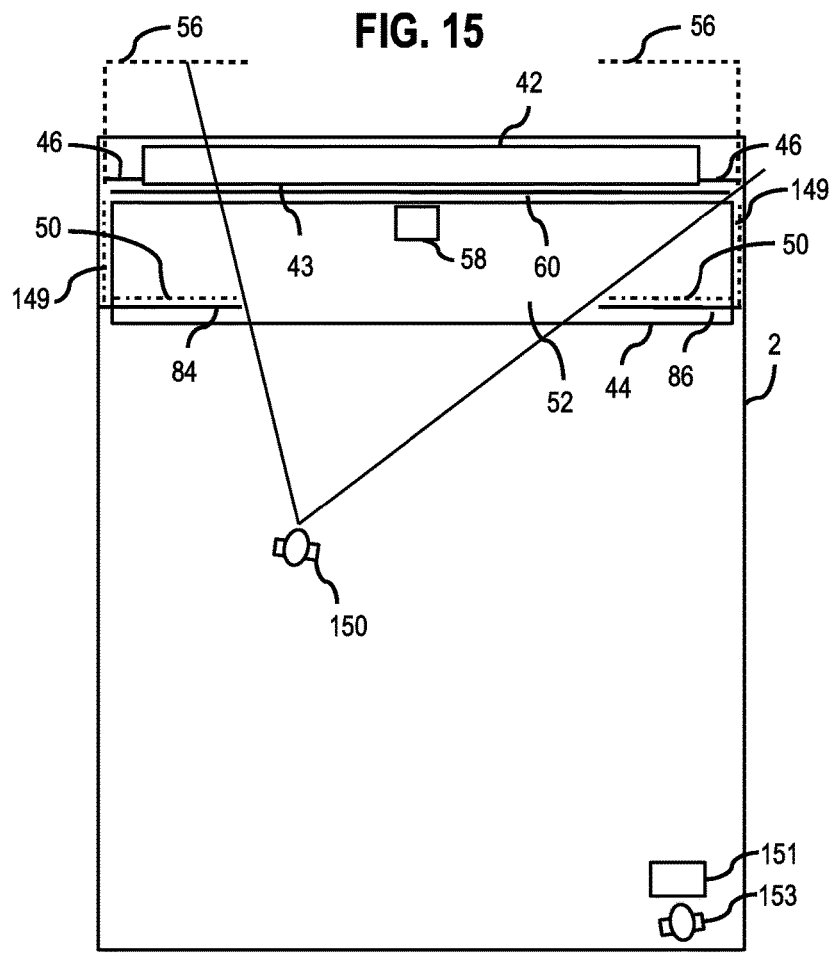
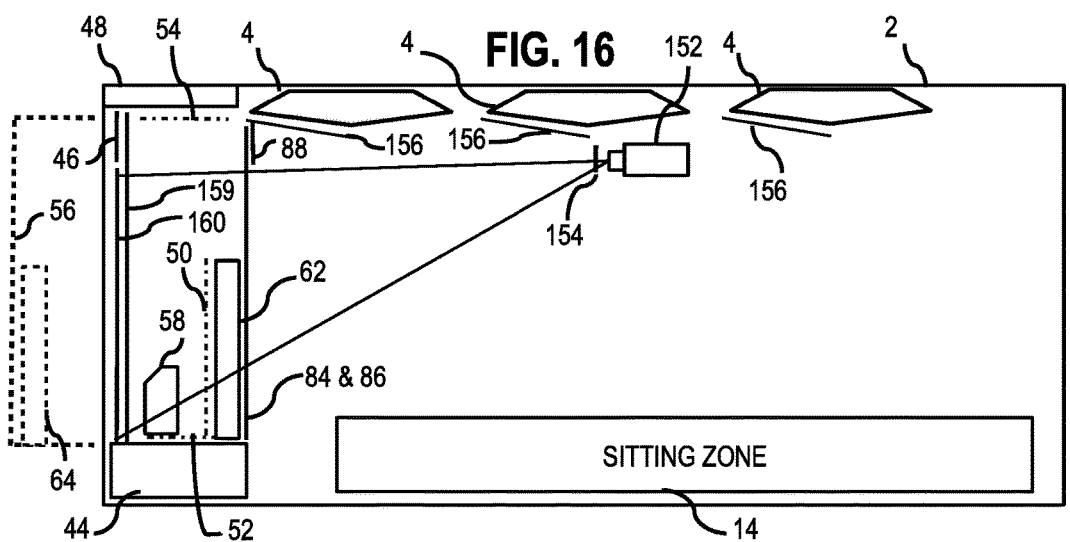

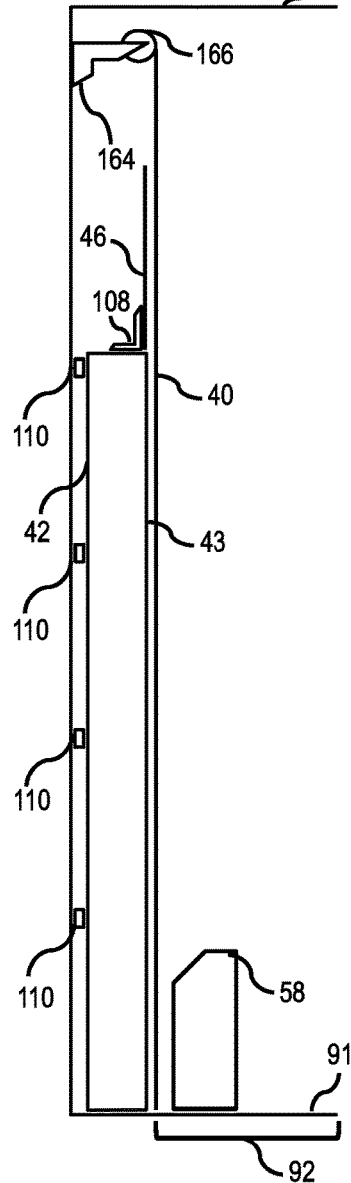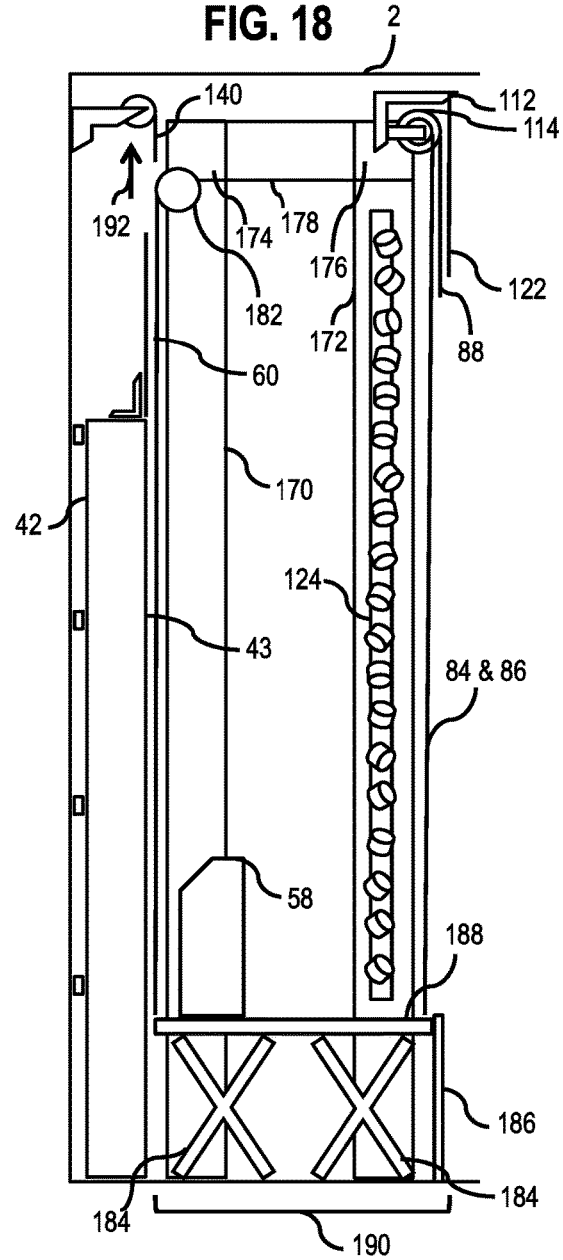

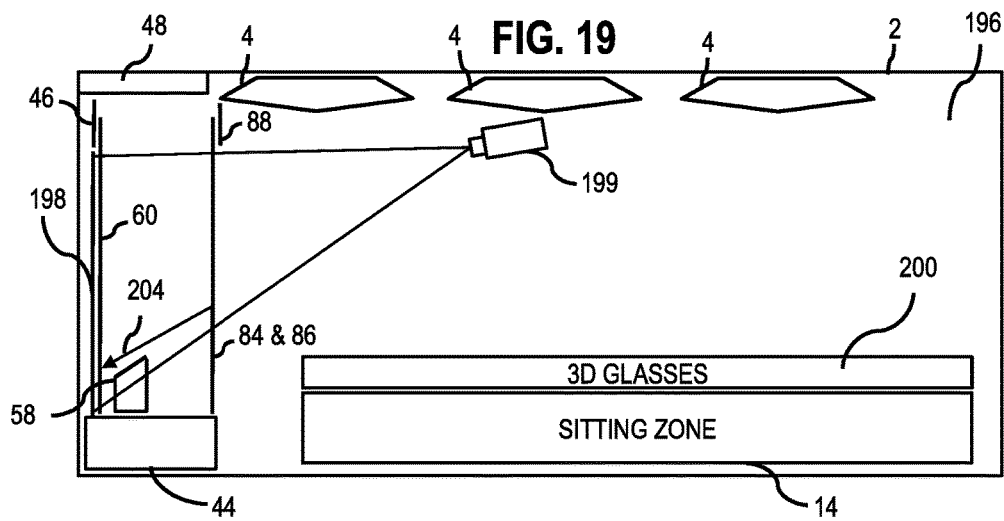
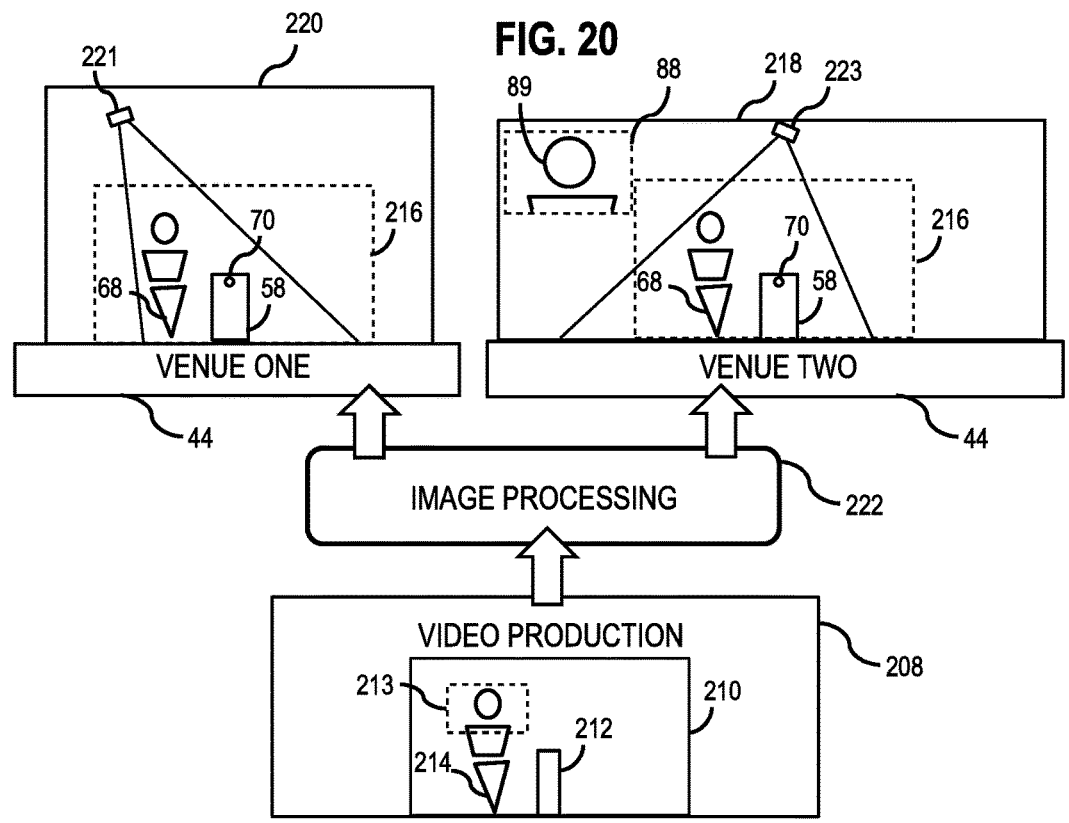

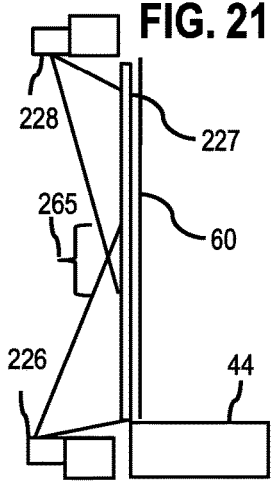
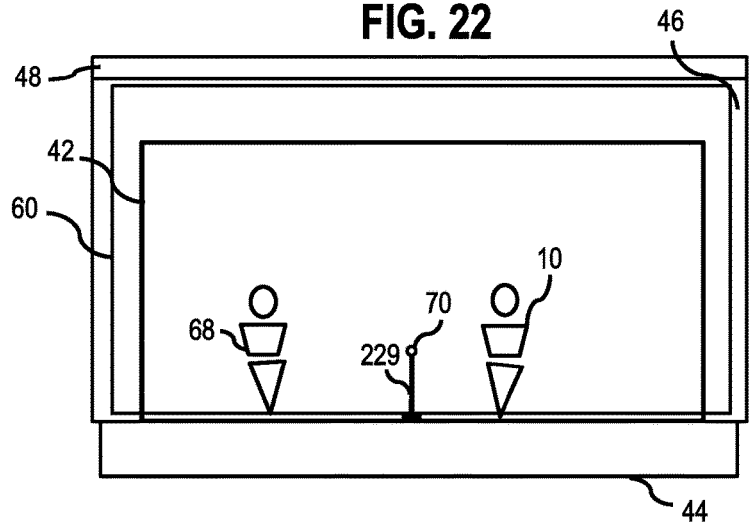
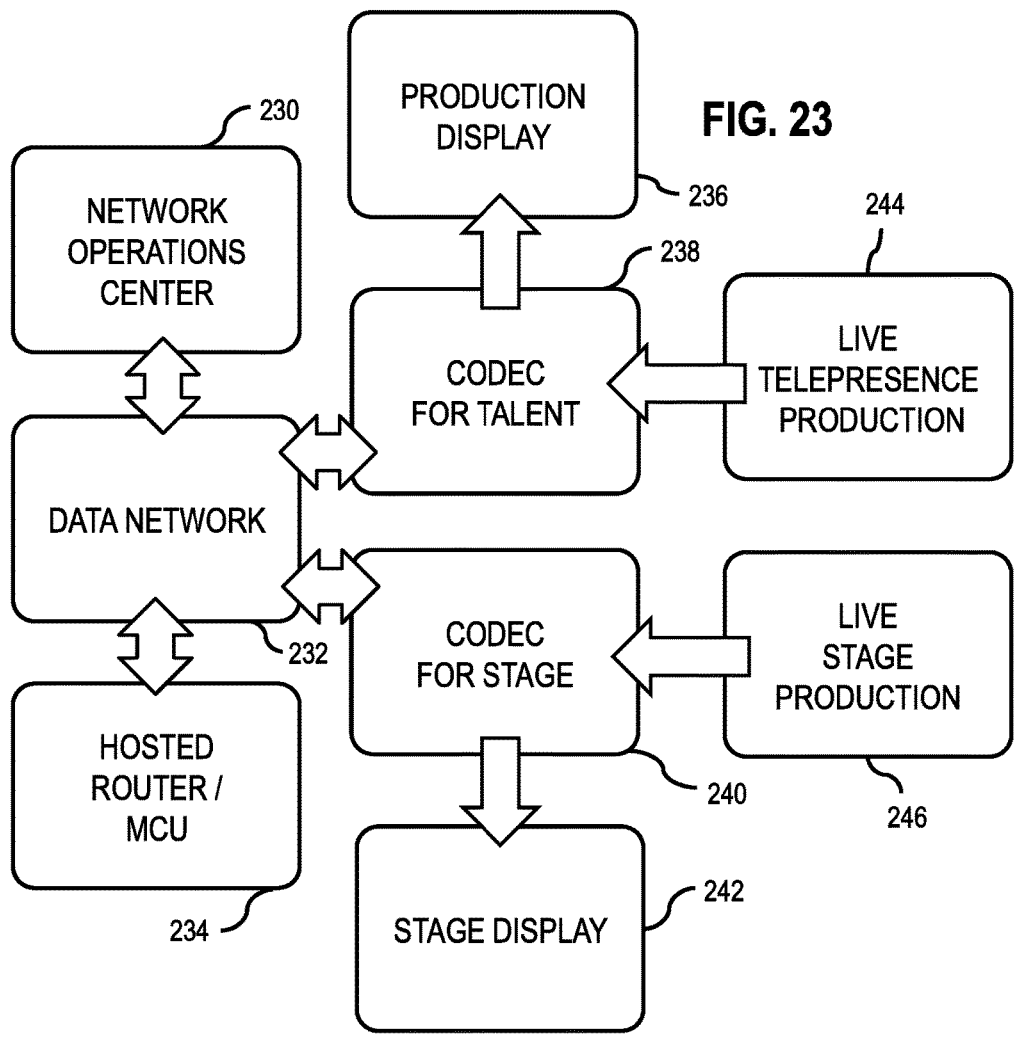

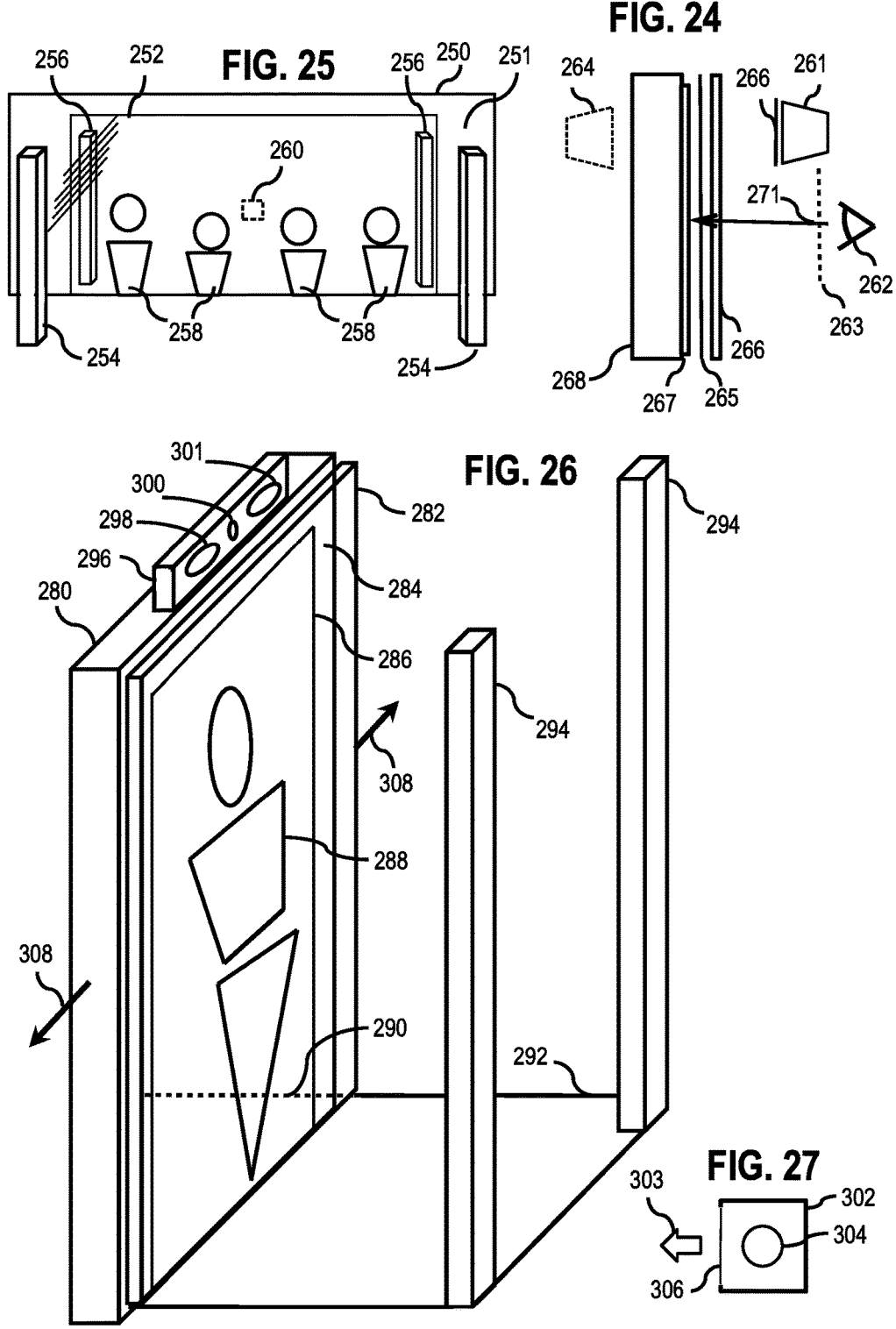

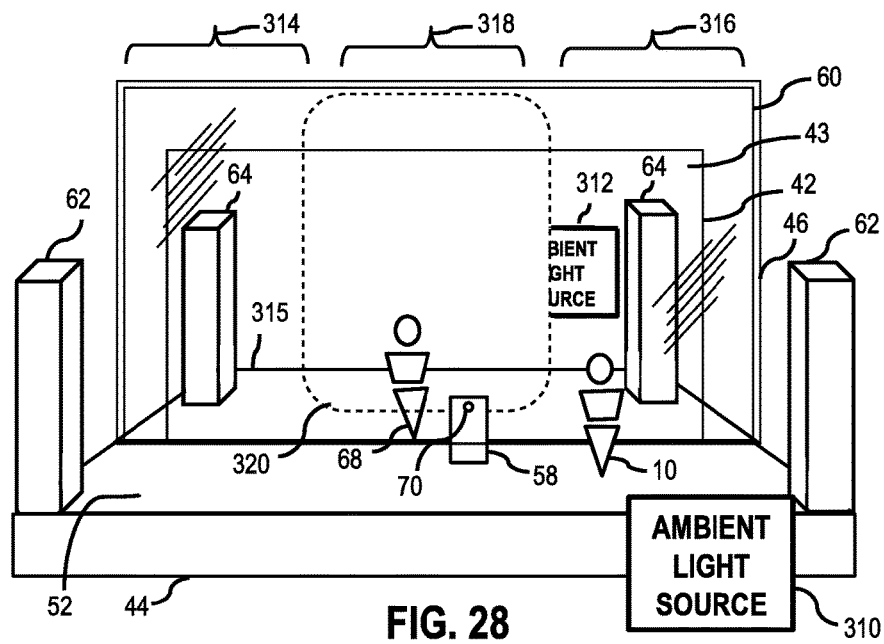
FIG. 28
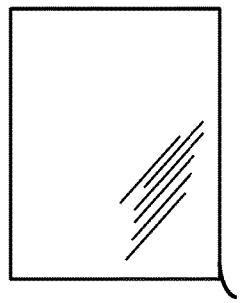
FIG. 29
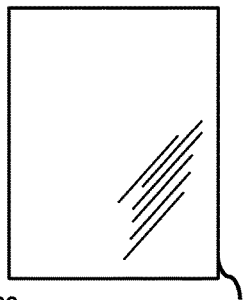
FIG. 30
FIG. 31 FIG. 32
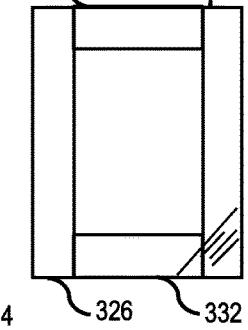 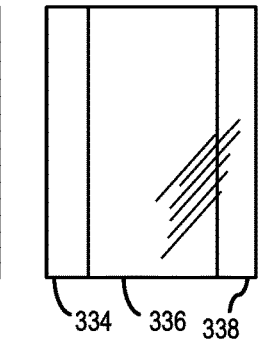
FIG. 33 FIG. 34 FIG. 35 FIG. 36
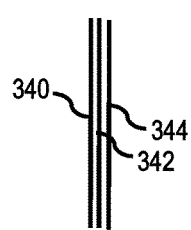 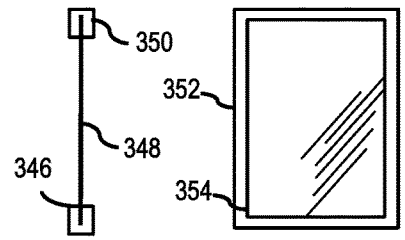 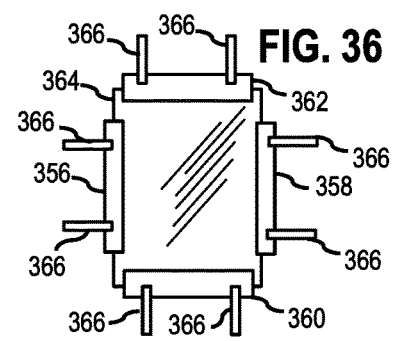

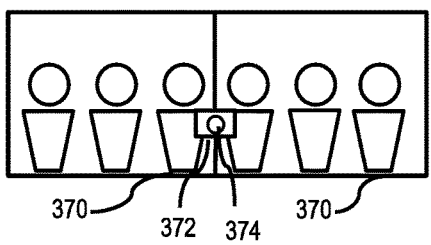
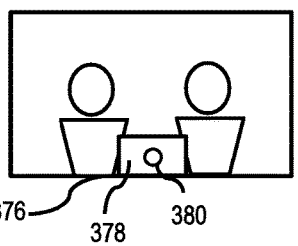
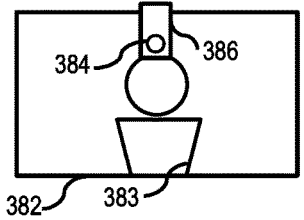
FIG. 37 PRIOR ART   FIG. 38 PRIOR ART   FIG. 39 PRIOR ART
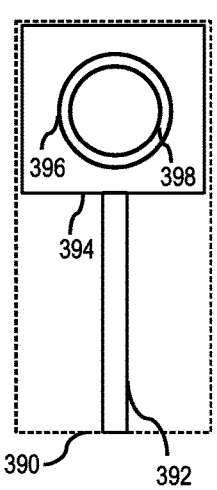
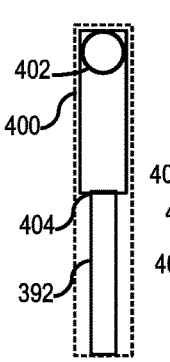
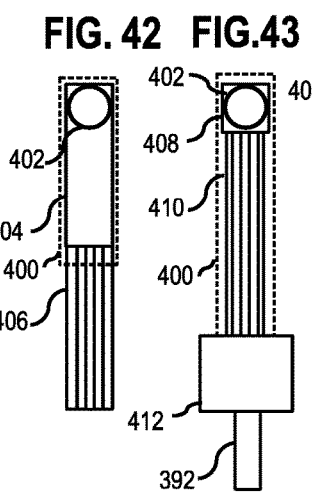
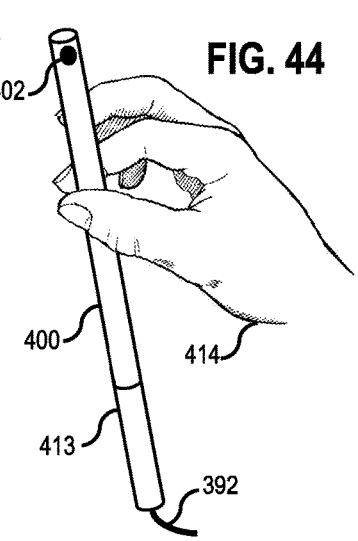
FIG. 40   FIG. 41   FIG. 42   FIG. 43   FIG. 44
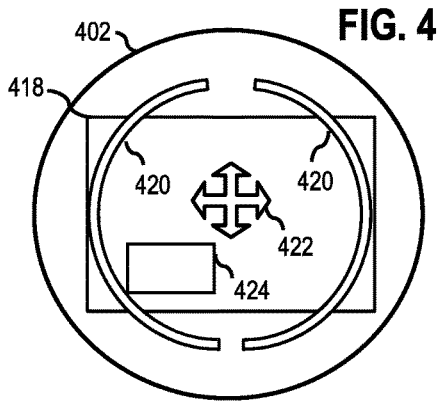
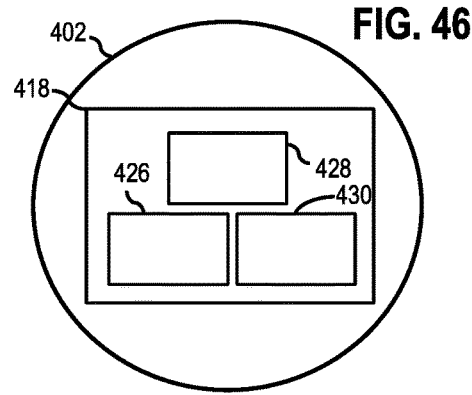
FIG. 45   FIG. 46

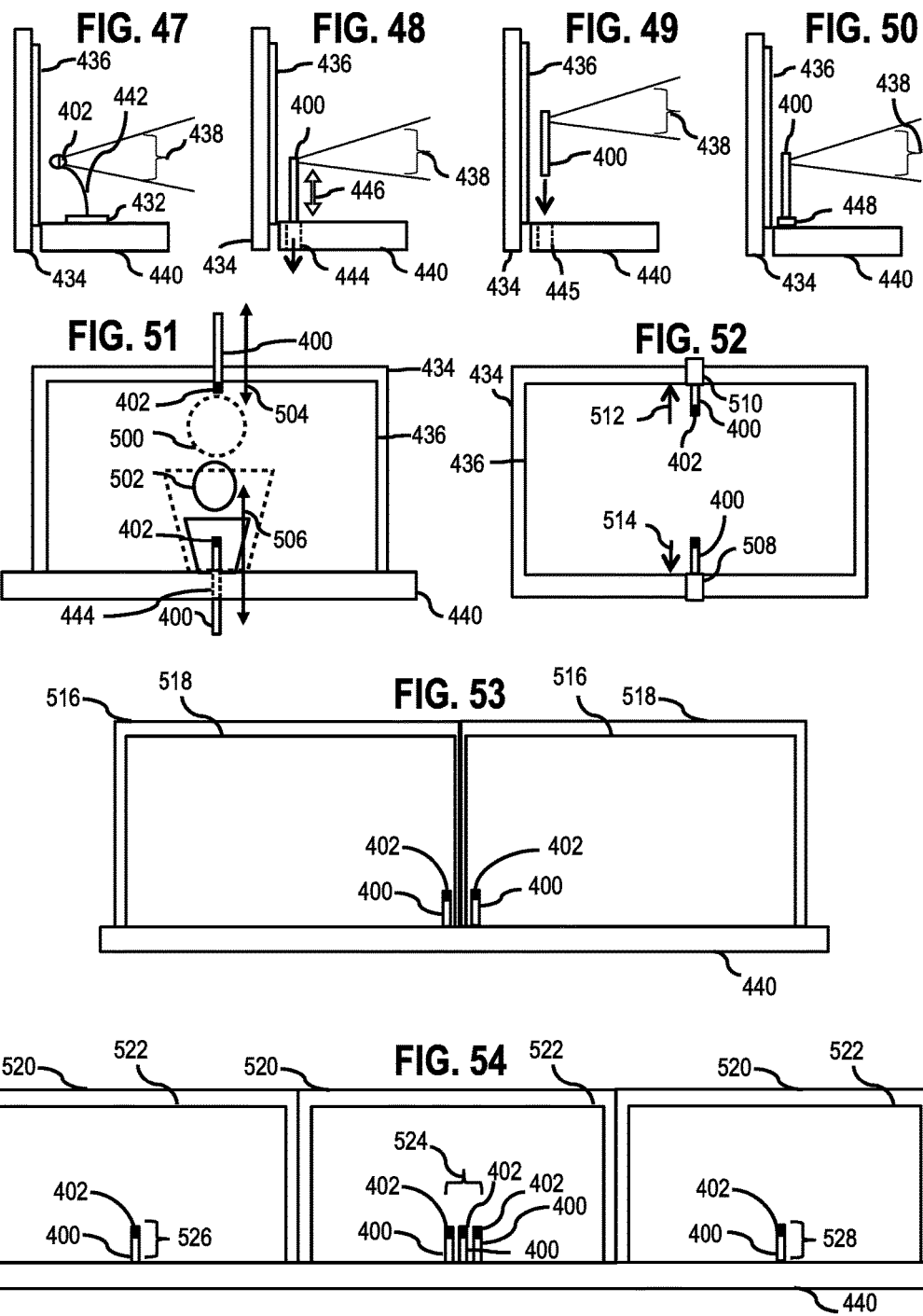

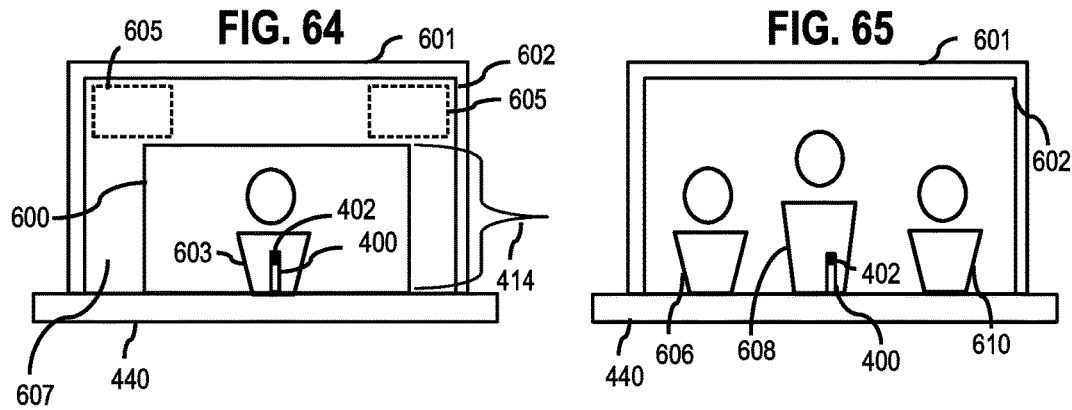
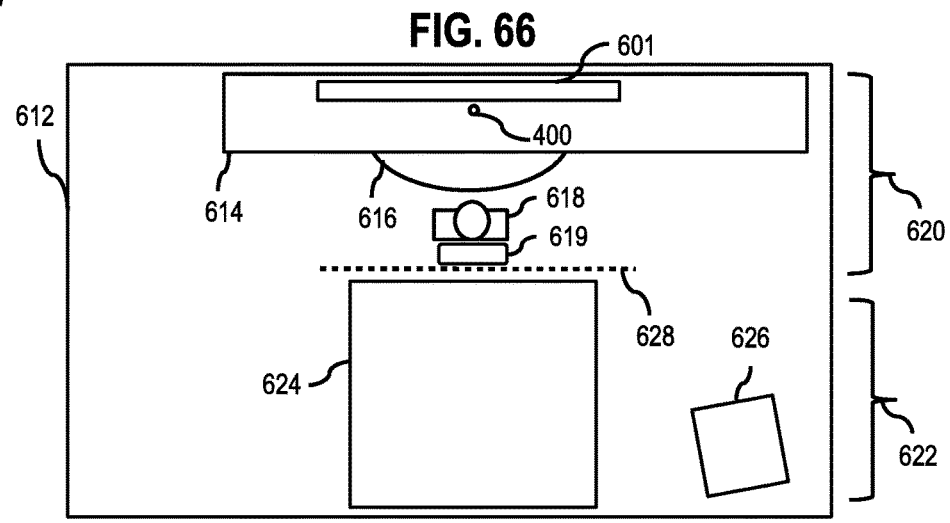
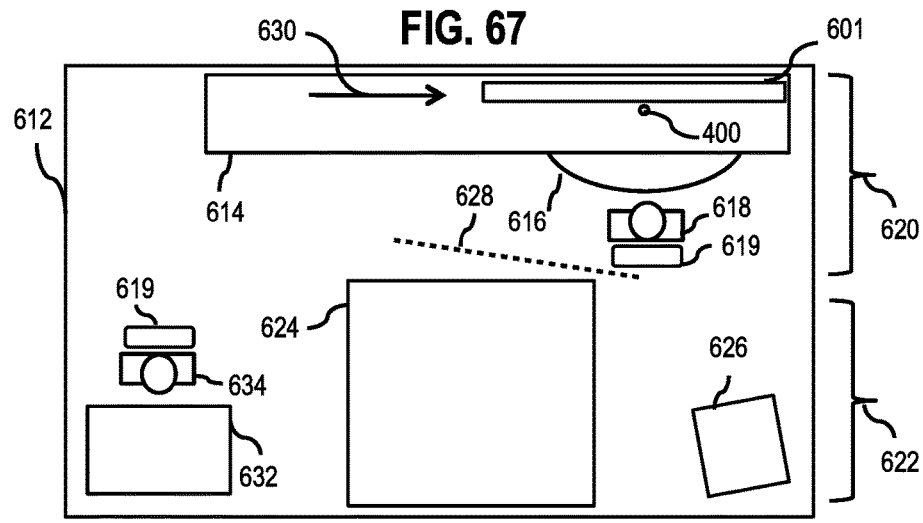

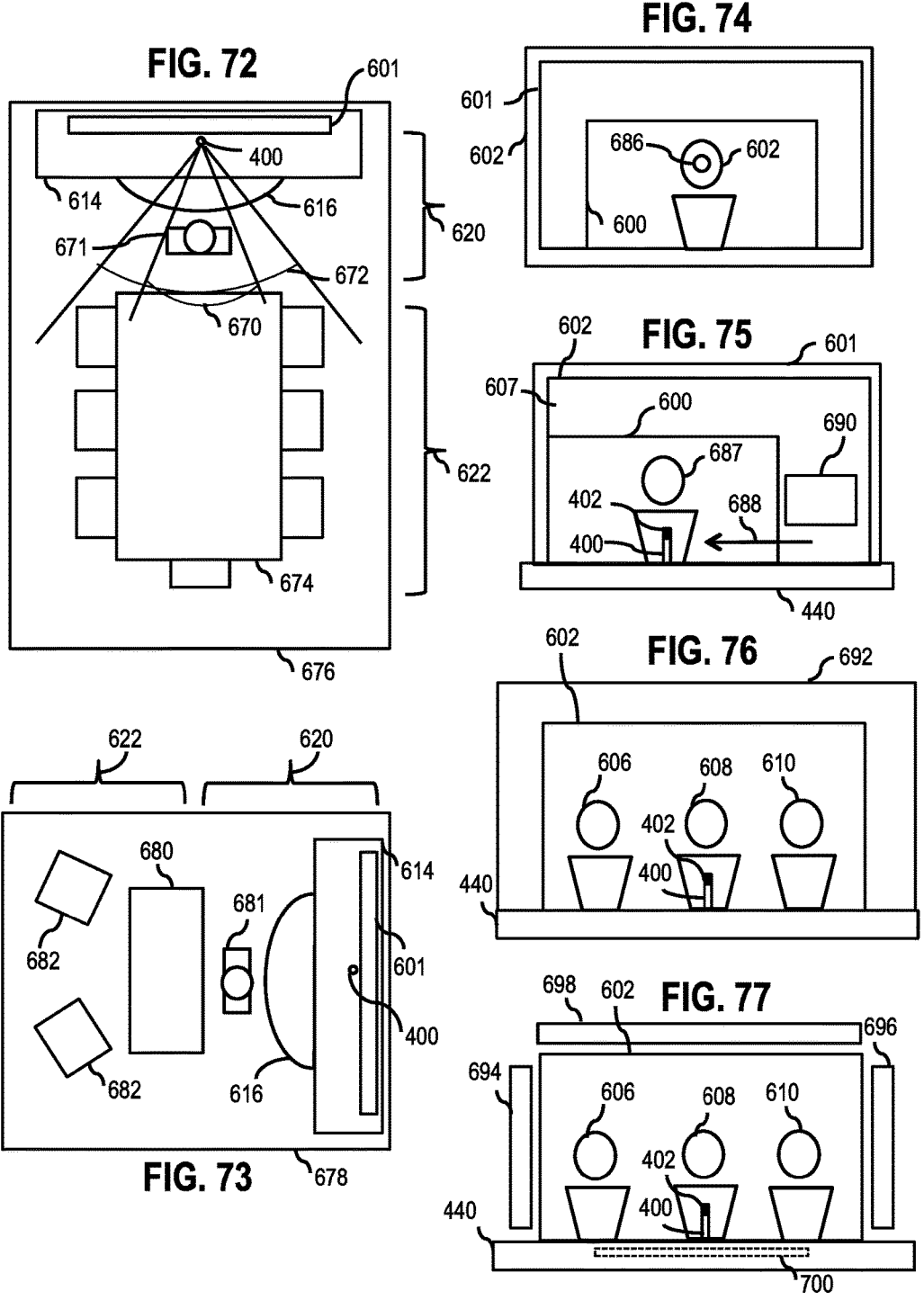

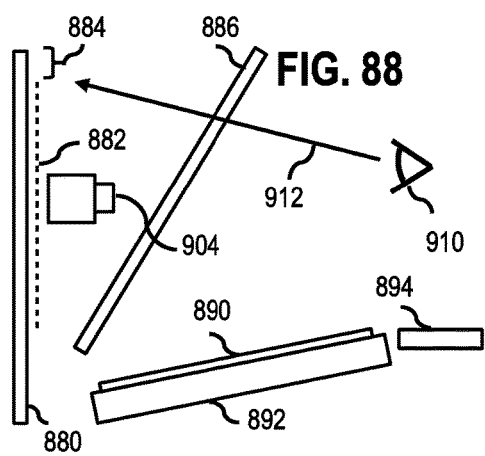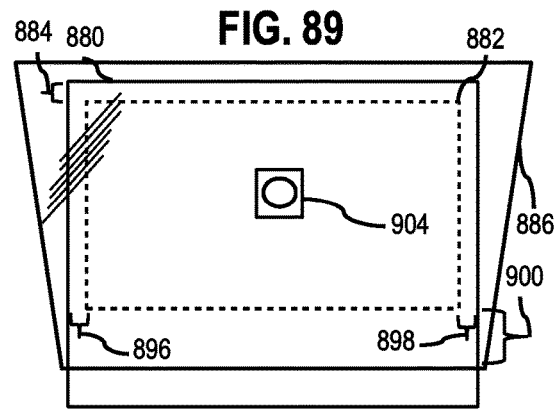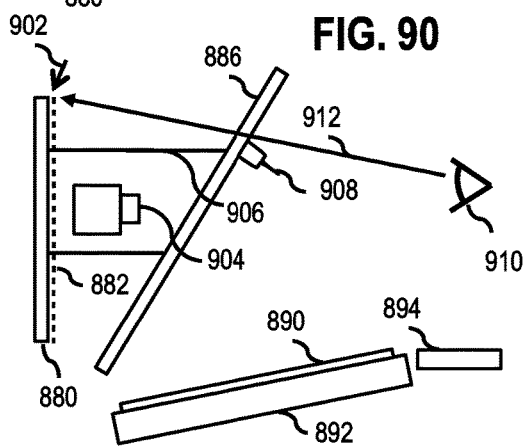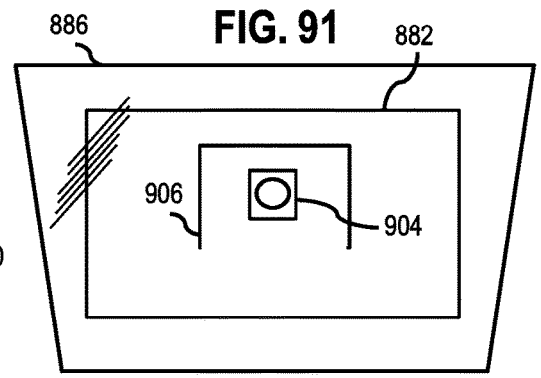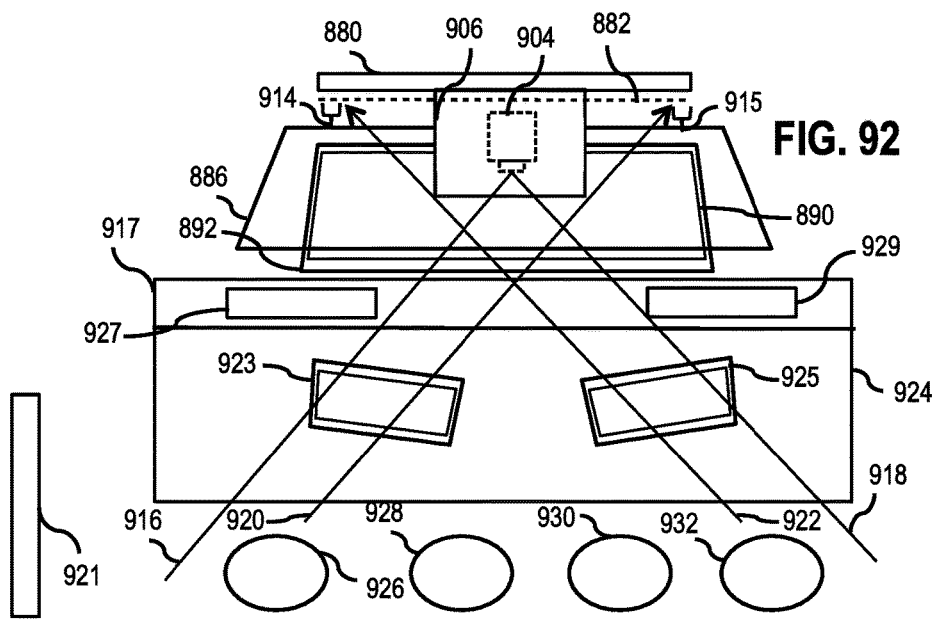

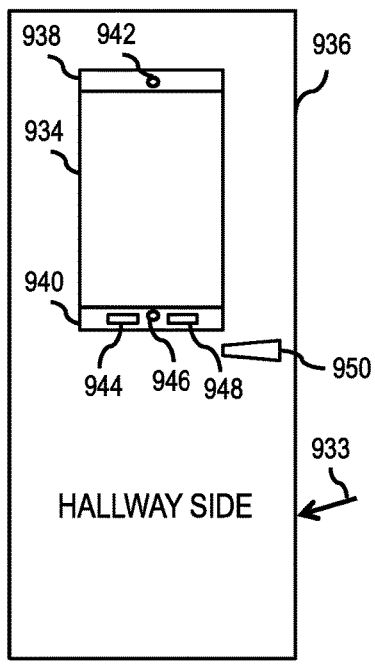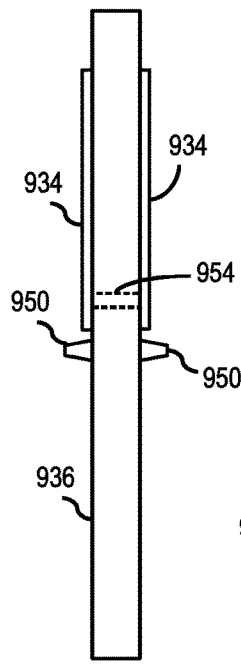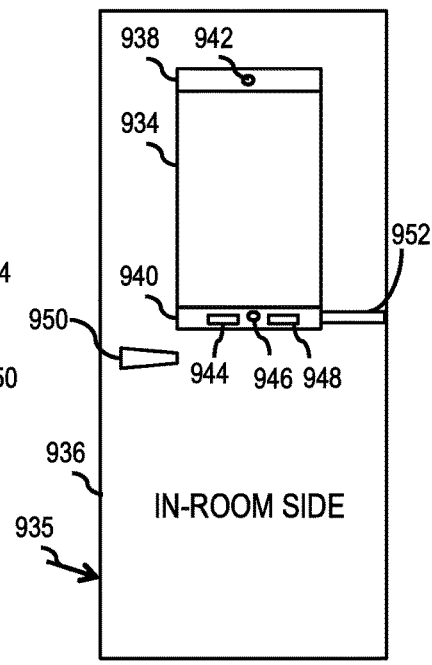

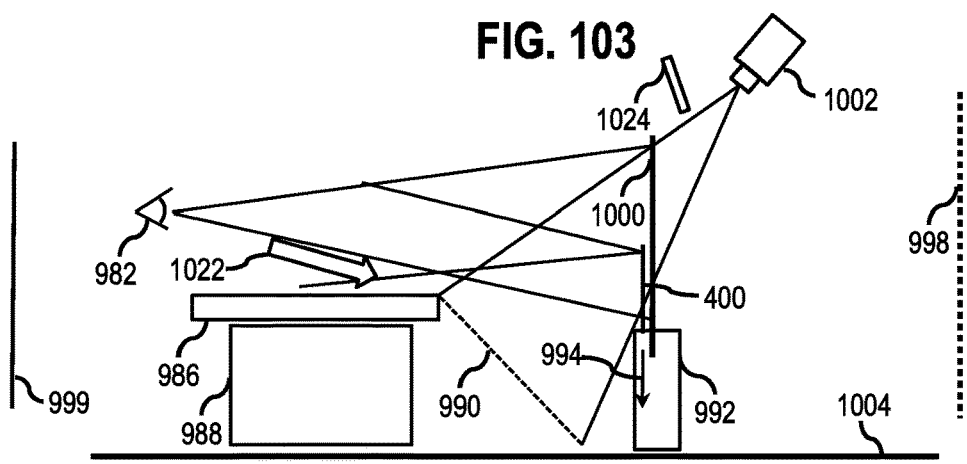
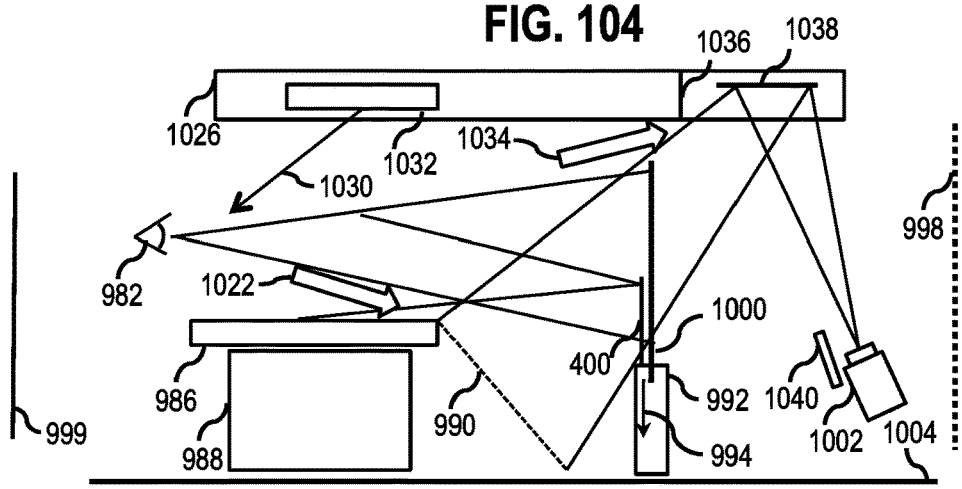
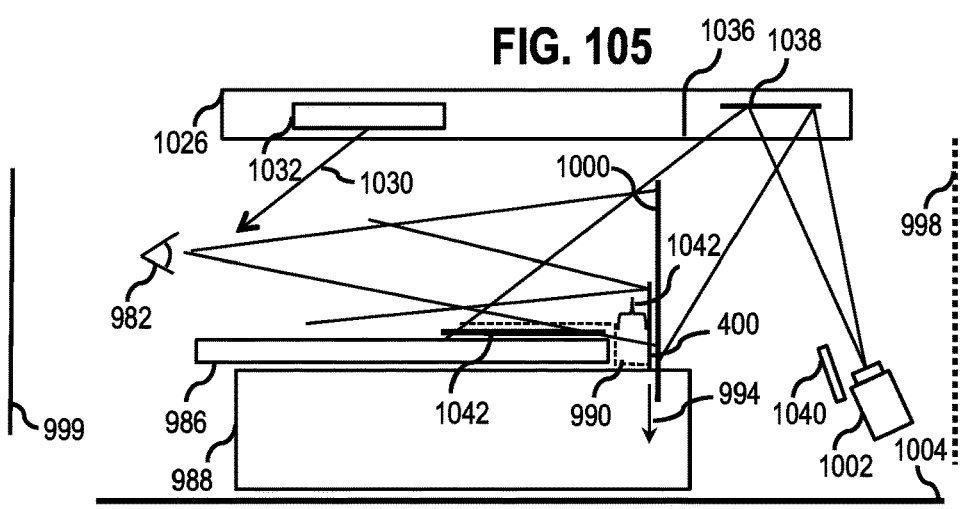

FIG. 111
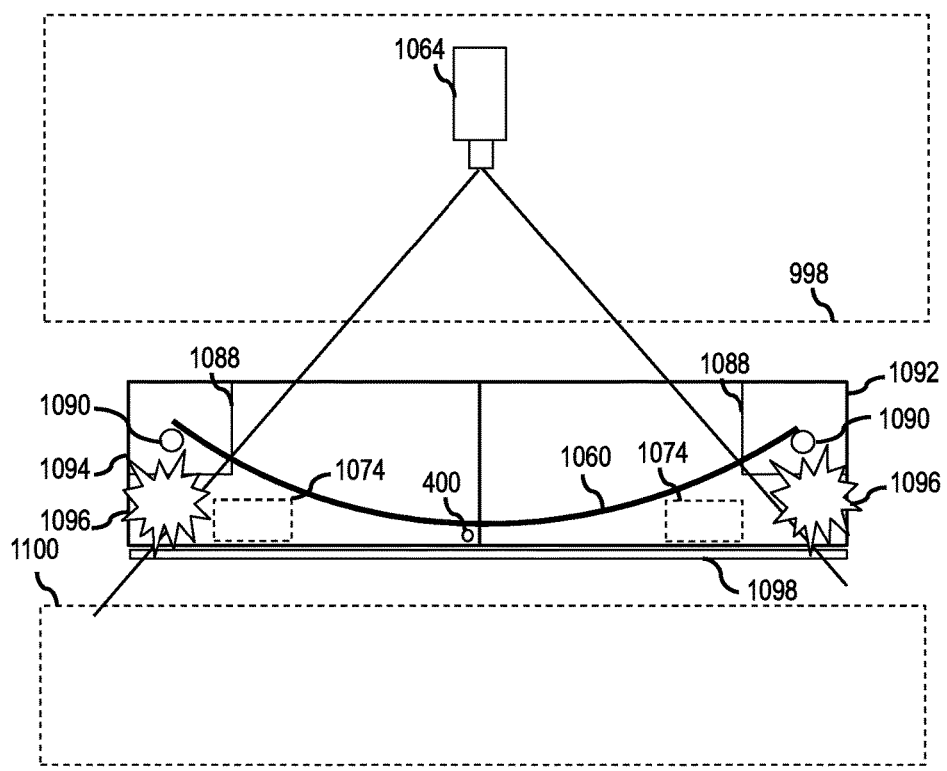
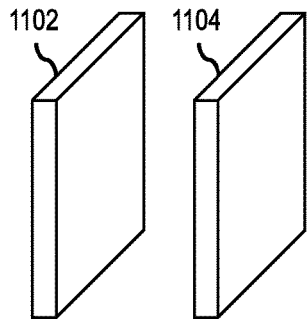
FIG. 112 FIG. 113
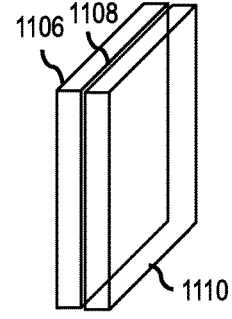
FIG. 114 FIG. 115
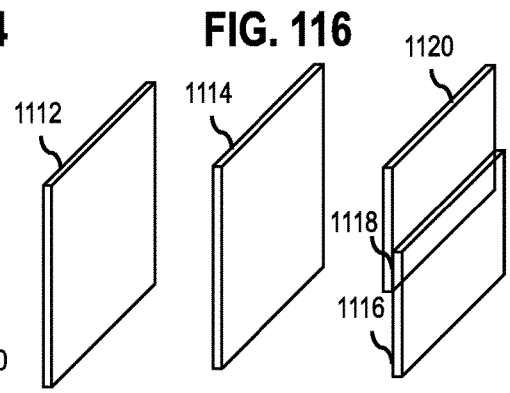
FIG. 116 FIG. 117

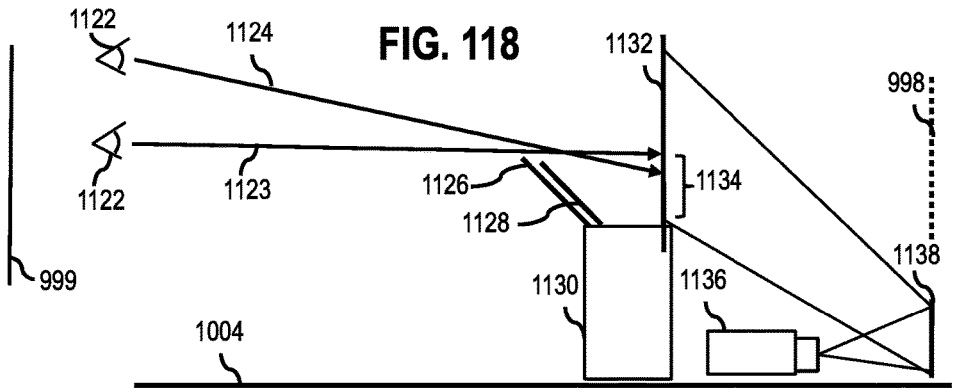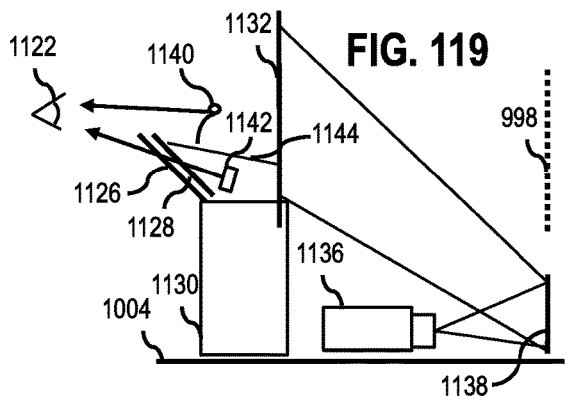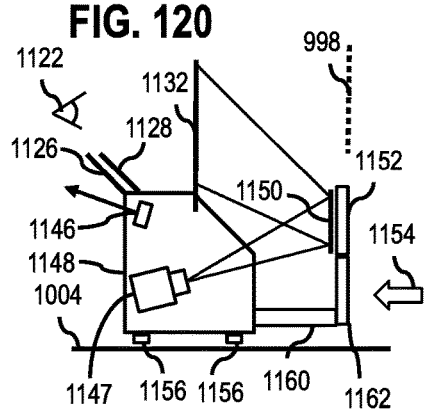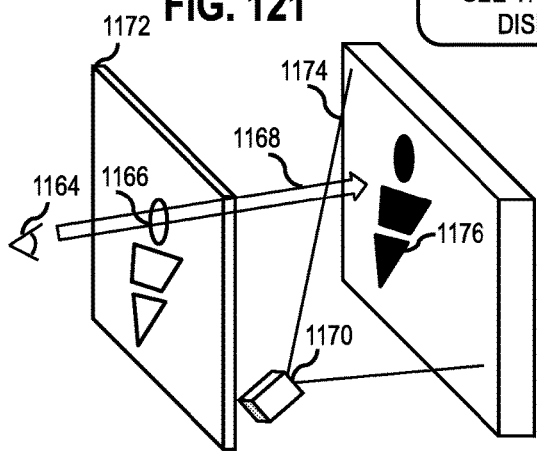

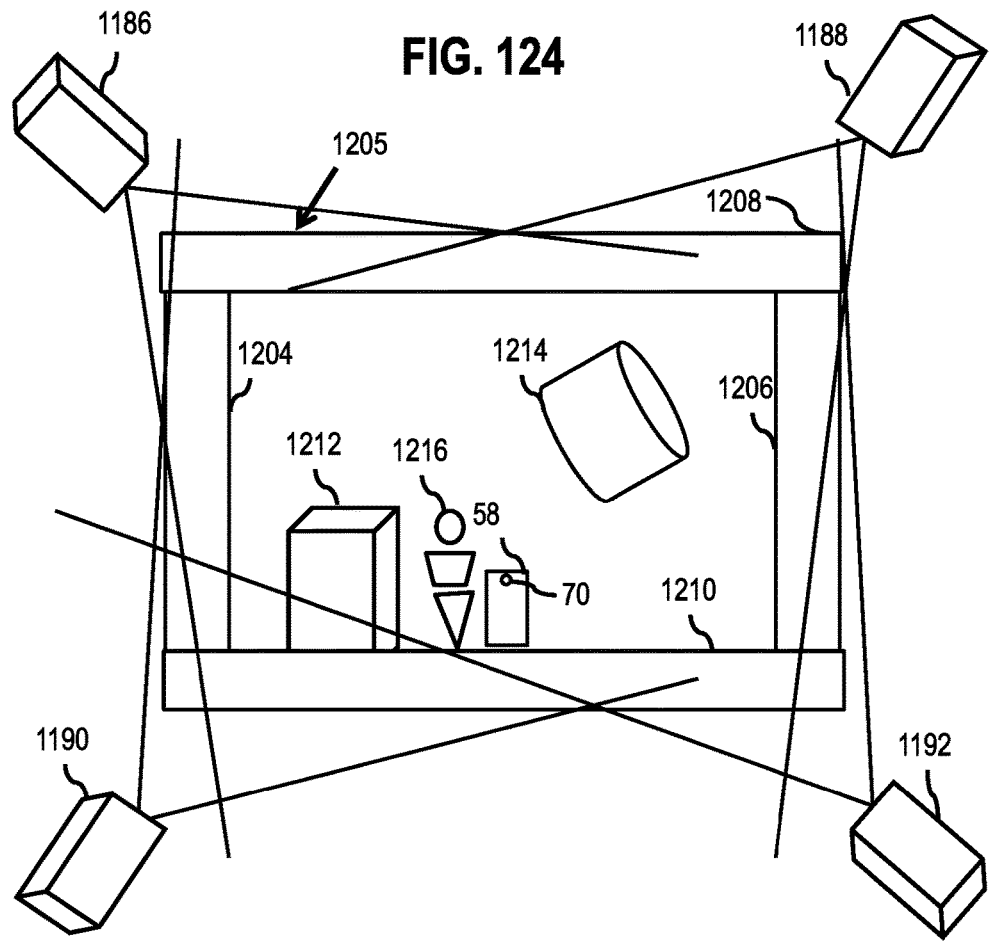
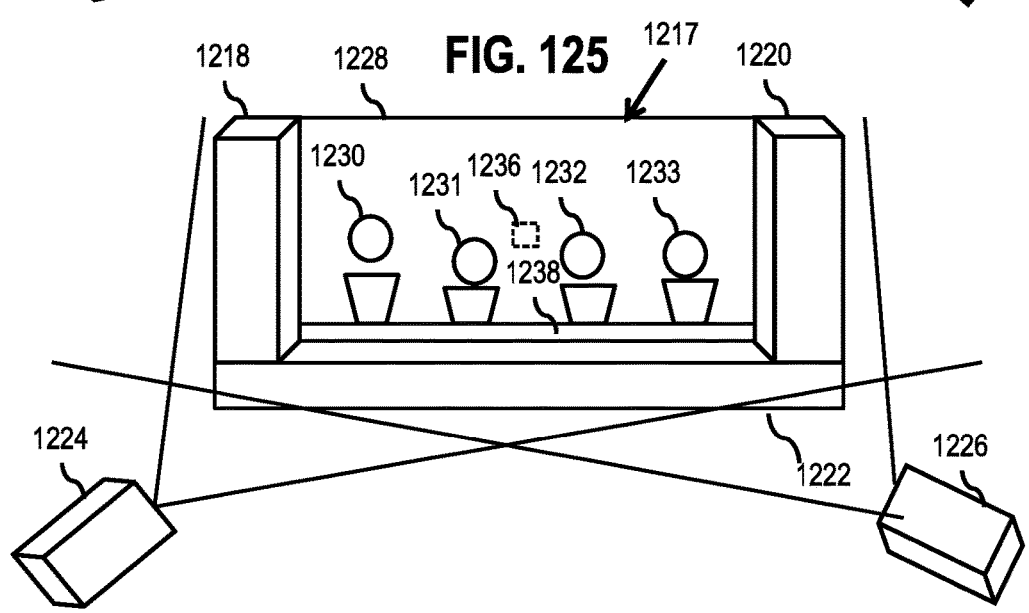

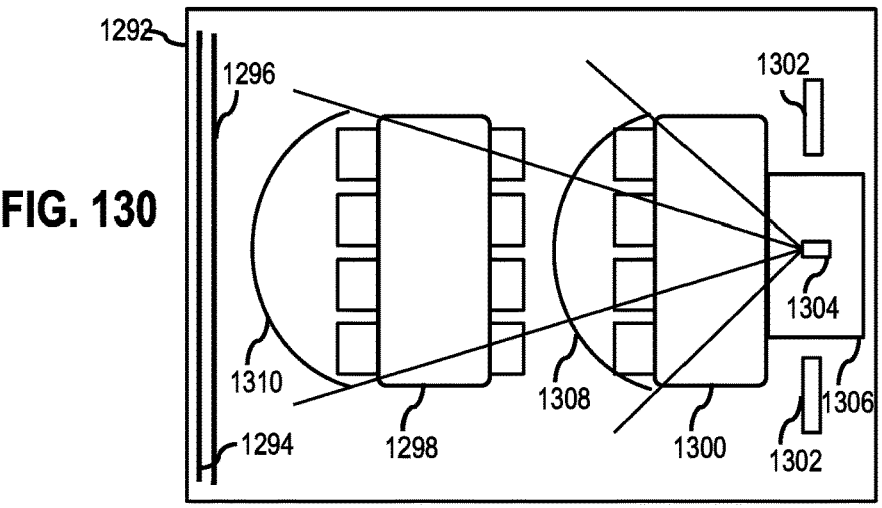
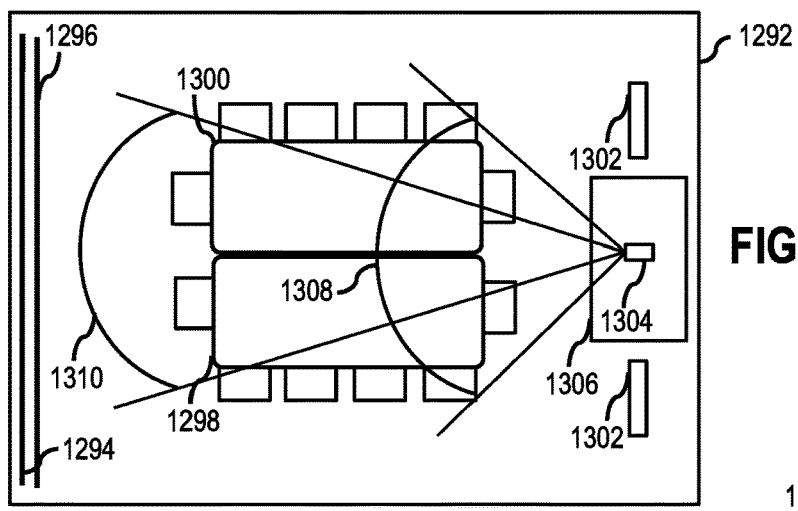
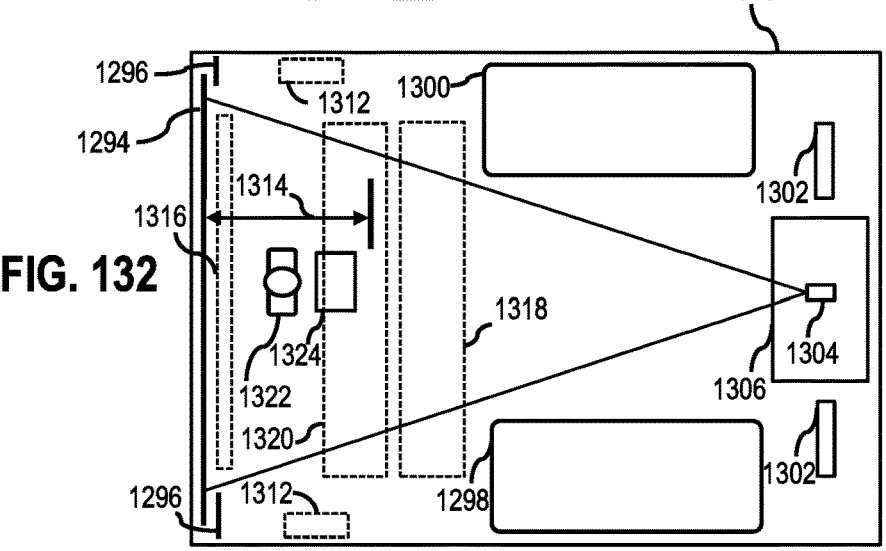

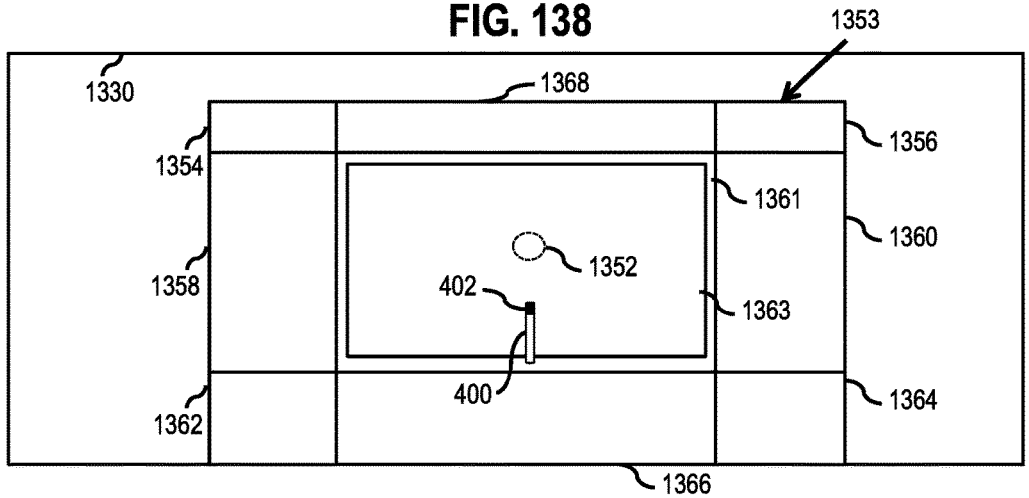
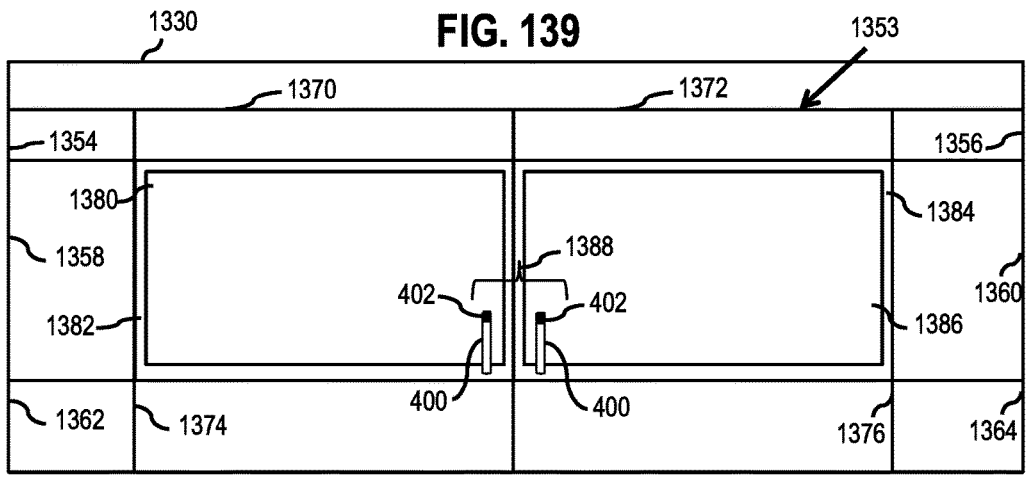
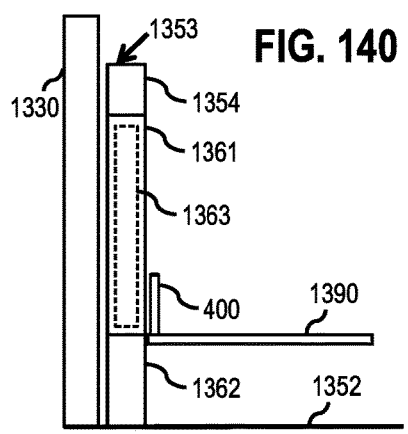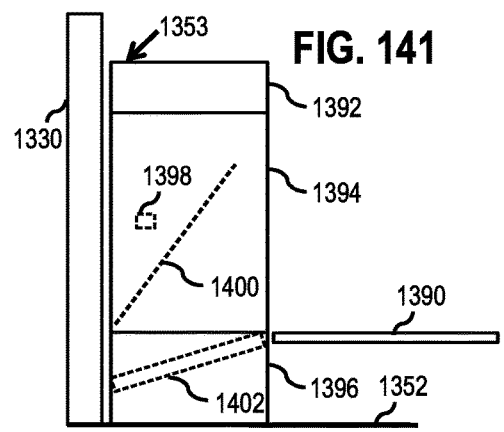

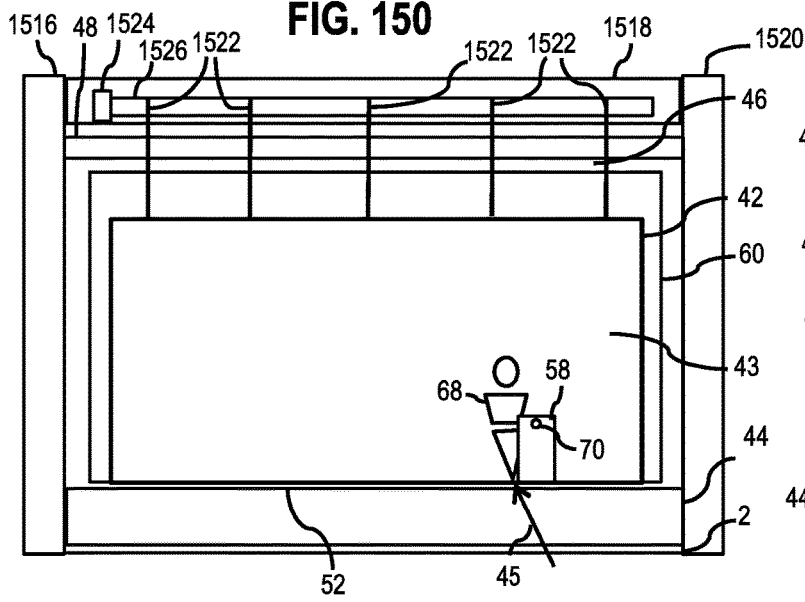
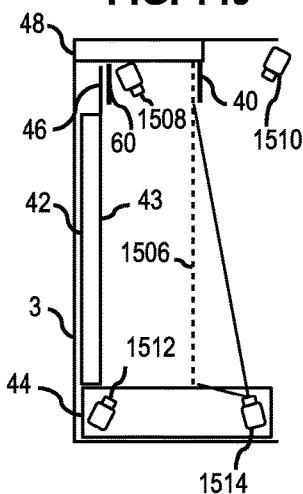
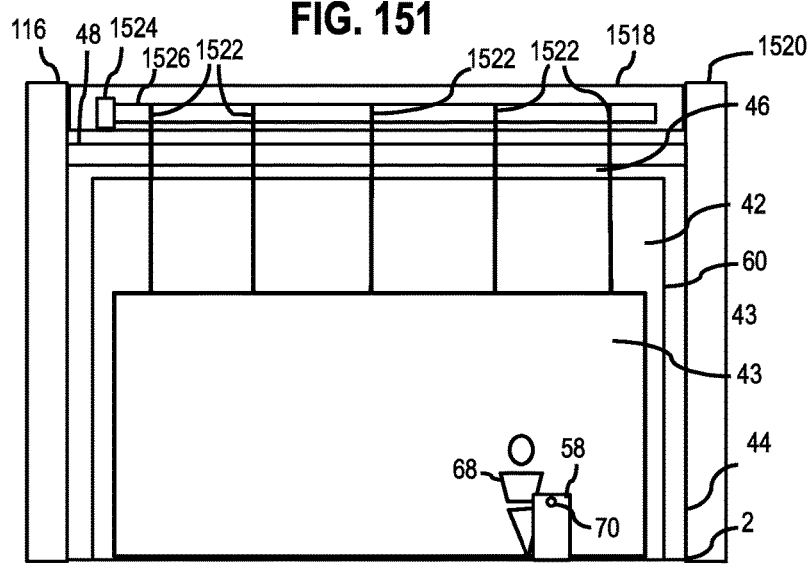
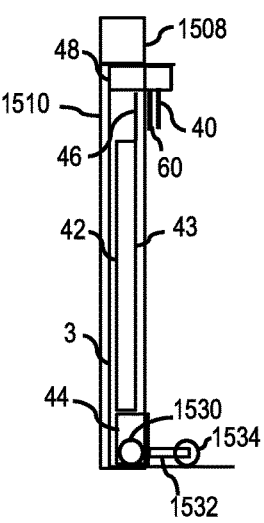

COMMUNICATION STAGE AND DISPLAY SYSTEMS

CROSS-REFERENCE TO PRIOR APPLICATIONS

This application is a continuation-in-part of U.S. patent application Ser. No. 15/593,711 filed May 12, 2017, which is a continuation-in-part of U.S. patent application Ser. No. 14/497,228 filed Sep. 25, 2014, which granted as U.S. Pat. No. 9,819,907 on Nov. 14, 2017.

U.S. GOVERNMENT SUPPORT

Not Applicable

TECHNICAL FIELD

Area of the Art

The present disclosure relates generally to communication and entertainment display devices that are see-through and with 3D settings, and specifically videoconferencing display devices applicable to personal computing, group collaboration, and the theatrical stage.

SUMMARY OF THE INVENTION

Videoconferencing is now an application on personal computing devices for over a billion people. The experience enables audio and video communication, but still lacks the sense of being with the person in the same physical space. The experience is further frustrated by a complete negation of simulating the way people communicate in the same room and in person. The parallax problem still frustrates most all videoconferencing from small handheld phones to large multi-screen telepresence rooms. That problem is a camera mounted away from the conferee's eyes on the screen so people appear to be looking away rather than at the people they intend to converse with. Though numerous technologies have been proposed to resolve this problem the art of using beamsplitters remains the most commercially viable way to align the camera with people's eyes on screen and maintain perfect display image quality and perfect camera image capturing. Numerous advances in reducing the appearance in size of these systems and improving user acceptance is an area of significant research and invention. Further, improved ways to increase the eye contact between conferees in retrofit camera systems and with a variety of display systems is a primary embodiment of the present invention. The present invention discloses numerous ways to improve eye contact with specialized micro-camera imagers and lenses and unique housing configurations.

Another area of great interest is improving the realism of conferencing by freeing the imaged people from the confines of a display frame. Simply when conversing with someone in person they do not have a TV box around them. The display frame is a major distracter while conferencing and this draws a person's attention to a constant awareness that they are conversing with a person on a TV or computer screen and not in-person. The Pepper's Ghost Illusion combined with videoconferencing has greatly resolved this problem. Yet, numerous advances are needed to make this optical configuration practical for group communication. Such advances are the subject of this invention to enable specific built environments concealing the optical, display, and other various components. Further, to enable effective videoconferencing lighting in these highly light sensitive environments is disclosed.

Direct see-through display technologies are now prevalent. The most well-known are projection screens that are see-through. While these screens have the ability to display a person in the physical room they are rendered nearly useless in corporate communications. This is due to the distraction of a residual projection beam that passes through the screen and illuminates portions of the meeting room environment, such as a table or ceiling. What is seen are two versions of the same image with one on the screen and the other dispersed in the meeting room environment. The present invention resolves these residual image issues by concealing these residual images from the direct view of the local participants. Still further, the present invention teaches how to conceal the projector lens seen through the screen. Another direct see-through display technology is LCD panels with the backlight removed. What is left are dull images of videoconferencing participants, yet the physical environment of the room can be seen behind them aiding in conference realism. The present invention teaches novel ways to dramatically improve the brightness of these see-through displays when used for videoconferencing. Further, an inventive method to provide moving shadows behind these direct see-through displays and the Pepper's Ghost optical arrangement is taught.

While holographic effects for the stage have become more common, the technology of inclined foil, plastic, and glass that creates these effects have limited many potential applications. An inclined optic for reflecting a physical room or an image display hidden from the audience view is well known in the art. Unfortunately, the inclined optic has proven to be a great hindrance to the technology's adoption. The inclined optic, often stretched polyester film, is very delicate and can take days to set-up in venue. The inclined optic also takes up a tremendous amount of space on stage, as well as a display laid on the stage floor. The present invention resolves all these insurmountable issues of the prior art with a unique ultra-compact staging hologram appearing solution. The present invention teaches the removal of the inclined optic and instead allows a vertical optic to reflect an illuminated foreground to create the illusion of stage objects and set behind a motion image. Further, videoconferencing applications are disclosed uniquely integrated into this stage optical configuration, as well as physical mid-ground props. Further, the stage solution is, in one embodiment, permanently attached to the room and expands and retracts as needed for quick set-up. Also, the same configuration is disclosed in small systems that provide life-size people in kiosks, as well as built into conference meeting rooms.

Image mapping has become well known for applications of making buildings come to life with amazing animation effects. The use of multiple projectors with mapping software to fit content onto physical objects is a carefully orchestrated projected effect. Using a grouping of imaged mapped projectors the present invention combines videoconferencing with a 3D projected physical set with life-size people among the projected set. The same can apply to recorded presentations creating the effect of a proportional correct human amongst a projected physical object set and both the human and the set are produced by the same imaged mapped projectors. Beyond the theater the invention has been applied to corporate group conferencing rooms where a grouping of imaged mapped projectors create the meeting room environment and the imaged videoconferencing participants.

Another primary embodiment of the present invention is to deploy display and communication technologies of the present invention in an enterprise of like units where many sites can all enjoy the same experience. Attention to display size, life-size people and distance to display are all critical when configuring displays for enterprise wide deployment. The present invention is applicable to corporate enterprises, but also in detail reveals the unique challenges deploying in a hotel enterprise. Unique enterprise wide hotel solutions are taught including smart doors where both sides of the hotel room door becomes a vital guest communication, security, and application portal. Also, guests are provided displays designed for the wrist and worn like bracelets, yet can unfold as a mobile phone or tablet. Further, see-through reception desks are disclosed where hotel staff can interact with guests virtually. Lastly, the present invention expands the use of a hotel property management system to interoperate with and manage the functional uses of the present invention displays and display application embodiments disclosed herein.

The present invention allows the aforementioned ultra-compact staging hologram device that is permanent in a hotel multi-purpose room, and enables the device to be moved without being disassembled in that room. The costs of setting up and tearing down large event audio/visual equipment are often insurmountable in costs. The present invention provides a concealed staging system, with a massive image display, retracted and hidden in the hotel multi-purpose room. Now clients can save enormously on the costs for setting up and tearing down these events because the audio/visual technology already exists in the hotel multi-purpose room. Further, the present moveable feature enables the hotel facility to place the device in any configuration in a multi-purpose room with and without room dividers.

Other embodiments of the present invention to further improve the large venue stage experience is overcoming the insurmountable costs of large event productions since creative agencies are involved in creating custom video content. The present invention teaches a new process to bypass a great deal of the custom content used for large scale video events by providing a client accessible online production program where the client can select from templates and a content library impressive show elements and fully conceptualize the show from their personal computing device. Further, a remote production staff at various locations joins the live show event as extended staff by a collaboration connection and is being able to control all or portions of the event show control system. Also, uniquely described is a temporary studio soundstage using a hotel multi-purpose room where the talent and the producers can see in real-time the production on the final format event display system already located in the multi-purpose room.

A further embodiment of the present invention provides consumers, including professionals, a flexible camera housing system where they can create their own camera housing. Cameras components are becoming increasingly miniaturized and the consumer is still limited to the applications of housing the major camera manufacturer provides. This limits numerous potential applications of how a small camera can be used by a consumer. The present invention enables a consumer the ability to access on their personal computing device a library online or downloaded of numerous camera housing 3D models. These models may be 3D printed or modified and the consumer can create their own housings.

The consumer then, with a small camera component kit, integrate that kit into the 3D printed camera housing.

The invention further discloses applications for large immersive ultra HD displays as used in numerous leisure and working environments. These new displays permit such high resolution that computer images may be resized to small portion of the screen while the user is immersed close up to the large display. Numerous room configurations, furniture configurations, and a unique device to manipulate multiple video sources on a single ultra HD image are disclosed, all of which enables entire new ways of watching large immersive displays in working modes close up and watching modes further away.

The invention further discloses novel marketing, speaker, and campaign system that enables mobile vehicles to set-up holographic events quickly and with a minimum crew at temporary events and present a live "holographed" person from a distant location. The prior art of inclined optics to create a reflected hologram has proven to be costly, too involved to set-up quickly, dim and dull in appearance, and too bulky to provide such mobile campaigns requiring rapid deployment at temporary events. The present invention discloses a unique process and device to overcome the substantial prior art limitations using mobile vehicles and a holographic podium with direct projection.

DESCRIPTION OF THE FIGURES

The included drawings are for illustrative purposes and serve only to provide examples of possible structures and process steps for the disclosed inventive apparatuses, systems, and methods. These drawings in no way limit any changes in form and detail that may be made to embodiments by one skilled in the art without departing from the spirit and scope of the disclosure.

FIG. 1 illustrates a prior art diagram of a hotel ballroom with a temporary audio/visual presentation set-up.

FIG. 2 illustrates a prior art diagram of a hotel ballroom with a temporary set-up of an inclined optic Pepper's Ghost illusion.

FIG. 3 illustrates a prior art diagram of a hotel ballroom with a reflected room depth illusion using an inclined optic.

FIG. 4A illustrates a side cut away view of the present stage invention in a hotel ballroom fully retracted and concealed and reveal the décor of the room.

FIG. 4B illustrates a front view of the present stage invention in a hotel ballroom fully retracted with a matching décor concealment.

FIG. 5 illustrates the present stage invention in a hotel ballroom fully expanded and operating with a live person on stage and enabling live people on screen amongst a reflected foreground behind them.

FIG. 6 illustrates the present stage invention fully expanded with illuminated 3D foreground props reflected to form a background.

FIG. 7 illustrates the present stage invention fully expanded with foreground drapes, emissive display, surrounding black, and sectional vertical foreground reflector.

FIG. 8 illustrates the present stage invention fully expanded with foreground roll-up panels, emissive display, surrounding black, and sectional vertical foreground reflector.

FIG. 9 illustrates the present stage invention fully expanded with a continuous vertical foreground reflector and the emissive display producing a life-size person, 3D objects, and a magnification screen (foreground not shown).

FIG. 10 illustrates the present stage invention fully expanded and the room floor serving as the stage area.

FIG. 11 illustrates the present stage invention fully expanded where the emissive display starts near floor level and the stage is placed in front of the emissive display.

FIG. 12 illustrates the present stage invention fully expanded with the vertical foreground reflector rolled up and out of view of the audience.

FIG. 13 illustrates the present stage invention fully retracted, concealed in the room, and with mechanical mechanism detail.

FIG. 14 illustrates the present stage invention of FIG. 13 fully expanded and with mechanical mechanism detail.

FIG. 15 illustrates the present stage invention fully expanded and revealing an audience members' scope of view of the foreground, mid-ground objects, screen, and reflected foreground background.

FIG. 16 illustrates the present stage invention fully expanded with a front projection system and the reflected foreground using foreground props.

FIG. 17 illustrates the present stage invention with an emissive display near floor height and a concealing drop panel hiding the massive display in a hotel ballroom.

FIG. 18 illustrates the present stage invention of FIG. 17 with a reflected foreground staging kit that is assembled in front of the emissive display.

FIG. 19 illustrates the present stage invention with 3D projection aligning video conferenced people on stage and amongst foreground props.

FIG. 20 illustrates the present stage invention content production and distribution to various size displays and maintaining life-size proportionality both in live and recorded playback modes of use.

FIG. 21 illustrates the present stage invention utilizing multiple rear projectors.

FIG. 22 illustrates the present stage invention with both a live person on stage interacting with an imaged person on the screen of the emissive display.

FIG. 23 illustrates the present stage invention with a basic diagrammatic layout of a live telepresence production.

FIG. 24 illustrates the present invention with a polarized light reduction system.

FIG. 25 illustrates the present invention configured for corporate communications in a meeting room with a reflected foreground behind the imaged conference participants.

FIG. 26 illustrates the present invention with a life-size person kiosk display with a reflected foreground consisting of high intensity light bars in the foreground.

FIG. 27 illustrates the present invention with a high intensity light bar construction.

FIG. 28 illustrates the present stage invention fully expanded with a conferenced person imaged on the screen in the mid-ground and reflected foreground objects in the background.

FIG. 29 illustrates the present invention utilizing a glass vertical reflector.

FIG. 30 illustrates the present invention utilizing a rigid plastic vertical reflector.

FIG. 31 illustrates the present invention utilizing a sectional vertical reflector.

FIG. 32 illustrates the present invention utilizing a gradient vertical reflector.

FIG. 33 illustrates the present invention utilizing multiple layers of reflective optics to increase brightness.

FIG. 34 illustrates the present invention with a weighted thin film plastic used for a vertical reflector.

FIG. 35 illustrates the present invention with a stretched frame retaining a thin film plastic used for a vertical reflector.

FIG. 36 illustrates the present invention with a stretching method for a thin film plastic used for a vertical reflector.

FIG. 37 illustrates a prior art multi-screen conference system with a camera aimed through a rear projection screen hole.

FIG. 38 illustrates a prior art camera box blocking a substantial part of the screen.

FIG. 39 illustrates a prior art large hanging camera intruding on the screen.

FIG. 40 illustrates the present invention with a screw mount lens.

FIG. 41 illustrates the present invention with a modified rectangular sensor board enabling a micro stem camera assembly.

FIG. 42 illustrates the present invention with a transparent wire system.

FIG. 43 illustrates the present invention with a micro head and separate image processing electronics board.

FIG. 44 illustrates the present invention as a final assembly of a micro stem camera.

FIG. 45 illustrates the present invention isolating images from a mega pixel imager and not using distorted lens portions.

FIG. 46 illustrates the present invention of a megapixel sensor configured for capturing and image processing numerous video signals for output.

FIG. 47 illustrates the present invention of a micro stem camera concealed as a table top gooseneck microphone.

FIG. 48 illustrates the present invention of a micro stem camera retractable into a working surface.

FIG. 49 illustrates the present invention of a micro stem camera detachable from a working surface.

FIG. 50 illustrates the present invention of a micro stem camera on a stand.

FIG. 51 illustrates the present invention of a micro stem camera adjustable for various proportions of images of people on screen.

FIG. 52 illustrates the present invention with a flip micro stem camera hinge to move the camera out of view of the display screen.

FIG. 53 illustrates the present invention of a micro stem camera used with a two conference display configuration.

FIG. 54 illustrates the present invention of a micro stem camera used with a three conference display configuration

FIG. 64 illustrates the present invention with a large high resolution display used in a mode of close up viewing and creating a smaller image in the larger screen and using a portion of the screen for videoconferencing lighting.

FIG. 65 illustrates the present invention with a micro stem camera and multi person conference display maintaining proportional life-size images.

FIG. 66 illustrates the present invention in hotel guest room and used in a work mode.

FIG. 67 illustrates the present invention in a hotel guest room with a display repositioned to a work mode area in the room.

FIG. 72 illustrates the present invention configured in a multipurpose meeting room with a close up work mode and a group conference work mode of use.

FIG. 73 illustrates the present invention configured in an office and intended to be used in a close up work mode of use and a watch mode of use.

FIG. 74 illustrates the present invention configured as a multi-mode use display and eye aligned camera technology for eye contact.

FIG. 75 illustrates the present invention configured as a multi-mode use display and enabling multiple streams of image content to be seen.

FIG. 76 illustrates the present invention configured with a surrounding light for videoconferencing.

FIG. 77 illustrates the present invention with multiple options for audio speakers.

FIG. 88 illustrates a display side view with a reflective panel used for eye contact while conferencing and a black backboard with a visible border.

FIG. 89 illustrates a display front view with a reflective panel used for eye contact while conferencing and a black backboard with a visible border.

FIG. 90 illustrates a side view of the present invention reflecting a display for eye contact while conferencing and an eliminated intrusive visible black border.

FIG. 91 illustrates a front view of the present invention reflecting a display for eye contact while conferencing and an eliminated intrusive visible black border.

FIG. 92 illustrates a top view of the present invention reflecting a display for eye contact and a camera hood that does not intrude beyond a user's viewing angle of the reflected image.

FIG. 93 illustrates the present invention of a smart hotel room door with a hallway side.

FIG. 94 illustrates a side view of the present invention of a smart door and how the hallway side is connected to an in-room side.

FIG. 95 illustrates the present invention of a smart hotel room door with an in-room side.

FIG. 96 illustrates the present invention of a smart door and content distribution to displays on both sides of the door.

FIG. 103 illustrates the present invention with a rear projection configuration that conceals the residual projection beam light and the light of the lens of the projector.

FIG. 104 illustrates the present invention with a rear projection configuration that conceals the residual projection beam light in a ceiling soffit and the light of the lens of the projector.

FIG. 105 illustrates the present invention with a rear projection configuration that conceals the residual projection beam light in a ceiling soffit and the light of the lens of the projector and an extended table.

FIG. 111 illustrates the present invention configured as portable videoconferencing stage system with the stage built upon stage road cases and the projector lens hidden from view behind the stage.

FIG. 112 illustrates the present invention utilizing a see-through projection screen made of plastic.

FIG. 113 illustrates the present invention utilizing a see-through projection screen made of glass.

FIG. 114 illustrates the present invention utilizing a see-through projection screen made of laminated glass.

FIG. 115 illustrates the present invention utilizing a see-through projection screen made of optical element fabric.

FIG. 116 illustrates the present invention utilizing a see-through projection screen made of plastic film.

FIG. 117 illustrates the present invention utilizing a see-through projection screen or see-through mirror made of film plastic and an optically bonded film extension.

FIG. 118 illustrates the present invention of a see-through rear projection screen configured as a wide format speaker's podium with a partially concealed screen.

FIG. 119 illustrates the present invention of a see-through rear projection screen configured as a wide format videoconferencing speaker's podium.

FIG. 120 illustrates the present invention of a see-through rear projection screen configured as a retractable and rolling videoconferencing speaker's podium.

FIG. 121 illustrates the present invention of an environment shadow projector applicable to all types of see-through display systems.

FIG. 122 illustrates the present invention of the method for creating a shadow in the background environment of objects seen on a see-through display.

FIG. 123 illustrates the present invention of a videoconferencing imaged mapped projection system for the stage.

FIG. 124 illustrates the present invention of a videoconferencing imaged mapped projection system for the stage with props familiar to common stage sets.

FIG. 125 illustrates the present invention of a videoconferencing imaged mapped projection system for a corporate meeting room.

FIG. 126 illustrates the present invention of a transparent emissive display large enough for a standing person's image with an environmental back light for illuminating the emissive display.

FIG. 127 illustrates the present invention of a transparent emissive display configured to show life-size videoconference images of people with an environmental back light for illuminating the emissive display.

FIG. 128 illustrates the present invention of a wrist display with a curved shaped memory for being held on the wrist.

FIG. 129 illustrates the present invention of FIG. 128 of a wrist display with a flat memory and to be used as a small tablet or mobile phone.

FIG. 130 illustrates the present invention configured as a two-tier multi-purpose videoconference room.

FIG. 131 illustrates the present invention configured as a large center table multi-purpose videoconference room.

FIG. 132 illustrates the present invention configured as a videoconference production studio.

Figure 133:
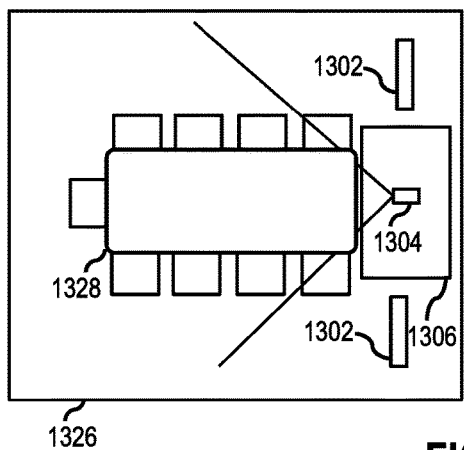

FIG. 133 illustrates the present invention configured as an eye contact meeting room with two modes of use and seen in a multipurpose room mode.

Figure 134:
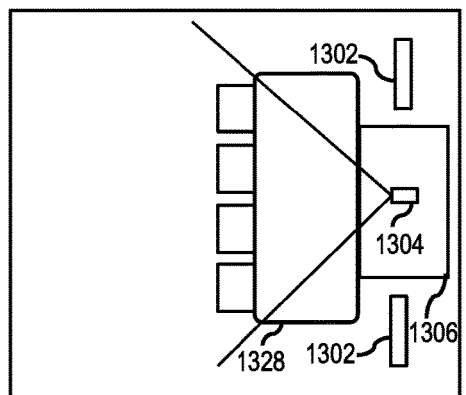

FIG. 134 illustrates the present invention configured as an eye contact meeting room with two modes of use and seen in a telepresence conference room mode.

Figure 135:
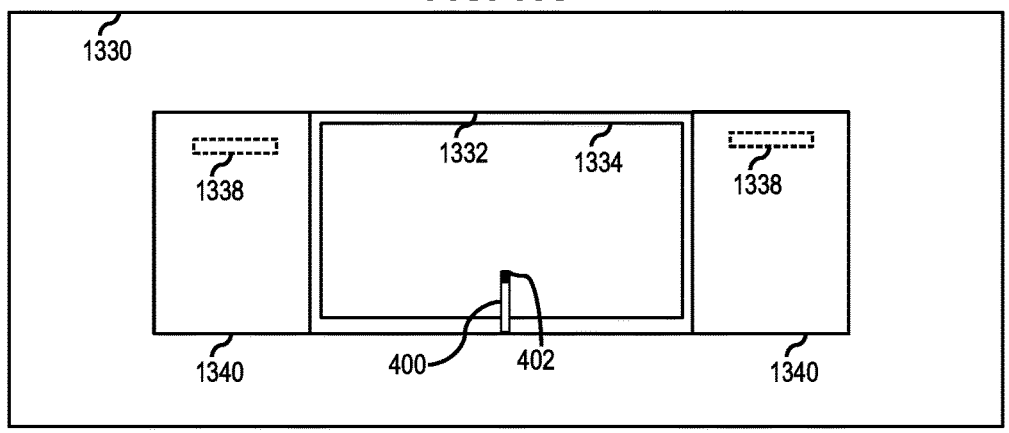

FIG. 135 illustrates the present invention configured with hanging light panels that align alongside a hanging flat panel display.

Figure 136:
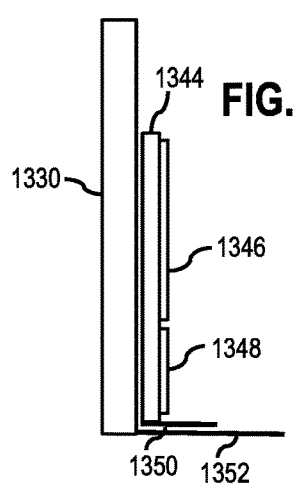

FIG. 136 illustrates the present invention of a floor resting group conferencing light that is leaned against the wall.

Figure 137:
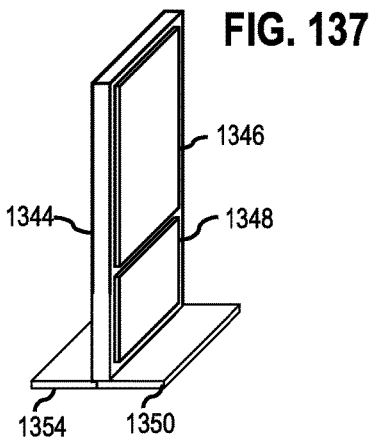

FIG. 137 illustrates the present invention of a floor resting group conferencing light that is freestanding.

FIG. 138 illustrates the present invention configured in a modular media center with modular sections for lights, speakers, and decorative panels.

FIG. 139 illustrates the present invention configured in a modular media center for two side-by-side displays with modular sections for lights, speakers, and decorative panels.

FIG. 140 illustrates a side view of the present invention of a modular media center for flat panel displays.

FIG. 141 illustrates the present invention of a modular media center for reflective display eye contact systems.

Figure 142:
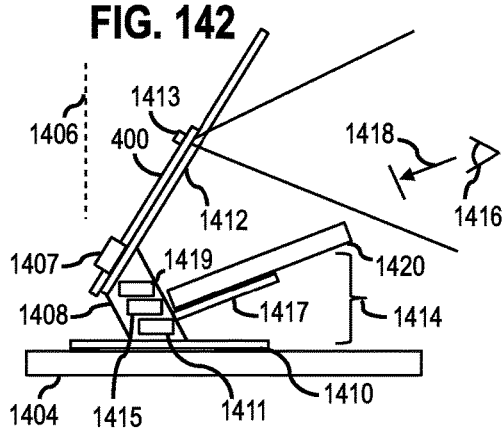

FIG. 142 illustrates the present invention of a reflective display eye contact system positioned on a desk with a micro stem camera.

Figure 143:
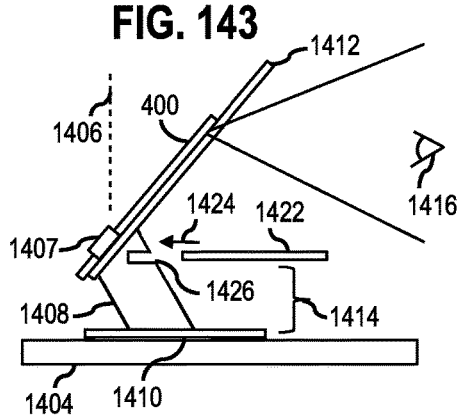

FIG. 143 illustrates the present invention of a reflective display eye contact system positioned on a desk with a micro stem camera and the display is a dockable tablet.

Figure 144:
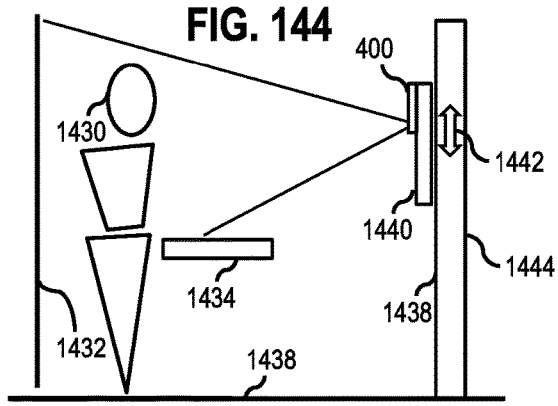

FIG. 144 illustrates the present invention of a standing videoconferencing production studio.

Figure 145:
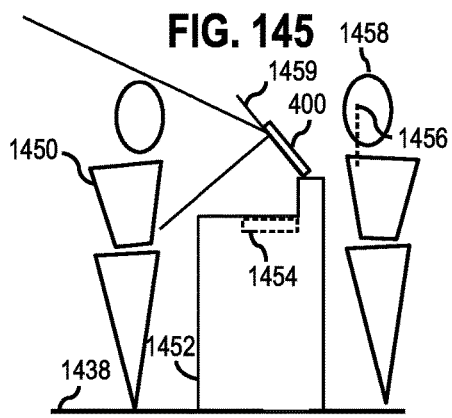

FIG. 145 illustrates the present invention of a see-through eye contact system integral with a service counter.

Figure 146:
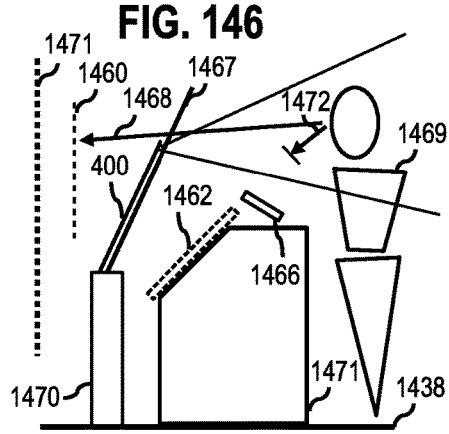

FIG. 146 illustrates the present invention of a see-through reflective display conference kiosk system.

Figure 147:
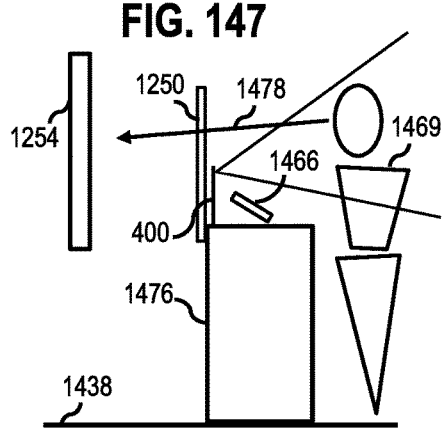

FIG. 147 illustrates the present invention of a see-through emissive display and conference kiosk system.

Figure 148:
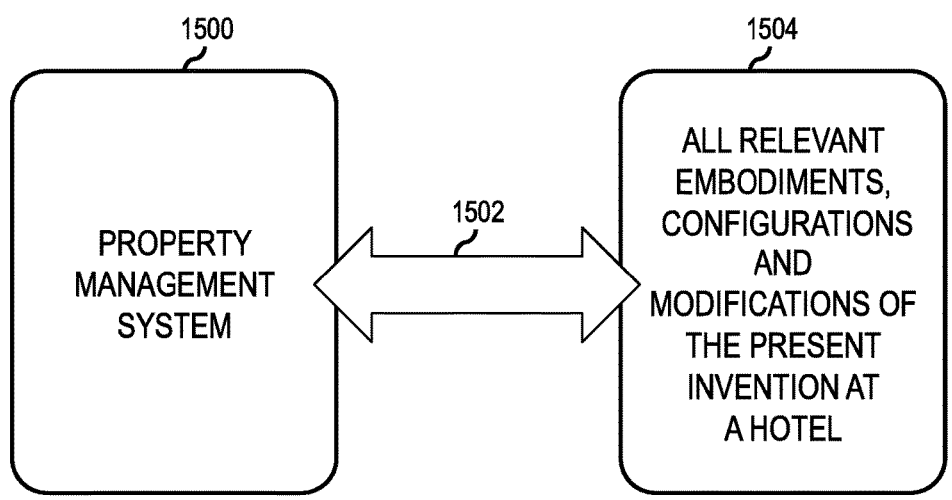

FIG. 148 illustrates numerous embodiments of the present invention integrated with a hotel property management system.

FIG. 149 illustrates the present invention with a forward projection screen and layered video images.

FIG. 150 illustrates the present invention with a display suspended in a risen stage mode.

FIG. 151 illustrates the present invention with a display suspended and lowered to floor height.

FIG. 152 illustrates the present invention configured as a moving and retracting stage.

Figure 153:
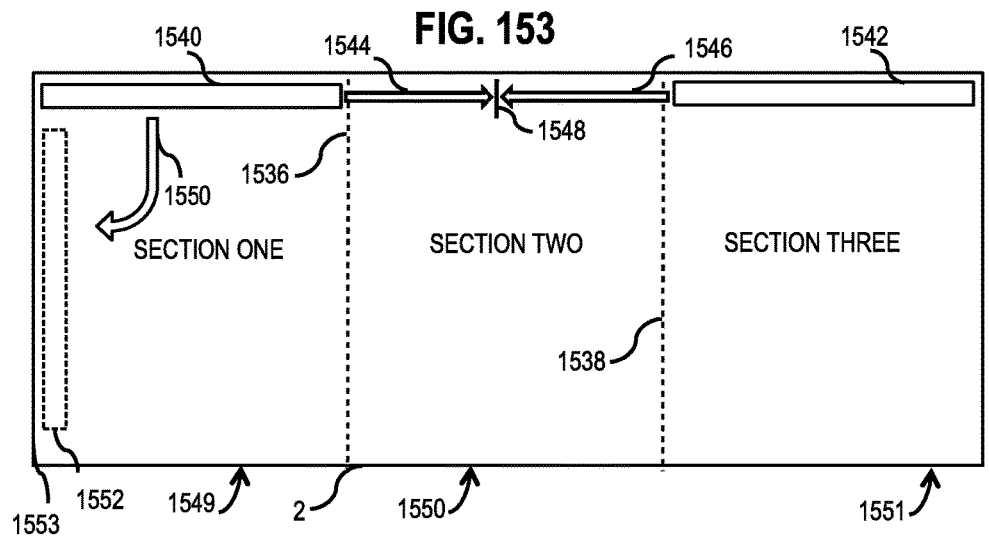

FIG. 153 illustrates the present invention with a moving and retracting stage and repositionable in a divided multi-purpose room.

Figure 154:
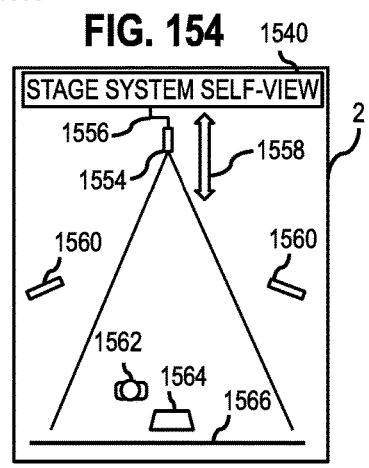

FIG. 154 illustrates the present invention of temporary studio soundstage using a hotel multi-purpose room.

Figure 155:
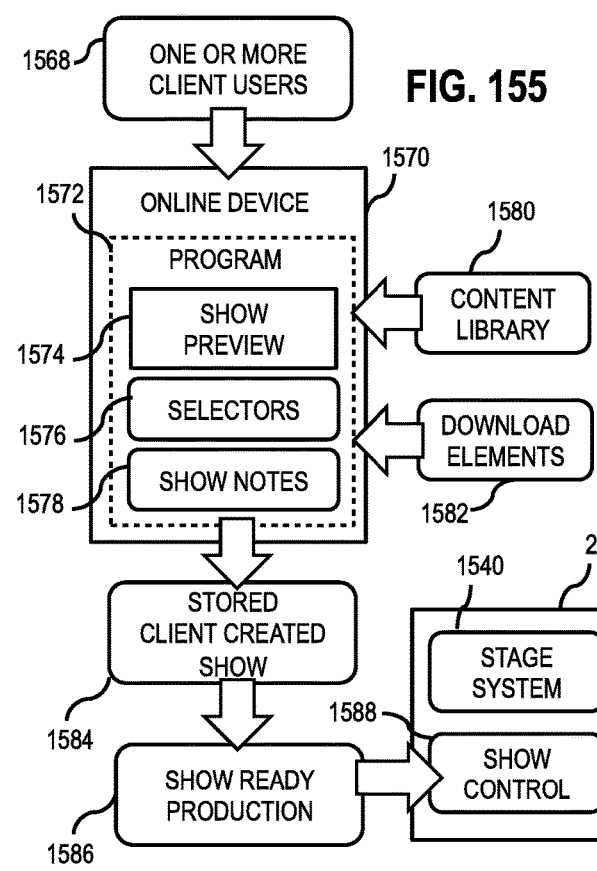

FIG. 155 illustrates the present invention of an online client created event show.

Figure 156:
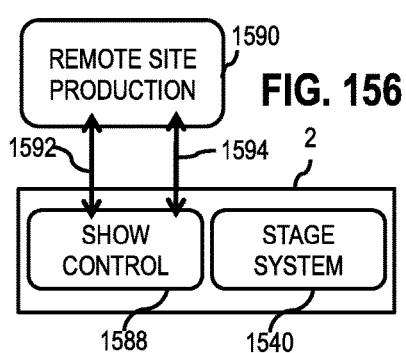

FIG. 156 illustrates the present invention a remote production collaboration and control system.

Figure 157:
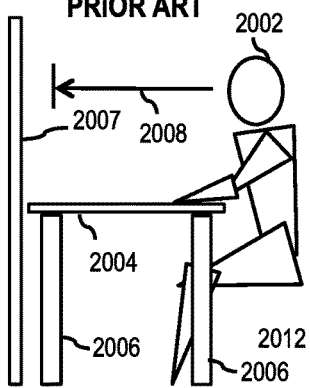

FIG. 157 illustrates a prior art cubicle privacy barrier.

Figure 158:
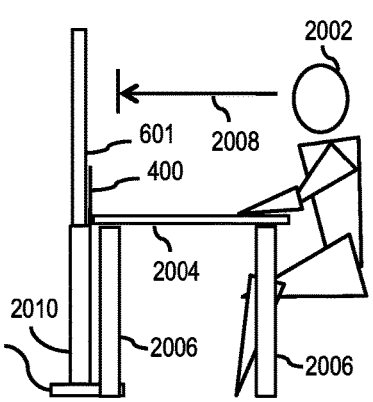

FIG. 158 illustrates the present invention of an image display serving as a privacy barrier and mounted to a floor resting stand.

Figure 159:
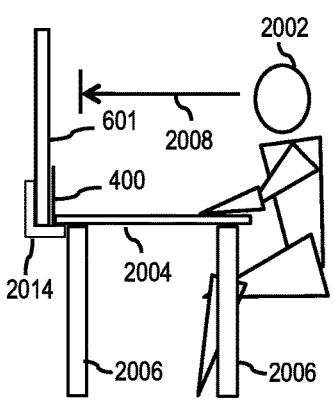

FIG. 159 illustrates the present invention of an image display serving as a privacy barrier and mounted to a desk mount.

Figure 160:
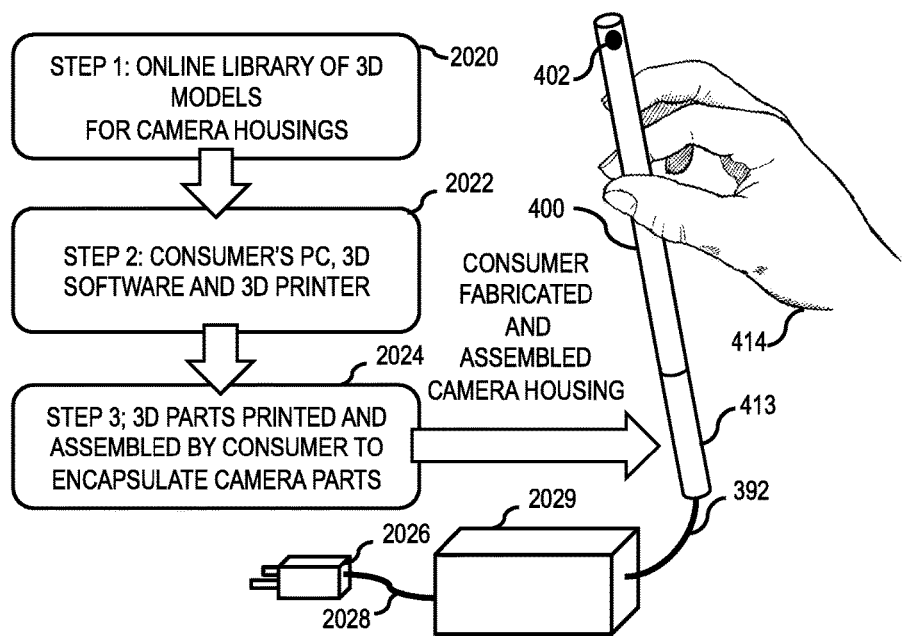

FIG. 160 illustrates the present invention of a camera component kit and process for a consumer to select, create, and 3D print their own camera housing.

Figure 161:
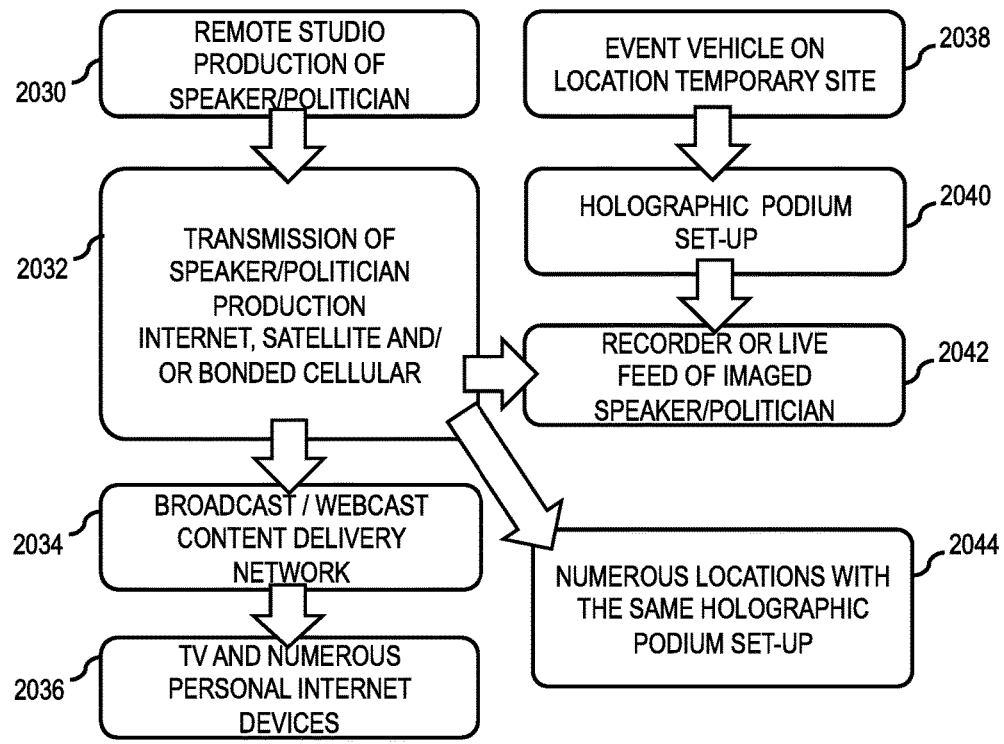

FIG. 161 illustrates the present invention of holographic podium campaign.

Figure 162:
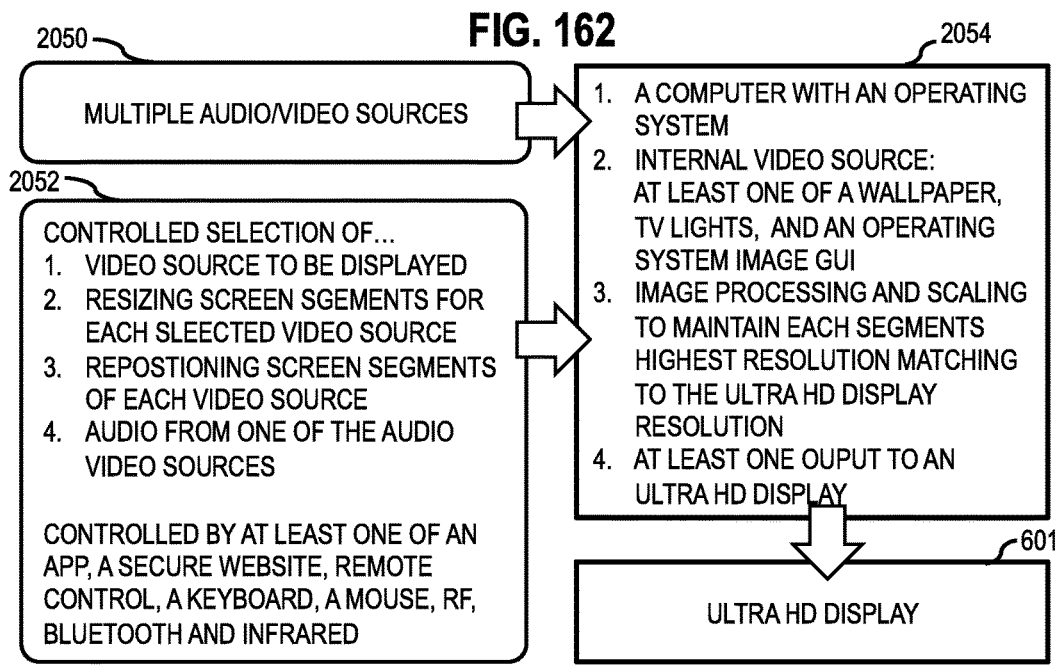

FIG. 162 illustrates the present invention of a multi-viewer, switcher, and scaling device for close up viewing of ultra HD displays

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a realistic and life-like audio and visual communication experience.

Videoconferencing applications are now easily accessible to anyone with a personal computing device and the Internet. Notebooks, mobile phones, PCs, tablets, and more all have microphones, cameras, speakers, and software to enable a videoconference. While videoconferencing accessibility for consumers and businesses has greatly increased, they still rely on audio-only communication and rarely engage video communication. The reasons are many, but the chief of the issues remains low quality internet access causing poor video quality and poor human factors. While all the embodiments of the present invention would benefit from increased bandwidth and a high quality connection the embodiments herein disclosed are related to human factors and resolving the issues of poor camera angles and people's images contained inside of a TV frame. Specifically, ways to align cameras closer to the eye level of the people seen on screen is a primary emphasis and also, in more elaborate configurations, removing the people on screen and placing them within a room environment. The hallmark of life-like conferencing is to place the image of the remote participants inside the room environment that is shared by the local participants and thereby simulating as if all participants are in the same room. This is applicable to small offices, homes, meeting rooms, and even on the stage for live concerts and corporate events.

Disclosed herein are devices, methods, and related systems resolving the above mentioned problems with video-conferencing. The present invention enables a superior experience so that participants will want to use the technology and not be frustrated by poor human factors, people looking off and away while engaged in a conversation, and imaged participants stuck on a TV set or a computer screen. The inventive motive described herein is to enable videoconferencing to simulate a natural in-person conversation in order to make videoconferencing a viable and valuable communication option for consumers, business people, and even audiences at events. Unfortunately, the history of videoconferencing has had several false starts with major corporations claiming they have achieved "telepresence" when in reality they simply where marketing TVs with cameras on top. Consumers have become increasingly savvy and are alerted to marketing puffery. Sophisticated users now demand innovation that will provide natural life-like communication.

For clarification and simplicity the present invention describes a "videoconferencing transmission system" as any and all ways participants in one location can hear and see remote participants at a remote location and likewise the same for the remote participants with the local participants. It should be expressly understood that for the sake of definition, a videoconferencing transmission system includes any type of audio pick-up device and related system for voice, any type of audio producing device and related system to produce a voice, any type of image pick-up device and related system for capturing images of people, any type of audio and image processing to transmit audio and video, and any type of transmission system. Hence, this definition as expressed in the claims of this invention should be understood to include analog-based videoconferencing, satellite-based videoconferencing, specialty-broadcast based videoconferencing, corporate class codec appliance-based videoconferencing, and personal computing device, and software application videoconferencing. Included is conferencing in where video may be presented only one way and audio both ways. The totality of the definition above includes all known and future developed means for participants at one location to see and hear participants at a distant location. Also, any known and future developed features to enhance this communication such as, but not limited to, multipoint, multicast, encryption, cloud-based architectures, peer-to-peer schemes, server-based and router-based systems are all under the generic designations "videoconferencing transmission system" and "videoconferencing." So unless otherwise, specified all the above is included and is modifiable by one of ordinary skill in the art without departing from the unique embodiments disclosed herein. Further, industry nomenclature should not confuse this definition and all words such as "telepresence," "video-chat," "video-collaboration" and the like are all encompassed by the designations "videoconferencing transmission system" and "video conferencing."

Disclosed herein are numerous embodiments incorporating an image display. Unless otherwise specified any and all types of display technologies are applicable including any variation of resolution, refresh rate, 2-D, 3-D, and color. A vast array of self-contained light emanating displays are applicable such as, but not limited to, LCD, LED, OLED, CRT, plasma, and the like. Also, many image displays are built as modules and connected to form a variety of sizes and shapes. Certainly, any type of modular connected image display is applicable to the present invention and when connectably combined forms a single image display. Of course, it is preferred that such modular image displays, whether self-contained light emanating or rear projection, conceal seams between modules. Also, unless otherwise specified, an image display should also be understood to include any type of projection system front, rear, or any type of projection pathway and optical components, including any type of projector image engine and any type of projection screen. Also, a specific embodiment may include two or more types of display technology to achieve a configurational objective. For example, an LED image display on stage may be used for a videoconference, yet a projection screen is used for a stage magnification screen.

Likewise, the videoconferencing camera technology may be any type of image pick-up device and optical system. This includes any type of image pick-up device such as, but not limited to, CCD and CMOS, including any type of lens system, multiple lenses, multiple sensors, imaged processing, and 3-D. Further, any type of speakers and microphones are applicable to any configuration of the embodiments of the present invention. Lastly, the present invention illustrates embodiments as applied to various rooms, venues, and environments. It is to be expressly understood that any particular configuration of the embodiments is applicable to any room, venue or environment. If, for example, a type of room is disclosed such as a hotel multipurpose ballroom in no way limits the present invention and should be applied to any room with similar characteristics, such as a large room at a university, a church, or on a corporate campus. Further, unless otherwise specified, the present invention's embodiments are applicable to any type and size of device or system whether it is small enough to fit in the hand or massively large and fills an arena.

FIG. 1 is a prior art illustration of a large hotel multipurpose room 2 with a common audio/visual configuration of a front projector 8 projecting onto a front projection screen 6 positioned near a display wall side of the room 3. Further, a temporary stage 12 is set-up so a speaker 10 can converse with those sitting in an audience sitting zone 14. The sitting zone 14 is where an audience resides and they may be in theater rows, around dining tables, standing or any other position depending on configuration of an event. An advantage to this room configuration is that front projection takes up little floor space in the large hotel multipurpose room 2. Disadvantages to this system are numerous. A series of a ceiling light 4 offers ambient light throughout the room 2, yet washes out the front projection screen 6. Typically, the audio/visual equipment are trucked in by a production company with exorbitant costs for logistics and planning for the event. Further, wear and tear of the facility becomes an issue as contractors set-up and tear down heavy equipment on a regular basis. Another major problem is that the speaker 10 is seen below the front projection screen 6 so as to not block the projector 8's projected image. Lastly, it offers little compelling presentation value since flat two-dimensional images are seen with poor black levels on the front projection screen 6.

Prior art FIG. 2 illustrates the same large hotel multipurpose room 2 configured with a common Pepper's Ghost stage illusion with an inclined stretched plastic film 26 to form a substrate that is transparent so an audience (not shown) sitting in the sitting zone 14 can see the speaker 10 standing the temporary stage 12. The front projector 8 is positioned on massive truss frame 20 and aimed to a floor resting front screen 18. The floor resting front screen 18 is reflected by the inclined stretched plastic film 26 and has a virtual reflected image 24 appearing on the stage with the speaker 10. This Pepper's Ghost stage illusion has proved to be impractical for large hotel multipurpose room 2 for a variety of reasons. The chief reason is the total system consumes a huge amount of the room 2 limiting the number of people that can be in the room. In some situations it could easily consume one half of the room. Another issue is the set-up construction time and complexity of the systems. It can often take days to set-up this effect and as many as 6 people are needed to stretch and mount the inclined stretched plastic film 26. As such, the wear and tear on a hotel facility is significant. The ceiling lights 4 above need to be blocked from above since the lights in the room wash out the floor resting front projection screen 18. Reducing the lights in the room 2 is not a solution, because a dark room limits the usefulness of the seating zone 14. Commonly, such systems have black drapes (not shown) placed at the rear of the temporary stage 12, which adds more equipment for logistics and set-up time. The inclined stretched plastic film 26 is most often not coated with any reflective enhancing properties. Typically, the uncoated optic would have a reflective value of about 10% of the originating source. That means a very expensive and high-powered projector is needed for projector 8 to increase the brightness of the floor resting front screen 18. Further, the inclined stretch plastic film 28 is delicate and can be easily dinged and ripped making it nearly impractical for long-term installation in a multipurpose room 2. Black levels for these systems are typically poor creating a noticeable haze in the virtual reflected image 24 caused by ambient light impinging the floor resting front projection screen 18. Even grey colored screens do not sufficiently resolve this haze issue. Other issues abound, yet the most significant is the speaker 10 is strangely separated from the audience in the sitting zone 14 by the inclined stretched plastic film 26. The speaker 10 is positioned up to 20 feet away from the front of the sitting zone 14. Being at such a far distance and separated by the inclined plastic film is not effective when the speaker 10 wants to engage an audience or a talent wants to gauge an audience reaction.

FIG. 3 illustrates another embodiment of the inclined stretched plastic film 26 incorporated into the temporary stage 12. This solution is just as complicated to set-up as the Pepper's Ghost illusion of FIG. 2. A fake room 32 is positioned in the ceiling and reflected by the inclined stretched plastic film 26 forming a virtual reflected room 36. A rear projector 28 and a rear projection screen 30 form a presentation image (not shown) in front of the virtual reflected room 36 adding depth behind the speaker 10 from the audience perspective at the sitting zone 14. The fake room 34 is illuminated by lights (not shown) so that it will appear visible in the reflection of the virtual reflected 36. This visual effect shares many of the same drawbacks as described for FIG. 2, including complex logistics, high cost, lengthy set-up time, dim images, room lights needing to be lowered, wear and tear on the facility, and having the speaker 10 far away and behind the inclined stretched plastic film 26.

With the limitations of the prior art, hotels have had little options to create compelling visual effects, presentations, and like-like videoconferences in their large multipurpose rooms 2. The same is true for other large rooms in schools, churches, corporations, and specialty venues, all of which can benefit from the present invention. The present invention offers an inventive solution to resolve all these issues of the prior art by enabling a compact system that is permanent to the room. The solution can retract and expand and has a retractable stage incorporated into it as well. The solution is very bright so room lights can remain on and a depth illusion for 3-D holography can be seen without the need of a bulky inclined stretched film taking up a large portion of the room. Further, the solution is concealable so when it is not in use it is camouflaged into the room décor so that the multipurpose rooms can be used for multiple kinds of events and room arrangements.

A primary embodiment of the present invention is illustrated in FIG. 4A. The large hotel multi-purpose room 2 utilizes a massive image display 42 positioned near the display wall side of the room 3 with an image screen 43 facing the audience sitting zone 14. The image display 42 is vertically oriented substantially straight up. Preferably, the massive image display 42 is an LED high-resolution fine pitch display. Often these displays are fabricated in modules and it is certainly advantages to utilize an LED product that has seams between modules that are not noticeable by the audience in the sitting zone 14. The image display 42 may also be an image display technology other than LED, and just as with LED, a self-contained light emanating display technology is preferred. The choice of potential massive display technology will evolve over the coming years and those advances are certainly applicable to being the massive image display 42. The image display 42 may be as large as desired for any particular large hotel multipurpose room 2. However, it is preferred the image display 42 enables a person to be imaged on the display life-size (not shown) from a lower portion and also provide presentation content above the person on the image screen 43. Hence, a size approximately 30 feet across and 15 feet tall would be one ideal arrangement. Also, the massive image display 42 may be oriented in a specific aspect ratio to match a pixel-for-pixel resolution of 4K or 8K video, as an example. Those in the art will appreciate that each room 2 may require a modification of the massive image display 42 and constructed at a size that fits any particular large hotel multi-purpose room 2. A surrounding black mask 46 is aligned to the perimeter edge of the image display 42, at least on the top, left, and right so that when the image screen 43 images the color black the image screen 43 and the black mask 46 forms a continuous appearing surface from the perspective of the audience at the sitting zone 14.

FIG. 4A further illustrates an embodiment of a retracting stage system 44 that retracts under the image display 42 when not in use and expands when in use. The retracting stage system 44 can be of any construction and mechanical method of contraction and expansion. It may be in modular pieces and manually set-up or fully automated and folds out aided by motors (not shown). Stage steps, railings, and multiple stage levels may also be added as desired (not shown), as well as other common stage construction elements.

An image display concealment substrate 40 of FIG. 4A is a retractable system for concealing the massive image display 42 and its image screen 43. The image display concealment substrate 40 is vertically oriented substantially straight up. A primary embodiment of the present invention is that the concealment substrate 40 can conceal the massive image display 42 when not in use and further conceals the image display 42 so that the large hotel multipurpose room 2 has a continuity of décor in the room and among its the wall surfaces. In other words, the room wall surfaces all share a similar theme of décor including, but not limited to, color, texture, pattern, design and materials. FIG. 4A illustrates the room décor on the surrounding walls in the large hotel multipurpose room 2 and FIG. 4B illustrates a front view of the concealment substrate 40 that is, in this one configuration, a printed rolling fabric with printed décor elements that match the actual décor of the room 2. FIG. 4A and FIG. 4B are illustrated side-by-side revealing a room color 37a matching a printed room color 37b, a pattern with texture 39a matching a printed pattern with texture 39b, a room design 41a matching a printed room design 41b, and a room material 45a matching a printed room material 45b.

The image display concealment substrate 40 not only covers the image display 42, but also the surrounding black mask 46. The concealment substrate 40 in one embodiment (FIGS. 4A and 4B) is made of a flexible fabric panel and hung by an expanding ceiling bracket 48. The concealment substrate 40 may be any material including fabric, printed fabric, room-wide substrate, sectional substrates, and a solid substrate such as wood, plastic, glass, and huge constructed moveable walls. Further, it may be mechanically placed in front of the image display 42 and away from the image display 42 by any means and can retract upwards, downwards, left, right, and any combination therein. It may be rolled, bundled, stacked in panels and held in place from any combination from above, below, and from the top. It may also be removed and positioned out of the way. The image display concealment substrate 40 may also be removed only partially exposing a smaller part of the image screen 43 for the audience to view. Those in the art will appreciate that the large hotel multipurpose meeting room 2 requires décor continuity of all room walls. An optional left side concealment substrate 40b, an optional right side concealment substrate 40c, and an optional center section concealment substrate 40a may all retract independently exposing differing portions of the screen image 43. As described the image display concealment substrate 40 is configured into 3 independent sections (2 or 4 or more sections certainly can be a preferred for some rooms).

Another embodiment of the present invention is to conceal the massive image display 42 and its image screen 43 by actually imaging content on the image screen 43 that matches the large hotel multipurpose room 2 décor. Careful attention to brightness, resolution, color, texture, and pattern of an image that matches the room 2 décor will conceal the intrusion of the image display 42 and image screen 43 in the multi-purpose room 2. The surrounding black mask 46 may be covered with retractable panels that match the décor and covers the mask 46. It may also be permanently finished not in black, but in a décor that matches the room. Lastly, the surrounding black mask 46 may be eliminated and the image display 42 is placed to the ceiling and the side walls of the room 2, and optionally to the floor, consuming the entire display wall side of the room 3.

Another embodiment of the present invention is the image screen concealment substrate 40 is constructed of an open weave fabric and when light from the bright image screen 43 in illuminated, the open weave fabric (not shown) nearly disappears from the audience perspective in the sitting zone 14. As a result the image screen concealment substrate 40 need not be positionable away from the image screen 43. In this case the open weave fabric becomes fully visible when the image screen 43 is off and lights (not shown) between the image screen concealment substrate 40 and the sitting zone 14 shine upon the open weave fabric making it fully visible to the audience in the sitting zone 14. The open weave fabric may be printed upon to match the décor of the large hotel multipurpose meeting room 2. The open weave fabric may also be any color, yet some colors such as black become especially unnoticeable when the image screen 43 is on.

A major embodiment of the present invention is illustrated in FIG. 5. The expanded ceiling bracket 48 with the image display concealment substrate 40 is attached and expanded to a position at a distance substantially away from the image screen 43. That distance may be any distance, but in a preferred arrangement 12 feet is sufficient. A speaker 10 is standing on the retracting stage system 44 and is able to engage the audience with an eye line 49 seated in the sitting zone 14. The speaker 10 is able to do so, because the concealment substrate 40, in this specific configuration, is configured with the optional center section concealment substrate 40a (FIG. 4B) rolled up and exposing to the sitting zone audience the image screen 43. Significantly, the optional left side concealment substrate 40b and the optional right side concealment substrate 40c remain down, concealing the stage left and right (not shown). The concealment substrate 40b and 40c now serves as a stage foreground separated from the image screen 43. No inclined stretched plastic film 26 is placed between the speaker 10 and the audience seated in sitting zone 14 as with prior art systems (FIGS. 2 and 3). Novel to this invention is a vertical reflective transparent substrate 60 placed near the image screen 43 and behind the speaker 10. The audience in the sitting zone 14 observes through the vertical reflective transparent substrate 60 the image screen 43 and the surrounding black mask 46. When the image screen 43 images the color black the continuous black surface is seen combining both the surrounding black mask 46 and the image screen 43.

A vertical reflective transparent substrate 60 of FIG. 5 reflects the foreground including a stage floor 52, a stage ceiling 54 and a concealment substrate foreground side 50 all forming a reflected rear stage 56. The foreground has physical objects between the audience in the sitting zone 14 and the image screen 43. The mid-ground has physical objects, such as a podium prop 58 placed near adjacent to the image screen 43 and is also between the image screen 43 and sitting zone 14. The mid-ground includes images imaged upon the image screen 43. The vertical reflective transparent substrate 60 is vertically oriented substantially straight up. The concealment substrate foreground side 50 may be flat or dimensional in shape (not shown). Also, the vertical reflective transparent substrate 50 may also reflect a side stage wall between the image screen 43 and the concealment substrate foreground side 50 (not shown). The speaker 10 is seen standing in front of the reflected rear stage 56. The podium prop 58 is placed on stage at a mid-ground to allow an imaged person (not shown) to be imaged on the image screen 43 to appear standing behind the podium prop 58. To enhance the reflection of the stage floor 52, the stage ceiling 54, and the concealment substrate foreground side 50, stage lights (not shown) are used to illuminate these objects so that they will be visibly bright in the reflection. Rather than stage lights, the stage floor 52, the stage ceiling 54, and the concealment foreground side 50 may be illuminated by any means. For example, they may be self-illuminated light panels, full color image displays, and projection screens with projected images to name only a few options (all not shown). Those skilled in the art will appreciate the creative production components and image content that can be added to enhance the illumination of the foreground elements of the stage floor 52, the stage ceiling 54, and the concealment foreground side 50.

FIG. 6 provides an alternative configuration of FIG. 5 where the concealment substrate 40 and its concealment foreground side 50 are replaced with a self-illuminated foreground object 62. That object 62 is reflected by the vertical reflective transparent substrate 60 forming a reflected rear stage object 64. The foreground object 62 is illuminated from within, but may be illuminated by stage lights instead (not shown). The foreground object 62 may also be used in conjunction with the concealment foreground side 50. The foreground object 62 may also be an image display (not shown) various image content. It is possible the light emanating from the foreground object 62 and any other foreground illuminated elements may cause unwanted reflection of the image screen 43 affecting its black level. Also, LED pixels may reflect the light exposing them to the audience and impinging a view of the reflected rear stage 56 and the reflected rear stage object 64. To resolve this, a first foreground polarizer 59 is placed on one or more illuminated foreground objects such as object 62. Between the image screen 43 and the vertical reflective transparent substrate 60 is a mid-ground polarizer 61. From the image screen 43 perspective the foreground light is greatly reduced and that light does not impinge the image screen 43 due to the darkening alignment of polarizer's 59 and 61. It has also been successfully deployed to use a large sheet polarizer as the vertical reflective transparent substrate 60 and thereby the mid-ground polarizer 61 serves to both reduce the foreground light on the image screen 43 and to reflect the foreground object 62 and the concealment foreground side 50.

Construction of the present invention is preferred to use Christie Digital Velvet LED modules as the image display 42. Also, Leyard based in China has made major advances in fine pitch indoor LED display technology. There is currently a substantial cost difference between high resolution LEDs and low resolution LEDs. Conceivably, to reduce costs a large display could incorporate two or more resolutions of LEDs where the higher resolution is used to image life-size people and the lower resolution is used for showing large close up shots of people in a magnification portion (see FIG. 20) of the screen (not shown). From the audience perspective they may not even detect the difference in resolution if sufficiently far enough away. These LEDS are delicate and can be damaged, so the numerous disclosed layers of substrates placed adjacent to the LEDs, as disclosed herein, serve to protect the LEDs from possible damage. The vertical reflective transparent substrate 60 is preferably a flexible polyester film that offers inherent strength when stretched. Typically polyester film is cut from its master roll at the manufacturing plant to manageable smaller rolls. Specialized handling procedures are required to access rolls wider than 10 feet. The concealment substrate 40, mechanical hanging and retracting systems are readily available and custom built by firms such Rosebrand. Also, staging systems are available from many resources. Show control and image processing are also widely available from many sources including Barco and Christie Digital.

FIG. 7 illustrates additional embodiments of the present reflected foreground stage invention. The concealment substrate 40 is replaced by a left theatrical stage drape 80 and a right theatrical stage drape 82. The drapes 80 and 82 are positioned away from the image screen 43 so that their rear foreground side (not shown) can be reflected and form a reflected rear stage 56 (not shown) behind an imaged speaker 68 on the image screen 43. The drapes 80 and 82 may open and close concealing the image screen 43. The vertical reflective transparent substrate 60 has been replaced with a left reflective clear substrate section 74, a right reflective clear substrate section 76, a bottom reflective clear substrate section 78 and a top reflective clear substrate section 72. Unlike vertical reflective transparent substrate 60 that spanned the entire surface of the image screen 43 the sections 74, 76, 78, and 72 permit no reflective transparent substrate over the major center portion of the image screen 43. By doing so ambient light in the large hotel multipurpose room 2 will not have unwanted reflection over the image screen 43. The sections 74, 76, 78, and 72 reflect the foreground drapes 80 and 82 and the stage floor 52 and stage ceiling 54 (not shown). The sections 74, 76, 78, and 72 may cover none or parts of the image screen 43. Further, the sections cover the surrounding black mask 46, which is left, right, and above the image screen 43.

The imaged speaker 68 seen in FIG. 7 is imaged on the image screen 43 and may be recorded, broadcast or live videoconference. The podium prop 58 serves to add a three-dimensional mid-ground prop aiding in the illusion that the imaged speaker 68 is live on stage. Preferably the imaged person 68 is seen against the color black on the image screen 43 giving the audience in the sitting zone 14 no visual reference point that the image screen 43 is there. The surrounding black mask 46's primary purpose is to expand the black continuous surface so as to present no visual reference point of the existence of the screen. A videoconference camera 70 is optionally located inside the podium prop 58 to capture images of the audience and the speaker 10 (not shown) standing on stage 44. To further aid in the illusion, the imaged person 68 appears as a real person on stage by aligning his feet at an alignment point 45 on the stage floor 52. It is to be expressly understood that the color black in the image display may be shades of black depending upon the black level of the image screen 43. The surrounding black mask 46 should match the shade of black to create a continuous appearing black surface.

FIG. 8 illustrates the configuration of FIG. 7 except the drapes 80 and 82 are replaced with a left roll up concealment panel 84 (functionally the same as 40*b* of FIG. 4B) and a right roll up concealment panel 86 (functionally the same as 40*c* of FIG. 4B). The panels 84 and 86 serve as the foreground for reflection forming the reflected rear stage 56. The panels 84 and 86 can also, by motor, rise to expose the entire image screen 43 (not shown). A center concealment roll up center panel 88 (functionally the same as 40*a* of FIG. 4B) raises and lowers exposing or concealing the image screen 43. The center panel 88 can also be built with a motorized rolling mechanism. The concealment panels 84, 86, and 88 when fully rolled out conceals the image screen 43 and may even conceal the stage 44 and has a décor that matches the large hotel multipurpose room 2 wall surfaces.

FIG. 8. additionally illustrates a virtual stage light with a beam 87. The virtual stage light 87 is an image on the image screen 43. The beam of light against a black color filling the image screen creates the illusion that the imaged person 68 is actually a real person on stage. The virtual stage light with beam 87 may be a stock video clip added to the show production by use of chromakey and other image combining techniques and mixes the image signals of the imaged person 68 and the virtual stage light with the beam 87. The virtual stage light with beam 87 is made even more realistic by having subtle changes in atmospheric diffusion of which the light beam illuminates. The show producer may create numerous lighting scenarios with colors and a plethora of virtual stage light with beam 87 stock clips. The virtual stage light with beam 87 can even be real-time animated to follow the imaged person 68 as they move about. That process can be live manual by a show staff or automated by image recognition and image processing. It is conceived that a live animated splash of light may illuminate the imaged person 68 and as he moves in and out of one or more imaged light beams. This requires a sophisticated image processing and image manipulating computer system and software to accomplish this effect in real-time.

FIG. 9 has the foreground elements removed to illustrate a vertical reflective transparent substrate 60 covering the image display 43 and the surrounding black mask 46. The imaged speaker 68 has a close-up shot 89 on a magnification image 88 seen on a portion of the image screen 43. The recorded, broadcast or videoconference imaged person 68 is contained in an image signal. Real-time image processing permits the close up shot 89 image to be extracted from the image of the imaged person 68. This may be a live manual process or achieved by automated image processing software. It is also possible that the close up shot 89 is a separate image signal and recorded and synced with the full body image signal of the imaged person 68. Also, a second image signal can be transmitted and received as an additional recorded, broadcast or videoconference image.

FIG. 9 further illustrates the present invention presenting a massive 3-D volumetric object 90 floating in a black color of the image screen 43 and the surrounding black mask 46. The volumetric object 90 appears 3-D and is described as "holographic" by observers even though the volumetric object 90 is technically not a hologram. Yet, industry terminology and popular description is certainly now morphing the definition of a "hologram." The object 90 is animated or videotaped with careful attention to increased surface reflection, shadows and motion that are in concert create the impression of a solid object floating in mid-air in the stages black void. The illusion is even more impressive when the reflected rear stage 56 is seen behind the 3-D volumetric object 90. Of course, stereo 3-D with glasses or auto-stereoscopic displays are applicable to the present invention, but the impressive illusion of the 3-D volumetric object 90 presents an impressive 3-D presentation and entertainment experience. Those skilled in the production arts will appreciate the vast creative possibilities to create impressive corporate meetings, church services, concerts, and special events with custom content created for the present invention. For example, data from a motion capture actor movements can, in real-time, be used to create animated characters. Those animated characters can be recorded or interact with an audience live at many locations simultaneously.

FIG. 10 illustrates an embodiment of the present invention where the image display 42 rests on a room floor 91 with its image screen positioned near the room floor 91 with a portion of the floor forming a floor stage area 92. The imaged person 68 has his feet aligned with the stage floor area 92 (not shown). FIG. 11 illustrates the present invention where the retracting stage system 44 is positioned in front of the image screen 43. FIG. 12 illustrates a retracting of the reflective foreground elements, removing of the concealment substrate 40, and the vertical reflective transparent substrate 60 from observation by the audience in the sitting zone 14 (not shown). By doing so the image screen 43 can be used in a mode of use as a large video wall or movie screen and in a second mode of use as a reflective foreground stage system.

FIG. 13 is a detailed mechanical side view of many of the embodiments described for FIG. 8. The left roll up concealment panel 84, the right roll up concealment panel 86, and the center concealment roll up center panel 88 are rolled down concealing the entire image screen 43 and the black surrounding mask 46. The retracting stage system 44 is seen retracted under the image display 42 with a stage front 136 that may remain in view or covered by the panels 84, 86, and 88 (not shown). A first hinge 132 connects to a permanent stage section 126 and a first flip up stage floor 130. The floor 130 is connected to a second hinge 134 to a second flip up stage floor 128. An audio/visual equipment rack 138 is placed under the image display 42. The image display 42 is attached to the display wall side of the room 3 by a heavy duty wall connectors 110. Those in the art well appreciate that the image display 42 may also be free standing (not shown) and also built with an access area between the image display 42 and the display wall side of the room 3 for maintenance purposes (not shown). The image display 42 may also be positionable away from the display wall side of the room 3 for maintenance and then repositioned closer to the wall 3 when in operation (not shown). The surrounding black mask 46 is attached to the image display 42 by an angle bracket 108. A side lighting rig 124 is one of two rigs, one for each side of the stage 44 (second side not shown).

The embodiment of FIG. 13 further illustrates mechanical systems for raising and lowering the various substrates and panels in the differing modes of use. Customizing various theatrical drapery and scenery drop mechanical systems will be apparent to those skilled in the art. The specific mechanical systems described herein are only one of many options to achieve the functional objectives described herein. A side spool plate 103 (a second side spool plate on the opposing side of the stage 44 not shown) is attached to the display wall side of the room 3 by an upper angle bracket 98 and a lower angle bracket 106. The side spool plate 103 has ceiling fabric spool 104, a direction roller 100 for connecting a ceiling fabric 102 to a clamp 118. Also connected to the side spool clamp 103 is the wide internal motor spool 120 for raising and lowering the vertical reflective transparent substrate 60. The expanding ceiling bracket 48 has a motor 96 with a hanger bracket 112 and a connected valance 122. Also, connected to the expanding ceiling bracket 48 is a dual motorized spool 114 with independent motorized spools for raising and lowering independently the left roll up concealment panel 84, the right roll up concealment panel 86, and the center concealment roll up center panel 88.

FIG. 14 is the same exact configuration of FIG. 13 except in an expanded mode of use with the image screen 43 visible to the audience (not shown). Specific unnumbered parts in FIG. 14 are numbered and referenced in FIG. 13. In the expanded mode, the ceiling fabric 102 is expanded at a fabric direction 148 by the expanding ceiling bracket 48 at an expand-out direction 146. The expanding ceiling bracket 146 is also positioned into the foreground and substantially away from the image screen 43, the left roll up concealment panel 84, the right roll up concealment panel 86, and the concealment roll up center panel 88. The center concealment roll up panel 88 is rolled up at an up direction 144 exposing the image screen 43 to the audience. Lights from the stage lighting rig 124 are aimed to illuminate all foreground elements sufficiently to be effectively reflected by the vertical reflective transparent substrate 60 or similar reflective system disclosed herein. The retracting stage system 44 is expanded at a direction 142 and is held in place by a stage leg trusses 140. The lights are prevented from being aimed at a rear facing direction 147 which may wash out the image screen 43. Any type lights illuminating the foreground with the intent to be reflected by the vertical reflective substrate 60 or similar transparent reflector should not wash out the image screen 43. To minimize light wash on the image screen 43 baffles, light directors, light lenses, image blocking film with micro louvers, and any other system, material or construction (not shown) are applicable to the present invention. Lights from the stage lighting rig 124 also can illuminate the podium prop 58 and any person on the stage 44 (not shown).

FIG. 15 illustrates a top view of the large hotel multipurpose room 2 revealing both sides of the stage 44 and the left roll up concealment panel 84 and the right roll up concealment panel 86. From the perspective of the viewer 150 the reflected rear stage 56 is produced by the reflection of the foreground including the stage floor 52, the stage ceiling 54 (not shown), a stage side walls 149, and the concealment substrate foreground side 50 all forming the reflected rear stage 56. A show operator 153 utilizes a control panel 151 to operate the entire event. Certainly other arrangements of audio/video control and show production will be readily apparent to those skilled in the art.

FIG. 16 illustrates the present invention with an embodiment that utilizes a bright projector 152 and a massive front projection screen 160 instead of the image display 42. All the disclosure related to the image screen 43 is applicable to the massive front projection screen 160. The massive front projection screen 160 may use any type and arrangement of variants of the vertical reflective transparent substrate 60 as disclosed herein. As seen in FIG. 16 an optional hanging sheet polarizer 159 is used to improve the contrast of the massive front projection screen 60 by darkening with alignment with an ambient light polarizers 156. Further, projector lens polarizer 154 can reduce the reflection of the projection lens of the bright projector 152 from the audience perspective in the sitting zone 14. The surrounding black mask 46 may be changed in color to match the color of the massive front projection screen 160 forming a solid continuous appearing surface. The hanging sheet polarizer 159, or any reflective transparent substrate, may also only cover the surrounding black mask 46 and not the massive front projection screen 160. The podium prop 58 may need to be constructed in a way that prevents excessive shadows to be cast on the massive front projection screen 160.

FIG. 17 illustrates the present invention and cross referenced to FIG. 10 with the image display 42 and the image screen 43 positioned at the room floor 91 and forming the floor stage area 92. The image display concealment substrate 40 is motorized retractable by a motor spool 166 held by a top bracket 164. FIG. 18 Illustrates the present invention of a reflected foreground built as a staging kit to be set-up and placed in front of the image screen 43 of the image display 42 that is permanent or temporary in the large hotel multipurpose room 2 or any room or venue. Moving at an upwards direction 192, the image display concealment substrate 40 is rolled out of the way. Positioned in front of the image screen 43 is a temporary stage floor 188 supported by a temporary stage riser legs 184 consuming a floor space 190. The temporary stage riser legs 184 are concealed by a stage skirt 186. The stage lighting rig 124, a rear mount spool 182 for rolling up the vertical reflective transparent substrate 60, the hanger bracket 112 with a connected valance 122, the dual motorized spool 114 with independent motorized spools for raising and lowering independently the left roll up concealment panel 84, the right roll up concealment panel 86, and the center concealment roll up panel 88 are held in place by a back truss 170, connected to a back upper truss block 174, connected by a top truss 178, connected by a front upper truss block 176, and connected to a front truss 172. While FIG. 18 illustrates the image display 42 at floor height it certainly could be raised up and still have the staging kit embodiment placed in front of it.

FIG. 19 illustrates the present invention configured with a 3D projector 199 projecting onto a stereo image supporting projection screen 198. The podium prop 58 is constructed to not interfere with an angle of the projection beam 204 and thereby reduce shadows cast onto the screen 198. The audience in the sitting zone 14 utilizes 3D glasses of any type including active and passive glasses. As described for all embodiments that are herein relevant to this configuration, and especially the disclosure for FIG. 16, is applicable to this configurational embodiment. 3D production, post production, and projection is common in the art. The present invention applies the additional depth cues of 3D projection to a recoded, broadcast, and videoconference of the image of the imaged person 68. 3D can aid further in creating a virtual stage, adding depth to the imaged person 68 and project virtual 3D stage elements (not shown). It can also be produced in conjunction with the reflected rear stage 56 (not shown).

FIG. 20 illustrates the present invention's video production and various image display orientations for recorded presentations, broadcasts, and videoconferences of the imaged person 68. A production backdrop 208 is made of a black light absorbing substrate or a chromakey background and image processed to a black color. The image captured person 214 is contained in an image capture image 210. A close up image 213 is either extracted from the image capture image 210 or created with a second image capture device. The imaged captured person 214 utilizes a narrow podium 212, which is blocked by the podium prop 58 when displayed. Image processing 222 of the image capture image 210 modifies the image 210 in a venue one with a square screen 220 and also in a venue two with a rectangular screen 218. Image processing 222 can take a recorded image, a broadcast image, and a videoconference image and maintain a life-size proportion of the image captured person 214 who is seen as the imaged person 68 on the square screen 220 and the rectangular screen 218. The image capture image 210 aspect ratio may be maintained in proportion no matter what numerous shapes and sizes of screens such as 218 and 220. The venue one with the square screen 220 and the venue two with the rectangular screen 218 are for reference sake and both share the embodiments described for image screen 43. That aspect ratio will usually be 16:9 but may also be wider or narrower. The aspect ratio may also be in portrait mode to preserve as a high pixel density of the imaged person 68. The production backdrop 208 that produces black in the image capture image 210 is displayed as native source image 216 in the screens 218 and 220. The screens 218 and 220 themselves image the color black in all areas of the screen that are not the native source image 216 forming a continuous black color with the screens 218 and 220. The videoconferencing camera 70 is concealed in the podium prop 58. A displayed close-up shot 89 on a magnification image 88 originates as the close image 213. A venue one virtual stage light 221 and a venue two virtual stage light 223 are configured for the size and shape of the screens 220 and 221. Functionally, the virtual lights 223 and 220 correspond to the explanation of FIG. 8 and the virtual stage light with beam 87. Modifications of the production and the display on multiple size image screens will be apparent to one of ordinary skill in the art. Further the image person 68 need not be head-to-toe, but may be only a torso and head shot and placed in front of the podium prop 58 or a table prop (not shown). In this case, the native source image 216 may actually be quite small. Also, numerous native source signals could be mixed and displayed side-by-side and each containing an imaged person recorded or live video conferenced creating the appearance that they are all sitting at a table during a panel discussion (all not shown).

FIG. 21 illustrates an alternative to the image display 42. A massive rear projection screen 227 replaces the image screen 43, and is produced by a lower short throw projector 226 and a higher short throw projector 228. The projection beams form a single continuous image and are seamless by an image over lapping 265. Those skilled in the art will appreciate multiple projection pathways from one or many projectors forming a massive image that functions as described for the image screen 43 with all the other related elements and functions as described herein. Projection mirrors (not shown) as well as any type of projector are applicable to the rear projection configuration of the FIG. 21.

Another embodiment of the present invention is utilizing the image display 42 with its image screen 43 constructed as a massive flexible display (not shown) that can be rolled up or moved aside like curtains or wall panels. It is to be expressly understood that as it relates to the deployment into the large hotel multipurpose room 2 such flexible image display construction will enable the same modes of use as described herein. With the massive flexible display, the massive concealment substrate 40 is not needed. The massive flexible display when positioned out of the way reveals the actual room wall of the multipurpose room 2 creating a consistency of décor on all room wall surfaces including the display wall side of the room 3. Further, the massive flexible display is constructed of a display technology that is integrated into all of the disclosed embodiments of the present reflected foreground invention in any application, and most significantly for the stage. The surrounding black mask 46 may be built into the flexible image display and may have a mask that is dropped in front of, rolled up with, and adjacent to it. Additionally, the vertical transparent reflective substrate 60, or its equivalent, can be dropped in front of the massive flexible image display.

FIG. 22 illustrates the present invention with both the imaged person 68 and the speaker 10 on stage. While certainly the speaker 10 could interact with a recorded image of the imaged person 68 it would require timing and production coordination. In a broadcast, the speaker 10 may only transmit his voice to the location where the imaged person 68 is located and thereby give the impression to the audience that both the image person 68 and the speaker 10 can both see and hear each other. Ideally, the imaged person 68 and the speaker 10 participate in a high quality videoconference transmission and the audience can observe the speaker 10 and the imaged person 68 and interact naturally with each other. Further, the speaker 10 and the imaged person 68 can also interact live in the videoconference with the audience enabling a fully interactive event. Further, multipoint can enable a videoconference to occur in many locations simultaneously with the present invention. The videoconference camera 70 is mounted and concealed in a floor resting microphone stand 229 on the stage 44. This unique camera concealment is an inventive embodiment of the present invention.

FIG. 23 illustrates a preferred videoconference transmission system for the disclosed image display stage concealment and reflected foreground stage invention. A data network 232 connects to a network operations center 230 intended for managing a global deployment of large hotel multipurpose rooms 2 incorporating the present invention. Connected to the data network 232 is a hosted router and/or MCU (multi-point control) 234 for enabling many sites to participate in a stage videoconference. A live stage production 246 permits a videoconference transmission by a codec for a stage 240 to be viewed upon a production display 236. A live telepresence production 244 permits a videoconference transmission by a codec for the talent 238 to be viewed upon a stage display 242. The videoconference transmission permits the live telepresence production 244 and the live stage production 246 to communicate by seeing and hearing each other by the connected interaction of at least minimally the codec for the stage 240, the codec for the talent 238 and by means of the data network 232. Related equipment such as cameras, microphones and speakers are integrated as a part of the videoconference transmission system, as required at one or more locations. The network operations center 230 can also serve to manage all forms of communication to and from the present stage invention including satellite, terrestrial TV, and other communication means, and all showing content that is recorded, broadcast, and live videoconference interactive among various large hotel multipurpose rooms 2 and production studios (not shown). Any and all protocols for videoconference transmission, including, but not limited to, analog, dynamic transfer mode (DTM), internet protocol (IP), and motion JPEG are all applicable to achieve the communication objectives of the present invention.

FIG. 24 illustrates the present invention as a digital signage system. A sign image display 268 with a sign content image screen 267 has a reflective clear substrate 266 that reflects a light prop 261 in the foreground as a virtually reflected light 264 behind the sign content image screen 267. An optional light side polarizer 266 is aligned with an optional sign side polarizer 265 and darkens from the sign content image screen 267 perspective and thereby reduces light from impinging the sign content image screen 267. A sign viewer 262 peers in a sign screen direction 271 through the reflective clear substrate 266 and the sign side polarizer 265 to view the sign content image screen 267. A clear barrier 263, such as protective glass, is not positioned between the sign viewer 262 and the sign image content screen 267. Such barrier itself would be reflected by the reflective clear substrate 266 causing unwanted reflection and also have upon it unwanted ambient reflections. The sign side polarizer 265 may serve as the reflective clear substrate 266 provided it has sufficient reflection value to reflect the light prop 261. The light prop 261 may be any shape and size depending upon the intended digital signage application. The signage system may incorporate any embodiment described for the stage application including videoconferencing. The embodiment of FIG. 24 is applicable to large and small signage systems in public spaces and may be built into kiosks and automatic teller machines (ATMs). It is also applicable to the stage systems and any other relevant configurations described herein.

FIG. 25 illustrates the present invention configured as a group videoconferencing system with a center camera placement 260 (but not limited to other placements) and aimed through a wide clear reflective substrate 250 reflecting a foreground light posts 254 and appearing as a reflected background light posts 256 in a reflection upon the wide clear reflective substrate 250. The camera placement may also be in front of the wide clear substrate 250. A group videoconference participants 258 are imaged on a wide conference screen 252 and the screen is adjacent on the same plane as an optional wide area surrounding black 251. The wide area surrounding black 251 extends the area for reflection by the wide clear substrate 250 of the foreground light posts 254. All embodiments of the reflected foreground discussed herein are applicable to the present embodiment of FIG. 25. The foreground light posts 254 may be modified in size, shape, position and number. Likewise floors, ceilings, and walls that are illuminated externally or internally may be reflected by the wide clear reflective substrate 250 to create objects that appear behind the videoconference participants 258.

FIG. 26 illustrates an alternate embodiment as described for FIG. 24 and FIG. 25 with the modification of showing a full standing person 288 on a portrait display 280 with a portrait image screen 286. The portrait image screen 286 has a portrait surrounding black substrate 284. The black substrate 284 and the portrait image screen 286 are covered by a portrait clear reflective panel 282 for reflecting a tall foreground light posts 294 and an illuminated floor 292 creating a reflected floor 290. A wide direction 308 illustrates construction of the embodiment that may be widened to provide a wider viewing angle for observers (not shown). A videoconference box 296 contains a microphone 298, a small conference camera 300, and a small speaker 301. The embodiment of FIG. 26 may be a videoconferencing system, kiosk, an ATM, a virtual greeting system, a clothing advertising system, and any recorded and live application that shows a life-size person, among numerous other uses. Further, internally or externally illuminated floors, ceilings, and walls may replace or augment the tall foreground light posts 294 for reflection by the portrait clear reflective panel 282.

FIG. 27 illustrates a multi-sided light output post as an alternative foreground object. A light 304 illuminates a heavy diffused three sided housing 302 and lightly diffused side 306 has a facing direction 303 toward the clear reflective substrate (not shown). The heavy diffused three-sided housing 302 is observed directly by a viewer (not shown) and has a common level of illumination. The light diffused side 306 is much brighter, but is observed by a viewer only in a reflection of the clear reflective substrate (not shown). That reflection matches the common level illumination from the viewer's perspective as being a consistency of illumination of the foreground object as observed directly and in the reflection. The clear reflective substrate for reflecting a foreground, as described herein in numerous embodiments, may be adjusted in its reflectivity from being an uncoated clear substrate to a complex beamsplitter coating with high reflectivity and transparency.

FIG. 28 illustrates a perspective view of the present invention for the stage revealing the foreground object 62 (FIG. 6) seen as the reflected rear stage object 64. The vertical reflective transparent substrate 60 is placed in front of the image screen 43 of the image display 42. The stage floor 52 of the retracting stage floor system 44 is seen as a stage reflection 315 upon the vertical reflective transparent substrate 60. The speaker 10 can interact with the audience (not shown) and the imaged person 68. The imaged person 68 can appear to stand behind the podium prop 58 and the imaged person 68 can see the audience and the speaker 10 by the videoconference camera 70. The vertical reflective transparent substrate 60 may be configured into a left reflective zone 314, a right reflective zone 316, and a reduced reflective zone 318. The reduced reflective zone 318 may have a reflective top for reflecting the stage ceiling (not shown) and a lower reflective zone for reflecting the stage floor 52 as revealed in the reduced reflective center portion 320. An ambient light source 310 has a potential reflection 312 in the right reflective zone 316. The potential reflection 312 is more visible on the right reflective zone 316 and less reflective in the reduced reflective zone 318 and the reduced reflective center 320. The vertical reflective transparent substrate 60 may be constructed by any reflective clear substrate and may have a continuous reflectivity across its entire surface or degrees of reflectivity across its surface. Variations of reflectivity are possible by numerous methods including, but not limited to, reflective optical coatings, anti-reflective optical coatings, layering coatings, feathering coatings with degrees of reflectivity, seaming coating sections with degrees of reflectivity, and using reflective sectional pieces instead of single vertical reflective transparent substrate 60. The same applies to all configurations of the present reflected foreground invention disclosed herein for such applications as group videoconferencing, digital signage, kiosks, and ATMs.

The vertical reflective transparent substrate 60 and its disclosed variants may be constructed in numerous ways, with numerous materials, and with numerous optical coatings and properties. As advances in optical technology takes place and new materials come into existence all are applicable and within the scope of the present invention. FIG. 29-36 are all variants of the vertical reflective transparent substrate 60. The embodiments of any these figures may have any type of optical coating and optical characteristic such as polarization and may be in any combination. Polarized optics in the form of glass, plastic or film may serve a dual role to reflect the foreground and also block foreground light aligned with another polarizer from negatively impinging the image screen 43. FIG. 29 illustrates a clear rigid plastic 322. FIG. 30 illustrates a rigid glass 324 that may be hardened chemically, by tempering or by other means. FIG. 31 illustrates a separate sectional clear reflective members consisting of a section left 326, a section right 328, a section bottom 332, and a section top 330. FIG. 32 illustrates a single clear substrate 336 with an increased reflective left side 334 and an increased reflective right side 338. The increased reflectivity may be based on optical coatings, adding or removing portions of optical coatings, feathering optical coating or layering several clear optical pieces on top of each other as illustrated in FIG. 33. FIG. 33 shows a first vertically clear flexible sheet 340, a second vertically clear flexible sheet 342, and a third vertically clear reflective sheet 344 each with an inherent reflection value and when positioned next to each other increases the total value of reflection. FIG. 34 illustrates a flexible clear plastic film 348 hung by a hanger 350 and with a bottom weight 346. The bottom weight 346 pulls the flexible clear plastic film 348 sufficiently to form a distortion free reflective surface. FIG. 35 illustrates a flexible clear film 354 stretched over a frame 352. Stretching can be manual pulling, mechanical pulling, and also heat shrinking over the frame 352. FIG. 36 illustrates a flexible stretch plastic 364 with pull bars 358 affixed to one or more sides (all shown) and pullers 366. The pullers 366 are affixed to a rigid structure (not shown). The pullers 366 may be worm screws, springs, straps, ratchets, and any other puller technology well known in the projection screen and theatrical staging arts for decades.

Any embodiment of the present invention utilizing the surrounding black substrate 46 and the vertical reflective transparent substrate 60 or the separate sections described for FIG. 31, may be combined as a single optical element referred to as a black mirror (not shown). As such, when in claims and description herein it should be expressly understood the black mirror is an optional combination of the black substrate 46 and the reflector used for reflecting the foreground. The black mirror may be fully opaque and placed at and beyond the perimeter of the image screen 43 or may be dark in hue and partially transparent and covering the image screen 43. The objective of the black mirror is to form a continuous black surface of the image screen 43 and beyond its perimeter. The color black is preferred, but shades of dark grey will suffice and those shades, for the sake of definition, should be construed as the color black. The black mirror may be any substrate, yet large plastic sheet film that is black in color or is transparently grey to the see the image screen 43 behind will suffice. As such, a grey sheet polarizer may be used. The polarizer also can eliminate ambient room light and foreground light from impinging the image screen 43 by additionally aligned polarizers.

The hotel multipurpose room 2 combined with the present stage embodiments enables a hotel owner and operator to offer a wide variety of events otherwise not possible. Ideally the present disclosed stage inventions are deployed in hotels around the globe and booking for these events are centralized. For example, a music artist desires to do five simultaneous concerts around the globe live. The present invention and numerous embodiments permit the hotel owners to have the entire concert venue technology stored and ready to be deployed in their hotel multipurpose room 2. No outside audio/visual company and no staging company is required for these events. The hotel multipurpose meeting room 2 is connected to an originating site where the artist is located and live via videoconference the artist can interact with each of the live locations by both seeing and hearing each other. Of course, the present invention offers the hotel owner and operator an impressive corporate meeting tool where executives need not fly to the hotel to fully interact with the audience on stage. When not on stage the executive can use another videoconferencing room as disclosed later herein to conduct more personal meetings and breakout sessions. The present invention offers a superb system for doing professional development such as a global remote doctors training network. For example, surgical techniques and medical products can be seen floating on stage next to the presenter. Religious groups may utilize the hotel multipurpose meeting room 2 and enjoy the present disclosed invention at weekly gatherings. Politicians will also greatly benefit by the present invention since they are now be able appear as a hologram and visit a dozen or more cities in a single day by arranging campaign stops at participating hotels all via videoconference. The present invention also permits movies to be seen and the participating hotels can convert a ballroom into a high-end dinner and movie theater. Also, live drama via broadcast or even better via videoconferencing permits actors in one location to interact and hear the audience feedback live even though the actors and audience are separated by thousands of miles. The present stage invention is also ideal for showing live sports at many locations to large audiences with sports figures, commentators and giant volumetric objects appearing 3D on stage. Numerous other applications and event types abound and hotel owners and operators have a new globally connected solution for numerous segments of society to visit their hotel properties.

Those skilled in the art will appreciate the stage embodiments for the described large hotel multipurpose room 2 may be modified as needed for the numerous arrangements of multipurpose room 2 environments. Those rooms, in fact, need not be multipurpose, but fixed seat theaters with the seats at inclines, fixed seat training environments in universities and corporations, to name only a few. Those skilled in art will appreciate that any room and any scale of the embodiments will not depart from the scope of the disclosed invention. The present invention may be a permanent or a temporary installation. Also, the hotel multipurpose room 2 is herein defined to include any public rentable multipurpose space such a convention center hall and a convention center meeting room. When built into a temporary application, such as a tradeshow booth, the display wall side of the room 3 includes in its definition a side of a booth or other arrangement. Lastly, the present invention may be incorporated into theatrical shows and concerts where the entire image display 42 and all other elements are rolled, swung, raised, lowered, and the like for an audience observation for only a portion of a show, concert or event.

Eye contact while videoconferencing has been a perplexing problem for all types of applications and uses. The camera mounted at the edge of the display creates the distraction of people looking far away rather than toward each other. Ideally, an eye contact system mounts a camera directly behind the eyes of the person on screen to affect perfect eye contact. Yet, a substantial need exists to improve eye contact and do so with off-shelf TVs and computer monitors. Also, a substantial need exists to provide a superior camera quality better than a web camera. Still further, consumers are frustrated with having to purchase a different kind of camera for numerous conferencing applications such as desktop and group conferencing configurations. The present invention resolves these issues.

FIG. 37 illustrates a prior art multiple rear projection display system with a hole 372 cut into a rear projection screens 370. A rear camera 374 is mounted between projection pathways (not shown) so as to not cast a shadow on the rear projection screens 370. Rear projection has proven to be too bulky and affordable flat panel TVs now render this solution nearly obsolete. Also, the hole 372 is an intrusion and when the rear projection screens 370 show content, such as data, the hole 372 is an unacceptable obstruction to the image. FIG. 38 shows a large PTZ camera box 378 intruding a generic display 376. A pan/tilt/zoom camera 380 requires the large PTZ camera box 378 for the camera 380 to mechanically capture various parts of a room and not have the box 378 impinge the image captured. The large PTZ camera box 378 may be in front of the generic display 376 or built into the generic display 376. Certainly the intrusion of the bulky pan/tilt/zoom camera 380 and its box 376 is a distraction and an intrusion while videoconferencing. FIG. 39 illustrates an overhanging camera body 386 with a lens camera 384. The overhanging camera body 386 creates a significant distraction being in close contact with a conference person's image 383 on a typical conference display 382. The lens camera 384, with even a small lens 1" in diameter, is a significant intrusion while conferencing since it looks like the conference person image 383 is wearing a hat or has something stuck on his head. The visible and obvious lens and the wide body of the overhanging camera body 386 combined, negatively affects the conferencing experience and eliminates whatever gains are made with an improved eye line. Other prior art systems place tiny beamsplitters on an image screen and aims a camera onto the beamsplitters for capturing a reflection of the viewers (not shown). These systems have proved to be too complicated and non-functional since light from the image screen impinges the reflected image on the tiny beamsplitter. Still others have tried, since the dawn videoconferencing, clamping cameras in bulky housings to monitor bezels and positioning the camera over the face of the person on the screen (not shown). Such crude systems have been used for decades and have proved utterly impractical for quality videoconferencing.

FIG. 40 illustrates a small camera 394 made of a common construction square electronic sensor board. The small camera 394 has a screw on lens 398 into threads 396. An image signal transmitter and power wire bundle 392 is contained along with the small camera 394 in a slim housing 390. The power wire of the bundle 394 is connected to a power source and that source may be permanent or battery. Traditional small camera construction limits a primary objective of the present invention and that is to create a nano camera with no intruding large visible lens and wide body housing. FIG. 41 illustrates a nano camera 402 with an integral lens constructed upon a rectangular shaped nano electronic sensor board 404 for processing sensor image data. The objective is to create a highly unique rectangular camera assembly herein referred to as a nano stem camera 400. As described for all relevant embodiments of the present invention whenever the nano stem camera 400 as referenced includes the nano camera 402. As illustrated, the nano-sensor electronic board 404 is nearly as narrow as the image signal and power wire bundle 392 permitting the assembly of the nano-stem camera 400 to be extremely narrow and elongated in shape.

FIG. 42 illustrates an alternate embodiment where power and signal wires are integral to a clear wire assembly 406. The clear wire assembly 406 may be constructed as a clear flexible ribbon material or a clear rigid material. The wires may be embedded or printed and the wires are intended to nearly disappear from view when placed in front of a luminous image display (not shown). FIG. 43 separates electronic functions of the nano electronic sensor board 404 into two halves consisting of sensor mount board 408 and an electronic camera board 412. The sensor mount board 408 connects to the electronic camera board 412 by an electronic wire bundle 410 that may be clear or concealed in the nano stem camera 400. The electronic camera board 412 may be constructed rectangularly and contained in the nano stem camera 400 (not shown) or separate and hidden from view.

FIG. 44 illustrates a perspective view of the nano stem camera 400 held in the hand of a camera user 414. The nano camera 402 is exposed from the nano stem camera 400 and is so small it is not recognizable as a camera unless the camera user 414 closely inspects it. The elongated shape may be any tubular style including round, oval, and square. The exterior of the nano stem camera 400 may be any color or texture including highly reflective mirror like finishes. An extension tube 413 permits the camera user 414 to choose the ideal length of the nano stem camera 400 and depends upon the image display (not shown) it will be placed in front of. For example, a short stem would be used with a desktop computer monitor and a long stem would be used with a large flat panel TV for group conferencing. Ideally, one product could be sold for multiple applications. The diameter of the nano stem camera 400 depends upon specific applications. The stem has been demonstrated to be less the 0.5 inch and even 0.28 inch diameter. Certainly the less diameter the better to minimize its appearance when placed in front of an image display. Further, the nano stem camera can have at one end a motorized pan and tilt mechanism (not shown). Also, the mechanism may be built into any part of the stem such as close to the nano camera 402. A motorized zoom may also be included. Preset scene features may be added and even auto tracking. The nano stem camera 400 may have IR and wireless and wired controls.

The nano camera 402 is preferably sourced as a massive megapixel CMOS camera for mobile phones. These nano cameras are now constructed into mobile phones with resolution above 40 megapixels. As a result they have a magnitude greater resolution than HDTV. FIG. 45 illustrates a nano camera 402 with integral nano lens (not shown). The lens on the nano camera 402 may cause a significant distorted image area 420 at the perimeter of a megapixel sensor 418. This is especially true for a massive megapixel camera. The area in the center of the megapixel sensor 418 is substantially free from lens distortion permitting an image portion 424 to be extracted. The present invention utilizes the image portion 424 of the sensor 418 free from lens distortions to digitally simulate a panning, tilting, and zooming 422 of the nano camera 402. The image portion 424 can produce a native resolution of any HDTV standard and even 4K standards and beyond. The camera user 414 can manually select features common to mechanical panning, tilting, and zooming and also has presets for one-touch selected scenes. Remote controls (not shown) and software can be used to access the cameras functionalities and may include pattern recognition face tracking.

FIG. 46 illustrates the present invention nano stem camera 402 with a megapixel camera sensor substantially higher than the needed native resolution of a given videoconferencing system or application. The present invention extracts from the sensor 418 a first video portion and live stream 426, a second video portion and live stream 428, and a third video portion and live stream 430. The video portions 426, 428, and 430 may each capture various parts of a videoconference with the intent of being displayed at a remote location on multiple image displays or seamed together by image processing to create a panorama view of a videoconference. Numerous options are available to enhance videoconferencing by having a megapixel sensor 418 that can produce simultaneously two or more image signals. Custom image processing and electronics are required to extract multiple simultaneous images from the megapixel sensor 418.

Several manufactures around the world manufacture nano class cameras and custom configuration from the sensor manufacture is preferred to ensure the assemblies and cable connectors enable the elongated and extremely slender shape of the nano stem camera 400. Sensor technology may be CMOS, CCD, and any type of sensor. It may also be 3D, multi-sensor, multi-lens array, and 3D light field technology. Also preferably the camera lens should be so small it is not recognizable as a lens from even inches away. The nano camera 402 may also be constructed with a tiny mirror and the assembly works like a tiny periscope (not shown). Although present invention discloses the nano stem camera 400 as specifically created for videoconferencing, it can certainly be used in many other applications such as security, live action sports, and even TV and film production. It may also have built in recording capabilities for storing video clips, picture taking function, built-in videoconferencing codec, battery, and other features.

FIG. 47 illustrates a unique embodiment of the present invention that conceals the nano camera 402 in a gooseneck camera microphone 442 on a table stand 432. The nano camera 402 captures an image 438 of a local videoconferencing participant (not shown). The gooseneck camera microphone 442 is a real object that naturally extends above a working surface 440 without drawing attention to local participants that it is actually a camera placed in front of a flat panel screen 436. The gooseneck camera microphone 442 and the nano camera 402 are placed sufficiently high in the picture to enable better eye contact while videoconferencing and broadcasting. The gooseneck camera microphone 442 may also be built to raise and lower into a table surface by hand or by motorized mechanical means. The gooseneck camera microphone 442 may also have a functional microphone built near the nano camera 402 (not shown). That microphone is not aimed toward the image of the person (not shown) on the flat panel screen 436, but rather is aimed toward the local participant (not shown).

Further, a flat panel display 434 with the flat panel screen 436 (more fully defined in FIG. 64) is placed behind the working surface 440. Placing the flat panel display behind and below the working surface 440 permits imaged persons on the screen (not shown) to appear with their torso originating from the table and eliminates the lower bezel (not numbered) from being viewed by the local videoconferencing participants. The effect is a greater sense that the imaged person on the flat panel screen 436 is sitting at the table. The working surface 440 may be any type of table, desk, counter, and the like.

FIG. 48 illustrates the nano stem camera 400 built into the working surface 440 and it has a raising and lowering motion 446 by a surface hole 444. The nano stem camera 400 can be positioned by the raising and lowering motion 446 manually or by a mechanized motor (not shown). The local participant may select the desired height of the nano stem camera 400. FIG. 49 illustrates a quick disconnect mount 445 for the nano stem camera 400 so the local participants can add the nano stem camera 400 in front of the flat panel screen 436 during videoconferencing. Preferably the mount 445 aligns the camera forward when inserted so no image alignment procedures are need before a videoconference. FIG. 50 illustrates the nano stem camera 400 on a stand stem 448 so that the nano stem camera 400 can be moved about on the working surface 440. The nano stem camera 400 may also telescope up and down while mounted to the stand stem 448 (not shown), similar a motorized car antenna. The stand stem 448 may also have a ball mount (not shown) to permit the nano stem camera 400 to adjust to level and to tilt up and down. Such image adjustment can also be built into the nano camera 402, into the housing of the nano stem camera 400, or achieved digitally. Such adjustments apply to all configurations of the nano stem camera 400 and gooseneck camera microphone 442 described herein. The configuration of FIG. 50 is ideal for desktop computer monitors. The FIGS. 47-50 are shown built into the working surface 440 but may, and all other similar illustrations, be built into or onto the actual flat panel display 434 or another supporting structure (all not shown).

FIG. 51 illustrates the present invention using the nano stem camera 400 in orientation depending on a first imaged person size 502 and a second image person size 500. Ideally for the smaller first image person size 502, the nano stem camera 400 is mounted below and can move by a first up and down motion 506. For the larger second image person size 500 the nano stem camera 400 is positioned above and moves in a second up and down motion 504. The sizes of people on the screen may be the difference in human sizes or the result of image scaling the human proportion to the desired size. The nano stem camera 400 may have manual selector menu or a gravity detector to automatically flip the image signal when the nano stem camera 400 is turned upside down. The image signal may also be selected to correct an image when captured off of a mirror.

FIG. 52 illustrates the present invention with a lower telescoping receiver 508 and an upper telescoping receiver 510 for mounting the nano stem camera 400 and the nano stem camera 400 either mechanically or manually collapses into the receiver 508 by a receiver down direction 514 and receiver 510 by a receiver up direction 512. The nano stem camera 400 does not need to intersect nor interfere with the face of the person on screen, which would ruin any attempt at have a quality videoconference (not shown). The intent is to give the consumer the ability to adjust the nano stem camera as desired to a position just out of the way of the face of the person on screen and rely on the distance from the user and the person on screen to minimize the parallax angle and thereby affect better eye contact. Further, the extreme narrow construction of the nano stem camera 400 and the unnoticeable lens of the nano camera 402 sufficiently remove intrusion when placed in front of group conferencing displays and desktops displays. This is especially an improvement over bulky common hinged articulating arm cameras that have been placed in front of faces on screen for behavioral research apparatus videoconferencing for decades and other consumer makeshift systems for eye contact, blocking the face of the person on screen. The telescoping receivers 508 and 510 compactly stows the nano stem camera 400, removing from view of the user the elongated stem of the nano stem camera 400. Consumers will readily adapt numerous ways to mount the nano stem camera 400 with adhesive, hook and loop, clamps, hooks, brackets, quick disconnects, and the like to any type of display, TV, computer monitor, tablets, notebooks, and mobile phones. Ideally, the nano camera stem 400 is sold with numerous attaching systems to adapt to many consumer desired uses.

FIG. 53 illustrates a common dual videoconferencing screen system with a dual image display 518 with adjacent image screen 516. Two nano stem cameras 400 are positioned near center and originate from below. The nano stem cameras 400 can originate from above and also be positioned further apart. The nano stem camera 400 can also be placed in between the displays 518 at eye level (not shown). FIG. 54 illustrates the present invention in a three screen videoconference arrangement with numerous camera arrangement position options. A three image displays 520 with a three image screens 522 are utilized to show a videoconference at a distant location with a similar three screen system. The nano stem camera 400 can be arranged in a left camera position 526, a center camera position 524, and a right camera position 528. Or a videoconference can use three nano stem cameras 400 positioned in the center camera position 524. The nano stem cameras 400 can be placed in any arrangement above and below depending upon the desired configuration and experience. The nano steam camera 400 can, as well, be placed in between the bezels of displays 520 (not shown).

Figure 55:
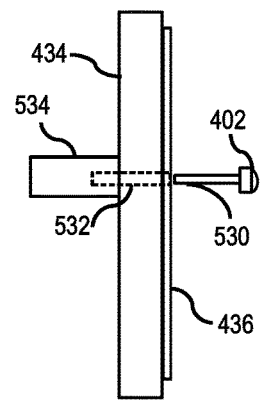
FIG. 55 illustrates the present invention of a micro head camera detachable from a hole in a display screen.
Figure 56:
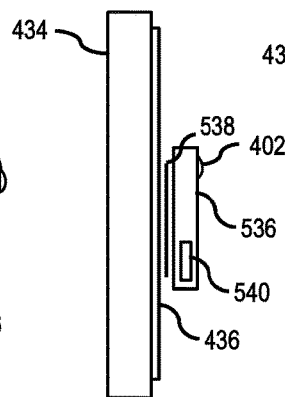
FIG. 56 illustrates the present invention of a micro stem camera affixed to a display screen wireless means to transmit video and power.
Figure 57:
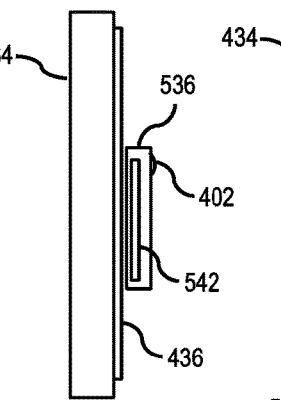
FIG. 57 illustrates the present invention of a micro stem camera affixed to a screen and powered by light energy from the display screen.
Figure 58:
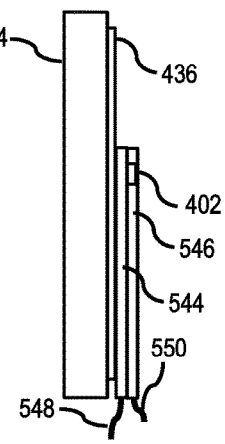
FIG. 58 illustrates the present invention of micro stem camera where the stem is concealed with a strip display with content seamlessly merging the main display and strip display.

FIG. 55. Illustrates the present invention where the nano camera 402 has a quick connect support stem 530 for transmitting image signals and power. The quick connect support stem 530 is placed in a micro hole 532 in the flat panel display 434. Mounted behind is a nano camera receptacle 534 which may have image processing electronics. FIG. 56 illustrates the nano camera 402 in a nano housing 536. Image signal transmission is made possible by a built in wireless image transmitter 540. Power may be presented to the nano camera 402 by wire or wireless (both not shown). The nano housing 538 is held to the image screen 436 by friction adhesive 538. Preferably the friction adhesive 538 leaves no residue on the flat panel screen 436. The illustration of FIG. 56 eliminates a major portion of the stem of the nano stem camera 400. FIG. 57 presents a power generation by a photovoltaic cell 542 or similar functioning energy producing device where the nano camera 402 is powered by the light emanating from the flat panel screen 436. A special image processing software can coordinate a bright light to always appear in the spot the nano housing 536 is affixed to (not shown). FIG. 58 conceals an image transmission and power cable assembly 544 by a flex display 546. It may also conceal a camera electronic board (not shown). The flex display 546 images the exact content on the flat panel screen 436 that is being covered up by the flex display 546. A small hole in the flex display 546 allows the nano camera 402 to capture images. A wire bundle 548 attaches to the image transmission and power cable assembly 544 and a second wire bundle 550 attaches power and video transmission to the flex display 546. The flex display 546 need not be flexible yet a flexible OLED is preferred.

Figure 59:
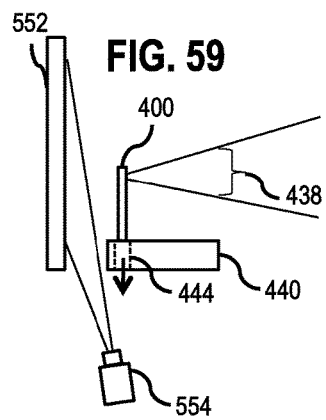
FIG. 59 illustrates the present invention of a micro stem camera used with a bottom mounted short throw projector.
Figure 60:
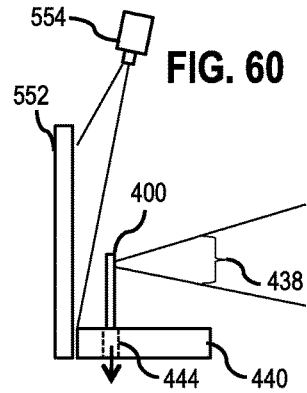
FIG. 60 illustrates the present invention of a micro stem camera used with a top mounted short throw projector.
Figure 61:
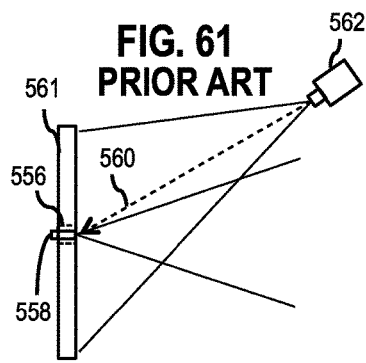
FIG. 61 illustrates a prior art system of a camera placed in a hole of a front projection screen and light from the projector impinging on the camera lens.
Figure 62:
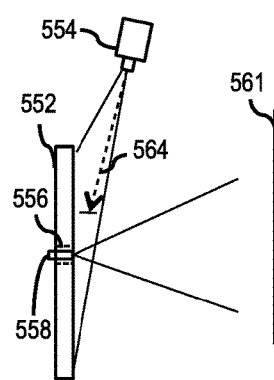
FIG. 62 illustrates the present invention of a camera mounted in a hole of a front projection screen and the lens protected from being impinged with the light from the projector.
Figure 63:
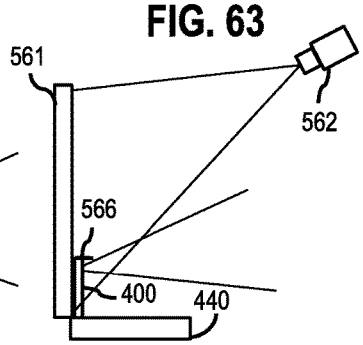
FIG. 63 illustrates the present invention of a micro stem camera with a shield to protect the lens from being impinged by the projector.

FIG. 59 illustrates the present invention where a short throw projector 554 mounted from below projects an image onto a short throw projection screen 552. FIG. 60 illustrates the short throw projector 554 projecting from above onto the short throw projection screen 552. In both configurations of FIG. 59 and FIG. 60 the nano stem camera 400 is placed in front of the projection beam so that the projection beam does not impinge the nano stem camera 400. FIG. 61 illustrates a prior art front projection eye contact system that suffers from the common projector 562 impinging by an intrusion angle 560 the lens of a conference camera 508 in a screen hole 556 cut into a common front projection screen 561. The light from the intrusion angle 560 substantially effects image capture with bright spots and lens flares being captured. The present invention resolves this prior art problem with the configuration illustrated in FIG. 62. The short throw projector 554 projects upon the short throw projection screen 554 at such a steep angle that the conference camera 508 is not impinged by a stopped impingement angle 564. FIG. 63 illustrates the common front projection screen 561 being projected upon by the common projector 562. The nano stem camera 400 is unaffected by the projection beam by a beam shield 566 preventing the beam to impinge the nano stem camera 400 and the lens of the nano camera 402 (not shown).

It is a primary embodiment of the present invention to create a single immersive videoconferencing system that serves two distinct modes of use. One mode is a close up work mode of use and the second a watching mode of use. Variations of these modes are herein discussed, but apply to diverse applications from hotel guest rooms to group videoconferencing rooms and even personal videoconferencing systems. Personal videoconferencing is ubiquitous, but it is nearly always experienced on a notebook, tablet, PC or mobile phone. Rarely do consumers have the ability to access high quality videoconferencing with life-size images and improved eye contact. Guests in hotels are usually presented with small flat panels displays and have little innovation in enhancing the guest experience. The present invention discloses unique hotel guest room as an immersive entertainment and work environment. Consumers have applications they use for videoconferencing such as Skype or Face Time, yet do not have the expertise to know how to coordinate these applications on immersive display systems. The recent availability of 4K resolution flat panel displays offers unique opportunities to innovate new ways to use immersive displays for multiple modes of use.

FIG. 64 illustrates an ultra HD flat panel display 601 with an ultra HD screen 602. Ultra HD is herein described as TV resolutions above 1080 lines a resolution and preferably 4K resolution or higher. Further, ultra HD is to be understood as immersive meaning the ultra HD screen 602 is larger than 50" diagonally measured and is preferably a display 80" diagonally measured and above. Ultra HD resolution and the large display scale permits a primary embodiment of the present invention of creating a computer resolution screen portion 600 to be scaled smaller inside the ultra HD screen 602 (as seen in FIG. 64). 1080 lines of TV resolution has been ineffective to permit close up viewing of computer data because of the limitation of the native resolution. Ultra HD flat panels permit such high resolution that sitting close to the ultra HD screen 602 and seeing the screen portion 600 is effectively the same experience as sitting close up to a computer monitor. This permits an entire new immersive way to use computer images in personal workspaces. Typically, in videoconferencing group meeting rooms, a computer signal is fed to a TV and people observe the image in a meeting room from far away. Because people are far away the detail of resolution is not a critical issue. The present invention discloses unique embodiments that configure work station computer images for videoconferencing where local participants sit up in a close work zone 620 to view the ultra HD image 602 on the ultra HD display 601 (see FIG. 66).

Unique to this present invention the screen portion 600 contains a computer image from an operating system GUI such as that provided by Apple or Microsoft. Alternatively, it may have an image from a dedicated videoconferencing appliance. The image in the screen portion 600 is preferably large enough to show a life size imaged person 603 with a remainder of the ultra HD screen 602 with a vacant area 607. That vacant area 607 surrounding the image portion 600 is used for lighting during a videoconference with TV lights 605. The TV lights 605 may use any portion of the vacant area 607 of the display and may be configured with numerous lighting gradients, color temperatures, brightness intensity, positions, and size in the vacant area 607. The screen portion 600 is preferred to be located on the ultra HD screen 602 at a lower image section 414 so that it appears in the portion 600 life-size image person 603 is sitting on the other side of the working surface 440 from a local participant (not shown).

The flat panel display can as well image a full screen videoconference on the ultra HD screen 602 (FIG. 65). A first life-size group participant 606, a second life-size group participant 608, and a third life-size group participant 610 are all seen on the ultra HD screen 602. The nano stem camera 400 with the nano camera 402 is positioned and adjusted to improve eye contact by raising or lowering over the ultra HD screen 602. The full screen videoconference can be viewed from close up or far away.

FIG. 66 illustrates the present invention built into a hotel guest room 612. The room is configured with a close work zone 620 where a guest 618 sitting at a chair 619 at a pull out table 616 which is connected to a long working surface 614. The guest 618 is positioned less than 7 feet away from the ultra HD screen 602 of the ultra HD display 601. The guest 618 is able to access his favorite computer operating system and select a scaled image where the computer image fills the screen portion 600. Alternatively, the guest may select a computer image to fill the entire ultra HD screen 602 and positions various windows to the lower image area 414 and leaves other applications in other areas of the ultra HD display 601. Essentially, in this configuration of the ultra HD image display 601 becomes akin to a bulletin board where an application window is available for quick glance, but not for intensive interaction due to the excessive eye and head motion strain. Further, observing motion images such as movies and video games it is preferred to not fill the entire screen when the guest 618 is in the close work zone 620. Motion sickness and headaches can occur when full screen fast motion content fills a wide field-of-view. The guest can select his favorite videoconferencing applications and observe the experience in the screen portion 600. Many videoconferencing software applications will not withstand quality requirements of 4K resolution and a large immersive screen. The image screen portion 600 effectively scales the image so that these applications can be seen life-size, but not so large they expose codec compression and other image artifacts. Scaling is achieved by software and hardware.

The hotel may provide a premium conferencing solution where a superior soft client application or appliance based videoconferencing system is used that provides a near pristine HD resolution at full screen and even 4K resolution. A network for superior performance videoconferencing requires that the remote people have the same experience for all participants. The present invention discloses a hosted network where hotel guest rooms, business centers, subject matter experts of any type, hotel staff, and other guest rooms in other hotels around the globe share in this unique high-end videoconferencing experience. Further, the system can also be deployed in homes, businesses, and other commercial, retail, finance, education and government facilities. The close up work zone 620 may be used with or without the screen portion 600 for videoconferencing.

The same ultra HD screen 602 of the ultra-image display 601 is viewed by the guest 618 in a watching zone 622. While in a bed 624 or a chair 626 the guest 618 can enjoy wide screen immersive movies, TV, sports, and gaming. The distance beyond 7 feet from the ultra HD screen 602 defines the watching zone 622. Modifications of the distance may be based on user preference, yet the principal of the watching zone 622 and the close work zone 620 having different intended uses remains constant. The ultra HD screen 602 is so substantially large it can be used to create the appearance of an environmental immersive wall. Content of nature, outer space, and other scenery may play constantly and selected by the hotel or the guest 618 to add room ambiance. Further, the ultra HD screen 602 plays all sorts of content from any transmission means such as satellite, a media server, and the like.

The ultra HD screen 602 may also be used in live videoconferencing to hotel staff as a live concierge service. The hotel staff can appear sitting or standing up and seen on the large immersive ultra HD screen 602 in full screen. 4 k resolution videoconferencing would be ideal and since the lower bezel (not shown) of the ultra HD display 601 is hidden behind the back edge of the working surface 614, it appears the hotel staff person is just standing on the other side of the working surface 614. Further, a series of 4 k resolution hotel video productions can be created with the life-size person arranged proportionally to the ultra HD screen 602 to create a life-like in-person experience. For example, as soon the guest 618 enters his room for the first time a video plays of a hotel staff person greeting them to the hotel. The video can play automatically by numerous triggers such as a room key activation and a proximity sensor.

A primary concern for hotel room based videoconferencing is the awkward image capturing of the bed 624. As seen in FIG. 66, a room block 628 prevents a guest from sending an image of himself with a bed in the background as captured by the nano stem camera 400. The room block 628 may be achieved by drapes, partitions, panels, a fold away bed, a bed transforming into a sofa, a camera angle aimed up slightly to remove the bed from view, architectural features, a room décor feature, and a furniture feature. For example, a headboard (not shown) of the bed 624 could be constructed as a lightweight panel and simply rested at the foot side of the bed and thereby completely eliminate the appearance of the bed when captured by the camera. More elaborate systems of modifying the actual captured image with image background replacement have been demonstrated. The image of the guest room 612 can be changed or only a portion and it may be done with any type of image processing and manipulating techniques. One such technique captures an image of the guest room 612 without the guest 618 in it and then a software program can identify when the guest enters the image so that the guest is seen in the final processed image, but not the actual room. Another simple technique is to use optical or image processing to create a shallow depth-of-field so that the guest remains in perfect focus but the background with the bed 624 is out of focus making the bed 624 no longer identifiable.

FIG. 67 illustrates the present invention where the ultra HD display 601 slides in a left and right direction 630 to a position away from the foot of the bed 624 to a side area with guest 618. This gives the guest 618 more area to move about while in the close work zone 620. It also gives the guest 618 the ability to position the ultra HD display 601 in the ideal position for viewing from the bed 624 and from the chair 626. Alternatively, the room 612 can have a dedicated workstation 632 at a second guest position 634. The workstation 632 may also be an ultra HD screen and have videoconferencing features. The workstation 632 can be oriented so the ultra HD screen 602 can be seen in the background of a videoconferencing image originating from a camera (not shown) at the workstation 632. Preferably the workstation 632 is an eye contact system to enable perfect eye contact while videoconferencing.

Figure 68:
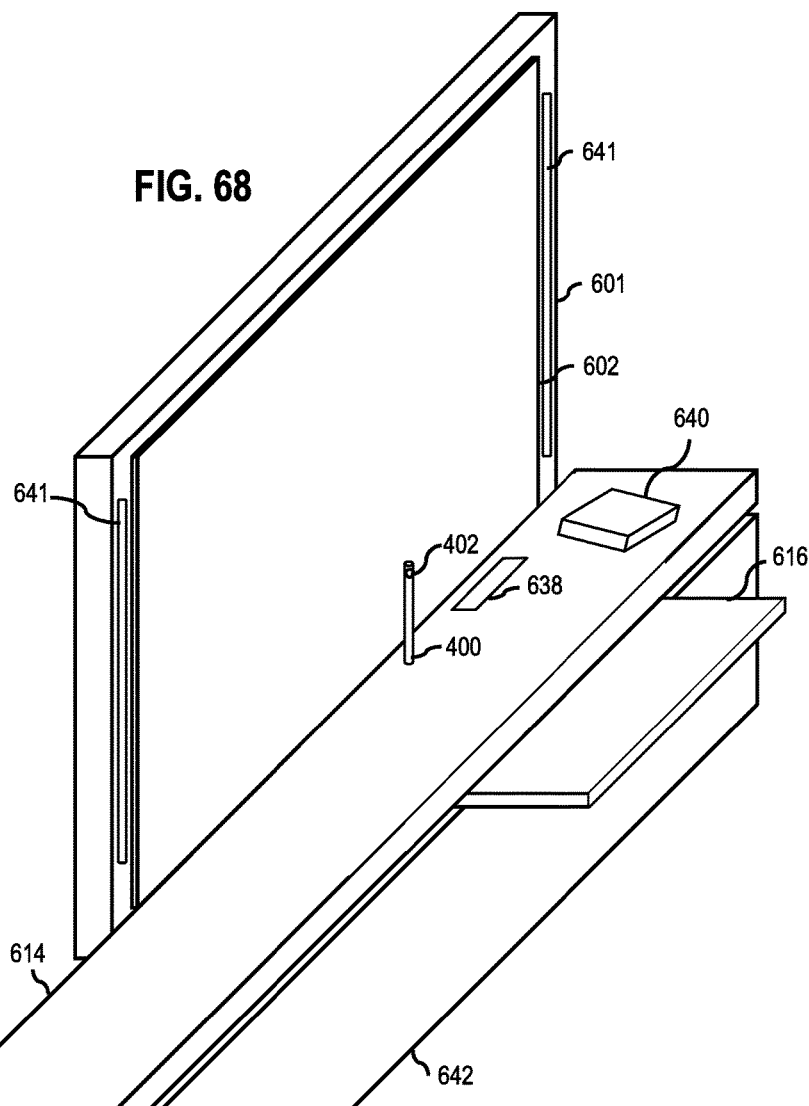
FIG. 68 illustrates the present invention positioned in an area of a hotel room and operating in a work mode of use.
Figure 69:
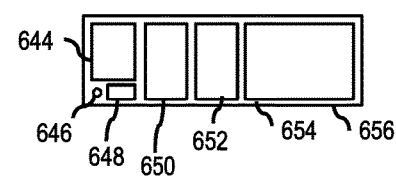
FIG. 69 illustrates the present invention with a table connector cubby.

FIG. 68 illustrates the present invention for a hotel room 612 (room not shown in close work zone 620 (see FIGS. 66 and 67) mode of use. The ultra HD display 601 with the ultra HD screen 602 is positioned so that the guest 618 can enjoy the screen 602 close up. The pull out table 616 is out and the nano stem camera 400 is engaged upward protruding from the long working surface 614. A control pad 640 controls the entire device and may be any technology such as touch and any communications protocol. A line speaker 641 on both sides of the ultra HD display 601 permits the illusion that voices are emanating from the center of the screen. Other audio speakers can be used instead of the line speakers 641. A connector cubby lid 638 conceals a cubby box 656 (FIG. 69) with an electrical sockets 654, an AV connections 652, a computer USB and monitor connectors 650, a table microphone 644, microphone indictor "on" light 646, and a hard "off" switch 648 for the microphone 644. The long working surface 614 is attached to a hotel room credenza base 642 that can include numerous features including a minibar, a desk, a dining table, a cabinet, a wardrobe, and drawers (all not shown).

Figure 70:
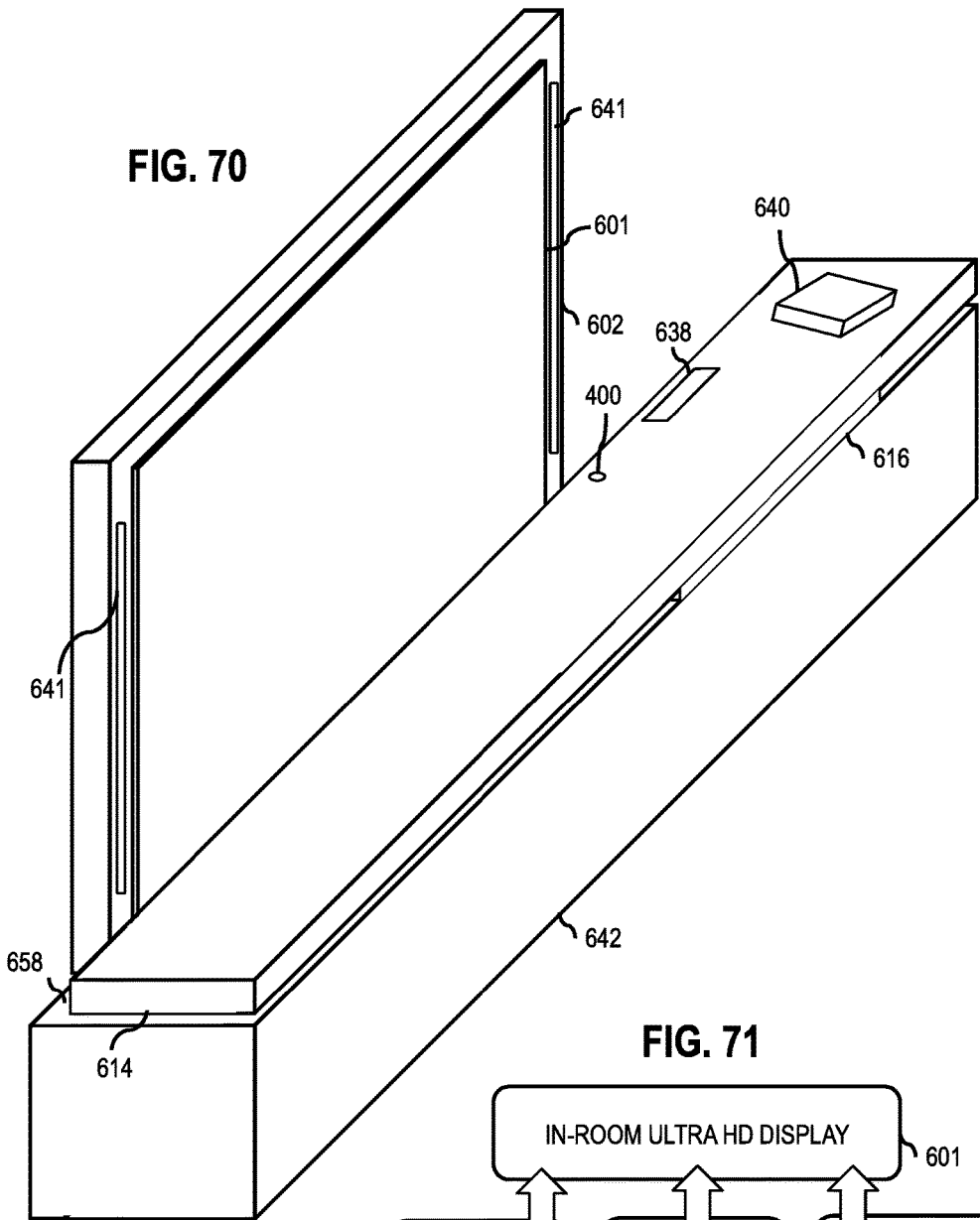
FIG. 70 illustrates the present invention positioned in an area of a hotel room and operating in a watch mode of use.
Figure 71:
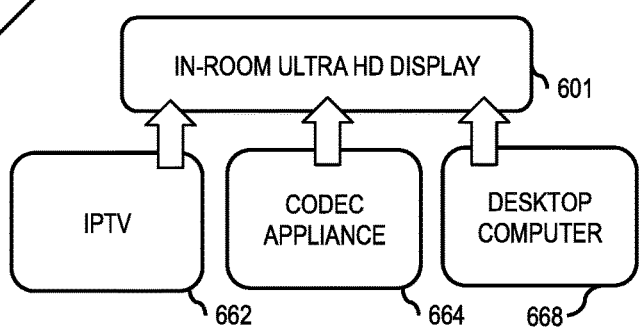
FIG. 71 illustrates the present invention having multiple sources of content delivery and collaboration.

FIG. 70 illustrates the configuration described for FIG. 68. The ultra HD display 602 is positioned to the left with the pull out table 618 retracted. The nano stem camera 400 is fully retracted and the nano camera 402 is concealed into the long working surface 614. The nano stem camera 400 retracted offers total video privacy for the hotel guest 618. Other ways to ensure to the guest 618 that the camera is off and cannot capture images is by shuttering the camera, disconnecting the camera and blocking the camera. A rear furniture well 658 permits the ultra HD display 601 to be lowered to conceal its lower bezel (not shown) and permitting the bottom perimeter of the ultra HD screen 602 to align flush with the long working surface 614. Imaged people (not shown) on the ultra HD screen 602 appear to be sitting on the other side of the working surface 614. The ultra HD display 601 receives content from an IPTV device 662, which includes any recorded and live TV, a videoconferencing codec appliance device 664 and a desktop computer device 668 (as seen in FIG. 71). These devices may be built as one or in any combination. Other connections and devices that work interconnected to the ultra HD display 601 is a satellite dish, a TV cable, a phone line, a DSL, a public internet, a media server, a hotel property management system, a private data network, and an analog videoconferencing system. An analog videoconferencing system may be used for internal hotel communications since no compression would be required. Further, the ultra HD screen 602 may be touch sensitive and can swivel out to form more comfortable viewing angles.

All the embodiments of the hotel guest room 612 (FIGS. 64-71) and its unique dual zone mode of use are equally applicable to other types of rooms. Certainly a home bedroom could share all the same embodiments as the hotel guest room 612. More specific is a traditional conferencing room 676 (FIG. 72) that illustrates the close work zone 620 where a meeting participant 671 sits at the pull out table 616 with a tight camera angle 670 from the nano stem camera 400. In the watching zone 622 resides a common meeting room table 670 of which all seats (seats not numbered) are captured by a wide camera angle 672. The present invention enables group conferencing to serve for a large group and a smaller group. When only a few people want to videoconference in common videoconferencing rooms they are forced to sit at the end of a big meeting room table and look across the table a TV hanging on the wall. This is an awkward and unnatural experience. When the meeting participant 671 sits in the close work zone 620 he can select to conference with either a full image over the immersive ultra HD display 601 or select a more appropriate portion 600 as described previously. FIG. 73 is an illustration of an office 678 with a worker 681 in the close work zone 620. Certainly, an ultra HD display 601 would need to permit a scaled window to manage content over such a wide area, and especially relevant using the portion 600 for videoconferencing. The worker 681 may also sit in chairs 682 and observe the ultra HD display 601 from the watching zone 622. An office desk 680 can be used by the worker 681 in both the zone 620 or 622.

FIG. 74 illustrates the ultra HD display 601 with its ultra HD screen 602 and an eye contact camera placement. The image portion 600 displays the image of a remote eye contact participant 602 whose image came from a videoconferencing system that had an aligned camera with the display that enabled eye contact (not shown). Camera placement 686 illustrates the principle that the present invention may use any camera in any placement, other than the nano stem camera 400. Ideally, the present invention can utilize any type of eye contact display solution provided the display is large and provides the ultra HD resolution. No matter the camera type and its placement, all are applicable to the present invention with the close work zone 620 and the watching zone 622.

FIG. 75 illustrates the present invention where the image portion 600 is moved to a left side 688 and that portion displays a life-size imaged person 603. The vacant area 607 of the ultra HD screen 602 is used for an additional content window 690. The additional content window 690 may be data sharing, an interactive whiteboard, a TV signal, an advertisement, a computer image signal, a GUI window, a hotel communication, to name only a few. Ideally, the local participant can select a view that best suits his needs. For example, the portion 600 may remain centered and the additional content window 690 is made small enough to fit into the vacant area 607 of the ultra HD screen 602. Alternatively, the ultra HD screen 602 is entirely filled with a graphical user interface of a software operating system and the portion 600, along with the additional content window 690, are independent segments in the interface.

FIG. 76 illustrates the ultra HD image screen 602 surrounded by a soft bank conference light 692. The soft back conference light 692 is used when the ultra HD display 602 displays full screen videoconferencing with the first life-size group participant 606, the second life-size group participant 608, and the third life-size group participant 610. FIG. 77 illustrates various options for audio speaker placement. Options include a left speaker 694, a right speaker 696, a top speaker 698, and a table speaker 700. Ideally, the speakers are arranged to simulate audio emanating from the ultra HD screen 602 to give the impression voices originate with the people seen on the ultra HD screen 602. Modifications of lights and speakers will be readily apparent to those skilled in the art.

The present invention discloses the use of stretched plastic film in meeting rooms for videoconferencing. The use of stretched film for stage and entertainment applications have been well documented and the inventors' have utilized stretched film for over two decades as disclosed in several patents. Applying stretch plastic film in a reflected Pepper's Ghost arrangement for corporate class videoconferencing presents numerous challenges for a successful deployment. Especially complicated is the dual function displaying holographic appearing augmented reality images simultaneous with a live video production for videoconferencing in meeting room environments. Issues of image brightness, image wash out, exposed optics, concealing mechanisms, conference lighting, interactivity with floating objects, and configuration in a common meeting room with limited space are all the subject of the present invention.

Figure 78:
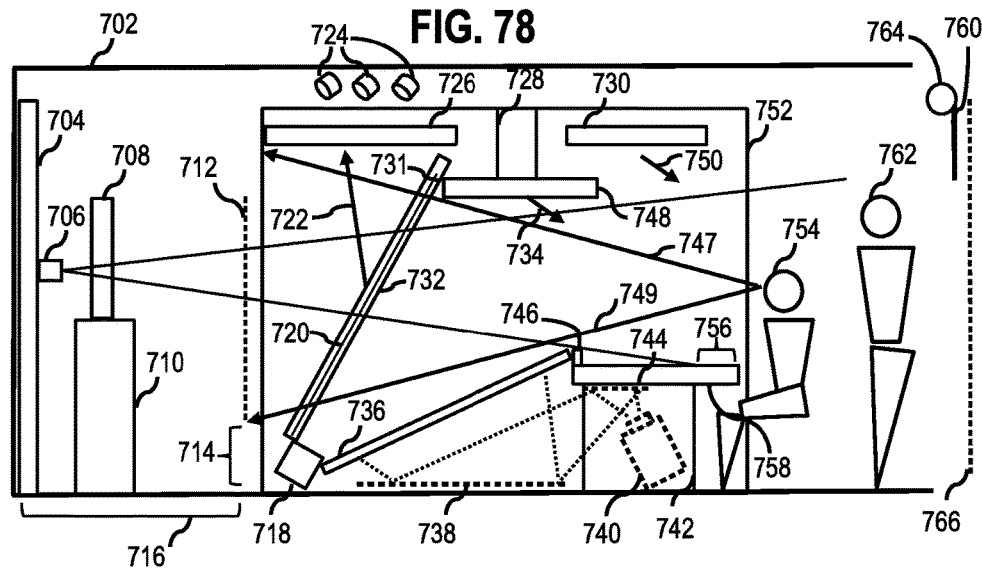
FIG. 78 illustrates the present invention configured as a stretched film augmented reality environment that enables eye contact while videoconferencing.

FIG. 78 illustrates the present augmented reality invention of an angled film 720 that is both transparent and reflective. The angled film 720 is stretched to form a distortion free room wide transparent reflective panel. The angled film 720 is transparent so that a room camera 706, disposed on a background side 716 of a meeting room 702, captures an image through the film 720 of both a sitting conferee 754 and a standing conferee 762. The camera also captures a table portion 756 of a tabletop 758. The angled film 720 also permits the conferees to peer through to the background side 716 of the meeting room 702. The room camera 706 is concealed by at least one of a room décor, a wall, an architectural feature, a piece of furniture, a façade wall panel, and a paint color similar to the environment (all not shown). Also, the room camera 706 may be any type of camera used for videoconferencing transmission including exotic type cameras such as 4K resolution, 3D, multi-sensor, multi-lens, and the like. Also, a mirror or series of mirrors (not shown) may reflect the image captured by the room camera 706. The angled film 720 also reflects an image on a slanted image screen 736 creating a virtual image 712. The slanted image screen 736 and the angled film 720 are both inclined at angles to enable the virtual image 712 to be vertically oriented substantially straight up. A vertical space 714 establishes the height of the virtual image 712 starts from the floor level. The vertical space 714 is between 24 inches and 32 inches so that in the virtual image 712 appears as if the video conferenced people are at table height (not shown). The angled film 720 is held in position by a bottom rigid frame 718 and additional elements are described in detail in FIG. 80. The angled film 720 intersects a wall slit 732 in a rigid partition wall 752.

FIG. 78 further illustrates a background display 704, which can be any type of display including flat panels, video walls, rear projection, front projection, and the like. The images on the background display 704 may simulate the room décor creating the illusion that the background display 704 is not a display but a solid architectural element in the room. The background display 704 can also show content that works in concert with the virtual image 712. Special attention is needed so that the background display 704 does not show content so bright that it substantially washes out the virtual image 712. A monitor 708 on a riser lift cabinet 710 enables additional content in the room. For example, data or a videoconference can be seen on the monitor 708. The background display 704 and the monitor 708 are in the room 702 on the background side 716.

FIG. 78 further illustrates a projection system consisting of an upward mounted projector 740 reflecting a first small mirror 744 and then reflecting a second large floor mirror 738 and finally imaging its beam upon the slanted image screen 736. The slanted image screen is approximately measured 120 inches diagonal allowing multiple people to be sitting and standing in the virtual image 712. Those skilled in the art will appreciate the extreme tight optical pathway configured to achieve such a massive image. The upward projector 740 requires a projector of about 12,000 lumens and a very short throw lens. The slanted image screen 736 is a stretched grey plastic rear screen. The disclosed projection pathway is only a suggestion and other types of projection such as a front projector above shooting upon a front projection screen below is certainly feasible and within the scope of the present invention (not shown). The upward projector 740 is mounted into a table base 742. The table base has forced air passed through it to keep the upward projector 740 cool (not shown). The table also has a sound dampening to reduce the sound of the projector (not shown).

FIG. 78 further illustrates highly controlled conferee viewing perspective. The sitting conferee 754 has an upward viewing perspective 747 that is obstructed by a hanging soffit 748 lowered by a soffit hanger 728. The hanging soffit 748 may include a directional conference light 734 aimed toward the conferees 754 and 762. The light is highly directional so as to not impinge the slanted image screen 736. The hanging soffit 748 hides from the conferees' observation a top film edge 731 of the angled film 720. Further, the hanging soffit 748 conceals a black out substrate 726 from the conferees 754 and 762 view. The blackout substrate 726 prevents ceiling reflections on the camera 706 side of the angled film 720. By doing so the camera image captured through the angled film 720 is free of any ceiling reflections from a reflective angle 722. Concealing both the top film edge 731 and the blackout substrate 726 is to eliminate any foreign elements unnatural to a common meeting room and thus expose the optical pathway to the conferees 754 and 762. The sitting conferee 754 has a downward viewing perspective 749 and that perspective conceals from observation the slanted image screen 736 by a table top riser 746. A primary embodiment of the present invention is to conceal the visible technology so that the conferees can enjoy an augmented reality conference that really does "trick" the mind making it look like the virtually imaged people (not shown) residing in the virtual image 712 are actual people in the meeting room 702.

Besides directional conference light 734 contained in the hanging soffit 748 the conferees are further illuminated by a second bank of directional conference lights 730 by an angled downward direction 750. Additional directional lights may be added such as pinpoint lights (not shown) from behind the conferees 754 and 762 to add illumination to the conferees' hair and shoulders, and to help separate their image captured by the room camera 706 against a room light absorbing black substrate 760. The conferees 754 and 762 images are captured by the room camera 706 and sent via a videoconferencing system to another exact room 702 at a distant location where their image is displayed with the black background surrounding their image (not shown) and the portion that is black is see-through revealing the distant rooms background side 716. Likewise, the room 702 virtually images conferees from the distant location (not shown) and what is black in that image is not seen and is see-through revealing the background side of room 702. A motorized roller 764 drops a matching room décor panel 760 to conceal the room light absorbing black substrate 766 when not in videoconference mode. A spotlights 724 illuminates the background side of the room 716 and an interacting person 768 standing in the background side 716 (see FIG. 79).

Figure 79:
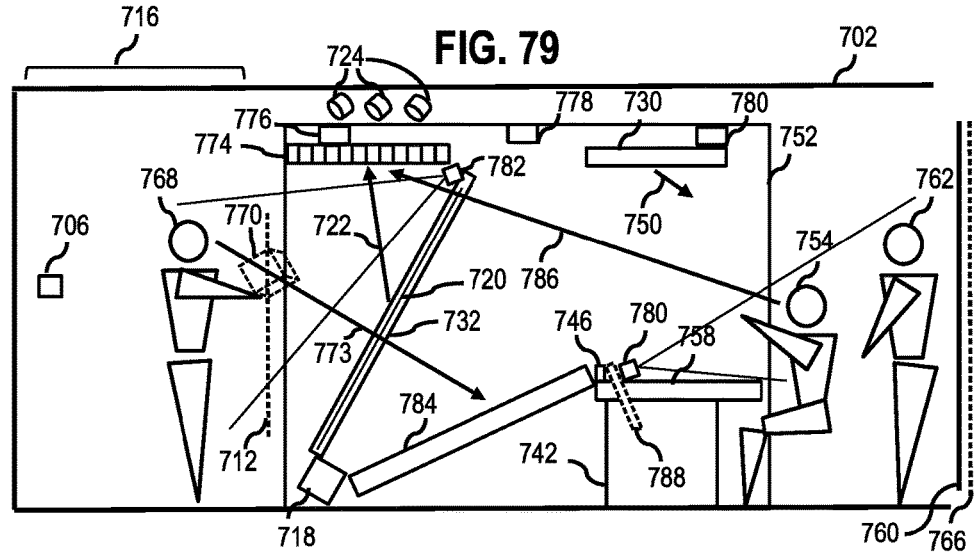
FIG. 79 illustrates the present invention configured as a stretched film augmented reality environment and the interaction of 3D objects by both the presenter and the viewers.

FIG. 79 illustrates additional embodiments of the present augmented reality invention disclosed in FIG. 78. The interacting standing person 768 is interacting with a volumetric 3D object 770 located at the virtual image 712. The volumetric 3D object 770 is actually a 2-D image of a 3D appearing object produced on a slanted flat panel 784 and reflected by the angled film 720. Objects that have shading, reflection and motion, and are surrounded in a black field will appear 3D in the present invention and seemingly float in the middle of the meeting room 702. The object 770 can also be fully interactive where the interacting standing person 768 motion is detected by a Microsoft Kinect 782 through pattern recognition and software aligning the person's motions with the object 770. The result is the appearance that the person 770 is holding, moving, and modifying the object 770. The interactive standing person 768 sees the object by a down glance 773 on the slanted flat panel 784. The interacting standing person 768 also simultaneously views a reflection of his image in the camera side of the angled film 720 and is able to exactly align his hands to the volumetric 3D object 770. The same operation is also ideal for navigating operating systems using Microsoft Kinect or a similar motion detection device. Other images surrounded in black also produce a stunning experience. For example, the present invention utilizes Microsoft Power Point and coordinated slides with a black background to produce impressive presentations. These presentations can originate from a simple tablet and its image is seen floating across the width of the meeting room 702. A second Microsoft Kinect 780 captures the motion of the sitting conferee 754 and the standing conferee 762. The conferees are also able to manipulate the object 770 or other content in the virtual image 712.

FIG. 79 further illustrates the embodiments of placing a data screen 780 inside the tabletop 758. The conferees 754 and 762 are able to simultaneously view the virtual image 712 and the data screen 780 to further enhance the experience. In one configuration the data screens show a multi-point image from several remote videoconference locations and through voice activation an image of a location on the data screen 780 can automatically switch and appear on the virtual image 712 (not shown). Also, room controls may be seen on the data screen 780.

FIG. 79 may utilize any type of display and certainly the projection system of FIG. 78 is interchangeable with the slanted flat panel 784 of FIG. 79. As display technology advances any and all types of displays, including 3D, are applicable to the present configuration of the meeting room 702. The display technology should be able to produce true black in order to eliminate any milky hue in the virtual image 712. FIG. 79 also illustrates a ceiling reflection block of louvers 774 constructed of louvers that from the perspective of the camera 706 side of the angled film 720 it appears black in the reflection and is free of any ceiling reflection from a reflective angle 722. Further, from a conferee viewing direction 786 the louvers 774 appear white in a color or similar to the room décor. A first cross beam 776, a second cross beam 778, and a third cross beam 780 span the room between rigid partition walls 752 with one wall on each side of the room supporting the beams.

Figure 80:
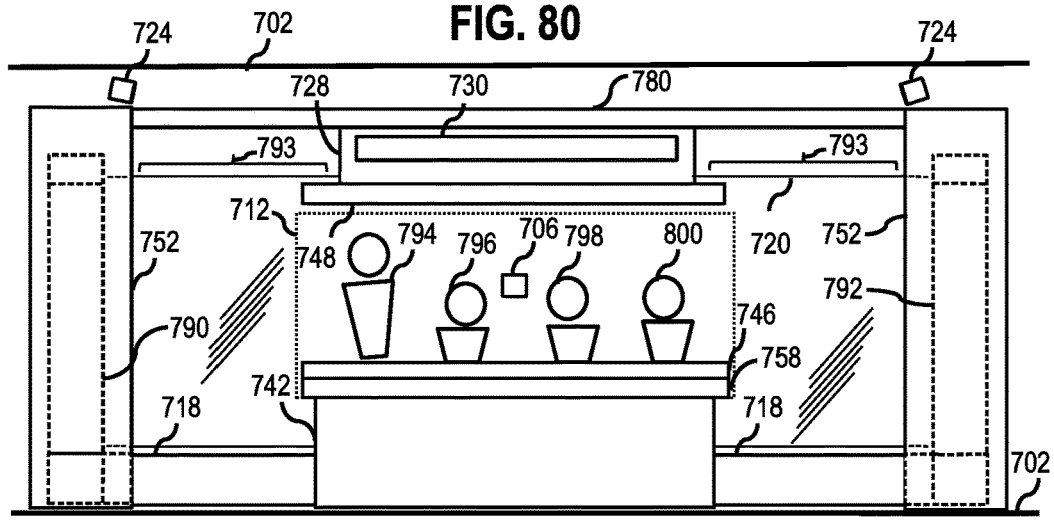
FIG. 80 illustrates the present invention configured as a stretched film augmented reality environment in a videoconferencing mode where imaged people appear in the middle of the room.

FIG. 80 of the present invention illustrates a front view of the configuration of FIG. 78 and elements of FIG. 79. The bottom rigid frame 718 is seen connected to a left side angled frame 790 and a right side angled frame 792, and the angled film 720 is attached to the bottom and the sides (not shown). An unattached angled film portion 793 leaves the film 720 exposed and is nearly unnoticeable. Attaching on the top of the angled film 720 could occur behind the hanging soffit 748 (not shown). FIG. 80 also illustrates the virtual image 712 with a first remote virtual conferee 794, a second remote virtual conferee 796, and a third remote virtual conferee 798, and a fourth remote virtual conferee 800.

Figure 81:
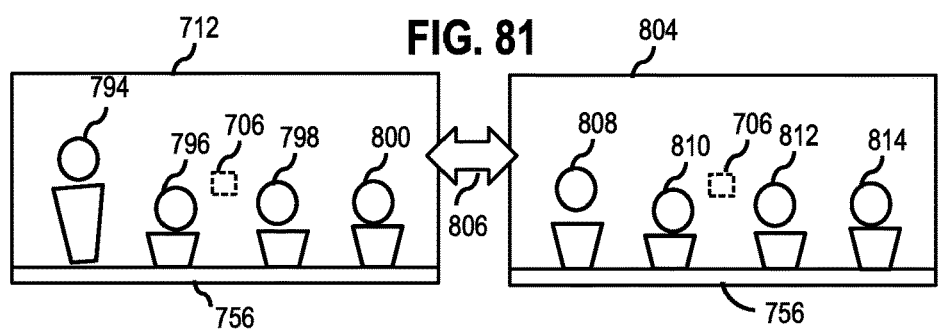
FIG. 81 illustrates the present invention configured as a stretched film augmented reality environment and maintain life-size proportionality of imaged persons.

FIG. 81 illustrates the present invention of FIGS. 78-80 wherein the images produced and seen as a virtual image 712 are proportionate in image size and life-size conferees are the same as a remote site 804. Ideally, the room 702 connects to the same configuration of the room at the remote site. In cases where the room 702 connects via videoconferencing to other types of room configurations with different size screens image processing can modify images to present life-size people in the virtual image 712. Image processing includes layering images together, seaming images, and extracting color from the image background to isolate the person on black. Any type of image isolating techniques are applicable to the present invention to add a surrounding black color around the images of the conferees including chromakey and digital background replacement.

Figure 82:
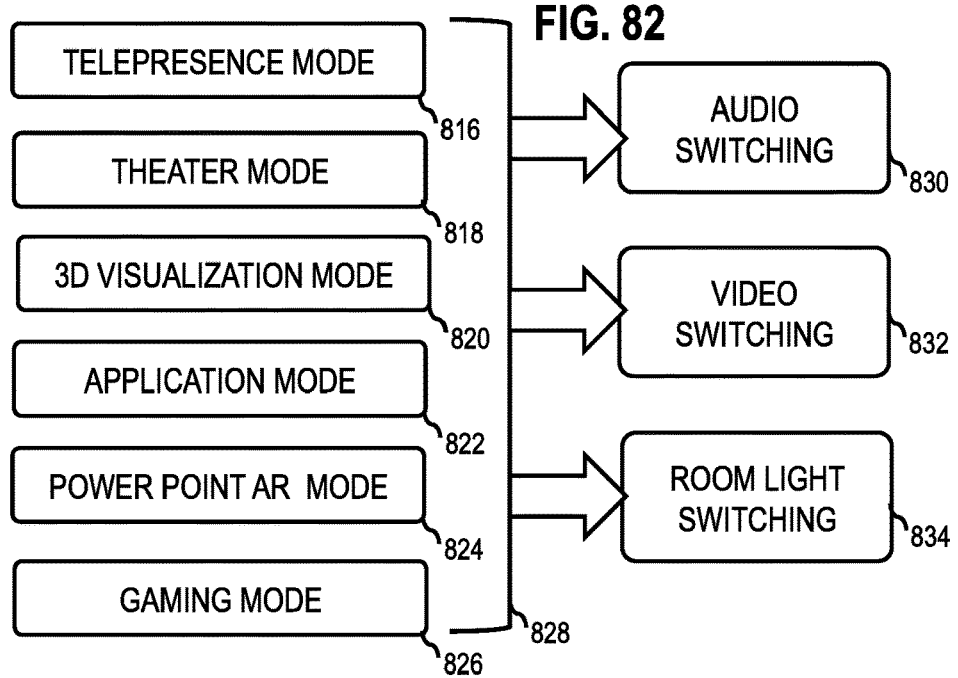
FIG. 82 illustrates the present invention configured as a stretched film augmented reality environment and controls for selecting various modes of use.

FIG. 82 illustrates the various modes the present invention described in FIGS. 78-81. The modes engage audio/visual control and switching equipment including an audio switching 830, a video switching 832, and a room light switching 834. The modes for control are a telepresence mode 816, a theater mode 818, a 3D visualization mode 820, an application mode 822, a Power Point augmented reality mode 824, and a gaming mode 826. All the modes communicate by the control connection 828 and the modes have control of room light scenes, switch the audio and video signals, and access content sources. For example, in the theater mode 818, at the touch of a button, most all room lights would be turned off and the audio switch 830 and video switch 832 would engage a movie content source (not shown).

Figure 83:
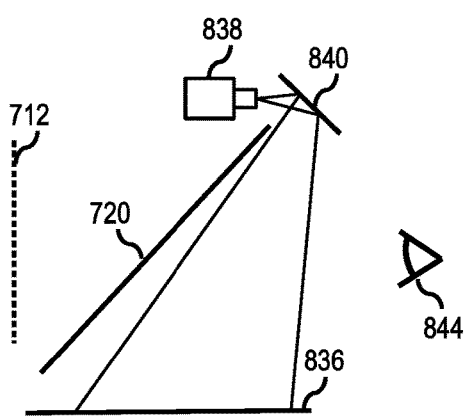
FIG. 83 illustrates a prior art stretched film optical configuration used for stage holograms.
Figure 84:
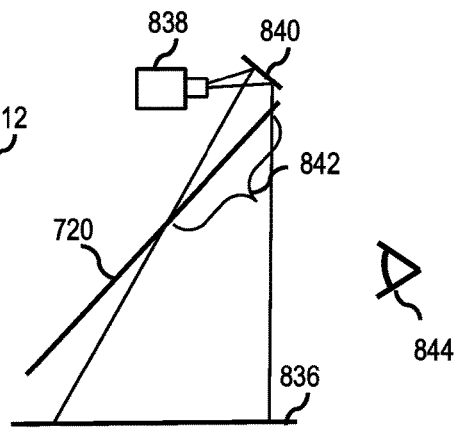
FIG. 84 illustrates a prior art stretched film optical configuration used for stage holograms with projector impinging the inclined optic.

The present invention described in FIGS. 78-82 may also use for its display a front projection system (FIG. 83 Prior Art) from a ceiling mounted projector 838 reflecting an image from a ceiling mirror 840 and imaged upon a lower projection screen 836 and observed by a person 844. This arrangement is common in theater stage systems. A significant drawback to this system is the projector protrudes too far forward and adds bulk to the optical arrangement. U.S. Pat. Nos. 5,639,151 and 5,890,787 to the present inventors disclose a superior optical pathway pass-through reflective projection (FIG. 84 prior art) where the projector beam actually strikes and passes through the angled film 720 in a strike area 842. The prior art patents teach that pass-through reflective projection can be used in any configuration for any application, which would include the desktop, meeting room, and theatrical stage. The patents also disclose the use of Mylar, which may be used for the angled film 720.

Figure 85:
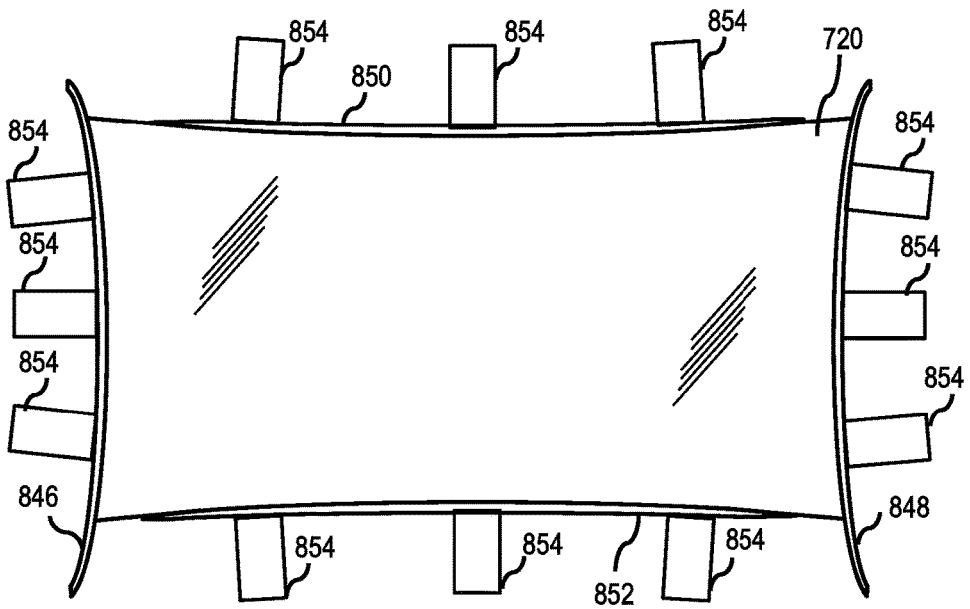
FIG. 85 illustrates the present invention stretching film by panel pull sections and bowed edge member stretching system.

FIG. 85 illustrates a novel embodiment of the present invention where the angled film 720 is stretched by a left flexible stretch bar 846, a right flexible stretch bar 848, a bottom flexible stretch bar 852, and a top flexible stretch bar 850. One or 2 sides may be removed if needed and still create a stretched distortion free reflective surface. Rather than pulling by points, the flexible stretch bars are attached by wide flex panels 854 that offers greater stability while stretching. The flexible bars may be constructed of any flexible material but is preferred that graphite composites are used for their high strength and even flexing characteristics. The angled film 720 is attached to the bars in one of numerous means common in the film stretching art. The flexible bars provide a greater ease of creating a distortion free angled film 720 since the flex allows greater fine tuning, rather than using a rigid bar such as metal tubes.

Figure 86:
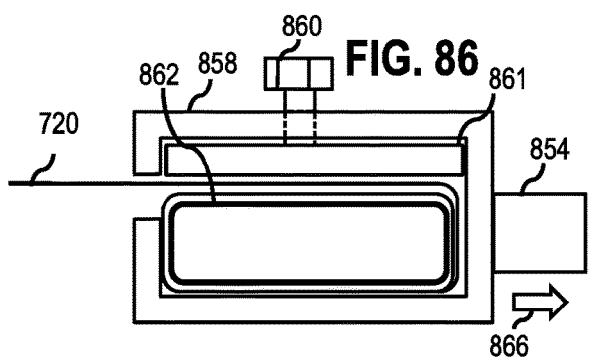
FIG. 86 illustrates the present invention clasping a film edge for stretching.
Figure 87:
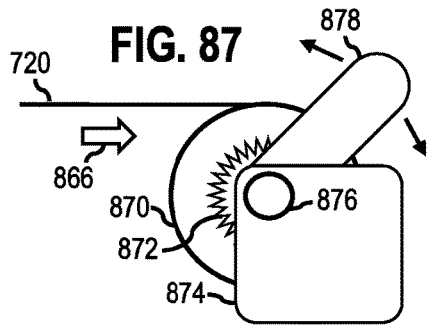
FIG. 87 illustrates the present invention for stretching film as one round tube pulling member.

FIG. 86 illustrates a superior method for attaching the angled film 720 to a rigid or a flexible bar 858. The bar 858 is a tube with a slit for the angled film 720 to pass by. A solid puck 862 made of metal or a composite is used to wrap the film around and may be optionally taped to the puck 862 before rolling or during roll turns (not shown). The angled film 720 is then wrapped around the puck 862 numerous times so that it locks in on itself by friction. An optional clamp base 861 with a tension bolt 860 presses the clamp base 861 upon the puck 862 further securing the film to the puck 862. The present invention does not use any invasive measure to secure the angled film 720. It does not glue, crush with abrasive grit or puncture the film, all of which weaken the film 720 and could cause a tear point while stretching. The bar 858 is pulled to a right pull direction 866 by the wide flex panel 854. FIG. 87 Illustrates a flex member round bar 870 of which the film 720 is sleeved in a slit (not shown) and rolled upon itself locking in upon itself by friction. A side bracket 874 holds an axel end 876 securing the flex member round bar 870. Sprocket teeth 872 adjust by a lever 878 the tensioning of the angled film 720 in the right pull direction 866. The tensioning methods of FIGS. 86 and 87 work in concert with at least one other stretching mechanism side (minimum two sides) in order to fully stretch the angled film 720 (not shown). The embodiments of FIGS. 78-87 may stretch the angled film by 720 by any means well known in the art for decades.

The angled film 720 is preferably made of a high strength polyester film and a common product name is Mylar. It is also preferred that the film is coated with a beamsplitter coating to increase its reflectivity. Often these coatings are highly sophisticated multi-layer dielectric stack coatings. Coatings that are highly transparent, yet has a reflectivity of about 40% is preferred over uncoated optics that have a low reflectivity of about 10%. Any and all materials used for the present invention and all embodiments for all configurations disclosed herein utilizing films should meet all regulatory safety standards. Those skilled in the art will appreciate that numerous options for the angled film 720 in regards to composition, thickness, and coatings.

FIG. 88 illustrates a reflective transparent panel 888 positioned with an eye contact user 910 on one side of the panel 888 and a black back board 880 positioned on the opposing side of the panel 888. On the eye contact 910 user side of the panel 888 a color flat panel 892 is positioned with an integral color screen 890 aimed upward and reflected by the panel 888 forming a reflected color virtual image 882. The black back board 880 is made of a black light absorbing material such as black telescope flocking. The reflected color virtual image 882 is positioned adjacent to the black back board 880 so that the reflected color virtual image 882 appears bright and with dynamic colors from the perspective of the eye contact user 910. A color camera 904 is aimed through the panel 888 to capture an eye contact image of the eye contact user 910 while viewing the reflected color virtual image 882. A dark surface 894 may be used so that the eye contact user does not see unwanted reflection reflected at the top of the panel 888. The dark surface may be at table height and actually be a table placed in front of the configuration and used by the eye contact user 910.

The side view FIG. 88 and the front view FIG. 89 illustrates a visible top black border 884 seen from an up perspective 912 of the eye contact users 910, a left black border 896, a right black border 898, and a black bottom side 900. From the eye contact user 910 perspective it appears the reflected color virtual image 882 has a black TV bezel around it. In the preferred embodiment of the present invention (FIGS. 90 and 91) the reflected color virtual image 882 is substantially perfectly aligned to the back black board 880 and the image 882 is adjusted to the board 880, which is cut to match so no black border is seen. To achieve this exact alignment means the reflected color virtual image 882 needs to be substantially vertically straight up and adjacent to the black back board 880. While it is preferred no black border is seen the black bottom side 900 may be visible to support the black back board 880, yet the border sides 896 and 898, and the black border top 884 are eliminated. Eliminating the black borders assists the eye contact user 910 to have an improved immersive telepresence experience. In such a case the image of the distant conferee (not shown) is seen in the reflected color virtual image 882 and absent the black borders, the distant conferee appears more life-like and present in a room (not shown) with the eye contact user 910.

Further, the present invention FIG. 90 illustrates a black hood 906 that prevents reflection from the ceiling falling upon the back side of the panel 888 and thereby impinging the image capturing of the color camera 904 through the panel 888 of the eye contact user 910. The black hood 906 is constructed of black material so as to completely disappear in the middle of the black back board 880 from the perspective of the eye contact user 910's view. The black hood 906 is carefully aligned between the black back board 880 and the panel 888 so that from the eye contact user's 910 view of the black hood 906 does not extend beyond the up perspective 912 protruding beyond a top 902 of the black back board 880. A gap 908 is required to prevent the protruding to occur. Likewise, the same gap is required for the grouping of eye contact users with a first eye contact user 926, a second eye contact user 928, a third eye contact user 930, and a fourth eye contact user 932 (FIG. 92 top view). Here the grouping of eye contact users have a far left viewing perspective 920 of which a right gap 915 permits the black hood 906 to not protrude beyond the right side of the black back board 880. In the same fashion, the far right viewing perspective 922 correlates to a left gap 914 which permits the black hood 906 to not protrude beyond the left side of the black back board 880. As a result the configuration allows one user or many users to enjoy the eye contact invention and not see the black hood 906 which is fully concealed by having the black hood 906 fully absorbed by the color black against the black back board 880. Further, the black hood 906 is configured so that it does not, from wide viewing angles, protrude beyond the perimeter of the reflected color virtual image 882 and the black back board 880. In addition the color camera 904 permits a wide camera shot to capture the grouping of the eye contact users 926, 928, 930, and 932 with a left side camera image side 916 and a right camera image side 918. Further, the black hood 906 is constructed wide enough to permit that wide camera view, yet not so wide as to protrude beyond and outside the reflected color virtual image 882 adjacent to the black back board 880.

The present invention further embodies many unique ways to collaborate and use asymmetrical screen arrangements as seen in FIG. 92. The grouping of the eye contact users 926, 928, 930, and 932 preferably experience life-size immersive image of distant conferees displayed in the reflected color virtual image 882 (not shown) and simultaneously can view and interact with secondary images (not shown). Typical conferencing appliances most often have two, video outputs and typically they are integrated with a symmetrical screen side-by-side. This arrangement harms the immersive experience since images of life-size people are displayed with data or small multipoint boxes on a screen exactly next to their images (not shown). The side-by-side arrangement does not simulate the way people see each other if all were meeting in person in the same room. A left table well monitor 927 and a right table well monitor 929 permit the secondary images to be displayed independently on one monitor or mirror displayed with the secondary image on both the table well monitors 927 and 929. The table well monitors 927 and 929 are in an area of the table 924 that is dark colored so as to not be visibly reflected by the panel 886. Data as well as multi-point can be seen on the well monitors 927 and 929. In multi-point, voice activated switching can select small images on the well monitors to dynamically switch to the reflected color virtual image 882 and that image can be transferred to the well monitors 927 and 928.

Further, software application based conferencing can use the well monitors 927 and 928, but it is preferred that a left table touch display 923 and a right table touch display 925 are used (FIG. 92). This permits the grouping of eye contact users 926, 928, 930, and 932 to interact with programs, such as a digital white board, and all people in conference can see each other interacting. It is possible that the table touch displays 923 and 925 can be switched from computer application to the data screen of a videoconference appliance. Lastly, some users may prefer touch interaction to occur on a large touch screen 921. Preferably the large touch screen 921 is seen in the view of the color camera 904 at the sides of the telepresence table 924 or in the back of the room (not shown). Participants at the remote location would then be able to see the grouping of the eye contact users standing, sitting, and interacting with the large touch screen 921. Also, unique to the present invention is that this eye contact configuration can be used as a hybrid conferencing system where, at the touch of the button on a control system (not shown), the user can select a traditional videoconference using a Polycom, Life-Size, and Cisco type codec appliance and then switch to a PC-based software application for videoconferencing with Microsoft Lync or Vidyo. The ability to have two discrete systems in one eye contact solution and can be deployed in any videoconferencing meeting room resolves the serious issue of clients having to decide one over the other.

FIGS. 88-92 may use any type of display technology including any type of front or rear projection pathway. The reflective transparent panel 888 may be any type of glass, plastic, and stretched plastic film, and may have any type of coatings to enhance reflectivity and maintain transparency. The black back board 880 may be removed by allowing the consumer to utilize the configuration as an augmented reality system and the people imaged in the reflected color virtual image 882 may appear to be in the actual environment of the room (not shown). The color camera 904 may be any type of camera and may have pan/tilt/zoom features. The camera may have presets so the a user may select the pan/tilt/zoom of the camera to select a shot of one, two, three or four or more users from the grouping of eye contact users 926, 928, 930, and 932. The present eye contact configuration described in FIGS. 88-92 may be applied to an adaptation for a desktop, a meeting room, a kiosk, an ATM machine, and large stage applications, to name a few. This eye contact configuration may also be flipped upside down or turned on its side, as well as in other embodiment of any other configuration disclosed herein.

The embodiments of FIGS. 88-92 are ideal for video depositions where the configuration allows life-size images of people interacting with perfect eye contact. Current video depositions consist of a common camera on a tri-pod and the defendant does not look into camera, but rather looks at a lawyer asking questions. The issue with this is when the video is played back in court the defendant does not appear to make eye contact with the jury as a news caster does when looking into a teleprompter. Eye contact is vital for establishing positive emotional reactions live during a videoconference and also when viewing recorded images. A unique embodiment of the present invention is to utilize the embodiments as disclosed for FIGS. 88-92 to create a video deposition terminal that creates perfect eye contact recordings. The defendant and the lawyer each communicate with their own eye contact system and both see each other virtually and live while the deposition is being recorded. Ideally, two systems are situated at a law firm so they can converse and be recorded, but certainly they could also videoconference from different locations and have the video and audio recorded. Also, videotaped with eye contact can be witnesses, expert witnesses and anyone whose recorded testimony is needed. The present embodiment of the invention applies to any perfect eye contact videoconferencing system when applied to live and recorded two-way video depositions.

FIG. 93 Illustrates a hotel guest room smart door 936 with a hallway side door 933 in a public hallway. FIG. 95 illustrates the same smart door 936 with an in-room side of the door 935. Both door sides 933 and 935 have mounted to it a touch door display 934 with a top portion 936 containing a first door camera 942. Further, the touch door display 934 has a bottom portion 940 with a second door camera 946, a microphone 944, and a speaker 948. Only one camera is needed and the two cameras 942 and 946 are optional to permit a better view of tall people and short people. A standing user (not shown) may select which camera to use or the remote site can select which camera during a videoconference. The full color touch display 934 is positioned out of the way of a door handle 950 and is mounted where people of any height can see it clearly. The touch door display 934 may be any type of display and of any size. A custom display in portrait mode can show a life-size person that is approximately 37" diagonally measured. Larger and much smaller displays, such as tablets, may be used in portrait mode or standard wide screen landscape.

The touch door display 934 may contain in it a computer processor for processing an operating system and software applications (not shown). One or both of the touch door displays 934 may have a computer built into it. Still further, the touch door display 934 on one or both sides may be thin client PCs with partial or major computing processing occurring by a computer in a hotel network, a cloud network, a separate processor attached to the door, or a computer in the hotel room (all not shown). It is to be expressly understood, and as described herein, the computer processing for the touch door display 934 may be of any computer configuration, integral to and separate from the touch door display 934. Foundational to the configuration of the present invention is that the touch door display 934 can show interactive software that is touch controllable by a standing person. Power and computer signals, monitor signals, and network signals may pass through a door hole 954 (FIG. 94) between both sides of the door and also a door channel 952 (FIG. 95) can pass the same power and signals. Conceivably, wireless signals and wireless power technologies can be integrated into the present invention.

The smart door 936 has a built-in presence detection which can be used on one or both sides of the door 932. A general presence detection is the ability to simply detect when a person is in the proximity of the smart door 936. Commonly, motion detection and related technologies will integrate into the present invention. Specific presence detection is any technology that enables the display 934 to recognize a specific person in proximity to the display 934. Specific presence detection can be based on pattern recognition where an image capture device such as one of the cameras 942 and 946 is able to determine the face of a specific person. Specific presence detection may also be linked to a room key. The room key may be any technology such as magnetic card swipe, RFID, and a bar code. The guest with this system is given a physical item that permits entry and hotels may deploy, as an example, wristbands that track the guest's entire activities while on the property. An entry device can be as simple as a metal key or a mobile phone with a software application that engages doors locks by any means. This system may be entirely built into the display 934 or the display 934 may be connected to any device such as a door handle and entry system device. Systems that enable specific presence detection permit a computer and a network to track the hotel guests throughout their stay and data such as the smart door opening and closing. Specific presence detection may also be based on fingerprint or simply typing an access code or other data into the touch screen of the touch door display 934.

Privacy for a guest is extremely important. The cameras 942 and 946 may have physical blocking shutters on them or may be turned away from being able to capture video toward the guest. Also, the guest may hard shut off the camera and even physically detach the camera. The microphone may as well be physically detached, muffled by a physical block of hard shut off with an indicator light to ensure the guest has privacy.

The smart door 936 is intended to offer a single door with two touch door displays on each side of the door and the applications and content on each side uniquely coordinates a user experience with each other. Those skilled in the art of software programming will appreciate the unique options the present invention offers when creating specific applications for the smart door 936. Software applications are created considering the idea that people are passing from one side to the other side of the smart door 936 and the application programming takes that into account. For example, a guest swipes a magnetic door key in a lock and that lock communicates to a computer controlling the smart door 936 as a guest is entering the room. Instantly the hallway side 933 touch door display 934 modifies content to notify that the room is in a "do not disturb" mode. At the same moment, a recorded concierge welcomes the guest on the in-room side 935 touch door display 934. This is only one possible programmed scenario of hundreds where actions on one side of the door directly effects information, content, features and applications automatically on the other side of the smart door 936. Certainly, many applications do not require informational exchanges between sides of the door and nothing herein should limit the present invention of the touch door display 934 being used on only one side of the door.

FIG. 96 illustrates an outline of custom software applications and content distribution 980. Custom software applications are created for the present invention and may be modified for each hotel client property. The custom software accesses content from a network source such as a media server or a hotel property management system, which can also serve to control all of the touch door displays 934 at a hotel property. The touch door display 934 may be controlled from a central server and update the touch door displays at numerous hotel properties globally. Content may be stored in the cloud, in a server, integrated into the hotel property management system, and stored with the touch door displays 936. Videoconferencing applications and transmission systems are integrated into the touch door display 934. Guest contact with the hotel staff is the primary use and can serve any hotel staff service at the smart door 936 face-to-face. For privacy the smart door 936 and the touch door displays 934 may be engaged as a video and audio receive and only an audio voice is sent to the staff. Videoconferencing can apply to any application and can communicate hotel guests with each other, subject matter expert, and even used for conferencing with friends, family, and business contacts. The touch door display 934 on the in-room side 935 may even detach and be used while seated for videoconferencing. It may even be used as a hand held device for room controls, phone and TV operations (not shown).

As outlined in FIG. 96 a hallway side services application 960 and an in-room side services application 962 are services provided by the hotel to the guest such as room service. A hallway side security application 964 and an in-room side security application 966 offer features related to guest and hotel security. For example, hallway side camera 942 can serve as a hotel security camera and from the in-room side 935 the guest can see who is knocking at the door on the hallway side 933. A hallway emergency application 968 and an in-room emergency application 970 provide vital emergency information to the guest. For example, during a fire the hallway side touch door displays 934 can provide visual cues on all doors of the escape route, and the in-room side 935 can sound an alert and give emergency instructions. A hallway communications application 972 and an in-room communications application 974 provide a variety of ways for the guest to contact the hotel staff and others. For example, texting, emailing, voice calling, and videoconferencing. A hallway side advertising application 976 and an in-room side advertising application 978 provides to the guest general and targeted advertising. All of the embodiments described herein for FIGS. 93-96 are applicable as described, without the specific hotel features, for use in hospital rooms, corporate meeting rooms and offices, schools, and government facilities, to name a few.

Figure 97:
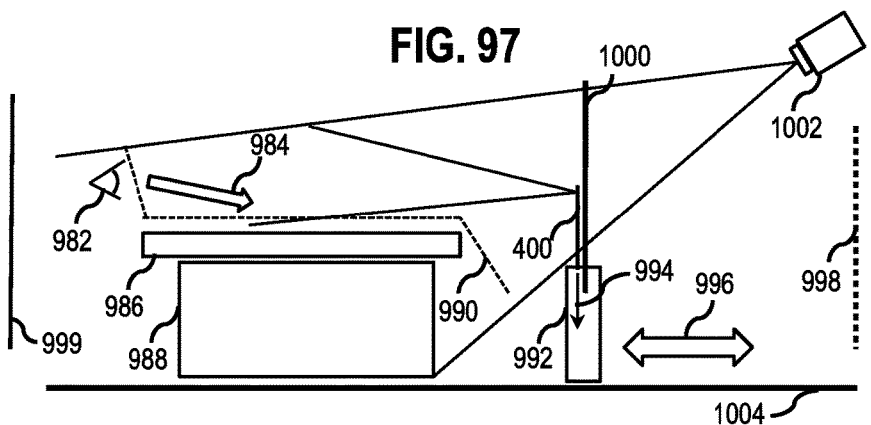
FIG. 97 illustrates the present invention of a videoconferencing see-through display based on rear projection with a micro stem camera and a top mounted projector.

FIG. 97 illustrates the present videoconferencing invention with a rear projected transparent screen 1000 used in a group conferencing room arrangement. Group conferencing is more than one person in the room and more than one person on the screen 1000. With that said all that is disclosed herein is as well uniquely applied to personal conferencing one person to another person. As discussed previously remote participants (not shown) are image produced among a black background and that image with the remote participants and black background is projected onto the transparent screen 1000. A local meeting room participants 982 view the remote imaged participants (not shown) imaged on the screen 1000 and the portion of the image projected on the screen that is black (not shown) is see-through. The black portion of the image projects no light on the screen 1000 so it remains see-through from the perspective of the local meeting room participants 982 who see bright imaged remote participants sitting and standing amongst a meeting room background 998 visible around them.

FIG. 97 further illustrates a meeting room black light absorbing wall 999 for the nano stem camera 400 to capture images of the local participants 982 against the wall 999. The nano stem camera stem 400 retracts in a direction 994 into a screen stand 992. The image of the local participants 982 may be video conferenced to a similar system as seen in FIG. 97 and appear at a remote side as if standing and sitting in the actual room. The effect is extremely impressive in creating a very life-like experience. The nano stem camera 400 can also be placed behind the screen 1000 and aimed through the screen to capture an image of the local meeting room participants. The gooseneck camera microphone 442 can be used instead of the nano stem camera 400 in any of the present configurations. The gooseneck camera microphone 442 is especially helpful since it raises the camera for better eye contact and looks like a real object that would be placed in front of a real person. The gooseneck camera microphone 442 adds an additional real world object making the image of remote participants that much more real appearing where they are sitting and standing amongst the meeting room background 998. The nano stem camera 400 can also be placed behind the screen 1000 and aimed through the screen to capture an image of the local participants 982.

Figure 98:
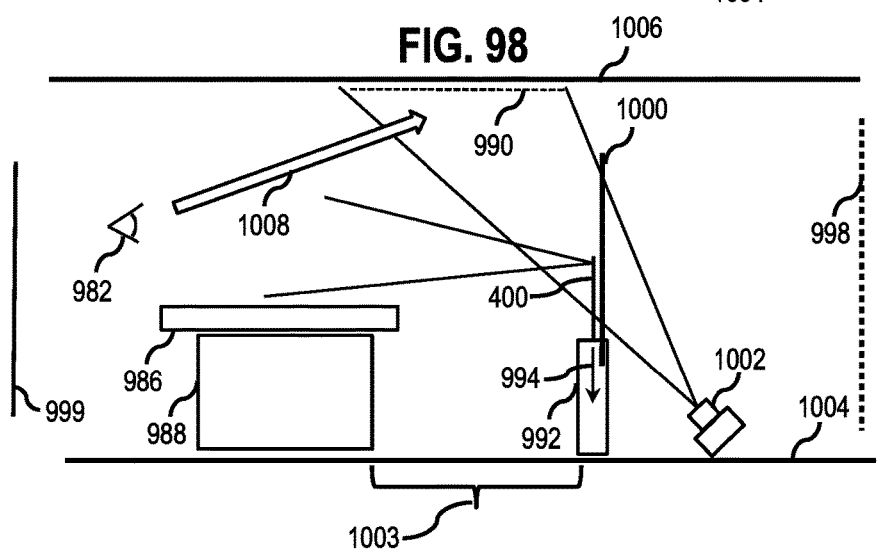
FIG. 98 illustrates the present invention of a videoconferencing see-through display based on rear projection with a micro stem camera and a bottom mounted projector.

FIG. 97 further illustrates a meeting room table 988 with a meeting tabletop 986 is positioned in the middle of a meeting room floor 1004. Chairs may be placed on a side of the table near the wall 999 and on the side with the screen 1000 (not shown). The rear projected transparent screen 1000 is built upon a moving mechanism such as wheels (not shown) that permits the screen 1000 to move toward the table 988 and away from the table 988 in a back and forth direction 996. An HD projector 1002 also may move with the screen 1000 or remain locked in position. Moving the screen closer and further away from the meeting room table 988 permits the meeting room to be used as a telepresence room and a multipurpose gathering room with the screen 1000. In telepresence mode, the local meeting room participants 982 sit on one side of the table and the screen 1000 is moved close to the meeting room table 988. In multipurpose gathering room mode the screen 1000 pushes away and chairs can be used on both sides of the meeting room table 988. Telepresence rooms are often inflexible meeting rooms and the present invention fully resolves that issue with chars being able to be placed on both sides of the table. FIG. 98 illustrates a moved away extra space 1003 which permits chairs to be placed on that side of the table (not shown).

FIG. 97 illustrates a downward projection pathway with the HD projector 1002 mounted high and aimed down to the rear projection transparent screen 1000. The rear projection transparent screen 1000 is partially transparent which means all the light of the HD projector 1002 does not disperse upon the screen 1000 and actually passes through the screen 1000 and creates an unwanted secondary image 990. As seen in FIG. 97 the unwanted secondary image 990 falls upon the meeting tabletop 986 and the local meeting room participants 982 can see in a tabletop direction 984 a highly distracting full color motion image of the remote participants both on the meeting tabletop 986 and on the screen 1000 (remote participants not shown). The experience is unacceptable for videoconferencing because the unwanted secondary image 990 intrudes on the videoconference call. As seen in FIG. 98 the HD projector 1002 is positioned near a meeting room floor 1004 and is aimed up to the rear projection transparent screen 1000. The unwanted secondary image 990 is seen on a meeting room ceiling 1006, which is directly seen by the local meeting room participants 982 by a line of sight 1008.

Figure 99:
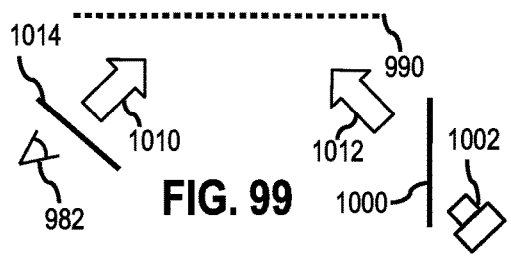
FIG. 99 illustrates the present invention with residual projection beam physically blocked.
Figure 100:
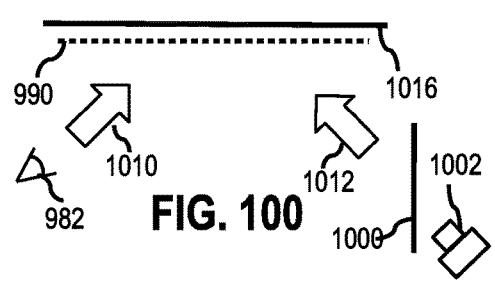
FIG. 100 illustrates the present invention with a residual projection beam light-absorbing material.
Figure 101:
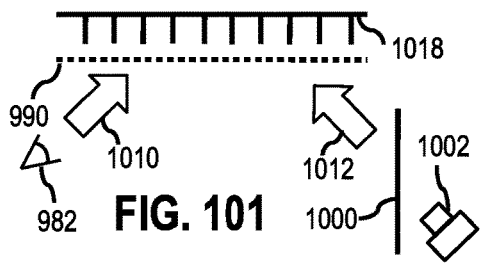
FIG. 101 illustrates the present invention with a residual projection beam light blocked by louvers.
Figure 102:
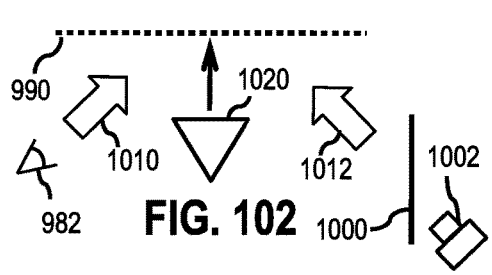
FIG. 102 illustrates the present invention with a residual projection beam light being washed out by a bright light source.

FIGS. 99-102 illustrates the embodiments of the present invention to eliminate the unwanted secondary image 990 from a direct observation direction 1010 by the local meeting room participants 982. The HD projector 1002 is aimed through the screen 1000 forming the unwanted secondary image 990 above or below (not shown) of the local participants. FIG. 99 uses a physical image block 1014 to block the view of the local meeting room participants 982 from seeing the unwanted secondary image 990. FIG. 100 illustrates an image reduction substrate 1018 that reduces the visible brightness of the unwanted secondary image 990. Black light absorbing flocking material is a superior choice and similar light absorbing materials. Another substrate has optical elements that have directive optical prisms and/or reflectors that aim the light of the unwanted secondary image 990 in a direction not noticeable by the local meeting room participants 982. The image reduction substrate 1018 may also be a mirror that reflects the light to another part of the room away from the local participants in a direct observation direction 1010. For example, the meeting tabletop 986 or the meeting room ceiling 1006 can have a mirror surface. FIG. 101 Illustrates a louver light trap 1018 that traps the secondary image 990 so it disperses upon a side of the louver light trap 1018 away from the direct observation direction 1010 of the local meeting room participants 982. The louver trap may be large slats 3 inches or larger, and can be tiny louvers barely noticeable to the human eye. FIG. 102 uses a bright light 1020 aimed at the unwanted secondary image 990 and it washes out the unwanted secondary image 990 to make it less noticeable to the local meeting room participants 982 direct observation direction 1010.

FIG. 103 illustrates the present invention where the unwanted secondary image 990 is concealed from a direct observation angle 1022. The HD projector 1002 is mounted above the screen 1000 and aimed through it and the unwanted secondary image 990 falls behind the meeting room table 988. Further, a primary embodiment of the present invention is a high mounted projector light block 1024 which prevents the local meeting participants 982 from directly looking into the HD projector 1002 and its beam of light.

FIG. 104 illustrates the present invention where the HD projector 1002 is aimed upwards and bounces off a high mirror 1038 which then redirects the projected image to the screen 1000 and also passes through the screen 1000 forming the unwanted secondary image 990. Adding mirrors in the projection pathway can be applied to any relevant configuration of the present invention. The unwanted secondary image 990 is concealed as described for FIG. 103. A mirror block 1036 prevents the local meeting room participants 982 in a mirror observation direction 1034 from seeing the high mirror 1038. The high mirror 1038 is optionally attached to a low profile soffit 1026. Contained in the low profile soffit 1026 is a directional conferencing light bank 1032 with an illumination angle 1030 illuminating the local meeting room participants 982. A lower projector light block 1040 prevents the local participants 982 from seeing the HD projector 1002 lens and light beam which would otherwise be very distracting to the point of blinding to the local participants 982 during a videoconference.

FIG. 105 illustrates the same configuration of FIG. 104 except the table meeting top 986 extends nearly all the way to the screen 1000. A table gap 1042 provides a greater illusion effect that the remote participants are sitting on the other side of the meeting room table 988. The remote participants' images actually extend below the meeting room tabletop 986 back edge so as the local participants move their heads up and down they see more or less of the lower torso of the remote participants on the lower portion of the screen 1000 (not shown). This substantially aids in giving the impression the person is sitting in the room and not just an image on the screen where the bottom of the perimeter of a screen cuts off the remote participants' image (not shown). Further, the table gap 1042 hides a portion of the unwanted secondary image 990. The unwanted secondary image 990 also falls on the meeting tabletop 986. The unwanted image reduction embodiments described for FIGS. 99-102 are applicable to an image reducer 1042 positioned within or upon the meeting tabletop 986. The screen 1000 is mounted in FIG. 105 directly to the meeting room table 988, but may be attached by other means such as a simple support stand (not shown).

Figure 106:
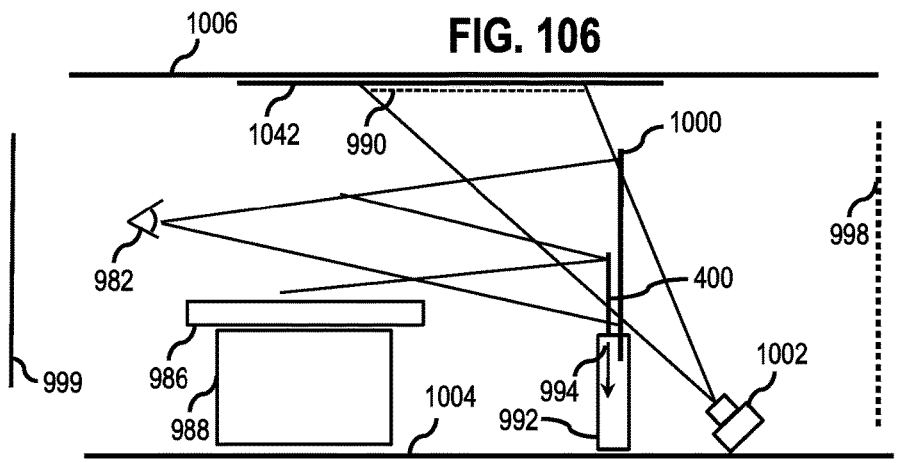
FIG. 106 illustrates the present invention with a rear projection configuration that conceals the residual projection beam light with light absorbing material and the light of the lens of the projector behind the screen stand.

FIG. 106 illustrates the present invention where the HD projector 1002 strikes the screen 1000 from an angle from below. In this configuration, the HD projector 1002 is mounted near the meeting room floor 1004 and aimed upward to the screen 1000 and the unwanted secondary image 990 disperses upon the ceiling 1006. The image reducer 1042, which may be any embodiment described for FIGS. 99-102 serves to substantially reduce the image on the meeting room ceiling 1006 that would otherwise be observable by the local participants 982. Without the image reducer 1042 the local participants 982 would observe the images of the remote participants (not shown) seen on the screen 1000 and on the meeting room ceiling 1006. Seeing the same image twice is highly distracting while conferencing making the meeting experience unusable. FIG. 106 also illustrates the HD projector 1002 and its bright lens and beam are blocked from the local participants view by the screen stand 992.

Figure 107:
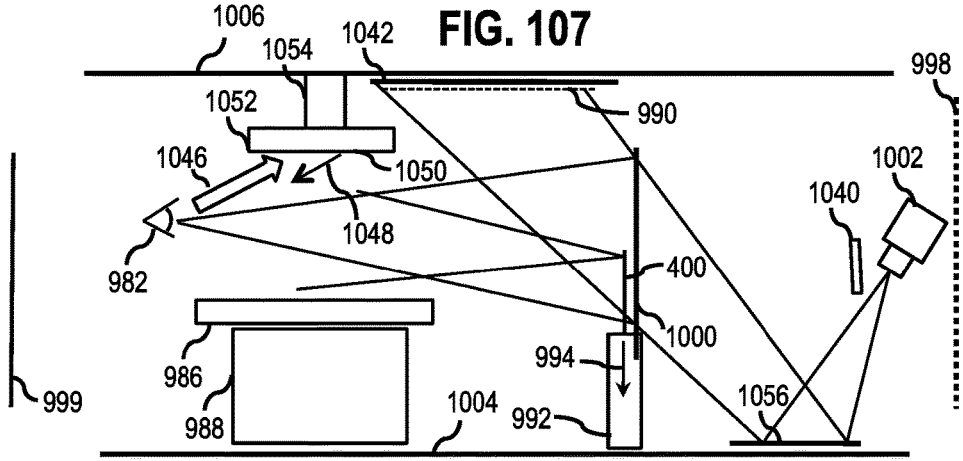
FIG. 107 illustrates the present invention with a rear projection configuration that conceals the residual projection beam light by means of a hanging light fixture.

FIG. 107 illustrates the present invention where the projector utilizes a floor mirror 1056 to lengthen the optical pathway. A meeting room hanging soffit 1052 and connected to a soffit drop 1054 creates an effective block so the local meeting room participants 982, when gazing in an upward soffit direction 1046, cannot see the unwanted secondary image 990. Contained in the meeting room soffit are soffit directional lights 1050 aimed in a local participant downward direction 1048. The image reducer 1042, although shown, is most likely not needed since the meeting room hanging soffit conceals the unwanted secondary image 990. The meeting room hanging soffit 1052 may also be a hanging decorative light fixture. So whether it is a décor feature or any kind of architectural feature the principle remains the same. That principle is any object that is common to meeting rooms in both design and décor blocks from the local participants 982 view of the unwanted secondary image 1002.

Figure 108:
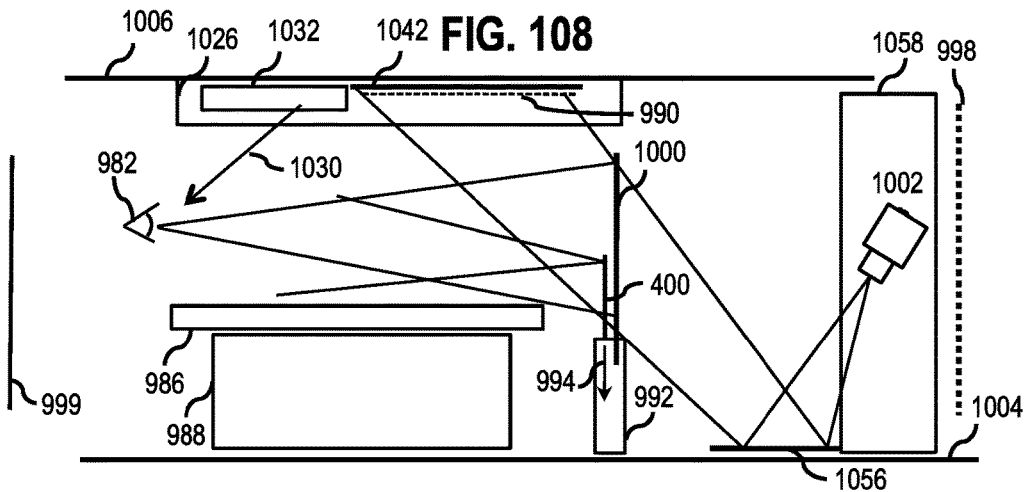
FIG. 108 illustrates the present invention with a rear projection configuration that conceals the residual projection beam light with light absorbing material and the light of the lens of the projector behind the screen stand.

FIG. 108 illustrates the present invention where the image reducer 1042 is placed inside the low profile soffit 1026. The projection pathway is the same as described for FIG. 107. In this configuration the HD projector 1002 is concealed inside of a façade housing wall 1058. It is constructed with a hole (not shown) and the façade housing wall 1058 serves the same function as the lower projector block 1040 (FIG. 104). The hole (not shown) can be concealed by many decorative means, so as to not draw attention to itself. The façade housing wall 1058 may also be a real wall with a hole cut into it.

Figure 109:
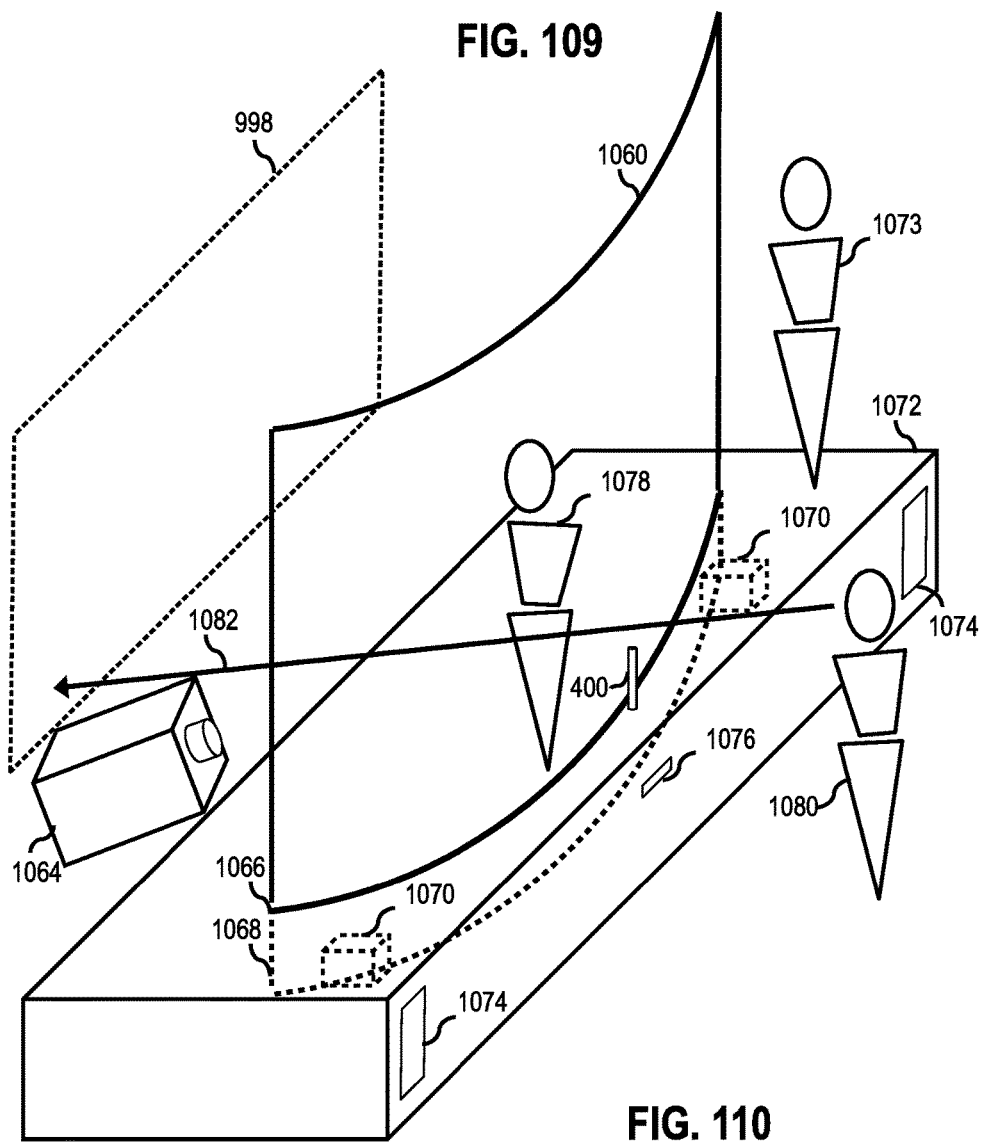
FIG. 109 illustrates the present invention configured as a rear projection see-through stage with a concealing of a projector lens.

FIG. 109 illustrates a rigid plastic rear projection transparent screen 1060 built into a custom stage 1072. A curved slit 1066 permits a screen portion 1068 of the rigid plastic screen 1060 to be inserted into the curved slit 1066 and pressed clamped into place by a clamps 1070. As a result the rigid plastic rear projection transparent screen 1060 is held upright by the curved shaped formed by the curved slit 1066 enabling the rigid plastic screen to not require any additional support such as wires, poles or frames. Without the curvature of the rigid plastic screen 1060 the screen would lean back and forth. The curved shape helps greatly in reducing cumbersome screen frames that reveal the screen 1060 to an audience observer 1080. Also, the curved shape adds to the 3-D appearance of a custom stage imaged person 1078 walking on stage in a 3-D area from the back to the front of the custom stage 1072. As described previously for numerous embodiments of the present invention the custom stage imaged person 1078 can be recorded, live via a broadcast or interactive videoconference and when the imaged person 1078 image is surrounded in black the effect is the imaged person 1078 is standing amongst the meeting room background 998 (or any stage background). It is created by a lower rear stage projector 1064 projecting the imaged person 1078 and the surrounding black that is see-through on the rigid plastic screen 1060 from the perspective of the audience observer 1080.

A live stage person 1073 stands on stage and interacts via broadcast or videoconference with the custom staged imaged person 1078. The nano stem camera 400, a custom stage microphone 1076 and a custom stage audio speakers 1074 are used to enable a videoconference, as well as, any other equipment and network (not shown). The custom stage projector 1064 is positioned low and aimed up toward the rigid plastic rear projection transparent screen 1060. The custom stage projector 1064 is hidden behind the custom stage 1072 from a direct audience observation direction 1082 of the audience observer 1080 as he sees-though the rigid plastic rear projection transparent screen 1060. By doing so the audience observer 1080 is not blinded by the light of the custom stage projector 1064. The rigid plastic rear projection transparent screen 1060 may be any size and can be fabricated by a size as large as 10 feet high and 20 feet wide. Acrylic ¼ thick clear with a lightly diffused 4% haze will suffice among other rear projection transparent screen technologies.

Figure 110:
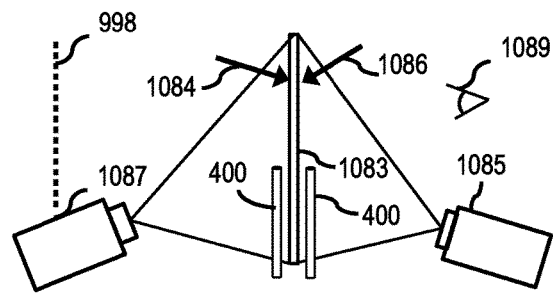
FIG. 110 illustrates the present invention with see-through projection screen that can be front, rear or both projection.
Figure 123:
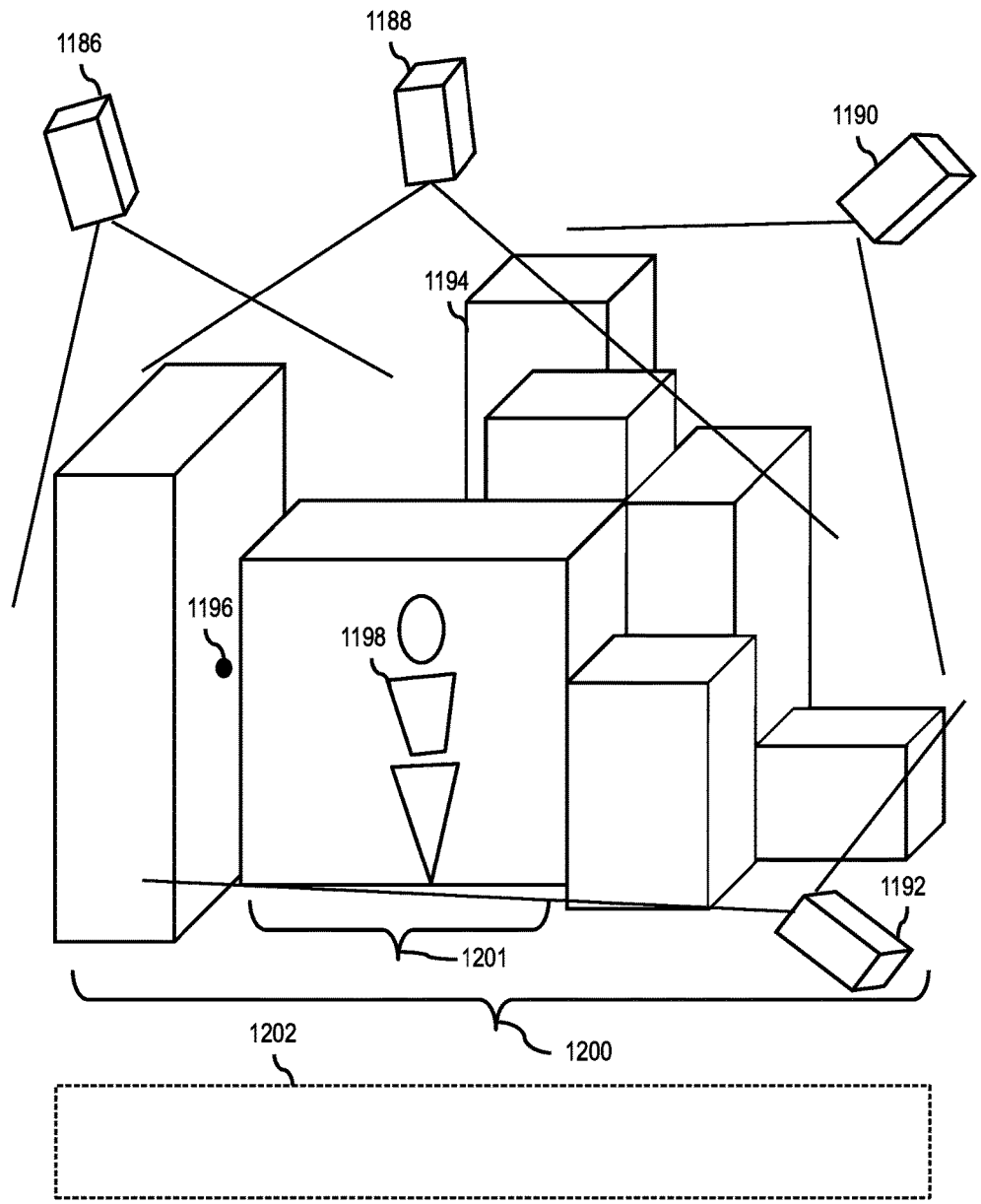

FIG. 110 illustrates an optional rear and front projection screen 1083 that can function as a rear projection transparent screen as described for screens 1000 and 1060 (FIGS. 97-109, 111, 118-120), where a rear side projector 1087 projects onto the screen 1083 and a rear projection side 1084. The screen 1083 is transparent and the participant viewer 1089 can see-through the screen 1083 to the meeting room background 998. Alternatively, various screen technologies that are transparent can be projected from either side of the screen. A front projection side 1086 of the optional rear and front projection screen 1083 has a formed image from a front side projector 1085. Other transparent screens are fabricated to be projected onto only from the front projection side 1086. It is to be expressly understood that the present invention and its embodiments described for rear projection transparent screen technology are all applicable to front projection transparent screens. All embodiments of videoconferencing, unwanted secondary images, blocking a direct view of the projector and its lens, and the configuration into a meeting room and a stage, to name a few, are all applicable to a screen that has a front projection side 1086 that is transparent. The inventive configurations disclosed herein are applicable to any applications such as ATM machines and virtual concierge kiosks.

FIG. 111 illustrates a variant of the FIG. 109 with the rigid plastic rear projection transparent screen 1060. In this configuration the screen 1060 does not fit into the curved slit 1066 but rather is held in place by a support poles 1090 connected to a metal bases 1088. The support poles 1090 are hidden from an audience viewing area 1100 by artificial trees 1096. Certainly any type of object could conceal the support poles 1090 other than the artificial trees 1096. Instead of the custom stage 1072 the configuration of FIG. 111 uses a left rolling road case 1094 and a right rolling road case 1092 to serve as the actual stage. A wood façade 1098 covers the road cases and from the audience viewing area 1100 the rolling road cases 1094 and 1096 appear to be a stage. The rolling road cases 1094 and 1096 are bolted together forming an integral stage. When not attached the rolling road cases 1094 and 1096 has everything placed inside for shipping including the rigid plastic rear projection transparent screen 1060 that is rolled up to fit into one of the road cases.

As it relates to the embodiments described for FIGS. 97-111 and 118-120 various options for the screen technology are applicable as described for FIGS. 112-117. Primarily these screen technologies are designed for rear projection, but may be applied to front projection as well. In common these screen technologies receive a bright beam of light containing a full color motion image that is dispersed upon the screen forming a visible image and these screen technologies have the unique characteristics of being see-through in the portion of the screen where no image is projected. That see-through portion is the projected color black and other very dark colored hues. FIG. 112 illustrates a rigid plastic transparent image screen 1102 that can be made of any plastic, any thickness and any optical characteristics enabling an image to be seen and see-through when no image is projected onto it and also see-through in black or dark image projected image portions. FIG. 113 illustrates a glass transparent image screen 1104 that can be made of any glass, any thickness and any optical characteristics enabling an image to be seen and see-through when no image is projected onto it and also see-through in black and dark projected image portions. The glass transparent image screen 1104 may be chemically hardened or tempered. FIG. 114 illustrates a laminated transparent image screen with a laminated first side 1106, a laminated second side 1110, and a lamination layer 1108. The sides 1106 and 1110 may be made of any plastic or glass with any type of properties. The lamination layer 1108 may be adhesive only and also have embedded in it an image dispersing technology such as holographic film or lightly diffused film. If holographic film it may be highly exotic and designed to receive a projected image from a certain angle and from a certain distance. The lamination layer 1108 can also serve as a safety feature preventing shattering. FIG. 15 illustrates a fabric transparent screen 112 that has sufficient size holes weaved into the fabric that it appears see-through. FIG. 116 is a flexible film transparent screen 1114, which may be holographic film, and lightly diffused plastic film. Both the fabric transparent screen 112 and the flexible film transparent screen 1114 can be hung, framed, stretched by pulling or heat contracting over a frame, or by any other means to form a surface to project upon.

FIG. 117 illustrates combining a first screen type 1120 with a second screen type 1116 by a connecting system, such as an adhesive, to bond the first screen type 1120 with the second screen type 1116. For example, a certain holographic film may only be 7 feet wide and needs to be extended an additional 6 feet to attain the proportion needed to mount on a stage solution as described for embodiment FIG. 111. It is also relevant in reflected systems as described for FIGS. 78-87. In this case, the angled film 720 may only be 7 feet wide that comes with a superior optical coating for reflection and clarity, yet an additional 3 feet is needed to stretch the film in a size optically required for the configuration. As such the embodiment taught in FIG. 117 would resolve the issue by widening the angled film 720. Any of the transparent image screens (FIGS. 112-117) described herein may have a variety of optical coatings to enhance the required image brightness and transparency. An embodiment especially significant for quality of videoconferencing are anti-reflective coatings that can be used with any of the transparent image screens (FIGS. 112-117) and are used to reduce ambient light reflecting off the front surface of the transparent image screens (not shown) and reducing a back reflection from the projector off the back-side of the transparent image screens (not shown).

FIG. 118 illustrates an augmented reality podium 1130 that allows an image of a person to appear to be standing at a podium from a recorded source, a broadcast source, and an interactive videoconference (not shown). A person's image (not shown) is imaged on a rear projection transparent podium screen 1132, which permits a podium observer 1122 to see the person's image on the screen 1132 and the meeting room background 998 around the person's image (not shown). As described previously, the see-through portion has black or a dark hue projected onto it, which means the person's image is surrounded in black. The person's image (not shown) is projected by a floor podium projector 1136. The podium projector 1136 bounces its projected image beam off of a floor mirror 1138 and then dispersed onto the rear projection transparent podium screen 1132. The augmented reality podium 1130 has a glass ledge 1126 with a black mask 1128. The glass ledge 1126 is a real 3D object in front of the imaged person on the screen 1132 (not shown) further enhancing the realism that a real person, and not an imaged person, is standing at the augmented reality podium 1130. Further, the podium observer 1122 repositions his head naturally at differing heights from a lower height 123 and a higher height 1124, in which more or less of the screen can be seen in a lower podium screen portion 1134 of the screen 1132. The glass ledge partially obstructs the image person (usually the lower torso and not shown) on the screen 1132 adding to the effect a real person is standing at the augmented reality podium 1130. The glass ledge 1126 may also be constructed of any material such as metal, plastic and wood.

FIG. 119 illustrates the same configuration of FIG. 118 with the addition of a videoconference camera placement configuration options. Contained in a hidden black podium camera hood 1144 is a podium camera 1142 aimed through a hole (not shown) in the black mask 1128 and through the glass ledge 1126. The camera is encapsulated in black so it is not noticeable by the podium observer 1122. Alternately the gooseneck camera microphone 442 as described in FIG. 47 raises the camera closer to eye level and also presents a real 3D physical object in front of the imaged person (not shown) to further enhance the impression that a real person is standing at the augmented reality podium 1130.

FIG. 120 illustrates the present invention of a portable augmented reality podium 1148, which operates nearly the same as described for FIGS. 118 and 119 except it collapses and is moveable. The portable augmented reality podium 1148 is built upon wheels 1156 for ease of moving in any direction. The system collapses by mounting an inside projector 1147 inside the podium 1148 and that projector is aimed to a folding mirror 1150 connected to a folding housing back 1152 and then directed to the rear projection transparent podium screen 1132. The folding housing back 1152 is connected to a housing riser 1162 and that is connected to a slide tray 1160 that closes in a closing direction 1154. Upon closing the folding housing back 1152 hingedly closes upon the portable augmented reality podium 1148 and thereby protecting the folding mirror 1150 when closed. A housing mounted camera 1146 is aimed through a hole (not shown) in the podium 1148 for videoconferencing.

FIG. 121 illustrates a primary embodiment of the present invention where a person or object can appear to have a matching shadow cast in an environment behind them. A generic augmented reality screen 1172 is a transparent screen where an augmented reality imaged person 1166 appears full color, full motion, and solid in form in front of a generic room background 1174. The generic augmented reality screen 1172 is any type of functional display, technology or system that enables the described effect of the imaged person 1168 in front of the background 1174 with his shadow cast in the environment. The visual cues of seeing shadows presents the impression that the image person 1166 is real and physically solid and thereby greatly enhancing the quality of the experience. The primary categories of technologies use the angled film 720, the rear projection transparent screen such as screens 1000, 1060, and 1132, front projection transparent screens and emissive transparent displays such as transparent OLED or transparent LCD with an adjacent back light removed. All of these technologies can create an impressive effect of an imaged floating person or imaged floating object on a clear substrate seen amongst a generic room background 1174 as observed by an awe struck viewer 1164 in a see-through direction 1168. The present invention utilizes a shadow projector 1170 to project a projected shadow 1176 onto the generic background 1174. The projected shadow 1176 cast a matching shadow from the signal source containing the imaged person 1166. In other words, as the imaged person 1166 moves about the projected shadow 1176 also moves. The projected shadow 1176 may be projected upon the generic background 1174 floor, ceiling, walls, and objects (not shown). Further, additional shadow projectors 1174 (not shown) can be added to create the illusion that multiple light sources are casting a shadow of the imaged person 1166 or any video object.

FIG. 122 illustrates a process diagram for creating the projected shadow 1176. A full color image signal source of a person or an object 1178 has that person or object isolated in a background and that background in the image does not appear on the generic augmented reality screen 1172. Further, that screen 1172 is see-through as viewed by the awe struck viewer 1164 perspective except where the image person 1166 resides in the image. That image signal 1178 is split and displayed on the generic augmented reality screen 1172 (process diagram 1180). The image signal 1178 is also sent to an image processing 1182. The image processing 1182 image manipulates the image signal to modify it to appear as a shadow. Image manipulation includes at least one of removing color except for black and white and grey, removing an image detail of the imaged person 1166 or another object, softening the edges of the imaged person 1166 or another object, filling the imaged person 1166 or another object with a dark color, replacing a dark area surrounding the imaged person 1166 or another object with a light color, and distorting the shape of the image person 1166 or another object. Pattern recognition algorithms and video editing techniques may also be used to isolate the image of the imaged person 1166 from the surrounding background in the image. Fortunately, extrapolating a person in the present invention is aided for the fact that many embodiments of the present invention captures an image of the person against a black background or a chromakey background. As discussed later for FIGS. 126 and 127 some augmented reality display technologies utilizes the color white as the color that is see-through on the display. In that case white would be the color used to isolate the image of the imaged person 1166 for image manipulating. Finally, the image manipulated signal is displayed by the shadow projector 1170 in a background environment 1184. The shadow projector 1170 may be a black and white, full color, low resolution, high resolution, high bright and also low brightness. The inventive solution of creating the shadow described herein may also be produced and animated separate from the image on the augmented reality screen 1172 and used for specialty uses in theme parks, museums and other entertainment applications.

Another embodiment of the present invention is using image mapping to create a three-dimensional physical object environment 1200 that is projected upon and imaging a video conferenced person in the environment. A first image mapped projector 1186, a second image mapped projector 1188, a third image mapped projector 1190, and a fourth image mapped projector 1192 all project an imaged mapped content upon the three-dimensional physical object environment 1200. A viewing audience 1202 observes the three-dimensional physical object environment 1200 with projected content that aligns to a physical objects 1194 and also observes a live video conferenced person 1198 within the environment. The live video conferenced person 1198 sees the viewing audience 1202 by an environmental camera 1196. That camera can be placed anywhere in the environment and also positioned to see a live person standing (not shown) in the environment as well. Image processors, scalers, and image mapping software orients the projectors 1186, 1188, 1190, and 1192 and their projected content to align the physical objects 1194 and also projects in an projected conference area 1201 the live video conferenced person 1198.

FIG. 124 illustrates an image mapped stage system 1205 with a bottom stage object 1210, a top stage object 1208, a left stage object 1204 and a right stage object 1206, a stage resting object 1212 and a stage elevated object 1214 all imaged mapped objects and projected upon with content by the projectors 1186, 1188, 1190, and 1192. A stage video conferenced person 1218 stands in an environment that completely transforms from various three-dimensional settings. The stage video conferenced person's 1218 image may be produced by either another display system such as an LED or rear projection or created by the projectors 1186, 1188, 1190, and 1192. To further enhance the realism of the experience the podium prop 58 and the videoconferencing camera 70 for videoconferencing is placed within the image mapped stage system 1205.

FIG. 125 illustrates an imaged mapped group conferencing system 1217 with a 3D table 1222, a left 3D object environment 1218, and a right 3D object environment 1220 all projected upon with the image mapped aligned images produced by a left projector 1224 and a right projector 1226. A conference image section 1228 may be any type of image display and preferably is an eye contact display with an eye level camera 1236. If not an eye contact display then any camera and display can be used. The conference image section 1228 images a remote matching table 1238, and a first section display conferee 1230, a second section display conferee 1231, a third section display conferee 1232, and a forth section display conferee 1233. The conference image section 1228 may also be produced by the left projector 1224 and the right projector 1226. The imaged mapped group conferencing system 1217 permits an immediate modification of the room environment during a meeting. For example, a board meeting may have the look of a wood paneled executive suite and an engineer meeting may have data projected on portions of the environment.

Figure 126:
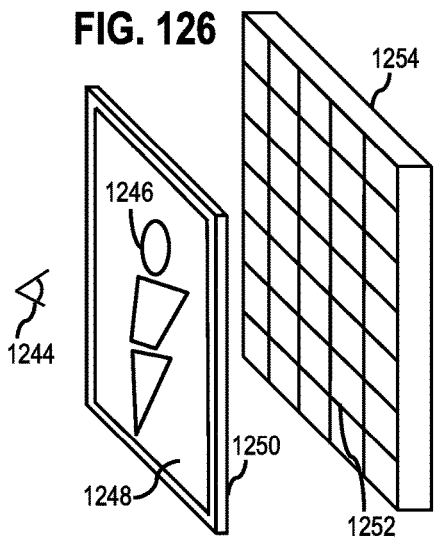
Figure 127:
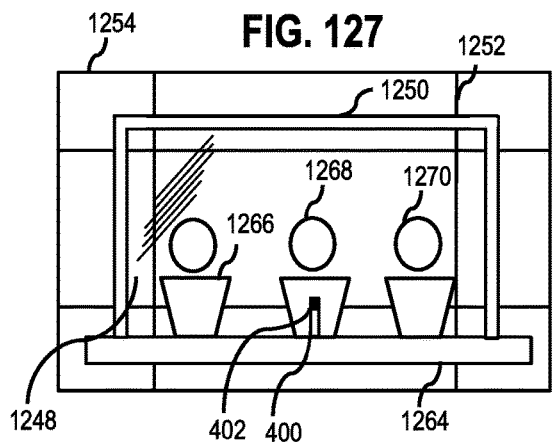

Another primary embodiment of the present invention is illustrated in FIG. 126, which reveals an electronic see-through panel 1250 that displays an imaged panel person 1246 (or any object) surrounded by a see-through display elements 1248. A panel observer 1244 watches and interacts via videoconference with the imaged panel person 1246 as well as other objects. The electronic see-through panel 1250 requires an illumination panel to produce bright images. The present invention creates an environmental background light 1254 larger than the electronic see-through panel 1250 so that the panel observer 1244 can move about and have a wide field-of-view. Also, the larger environmental background light 1254 is fully detached and substantially away from the panel 1250. The environmental background light 1254 appears to the panel observer 1244 as an architectural light feature or other bank lighting system. Unbeknownst to the panel observer 1244, the environmental background light 1254 illuminates the image on the electronic see-through panel 1250. The electronic see-through panel 1250 is preferably an LCD flat panel display with its common adjacent backlight removed. Variations of LCDs are all applicable to the present invention, yet LCDs that are nominally white are preferred. In other words, the color white is actually produced by the flat panel backlight so when that backlight is removed the color white actually becomes the see-through display elements 1248. As a result with this type of LCD flat panel the video content production of the imaged panel person 1246 should have the person surrounded in white and similar variants of hue and not black. Other types of LCDs may require another color to be selected in order to be transparent or may have a specific method other than color to engage transparency of the LCD elements. Such color selection or specific method should be understood as modifications within the scope of the present invention and disclosure. Various types LEDs with transparent capability may also be used for the present invention and a camera (not shown) may be aimed through an LED display for eye contact image capturing of a conferee observing the LED display. The electronic see-through panel 1250 often has a surrounding frame around it (as illustrated FIGS. 126 and 127) and that frame can be concealed by any means including building kiosk walls and table surface in front of the frame that hides the surrounding frame leaving only the see-through display elements 1248 in view.

Further, the large environmental background light 1254 has affixed to it or near it a background differentiator 1252. A large light offers no reference for the panel observer 1244 to distinguish the depth of the background environment. The background differentiator 1252 may be a square pattern as shown, but may also be anything that breaks up the uniformity of the environmental background light 1254, such as an architectural element, a furniture element, and a physical object. As the panel observer 1244 moves about the background differentiator 1252 clearly associates where the imaged panel person 1246 is located in reference to the environmental background light 1254. Another preferred embodiment of the present invention is the environmental background light 1254 is a large video display (not shown) that images white light and the background differentiator 1252 is actually a matching shadow of the imaged panel person 1246 (not shown). The description for FIGS. 121 and 122 are applicable to create a matching shadow for this present embodiment. The present invention can also be a group videoconferencing system where an environmental background light 1254 can fill a room wall and the electronic see-through display is positioned in front of, but substantially away, to juxtapose the differentiator 1252 position in the room and a first electronic see-through display conferee 1266, a second electronic see-through display conferee 1286, and a third electronic see-through display conferee 1270.

Figure 128:
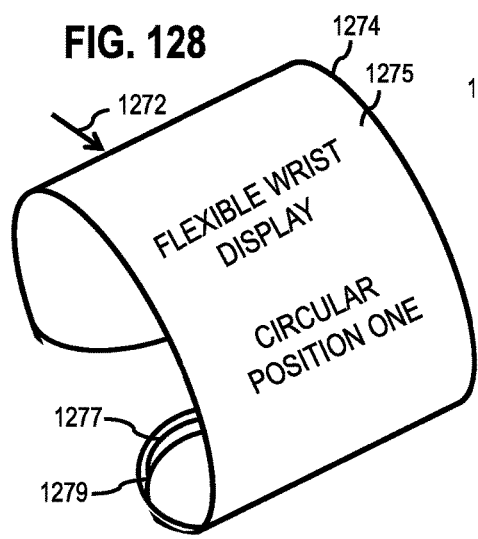

Yet, another primary embodiment of the present invention is a personal display that is mounted to a person's wrist as a watch or bracelet. Many firms have tried to commercialize smart watches and others have conceptualized displays that wrap around the wrist. The problem with such display devices is that they are only usable while mounted to the wrist. Unfortunately, consumers have become accustomed to the practicality of flat mobile phone displays and small tablets, which have proved to be the most ergonomically sound since they are handheld and can be manipulated with two hands. While consumers enjoy the large mobile displays for numerous applications they are universally annoyed by having to store the large device in their pocket or purse. A simple watch offers the convenience of having the display readily available on the wrist. The present invention resolves the problems of this prior art by providing a personal wrist display 1274 with a flex screen 1275 that is flexible and can be in a position one 1272 that can wrap around the wrist as seen in FIG. 128. In the display position one 1272 maintains the circular shape rigidly and affixed to the wrist much a like a rigid bracelet or the circular shape is not rigid and can follow the contour of the wrist and the two ends may clasp together by any common magnetic or mechanical means (not shown). The personal wrist display 1274 can be removed from the wrist and uniquely mechanically be made rigid and substantially flat in a display position two 1278 as seen in FIG. 128. Now the consumer can utilize the wrist display while mounted to the wrist, but also as a rigid handheld display device. It is preferred the personal wrist display 1274 has the wide and long flex screen 1275 that covers all or most of the surface. It may serve as a watch and the video display may show the content of any watch piece and also any type of watchband.

Figure 129:
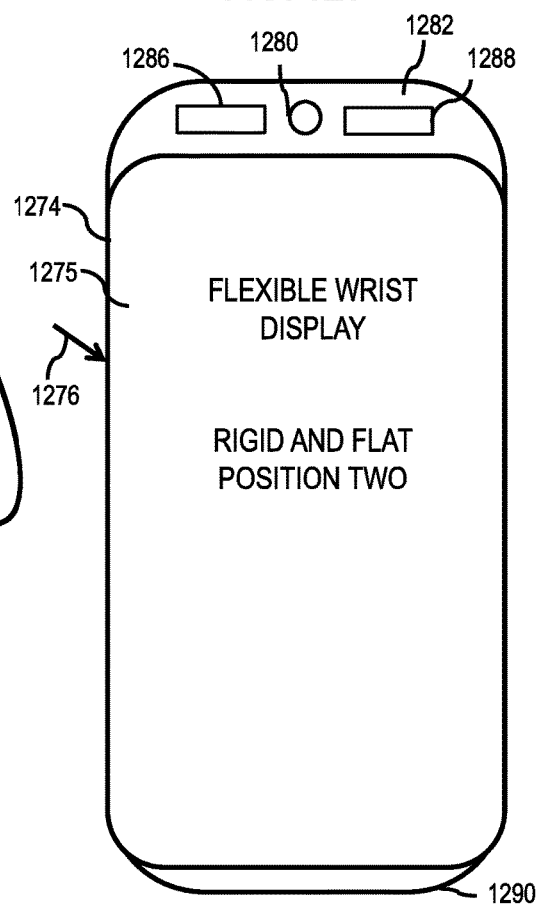

Preferably the personal wrist display 1274 is a full functioning mobile phone with any and all known phone features such as a camera on both sides of the display, video and picture flash light, and display on both sides (all not shown). All current and future innovations in hardware and software applications applicable to mobile phones are readily configurable into the personal wrist display 1274. Further, it can function with any and all known features common to tablets and notebooks. FIG. 129 illustrates a bottom housing 1290, which can contain hardware common to a mobile phone. It also illustrates a top housing 1282 which contains optionally a wrist display speaker 1286, a wrist display microphone 1288, and a wrist display camera 1280, all of which combined can function to conduct a videoconference and any other common applications such as video/audio recordings and pictures. The computer circuitry and battery technology can be of any type and shape and mounted anywhere within the personal wrist display 1274. The ideal design objective is to create a lightweight and thin personal wrist display 1274. Flexible batteries and flexible computer circuitry may aid in that that ideal design objective but is not required. The flex screen 1275 may be any type of flexible display technology but is preferred to be full color, high definition, and full motion. Flexible OLEDs are a prime candidate for the flex screen 1275.

A primary embodiment of the present invention of the personal wrist display 1274 is that it can transform from the circular position one 1272 and into the rigid and flat position two 1276. Flat is to be defined as substantially flat and in the rigid position two 1276 state the personal wrist display may have a slight arc. Numerous mechanical mechanisms can achieve the position one 1272 and the position two 1276 and all are applicable to the present invention. A sleeve 1279 behind the flex screen 1275 (FIG. 128) can receive a thin memory metal plate 1277 bent to snap into the position one 1272 and when lightly forced open it snaps into the position two 1274. The sleeve 1279 can receive many sizes and tensions of the thin metal memory plates 1277 for differing size wrists. Since the thin metal plates 1277 are removable they are replaceable if they should ever lose rigidity or not conform to the intended circular shape. The thin memory metal plate 1277 may also be affixed to the flex screen 1275. Other methods to attach or build integral a mechanical system that allows both a circular shape and a rigid flat shape are applicable to the present invention. Any type of clasping system can be used if desired (not shown) or be used on the wrist as an open sided bracelet. Other mechanical systems that use sectional magnets can snap into a rigid shape and then be lightly forced to break contact and then clasped around the wrist (not shown) are certainly acceptable alternatives. Conceivably, the consumer could be offered several sizes of the personal wrist display 1264 that are longer, shorter, wider, and narrower.

Another primary embodiment of the present invention is to provide a multi-mode meeting room 1292 that can serve as a common group videoconferencing room and also as a studio production room for producing, recording, live broadcasting, and videoconferencing to the unique display systems of the present invention disclosed herein. The room 1292 is ideally located at, but not limited to, a hotel to provide a service as a self-contained production studio. The multi-mode room 1292 serves as a normal appearing meeting room with a videoconferencing system. It also serves several specialty modes all of which require capturing an image of the participants in the room surrounded in black or chromakey with a black background and transmitted to the many display systems disclosed herein. This includes, as is relevant to any particular application and configurations, the embodiments illustrated in FIGS. 4-36, 78-87, 97-127, 146-147, and other relevant figures and all possible configurable modifications. For FIGS. 126-127 and 147 the color black may be replaced with white. The multi-mode meeting room 1292 has a room eye contact display 1306 with multi-mode camera 1304 which may be a high-end broadcast camera with pan/tilt/zoom capability. A side conference lights 1302 illuminates toward local conferees (not shown) sitting at a front table 1300 and a rear table 1298 and toward a back conceal wall 1296. The back conceal wall 1296 are fabric panels, a rolling fabric or another concealing substrate that matches the décor of the multi-mode meeting room 1292. The multi-mode camera 1304 has a first capture angle preset 1308 that is ideal for capturing conferees sitting at the front table 1300 while viewing the eye contact display 1306. The multi-mode camera 1304 can also have presets that aim to three, two, and one conferees (not shown). Also, conferees seated at the rear table 1298 are also captured in the first capture angle preset 1308. A second camera capture angle preset 1310 captures the rear table 1298 with the conferees sitting at that table facing the eye contact display 1306 and are aligned to be transmitted and displayed as seen in FIGS. 80 and 81 and applicable to numerous other embodiments and configurations of the present invention. Further, the back conceal wall 1296 is removed from the camera capturing revealing a multi-mode meeting room black wall 1294. The wall 1294 may be black light absorbing material or chromakey all with the intent to surround the conferees image in black (not shown). FIG. 131 illustrates how the multi-mode meeting room 1292 can have the front table 1300 and rear table 1298 rolled into a single large table meeting room experience.

FIG. 132 is the same multi-mode meeting room 1292 as disclosed for FIGS. 130 and 131 and is now converted into another mode of use and that is as a studio for production to the stage systems disclosed herein with head-to-toe video shots of a full body conferee 1322. The production in this mode can be for recorded, live broadcast, and videoconferencing. The front table 1300 and the right table 1298 are moved away from the center of the room. The back conceal wall 1296 is retracted left and right fully exposing the full body conferee 1322 standing against the pitch black background of the multi-mode meeting room black wall 1294 (which alternatively may be chromakey background). A side lights 1312 offer side lighting, a rear ceiling track spot lights 1316 offers back of head and shoulder lighting, a first concealed ceiling light bank 1320 and a second concealed ceiling light bank 1318 offers front lighting all to illuminate the full body conferee 1322. All this studio quality lighting is deployed in the multi-mode meeting room 1292 inconspicuously and all looks like a normal business class meeting room. A black carpet area 1314 extends from the black wall 1294 to a location in front of the full body conferee 1322. The multi-mode camera 1304 captures the feet of the full body conferee 1322 amongst pitch black so the entire captured image of the full body conferee 1322 is surrounded in black. A small scale podium 1324 serves as a place for the full body conferee to rest his hands and notes. The small scale podium 1324 is constructed so as not to be seen on screen in the disclosed stage configurations of the present invention because it is blocked from view on stage from the podium prop 58. Finally, the full body conferee 1322 may use the room eye contact display 1306 which can be used as a teleprompter and as a videoconference display to see a remote location. Certainly, the multi-mode meeting room 1292 is not the only way to produce a head-to-toe image of a person and, at times, events occurring around the globe will require capturing the image of a speaker live on stage for recording, broadcast, and videoconference.

FIG. 133 Illustrates a multipurpose group meeting room 1326 which has a convertible table 1328 that is used with chairs and conferees (not shown) on both sides of the table in a typical meeting room arrangement. The issue with this arrangement is when conferencing is the people in the chairs close to the eye contact display 1306 appear larger than the people farthest away at the opposite end from the eye contact display 1306. The convertible table 1326 rotates on wheels or other means (not shown) to create a telepresence row where all people are positioned on one side of the convertible table 1328 as seen in FIG. 134. The eye contact display 1306 would ideally be the embodiment as described in FIGS. 88-92. The convertible table 1328 may also be used without the eye contact display 1306 and instead a common flat panel with any kind of camera (not shown). If a flat panel is used, the nano stem camera 400 would be preferred because of the improved eye line.

Lighting for group conferencing meeting rooms has been frustrating because room designs, facilities personnel, and others are usually forced to select some kind of expensive and complicated ceiling light systems. Also, these ceiling light systems require electrical contractors to install and hard wired into the room electrical systems. Most conferencing rooms now use simple flat panel displays that hang on the wall. Facilities personnel are commonly hanging these lightweight TVs on the walls without contractors involved. Most meeting rooms have ample ambient light generated from above such as florescent fixtures, but light only from above causes unflattering shadows on peoples' faces.

A primary embodiment of the present invention is to provide lightweight illumination panels that flank the videoconference display to add forward light illumination. FIG. 135 illustrates a pair of a wide soft light LED panel 1340 that is mounted on the wall by a simple hanger 1338. The wide soft light LED panel 1340 flanks left and right a hanging flat panel 1332 with an HD integral screen 1334. The wide soft light LED panel 1340 plugs simply into a wall outlet and has on/off that can be IR controlled or other control features common to room control systems. Exposed LED light bulbs can be blinding so they are covered by a diffuser (not shown) which may be a white lightly opaque acrylic plastic sheet or a lamp shade material. The LEDs may be white light of any color temperature desired and any brightness. Alternatively, a mixture of blue and yellow LEDs can be independently controlled and mixed to a desired white color temperature. The LEDs are spread over a wide area because the light should appear soft to the observer with no hotspots that could be blinding.

Another primary embodiment of the present invention is to use an emissive light display, such as an LCD TV or OLED TV, in landscape or portrait mode, as the wide soft light LED panel 1340. The emitted white conference light can be a video source and various light effects and adjustments are added. Controllability of the TVs is by typical audio/video TV controls with preselected lighting scenes for the content (not shown). Content scenes for lighting could be served by a small media server (not shown) and the content signal may be mirror split to multiples of the wide soft light LED panels 1340. Additionally, a lampshade material may be placed over the TV to completely conceal the fact that the light source is actually a TV serving as the wide soft light LED panel 1340. Alternatively, a standing LED light bank 1344 as seen in FIG. 136 can be used instead of using the simple hanger 1338. The standing LED light bank 1344 leans against a room wall 1330 and does not fall forward because of an attached front half foot 1350 resting on a conference room floor 1352. The LED illumination section 1346 is aimed toward the videoconference participants (not shown). An optional audio speaker area 1348 allows many different types of speakers to be mounted into it. Alternatively, it can be used to house a videoconferencing computer or codec appliance (not shown). FIG. 137 is a perspective view of the standing LED light bank 1344 and it can stand and not fall back by the addition of an attached rear half foot 1354. Conceivably, the standing LED light bank 1344 could come in a height that would work at table height and also bar stool height, which is becoming a trend in videoconferencing collaboration furniture.

A primary embodiment of the present invention is to create a videoconferencing media wall kit system 1353 that permits architects, room designers, and facilities personnel to modularly select a videoconference media wall kit system that best suits their design and communication technology goals. The kit is conceived as offering a series of styles to fit multiple environments and the architect, designer, and facilities personnel can choose a variety of surfaces, fabrics, and speaker cloth so that a kit can be premade and delivered to a job site and mounted adjacent to the room wall 1330. As seen in FIG. 138 a single display center housing 1361 has a TV conference display 1363 contained therein. The TV conference display 1363 may be an eye contact display with a center mounted camera 1352 or a nano stem camera 400 with nano camera 402 mounted from below, but may be from on top as well (not shown). A center lower housing 1366 is connectively positioned below the single display center housing 1361. An upper left housing 1354, an upper center housing 1368, an upper right housing 1356, a left center housing 1358, a center right housing 1360, a lower left housing 1362, a lower center housing 1366, a lower right housing 1364, and the single display center housing 1361 are all connectively positioned into a single assembled kit. FIG. 139 illustrates the same left and right side housing assembly as seen in FIG. 138. This embodiment further illustrates a left TV conference display housing 1382 with a left TV conference display 1380, a right TV conference display housing 1384 with a right TV conference display 1386, a left lower center housing 1374, a right lower center housing 1376, a left upper center housing 1370 and a right upper center housing 1372 all connectively positioned into a single assembled kit. Multiple nano stem cameras 1388 may be positioned as desired, as well as numerous other mounting options for a plethora of camera types with and without mechanical pan/tilt/zoom. Any of the housings described herein as part of the videoconferencing media wall kit system 1353 are configurable to contain an electronic component storage area, a cabling area, a storage area, a camera area, and a speaker area.

FIG. 140 illustrates a side view of FIGS. 138 and 139. A selected table shape and style 1390 permits the architect, designer, and facilities personnel to choose a variety of table shapes that best suits the meeting room. Tables as seen in FIGS. 130-134 are all applicable, as well as many other shapes and sizes. The nano stem camera 400 can mount in many ways as described herein as well as other cameras. FIG. 141 illustrates a variant of the videoconferencing media wall kit system 1353 designed for a beamsplitter 1400 eye contact display with a lower mounted flat panel 1402 with a screen aimed up (not shown) and reflected by the beamsplitter 1400. A kit mounted camera 1398 aims through the beamsplitter 1400 toward the local room videoconference participants (not shown) to capture a perfect eye contact image. Likewise, a reverse beamsplitter arrangement can be used where the camera captures a reflected image of the participants off of the beamsplitter 1400 and the flat panel is placed vertically behind the beamsplitter 1400 opposite the participants (not shown). The beamsplitter 1400 can be any type of reflective transparent panel with any type of coatings which includes beamsplitting coatings to improve reflectivity. An eye contact left side upper housing 1392, an eye contact left side center housing 1394, an eye contact left lower housing 1396, as well as other center and right side housings (not shown) are all connectively positioned into a single assembled kit.

Another embodiment of the present invention is a desktop eye contact display as seen in FIG. 142. A desktop beamsplitter 1412 permits the nano stem camera 400 to capture through the desktop beamsplitter 1412 the image of a desktop video chat user 1416. A common desktop flat panel display 1420 has its screen (not shown) aimed upward and is reflected by the desktop beamsplitter 1412 forming a desktop reflected image 1406, which is observed by the desktop video chat user 1416. A thin profile housing 1408 supports the desktop beamsplitter 1412 and a panel mount 1417 of which the common desktop flat panel display 1420 rests upon. The thin profile housing 1408 is attached to a desktop support plate 1410 and rests upon a desktop 1404. The common desktop flat panel display 1420 is mounted at a slant and higher toward the desktop video chat user 1416 for the purpose of creating a screen obstruction angle 1418 so the user 1416 does not see the flat panel display 1420 screen. Further, the common desktop flat panel display 1420 is positioned above the desktop 1404 forming a working space 1414 to extend desktop usable space. The nano stem camera 400 is adjusted by a camera adjustment knob 1413 for subtle direction changes and positioning up, down, left, right, and yaw are set by a stem adjustor 1407. The nano stem camera 400 conceals power wires and image signal wires so they are not exposed and seen through the desktop beamsplitter 1412 by the desktop video chat user 1416. FIG. 142 also illustrates a power management connector 1419 so that mobile phones, notebooks, PCs, and tablets that are used to send a videoconferencing image signal to the common flat panel display 1420 can plug directly into the desktop system for power.

Mirror flip features are typically included in projectors such as is used in FIGS. 78-84. The common desktop flat panel display 1420 does not have a mirror flip feature so when its screen is seen as the desktop reflected image 1406 it is unreadable with a mirror image distortion. An image flip scaling box (not shown) is used for this desktop embodiment so that the user 1416 can read the reflected image 1406 and is as well applicable to many embodiments described herein such as FIGS. 88-92. These additional boxes add considerable wiring mess and bulk issues for desktops. To resolve this the present invention incorporates an internal image flip scaler to manipulate the image so it can be seen upon a reflection in correct orientation. An image flip scaler board 1415 is incorporated into the thin profile housing 1408 and the common desktop flat panel display 1420 plugs directly into the image flip scaler board 1415 to receive the image manipulated image. Finally, a USB hub 1411 is built into the thin profile housing 1408 so that USB peripherals such as microphones, cameras, lights, and the panel display 1420 can all connect to a PC, notebook, tablet or other computing device through the thin profile housing 1408 or other part of the system. As a result multiple USB lines are now contained in the unit and not laid out on the table. The USB hub 1411 reduces greatly the complications for the consumer on integrating components into the present desktop embodiment.

FIG. 143 Illustrates the present invention as described for FIG. 142 except that it is designed to receive temporarily a tablet 1422 into a dock port sleeve 1424. The desktop video chat user 1416 engages a mirror flip app so the image is seen correctly in the desktop reflected image 1406. The user 1416 engages touch on the tablet 1422 by looking at the desktop reflected image 1406 and simultaneously the reflection of his hand (not shown) reaching to the touch the tablet 1422 screen. This embodiment permits the entire large tablet screen to be viewed by the user 1416 unencumbered by a surrounding bulky housing and many differing types of tablets can mounted into the desktop system. The desktop systems of FIGS. 142 and 143 may also have beamsplitters that are clear, may have a black coating on the back except for a hole for the camera to aim through, may have an adjustable contrast systems to change from clear to dark, and may be configured as described for FIGS. 88-92 with the black back board 880.

Another primary embodiment of the present invention it to permit a standing person to have a high quality videoconferencing experience and or produce for a high quality image for transmission. Standing conferencing is applicable to many uses such as, but not limited to, ATM machines, subject matter expert kiosks, hotel front desk and concierge communications. FIGS. 144-147 will discuss a particular application for each figure and in no way should be construed to limit other applications of use. FIG. 144 illustrates a hotel concierge 1430 videoconferencing with a hotel room guest. The concierge 1430 appears standing life-size in the room across form the table at the distant location when viewed on the configuration seen in FIGS. 64-71. Additionally, it is preferred the connection is 4K resolution. The concierge 1430 stands at a mini matching table 1434 that matches the tables in the hotel guest rooms. A portion of the mini matching table 1434 is captured by the nano stem camera 400, which is mounted from above a vertical display 1440. The vertical display 1440 can be quickly adjusted in a vertical up and down direction 1442 for differing heights of concierge 1430 on a small display stand 1444 resting on a simple floor 1438. The nano stem camera 400 also captures the image of a matching wall 1432 that is a similar color and texture and material of the wall in the guest hotel rooms. The configuration of FIG. 144 is also ideal as a video recording studio to procure messages to be played by guests in their hotel room.

FIG. 145 illustrates a hotel front counter associate 1450 at a counter 1452. The associate 1450 can converse naturally with the standing guest 1458 and can also glance to a counter reflected image 1456 produced by reflecting a counter display 1454 by a clear beamsplitter 1459. The clear beamsplitter 1459 permits the associate 1450 and the standing guest 1456 to see each through the clear beamsplitter 1459. Without the clear beamsplitter 1459 a common display would be needed and block a view between the associate 1450 and the standing guest 1458.

FIG. 146 illustrates an augmented reality ATM machine 1471 with a large clear beamsplitter 1467 reflecting a large HD videoconferencing display 1462 and forming a floating reflected image 1460. An ATM user 1469 sees in an image direction 1468 the reflected floating image 1460 against a controlled background 1471 that is substantially dark that enhances the brightness of the floating reflected image 1460. The large HD videoconferencing display 1462 is mounted at a slant to block the HD videoconferencing display 1462 from an ATM user 1469 viewing direction 1472. The ATM machine 1471 also has an ATM touch screen 1466 with easy access for the ATM user 1469. FIG. 147 is a see-through image ATM machine 1476 and is based on the description for FIGS. 126 and 127. The ATM user 1469 peers through the electronic see-through panel 1250 in a gazing direction 1478 to see the environmental background light 1254. A bright floating image of a bank teller (not shown) interacts with the ATM user 1469 as if actually present in the room. Lastly, the configuration as described for FIG. 26 can be configured as an ATM machine showing a full body (as seen) or as an upper torso and head appearing as if the bank attendant is standing across a counter (not shown). The bank attendant that appears on this or any configuration of the present invention may be video conferenced or recorded interactive video clips. Certainly the ATM configurations of FIGS. 146 and 147 can also be used as interactive kiosks that offer a whole host sales and services such as insurance sales, medical opinion, hotel concierge, auto sales to name only a few.

Numerous embodiments of the present invention are all applicable to any and all potential applications from corporate, government, finance, healthcare, entertainment, and education communications and while disclosed to enhance a guest experience while visiting and staying at a hotel are fully applicable to all other potential applications of use outside of hotels. Hotels should also be understood applicable to cruise lines and other types of luxury accommodations. As defined by Wikipedia in the hospitality industry "a property management system, also known as a PMS, is a comprehensive software application used to cover some basic objectives such as coordinating the operational functions of front office, sales and planning etc. Automate hotel functions like guest bookings, guest details, online reservations, point of sale, telephone, accounts receivable, sales and marketing, banquets, food and beverage costing, materials management, HR and payroll, maintenance management, quality management and other amenities. Hotel property management systems may interface with central reservation systems and revenue or yield management systems, front office, back office, point of sale, door-locking, housekeeping optimization, pay-TV, energy management, payment card authorization and channel management systems."

As such, all of the embodiments of the present invention, the configurations illustrated and the numerous modifiable configurations are ideally connected to a PMS so that hotel management and staff have greater flexibility and control of the display systems disclosed herein. This includes the related videoconferencing systems, entertainment content, and digital signage applications that can be utilized with the disclosed display systems. The display systems disclosed herein are intended be used in hotel business centers, hotel guests rooms, the lobby, the front desk, convention center facilities, back room videoconferencing production room, ballrooms, multipurpose rooms, meeting rooms, to name only a few. FIG. 48 illustrates a PMS property management system 1500 and all the embodiments of the present invention 1504 are connected by a two-way communication 1502. The two-way communication 1502 is connected software communication offering control and feedback from the various display systems disclosed herein. Feedback is not required, but serves to alert the hotel staff of the operational status of the displays systems and their related systems such as videoconferencing, advertising content, TV content, hardware functions, to name only a few. Further, guests can make input selections which interactively accesses the PMS property management system 1500 to engage through one of the disclosed displays, a product or service and also activities such as reviewing a room bill or making or modifying room reservations, to name only a few.

FIG. 149. Illustrates the present stage invention as described for and illustrated in FIGS. 4-23 and elsewhere. A forward projection substrate 1506 may be one of many materials for a desired effect. It may retract up, down, right or left by any means (all not shown) and it may retract with the entire device when not in use. The forward projection substrate 1506 may be a solid or partially transparent surface so that rear projected images can be created from a lower back projector 1512 and/or an upper back projector 1508. Likewise, the substrate 1506 may be front projected where images are created by a lower front projector 1514 and an upper front projector 1510. The image on the substrate 1506 may be formed by one or more projectors combined to fill the substrate 1506. The substrate as a solid surface may use common rear projection and front projection screen material. Specifically, to enhance the present invention for the hotel multi-purpose room 2 is to enable a transparent forward image dispersed upon the substrate 1506 so that the audience can see both the dispersed image on the substrate 1506 and simultaneously through the substrate 1506 to see the image upon the image screen 43 of image display 42 (not show). Video content can be synchronized so that the layers of images are coordinated on the substrate 1506 and the image screen 43. The impact from the viewer's perspective is a 3D appearing effect where video objects can appear on the substrate 1506 in front of other video objects behind on the image screen 43. The art to create effective video images is described specifically for FIG. 9. A material to enhance the forward projection substrate 1506 as being transparent are open weave fabrics, such as various types of scrim, tulle, clear, and lightly diffused plastic sheets and actual clear holographic sheets with light, enhancing, directing, dispersing characteristics. The forward projection substrate 1506 may be in front of the entire image screen 43 or only a portion and may cover multiple portions of the image screen 43. Also, the concealment substrate 40 may be used for any of the characteristics for the just described forward projection substrate 1506.

The embodiments of FIGS. 4-23 and all other relevant embodiments herein are applicable to the embodiments as described in FIGS. 150-152. FIG. 150 illustrates the present invention where the hotel multi-purpose room 2 has installed the image display 42 and is suspended by a cables 1522 attached to a cable spool 1526 and is moved by a motor retractor 1524. FIG. 151 illustrates the image display 42 lowered to floor level by the cables 1522, the cable spool 1526, and the motor retractor 1524. The image display 42 may be any type of light emitting display such LED modules, LCD displays with very thin bezels forming a nearly invisible connection between the display sections/modules, and newly developed displays, such as rolling fabric image displays, to name a few potential image display technologies in development and applicable to the present invention. A novel variant of the image display 42 is similar to the arrangement of FIG. 16 and the massive front projection screen 160, yet in this embodiment, the screen is actually a black surface projection substrate (not shown). Typical front projection screens cannot show deep black when the room lights are on. However, with very bright projectors, images can be formed on black surfaces such as black cloth. The advantage of such a screen surface is that it is integral with the surrounding black mask 46.

The mechanical connectivity of FIGS. 150 and 151 illustrates a left truss 1516, top truss 1518, and right truss 1520 which all connected supports the image display 42 and any other component related to the present invention. The trusses 1516, 1518, and 1520 may also be fabricated as solid supports such as I-beams. However, trusses provide the optimum strength with lightest weight. FIG. 152 is a side view of FIGS. 150 and 151. The trusses 1516, 1518, and 1520 may be self-standing or may be attached to the wall side of the room 3 (not shown) and detachable by fasteners, quick release mechanisms (all not shown), or other means. A rotational wheel 1530 enables the trusses 1516, 1518, and 1520 and the image display 42 and any other optional components of the system described herein and enables the entire stage device to move in any direction. A removable optional support stem 1532 with a stem rotational wheel 1534 may be included to add stability and prevent tipping of the device while it is being moved. Those skilled in the art will appreciate the numerous mechanisms to enable the stage 1540 to move in any direction. Further, motorized systems can be added as well.

A primary embodiment of the present invention is to move the image display 42 and other stage related components discussed herein without the need to disassemble them so they can be repositioned in the hotel multi-purpose room 2. A moving retracting stage 1540 embodies the present invention as described for and shown in FIGS. 4-23, FIGS. 149-152, FIGS. 154-156 and elsewhere in the present invention. The hotel multi-purpose room 2 is often partitioned into sections with a Section One 1549 partitioned by first moveable partition 1536 adjacent to a Section Two 1550, and the Section Two 1550 adjacent to a Section Three 1551 partitioned by a second moveable partition 1538. Of course, hotels and convention centers have numerous layouts of moveable partitioned sections within their large multi-purpose rooms. Any of those various configurations are applicable to the following descriptions for the Sections 1549, 1550, and 1551 and may be two sections, four sections or any number of sections. The moving retracting stage 1540 has numerous advantages over common prior art method of disassembling and moving audio/visual equipment. For example, just assembling a 12 foot high by 43 foot wide LED or LCD display wall, which proportionally is approximately two massive 16:9 aspect ratio images side by side, could take a day and a large crew. This moving retracting stage 1540 can be moved into the desired location in the hotel multi-purpose room 2 in a fraction of the time. The stage 1540 may be moved by motors that power wheels, rollers or sliders (not shown) to position the stage 1540. This is done with little human physical effort. The present invention provides enormous cost savings and while maximizing facility productivity.

As seen in the primary embodiment FIG. 153 the moving retracting stage 1540 in Section One can be used in a closed Section One 1549 of the room 2 by the first moveable partition 1536. For larger events the first moveable partition 1536 and the second moveable partition 1538 can be retracted creating a large open room 2 for a very large audience. The moving retracting stage 1540 can be moved to an end wall 1553 and face all three Sections 1549, 1550, and 1551. Or the stage 1540 can be moved in a right direction 1544. It is also conceived that a hotel may have two stages with the moving retracting stage 1540 and a second moving retracting stage 1542. With the room 2 partitions 1536 and 1538 closed, separate events can be conducted at the same time in the multi-purpose room 2 with the stage 1540 and the second stage 1542. With the partitions 1536 and 1538 open, the stage 1540 and the second stage 1542 can be moved in the right direction 1544 and a left direction 1546 and meet at a connection point 1548. The two stages then could be used for a single large room event. They stages 1540 and 1542 can operate independently or together and it is intended that the image display 42 (not shown) of each stage is joined seamlessly forming a much larger display area. In such a case other stage components and systems would, as well, be integrated for the event (not shown). Additionally, more than 2 moving retracting stages 1540 and 1542 could be in the room 2 (not shown). The hotel, with this deployment, has a great deal of flexibility to rapidly adapt the hotel multi-purpose room 2 for any given size of event.

FIG. 154 illustrates a further primary embodiment where the hotel multi-purpose room 2 has a temporary audio and video production sound stage. It is the intent to build a global network of stage systems as described herein and permanently locate in hotel multi-purpose rooms 2. Ideally, these rooms 2 are connected with quality of service data connections and may be interconnected and optionally through a remote network operations center 230 as discussed for FIG. 23. This enables very high quality data connectivity to exist and be constantly checked to ensure the connection is up and running and at an acceptable quality. This inherent connectivity enables broadcast, multicast, videoconference and multipoint communications without the complexity and cost to access temporary data connections in the room 2. As a result of this connectivity the hotel multi-purpose room 2 is an ideal location to create a temporary soundstage for productions. In many situations complex video productions of live and recorded human activities will be needed. The room 2, at a particular hotel, serves as a studio sound stage for live productions sent to other stages 1540, or variant stages as described herein, around the globe. Likewise, recorded productions could be played back on stages 1540 around the globe. A large backdrop 1566, such as black cloth or green screen, is positioned in the room 2. An on camera talent 1562 is captured by a high res camera 1554. The high res camera 1554 is connected to the moving retracting stage 1540, or any other version of the stage embodiments of the present invention, by a signal cable 1556. The on camera talent 1562 is able to see himself live on the stage 1540 and adjust his performance or presentation accordingly. A series of studio lights 1560 are also temporarily set-up to illumine the on camera talent, the large backdrop 1566 and the production prop 1564.

Conceivably, any hotel multi-purpose room 2 with the present invention installed can become a state of the art production studio in a relatively short period of time. The advantages are critical to ensuring the best possible productions, which are intended to be seen on the image screen 43. The on camera talent 1562 can see in real-time exactly how his feet align to the floor at the feet alignment point 45 in the image screen 43 (FIG. 150) and stage floor 52, and how his interactions with production prop 1564 appears. The creative production team can adjust the series of studio lights 1560 to enhance a 3D appearance and can enhance shadows of the on camera talent 1562 and how shadows play off the production prop 1566.

Another major advantage of using the large room 2 as a studio soundstage is that the high res camera 1554 can be placed very far away from the on camera talent 1562. When the high-res camera 1554 is moved in a closer and further away directions 1558 it effects the perspective of the on camera talent 1562 as he walks closer and further away from the camera 1554. For example, the talent 1562 may move about and his image may look to get too small or too big as displayed on the image screen 43 and thereby breaking the illusion there is a real person on the image screen 43 (not shown). Further, the high res camera 1554 may also be mounted, not only far away for proper perspective, but also mounted close to the floor of the room 2 (not shown). If the camera is too high, then the talent 1562 may look like they are floating with their feet leaving the stage floor 52 at the alignment point 45 (FIG. 150) as they move closer and further away from the high res camera 1554. Shadow or reflection displays (not shown), can be deployed on the stage floor 52 as any type of front or rear projection, or any type of emissive display such as LED or LCD creating the illusion that the imaged person 68 on the image screen 43 is actually casting shadows or reflections on the stage floor 52. Such stage floor reflections and shadows may also be used for imaged stage props (not shown) to enhance their realism. To enhance the overall illusion, the stage floor 52 would be black in many instances to create the illusion that the imaged person 68 is standing in a black void with a deeper theatrical stage behind them. Likewise, the illusion can be further aided by simulating floor shadows and reflections imaged on the image screen 43. The black void effect is further enhanced when a bright light is placed in the field of view of the image screen 43, such as at the perimeter of the image display 42. Or the image screen itself may have a feature that has a bright light with surrounding black. The bright light tricks the eye into stopping down like a camera so that black areas appear even more deeply black (all not shown) making the black void even more convincingly deep as a common theatrical stage.

Those in the production arts will greatly appreciate this hotel "ballroom" temporary soundstage studio and the ability to see exactly the finished product in real-time. Highly complicated productions with numerous actors, singers, speakers, and so on, with numerous props, visual effects, animated effects, backdrops, shadow effects, lighting effects, are all used to enhance the realism of the final visual experience. Also, green screen and chromakey can be used for live and recorded productions in many creative ways including isolating the on camera talent 1562 on a black field aiding in the illusion he is standing realistically amidst a black void on the stage of the present invention. This black void is why careful attention is given to ensuring the image screen 43 can produce deep black and the surrounding black mask 46 hides any visual cues of the actual narrow depth of the stage floor 52 and the entire stage device 1540, or its variants described herein.

FIG. 155 illustrates a primary embodiment of the present invention creating a novel production workflow process that radically improves the productivity of event content creation and thereby lowers the cost of production. The prior art process for event video content creation has relied almost exclusively on expert video production companies that create custom video content for custom large format displays. The present invention radically changes this process by empowering the client to create their video production for the various stage inventions disclosed herein. A client users 1568 accesses with their own personal online device 1570, such as a tablet or notebook PC, a website, and/or a downloaded app to engage a client production computer program 1572. The program 1572 has at minimum a reference to the image display 42 screen aspect ratio at a particular selected hotel multi-purpose room 2. That reference is a video playback for a show preview 1574. The client users can create a show event and store the show event for future access by themselves and others they give permission to. The client user 1568 layouts a timing of the event in the program and can add a show notes 1578 for a staff of people to review and know chronologically the timing and sequence of various elements of the show. Further, the client users 1568 has access to a selectors 1576, which provides all vital elements needed to create video content and also the overall show, such as lighting scenes.

The selectors 1576 include, but not limited to, venue selection, video template selection, video elements selection, virtual video lighting selection, actual stage lighting selection, prop selection, audio set-up selection, and audio clip selection. The client users 1568 creates a show using the selectors 1576 on their own device 1570 and can view the show created on the show preview 1574. Accessible from a separate database or integral to the program 1572 is a massive content library 1580 so that the client users 1568 can select the desired content. Additionally, the client users 1568 can upload their own or a third party content to the program 1572 by means of a download elements feature 1582. Upon creation of a show file the client users 1568 has a database of a stored client created show 1584. A production team accesses the stored client created show 1584 and further modifies, expert enhances, and creates a show ready production 1586. The show ready production 1586 is then sent to a show control 1588 at the hotel multi-purpose room 2. The transfer can happen prior to the event and stored on a portable device, data streamed prior to the event or data streamed real-time during the event, among other options. The show ready production is then displayed on the moving retracting stage 1540 or any variation of the stage embodiments disclosed herein. The show control 1588 can include, but not limited to, video playback, audio playback, live videoconferencing equipment, video and audio switchers, and other audio, visual and communication equipment needed to conduct a large event.

The program 1572 further includes, but not limited to, show timeline and notes, multiple show project files per client user 1568, playback online, playback from device 1570 data storage, online collaboration such videoconferencing, cloud storage, copyright vetting and terms, production company terms and conditions for use, schedule of production fees, content fees, venue reservation, production work time tracking, online payment system, talent and technical online resource referrals. While the embodiment of FIG. 155 is primarily a new production method to empower client created event shows, it is to be expressly understood this online production system, will also be used by industry professionals, production companies, and creative content agencies on behalf of their clients. It is also to be expressly understood that the event show creation process described in this primary embodiment as illustrated in FIG. 155 is also applicable to any other prior art or alternative stage systems that images video on large format displays at events with an audience.

FIG. 156 illustrates a real-time remote production system to bring multiple locations of remote production staff collaborating in real-time at one or more hotel multi-purpose room 2 locations. A remote site production 1590 may be one or many locations and it may be a person working from any location, including their home, office or mobile, and may be a production team office where production staff is located. A collaboration connection 192 connects the remote site production 1590 to the room 2 and local staff operating the show control 1588 and can be at least one of online editing, videoconferencing, one or two way audio and/or video, and room 2 video observation for audience reaction and security. Together, the remote site production 1590 and the staff operating the show control 1588 jointly conduct the live event show. Multipoint videoconferencing bringing in multiple locations at the room 2 and related staff and many remote site production 1590 locations can all join the call. Audio can be broken off to camera people in the room 2 taping the event for a magnification screen, as well as all other conceivable delegation of duties to an event production staff. A control connection 1594 connects one or more remote site production 1590 locations to the show control 1588 and can operate remotely various features of the show control 1588. Ideally, the remote production 1590 location has a high-quality eye contact videoconferencing system as described herein so that the dispersed production staff can work as efficiently as if they were all present in the room 2. Further, the staff at the remote site production 1590 may see a feed of the image to be sent to the stage 1540 and can forward content to the staff at the show control 1588. The remote site production 1590 becomes especially useful as a production operations center when coordination is needed when multiple room 2 with multiple stage 1540 (and all the stage variants disclosed herein) are conducting the same event around the country or globe.

The embodiments as illustrated and described for FIG. 47-77 and elsewhere in the present invention are applicable to a novel workspace cubicle. Prior Art FIG. 157 illustrates a common cubicle barrier 2007. A cubicle desk user 2002 sits at a cubicle desk 2004 on cubicle desk legs 2006 and gazes ahead in a gaze direction 2008 and is prevented from seeing beyond the cubicle barrier 2007. The cubicle barrier aids in privacy to limit other workers (not shown) from readily seeing the cubicle desk user 2002 and at the same time limits the view of the cubicle desk user 2002 so other workers can have additional privacy. The cubicle barrier 2007 also aids in reducing workspace noise. The flat panel ultra HD display 601 with its ultra HD screen 602, described previously is seen by cubicle desk user 2002 so that he can enjoy a high resolution image on a very large display 601 in his personal space (FIG. 158). FIG. 158 illustrates an embodiment of the present invention where the ultra HD display 601 serves as a cubicle barrier with similar function as the common cubicle barrier 2007. The ultra HD display is placed near a cubicle desk 2004 opposing the side the cubicle desk user 2002 is seated. The ultra HD display is detached from the cubicle desk 2004 and rests on a stand 2010 with a stand base 2012. The stand 2010 may also serve as a cable management system. The stem camera 400 is shown for illustrative purposes and can be mounted in any location and other types of cameras and eye contact displays can be used with present embodiments.

FIG. 159 illustrates the ultra HD display 601 mounted to the cubicle desk 2004 by a display desk mount 2014. Again, in this configuration the ultra HD display 601 replaces the common cubicle barrier 2007. As seen in FIGS. 158 and 159, the ultra HD display 601 provides sufficient privacy for the cubicle desk user 2004, yet additional barriers may be added surrounding the display 601 and on other walls of the cubicle workspace. The word "cubicle" may not now be in fashion, yet still many manufacturers make open concept workspaces where desks and small barriers are placed in large open spaces. The present embodiments transform these open workspaces with privacy barriers being created by large ultra HD displays 601. Additional common sound masking/noise reduction technology has been deployed to further aid in audio privacy and reducing distracting ambient noise in these open workspaces using the ultra HD display 601 as a replacement for the common cubicle barrier 2007.

FIGS. 40-46, as previously described, teach the fabrication and unique applications of novel small cameras. FIG. 44 illustrates a specific housing nano stem camera 400 with nano camera 402. All the embodiments described for the FIGS. 40-46 are applicable to the present invention embodiment as illustrated in FIG. 160. With the miniaturization of components such as the nano camera 402, the small camera 394, the lens 398, the wire bundle 392, the electronic sensor board 404, power wire bundle 392, clear wire assembly 306, sensor mount board 408, electronic camera board 412, sensor mount board 408, electronic wire bundle 410, and any component variation thereof is applicable to be integrated into a consumer created housing of their choice. Specifically, the housing of the nano stem camera 400 is only one of hundreds of possible housing options of which the aforementioned camera components can be integrated within. The present invention, as taught in the process of FIG. 160, permits consumers the ability to buy a kit of a fully functioning camera and then modify that camera for the application they so desire. For example, the nano camera 402 or similar small camera such as the small camera 394 need not be integrated into the nano stem camera 400 elongated tube housing but a housing of an entirely different shape and functionality.

As illustrated FIG. 160 the steps of this embodiment of the present invention are described in the following steps. The consumer in a STEP 1 2020 accesses an online library of 3D models of camera housings, and can optionally manipulate those 3D models. STEP 2 2022 the consumer uses their own computing device with 3D model software for use with their own 3D printer. The consumer may optionally select a housing online, modify the housing, if available for modification, and have a third party print the 3D model of the selected camera housing. STEP 3 2024 the selected 3D model is printed "formed" and the consumer integrates the various camera components and encapsulated inside of the 3D printed camera housing. Some parts need not be encapsulated such as a low voltage power wire 392, a high voltage power wire 2028, a low voltage power supply 2029, and an outlet plug 2026.

3D printed housings can be made of numerous materials, but most are plastic based. It is conceivable other materials such as metal or even wood may be automatically milled out from a 3D model into the desired housing. The camera components to be housed may be any common camera components including, but not limited to, batteries, sensors, electronics, storage devices, lenses, wires, etc. The camera housing 3D models may be used for videoconferencing, actions sports, toys, camcorder, still camera, waterproof, clip-on, security, scientific, drones, stealth in size for hidden camera uses, and many more styles of housings. Also, the consumer may access a 3D modeling program and create their own housing from scratch. All the features and connections related to cameras, camcorders, micro cameras, action sports cameras, wearable, professional cameras, pan/tilt/zoom cameras, broadcast cameras, IP addressable and so on are all applicable to the present invention. Those skilled in the art will appreciate the numerous options to build custom cameras for specialty purposes with the present invention.

As described previously, the present invention is used by politicians, which includes campaigning and security purposes. The prior art FIG. 2 peppers ghost has been tried for political campaigns. It proved to be extremely difficult to set-up and tear down and needed to be used in dimly lit environments or used inside a draped off box or metal shipping containers so that the dim reflection of the image on the inclined stretched plastic film 26 could be seen. The sheer complexity of setting up such a large apparatus at many temporary events limits its potential use as an effective campaign system. Further, the lack of image brightness in common room lit environments greatly limits its potential wide scale adoption. What is needed is an augmented reality effect where a live or recorded image of a politician or any speaker can appear standing in a room at a podium and be convincingly realistic. Further, what is needed is a system that only one person can set-up in just an hour and the image is very bright under normal room lights. Further, what is needed is a rapid deployable delivery system for both moving physical components and also network connectivity at each location for the temporary event.

FIG. 161 resolves the aforementioned problems with the peppers ghost illusion for campaigning with rapid deployable events at many locations. FIGS. 118-120 teaches an augmented reality transparent display podium 1130 and 1148 where the image is formed directly on the rear projection transparent podium screen 1132 making it much brighter than the Prior Art inclined stretched plastic film 26 with a dim reflection. The advantages are this solution is much brighter, much more compact and requires very little set-up as compared to the peppers ghost systems. For the sake of clarity "holographic podium" in the context of FIG. 161 shall mean the solution as taught in FIGS. 118-120, but also includes all other embodiments of the present invention that creates the appearance of a person is standing in the physical space of the room and can be configured as a portable system that can be easily moved from location to location, to support, for example, a political campaign, a nationwide product marketing launch, or in-store events of famous persons interacting live with crowds as a hologram. This includes the embodiments of FIGS. 24-26, 97-117, and the stage embodiments and other relevant embodiments described herein. Further, a mobile media news or entertainment network can deploy this solution with show hosts, guests and entertainers interacting with audiences at many locations and also broadcast the show events to TV or webcast to personal computing devices. Audience members at the events and online are able to participate live in these events by social media, by text, by phone, by webchat or other communication means.

FIG. 161 teaches a rapid deployable augmented reality holographic podium campaign system. The solution has a single person set-up for a temporary event and can be repeated day after day. With dozens of these systems deployed, thousands of events communicates the candidates or speakers message whether recorded or live. For a live event, FIG. 161 first teaches the use of a vehicle on location at a temporary site 2038. A fleet of vehicles have installed communications gear such as satellite, internet, and bonded wireless to image a live feed of the candidate. Further, the vehicle has all AV and staging for an event including a backdrop with, for example, a candidate's name and creating a complementary background behind the holographic podium. The single person can set-up the holographic podium 2040 at the temporary location and then the podium can receive the recorded or live feed of the speaker/politician 2042 via internet, bonded wireless or satellite. The politician location has a remote studio 2030 with a black drape or green screen with chromakey black so the speaker/politician will look as if standing at the holographic podium in the midst of the room. The studio produces audio and video of the speaker/politician for transmission 2032 and transmitted to the holographic podium location 2038 and also numerous locations with the same holographic podium set-up 2044. Further, the speaker/politician can be broadcast live and also via webcast content delivery network 2034 to numerous types of personal internet devices 2036 such as tablets, phones, and notebooks. Conceivably, twenty audiences at twenty locations could see live the speaker/politician and a combined total attendance could be well above 10,000 people with another 100,000 attending online with millions watching on TV. It is also an embodiment of the present invention to incorporate an online donation system engaged by persons observing the holographic podium in-person or online and making donations by their cell phones and personal computing devices.

Further, as it relates to FIG. 161, since the production of the speaker/politician is on a black background, that black background is the image that is sent to the holographic podiums. A black background may not be desirable for webcast and broadcast. In that case a black background can be removed or a green screen could be used in the production with another background added other than black. Still even more compelling is to webcast from an actual holographic podium with a camera capturing the actual effect so web audiences can see the speaker/politician on the holographic podium. The present invention can use any numerous modes of video, audio, and data transmission and may be one-way video or two-way video, multicast or multipoint. Each event and campaign program will have various expectations of live interactions. With some transmission methods a delay of 2 seconds and even 30 seconds are common. In such a case, the speaker/politician could be cued by a moderator or questions could be delivered from a social media account asking questions in real-time to the speaker/candidate. Such a scenario would reduce the awareness to the audience of a significant transmission delay.

FIGS. 64-77 illustrates the ultra HD display 601 and its ultra HD screen 602 and its various unique embodiments. Primary to that is the use of the large flat panel ultra HD display 601 used in a close up work zone 620 where it is placed on or just behind a table or desk. In such a case, the large ultra HD screen 602 forms an immersive display that has a screen portion 600 that can display a computer image from a PC, an image from a videoconferencing appliance, movies, TV video games, and any other video sources. Further, what is in the vacant area 607 surrounding the screen portion 600 of the ultra HD screen 602 can form TV lights 605. To further advance the present embodiment is a personal show control device 2054 as seen in FIG. 162. The device 2054 is a box that can be purchased by a consumer and connected to the ultra HD display 601. The device is a unique and powerful multi-viewer, switcher, scaler, and purpose based computing device in which many video signals can be seen simultaneously on the ultra HD screen 602 and each of those many video signals can be resized and repositioned.

Uniquely, since the personal show control device 2054 can image scale a signal from a PC monitor, settings for wide screen can be selected and used, for example, for immersive gaming and computing. Essentially, the computer image would be like a wide format movie and letterboxed top and bottom. Or the device 2054 can receive multiple monitor inputs from the same PC and their multiple images can be arranged side-by-side, as if having multiple computer monitors on a desk. By doing so, the clutter of many displays on a desk is done away with one sleek large immersive display. Each of those images can be repositioned and resized anywhere on the ultra HD screen 602. As for PC gaming, the multiple video monitor inputs can be seen side-by-side and the images can be seamless forming what looks like an immersive and extremely wide aspect ratio gaming experience akin to having 2 or 3 monitors on the desk and each showing a portion of the video game.

The personal show control device 2054 is preferably a purpose built device that has inherent features, such as, but not limited to, an android based IPTV box. Apps can be downloaded and the consumer can use the device 2054 for more than the shown control of resizing and repositioning multiple image sources. Furthermore, the android based device can have a modified GUI so that it is customized by the user and also has specific video display features such as variations of the TV lights 605. Also, the app based ecosystem of android and similar computing platforms will provide many options for future device enhancements with online updates. For example, videoconferencing software may be included and other collaboration apps. Further, for one possible variant, an image source may be a one or more images from a PC and that image would then be seen within an android GUI providing, among things, an imaged wallpaper (not shown). The image manipulation of multiple images and maintaining the highest resolution, while being selectably resized and repositioned on the ultra HD screen 602 requires specific image processing power. That image processing can be aided by specialized chips from firms such as i-Chips USA based in San Jose Calif.

The personal show control device 2054 primarily is designed to have one video output to one ultra HD display 601, but more than one video outputs are conceivable. Audio output may be embedded in an ultra HD ready HDMI output and audio may also be split out to, for example, optical connection. The user is given, one of many control means, the ability to select the sound associated to the selected video image seen on the ultra HD screen 602. The device 2054 and numerous inputs, including many HDMI or other standard video connections, may or may not carry audio. It also optionally has USB and preferably many USB connections to hook up a camera, a microphone, and other peripherals. The device 2050 may also have wireless streaming capability so that audio and video from personal devices, such as a mobile phone, may appear as one of the images on the ultra HD screen 602.

The personal show control device 2054 can be controlled by the user by several means including a remote control, a mouse, a keyboard, and a personal device app. Also uniquely, the device 2054 can be controlled by a secure website, such as a social media site and through a personal logged in account. The device 2054 is also intended to be used in an enterprise where the information technology staff can access any particular device 2054 for status and remote operation and also access all devices 2054 for, for example, remote upgrades.

As seen in FIG. 162 multiple audio/video sources 2050 are connected to the device 2054. A controlling means 2052 by at least one of an app, a secure website, a remote control, a keyboard, a mouse, and by transmission means of radio frequency, Bluetooth and infrared. Further, the controlling means has selection of the video source to be displayed, resizing screen segments for each selected video source, repositions screen segments of each video source and audio from one of the audio video sources. The device 2054 is a computer with an operating system, produces internal video sources of at least one of a wallpaper, TV lights, and an operating system image GUI. Further included is image processing and scaling to maintain each segments highest resolution matching the ultra HD display resolution. Resolution matching is scaling to best utilize the ultra HD display 601 native resolution. However, a resolution less then native may be acceptable for some video sources. Conceivably, image enhancement could apply when the source video is lower resolution then the segment of the ultra HD display 601. The device 2054 further has at least one output to an ultra HD display 601. The device 2054 is attached to the ultra HD display 601. Though present embodiment of FIG. 162 is presented as a consumer purchasable device that can be connected to an ultra HD display 601. It is to be expressly understood the device 2054 may be, alternatively, integrated into the ultra HD display 601.

All of the embodiments of the present invention may be incorporated into business models that are based on rent, lease, service and temporary use, which includes charging for that temporary use or service. This includes tickets to watch events on any of the disclosed stage embodiments. Such events may be placed online with tickets offered for sale. Further, the web sales presence will assist the hotels, with the stage installed, to be marketed with discounts such as "dine plus show" or "dine plus show plus stay." The hotels will have a new marketing approach to build up the exposure of their property. Further, private events will be drawn to the hotel property due to the affordability of the stage and production capability described herein. For example, it is conceivable the present invention described for install into the hotel multi-purpose room 2 may reduce the cost for custom video production and large scale audio visual shows by as much as 80%. As a result, the hotel will have a magnet service and technology installed which will attract clients to book events and procure the entire hotel offering including rooms, event, and convention services. Also, the online presence for marketing reveals the entire global network of the room 2 stage experiences. Further, the online presence reveals date and times for such events with ecommerce ticketing sales and booking. The online presence also reveals the massive network of content categories to choose from, including, but not limited to, live theater, movie theater, fantasy sports, video gaming events, gambling events, educational events, professional training events, political events, product launches, concerts, sport events, faith based events, diplomatic events, corporate events, charity events, to name a few.

Advances in display technology are all readily integrated and anticipated to enhance the present invention in the future. These advances such as being thinner, brighter, higher resolution, auto-stereoscopic, new types of light sources, new types of light emitting image devices and so on are all readily integrated into the embodiments of the present invention. For example, short throw projection lens technology has made great leaps forward in recent years and offered by firms, such as Panasonic for a wide range of projectors. These ultra-short throw and bright projectors can be used with any of the embodiments described herein including, but not limited to, the embodiments of FIGS. 19, 21, 59-63, 78-82, 97-125. A short throw projector would also aid in the Prior Art FIGS. 2 and 3 to reduce the bulk and complexity of setting up the inclined stretched plastic film 26. The present invention includes in room 2 the film 26, positioned upright and, optionally other components, such as the screen 18, and stowed and concealed behind the image display concealment substrate 40 (not shown). All other embodiments described herein are applicable to that novel use of the film 26. Those skilled in the art will appreciate the modifications of projection configurations to accommodate the novel objectives of the present invention.

The following claims are thus to be understood to include what is specifically illustrated and described above, what is conceptually equivalent, what can be obviously substituted and also what essentially incorporates the essential idea of the invention. The embodiments are in no way limited by its application and can be utilized as an ATM machine connected to a network, a kiosk running multiple applications, and connected to numerous services via videoconference, a personal conferencing system, a group conferencing system, a stage conferencing system, a personal entertainment system, a group entertainment system, a home videoconferencing systems, a home entertainment systems, to name only a few applications. Ideally, the embodiments herein are used throughout the travel industry including hotels, cruise lines, airports, airplanes, commuter trains, and train stations. They can be used as ticket/token machines, help desks, subject matter expert terminals, and digital signage in any type of travel, shopping or leisure locations. Also, any and all networks connecting the present invention are applicable to, but not limited to, connecting homes, offices, buildings, corporations, governments, healthcare professionals, and educational institutions. Also, any embodiment of the present invention may be used for accessing virtual worlds, navigating through virtual worlds, interacting with virtual worlds including interacting with virtual characters or live people, creating content for virtual worlds, and integrating videoconferencing into virtual worlds.

Multi-format productions are an embodiment of the present invention where the black void illusion or other types of holographic (all forms of augmented reality display) concerts or events whether being live, delayed, or stored and forwarded may also be transmitted to personal computing devices, TVs, and the like. Also, holographic concerts or events can be captured live on stage by a video production team with one or more cameras for a live broadcast of the event and streamed for live PC device and TV for pay-per-view access. The production can be multi-format in that a VR production is captured, as well as a traditional live switched video broadcast/live stream. The use of the numerous types of transparent screens described herein and the black void illusion described herein will enable a holographic illusion of a speaker or performer and that talk or performance can be streamed to other holographic event venues, smaller holographic displays that may, for example, be in a person's home and to millions of personal computing devices, TVs, and the like. For example, superimposed AR where the image of the person appears to reside in the live video taken of an environment on a phone or tablet and the imaged person appears superimposed in that environment can be seen on that phone or tablet screen. Superimposed AR can include 2D video image of a person to a highly advanced 3D capture and display of image of a person. Therefore, "observers" and "audience" as defined herein should also be understood as extending to people at locations other than where the present invention is installed and thereby enabling reach to millions of people at the same time on their phones, tablets, notebooks, desktop PCs, and TVs.

Hence, it is an embodiment of the present invention to capture a speaker, performer, singer and the like against a black background or green screen (or other isolating color) which can ultimately be presented as a black background on the present invention transparent displays (imaged as transparent and see-through) or black void illusion display and also have that same image presented as a transparent background thereby permitting a superimposed AR image over a live camera feed of a real environment captured by phones, tablets, and other camera and display systems. For example, a live concert could be in one city while the singer is in a studio in any other city being transmitted to the live concert venue and also the same video production can be utilized in a streaming application to numerous phones and tablets capable of creating superimposed AR. The singer, for example, could be seen on the phone or tablet appearing to be performing live in the person's room standing on the floor or standing on a table. Consumers can access the concert website or application and pay a fee to watch the concert and select to view the concert in standard format, multi-camera selection format, VR format, and AR superimposed format. Also, merchandise can be sold in a store in the application or website before, during, and after the concert or event. Such shopping experience could present content in standard format, VR or AR.

The multi-format production for VR, mobile AR, and hologram displays, such as the black void illusion, described above is also ideal for creating, for example, a daily news program, a talk show, an interview show, a sports show, a sitcom, and a drama. Live productions can originate from a studio or a special satellite van and/or production van with wireless transmission capability for location based video productions. AR productions can be set up quickly for green screen and the like for productions in multiple locations in a single day. Also, image isolating technique can be used during productions instead of a black, green or blue screen. The same mobile van can also capture VR and traditional video for VR/AR streaming, broadcast, and videoconferences. Likewise, home studios for stars and subject matter experts can be placed permanently in their homes for quick access to be seen on a recorded or live AR/VR program.

Further, the multi-format VR/AR production can present video recorded or live to a phone, tablet, web, and TV application with numerous features. For example, an AR and/or VR network can be offered with numerous shows and the shows play live or are accessed from a database of recorded shows. Also, AR/VR programs can be accessed by being embedded as a menu option while watching a specific AR/VR program and also may automatically present the next AR/VR program in a line up. AR/VR programs may be presented to users based on user history preference or watching habits. Further, AR/VR programs may offer a store for merchandise, including audio and video content downloads such as songs or movies. Further, all types of advertising may be presented in AR or VR with optional prompts for user response.

It is primary embodiment of the present invention that a multi-format production transmits a live or recorded image with the intent to be seen on a personal augmented reality device and also on an AR holographic system, including the black void illusion, as described in numerous inventions herein, capable of producing a proportional life-size human. Further, the transmission can present a live image from a production site of any type of programming such as a news program and concert. Further, the multi-format production system may include VR. Personal AR devices can include superimposed AR as described above and also head mounted systems, such as Microsoft HoloLens, Meta, and Magic Leap Glasses. For such head mounted systems all the inventive features described above for superimposed AR are equally applicable.

Another embodiment of the present invention is to access live streaming through and/or recorded/stored videos at a video delivery site which may be a private dedicated server or a site such as You Tube and have videos of persons and objects seen against, for example, green screen hat then can be accessed by an AR application on a phone, tablet and the like. For example, a live video podcast of a person, or any kind of program, could be video captured and streamed to the video delivery site and that video would then be accessed by an AR app to superimpose that person on an image of an environment captured by a phone or tablet camera. Further, the video could be streamed through the video delivery site to thousands of users watching it on the video delivery site and also they can access it through the AR app. That AR app may also have a layer of actionable control such as polling or a store to purchase items, or simply present AR advertising which may be user demographic, habit, preferences and other data targeted. Viewers may see the video of the imaged person or object at the video delivery site with a green screen background and will also enjoy that same live video as an AR image on their phone, tablet and the like. To make the image on the video delivery site more enjoyable the color black maybe a background instead of the more common green or blue. In that case black would be the key color for the image isolation by the AR app. Also the video image, whether streamed live or uploaded to the video delivery site, may have included in post or real-time a matte for the key used by the AR app. While 2D images of people work well as AR images 3D images and 3D capable AR apps can be used as well. Further, the AR app could be programmed to add a shadow or reflection for a person seen on screen, to name only a few image manipulating options. The multi format production may also capture a person for a streamed live show or recorded video show and produced against green screen, or equivalent variant, and that show is seen with a virtual set enjoyed by the You Tube community and also is offered to the community of viewers and fans as a AR app for their phone, tablets and the like.

The imaged speaker 68 (or any other imaged person described herein) is seen amongst the black void on image screen 43 (or other variants described herein) as introduced and described in FIG. 4A, FIGS. 7 & 8, and elsewhere, creating the illusion that the imaged speaker 68 (FIG. 7) is standing in the black void of a stage since no visible reference of the image screen 43 is recognizable to the audience in the sitting zone 14. The "imaged speaker 68" is also referred to in text as the "imaged person 68" and for clarity are used interchangeably and have the same meaning in that the speaker may be a performer or any role of person on the image screen 43 appearing to be on stage. Also, the imaged speaker 68 may be interpreted as multiple people imaged on the image screen 43. The vertical reflective substrate 60, as well as sections 74, 76, and panels 84, 86, and 88, and the like, are optional. Reflecting a foreground upon the image screen 43 or the surrounding black mask 46 is as well optional.

The black void illusion is applicable to the stage and also to smaller displays, portable systems, a stage built into travelling trucks, digital signage, movie theaters, billboards, museum displays, medical imaging displays, control rooms, and any other potential application and configuration described herein or other logically derived from the teaching of this text and figures. For example, for smaller displays the surrounding black mask 46 may be a black painted wall or pop-up black colored sign, among many other options. A display such as an enhanced black capable display such as a 65" QLED or OLED display is placed in front of or adjacent to the surrounding black mask 46. The black display becomes absorbed in the surrounding black mask 46 creating the back void illusion. Objects and people imaged in the black void appear floating or present in the large black environment and visibly do not look contained in the smaller display but within larger black environment. The surrounding black mask 46 may be adjacent to the display or behind it a few inches, a few feet or more. Also, a physical object such as a podium housing, a table, a kiosk and the like can be placed below the display creating the illusion of a person recorded, broadcast or live standing or sitting at the object. So a compelling black void illusion can be created without the need for a head-to-toe video production and the surrounding black mask 46 need not fully surround the image on the smaller display. Even a torso video shot of a person self-created from their desktop PC, notebook, tablet or phone and can be seen on the smaller black void illusion display. In such a case, a person in their home could appear in any part of the world recorded, broadcast or video conferenced standing at a black void illusion podium or sitting at a black void illusion table proportionally life-size. It is preferred a frameless TV display is used or a frame can be concealed with black paint, cloth, and the like to make it disappear amongst the surrounding black mask 46.

All of the present invention is applicable to entertainment mediums, including displaying any type of production. For example, the imaged speaker 68 within the black void illusion, or other imaged persons disclosed herein may be recorded or live. The imaged person may be an entertainer, singer, religious leader, politician, teacher, and so on. The imaged person may be a digital recreation, a prosthetic make-up enhanced person, a look alike, and/or any combination to resurrect a famous singer, politician, historical figure, and other living or deceased people. Characters may also be digitally created as an animated character that is realistically human or cartoonish. Further, the person 1078 may be a synthesized created person which uses a combination of make-up and computer generated imagery, such as placing the digital animated head of a person onto a real videographed body. This technique often speeds production time and saves on production costs. These digital characters may be recorded or live interactive from an AI application, animation system, video segments, or real-time performance animation to interact with a single user or an audience. The performer using one or more processes of performance animation may be recorded, local or remote and may connect via broadcast or telepresence so the experience is fully interactive. All of the variations described above are, for simplicity, defined herein as imaged persons and are interchangeable with an imaged singer, an imaged character, and the like. The images may originate from a recorded source, a broadcast such as a common video/audio satellite feed which may be two-way audio and one-way video, and telepresence. Specifically, the above variations of the imaged speaker 68, or other imaged persons as described herein, are applicable to many applications and configurations of the black void illusion described herein.

The imaged speaker 68 appears on stage and described herein as originating from a transmission from a recorded playback device (either local or remote), a broadcast or a telepresence connection. As previously taught, any of the imaged persons described in this specification when seen on stage should be proportional life-size with some flexibility to modify that true proportionality, if not noticeable to the observing user or audience as being unnatural. It is to be expressly understood that the definition of a proportional life-size person as used in the entirety of this specification and claims means within an approximation of what is observed as natural appearing to a single observer or to an audience. Hence, a proportional life-size person as imaged on any of the described inventions herein may be smaller or larger than the actual person being videographed. Also, the imaged person's feet are aligned to the stage floor to maintain realism of the experience. For matters of definition, a stage floor can be any floor a person naturally appears to stand upon. The stage floor may be the actual floor of the stage or may be a raised floor simulated with props and scenery. A stage floor also may be one of many floors of a scene, such as a balcony in a certain stage set design. Further, the stage floor may be reflective to present a reflection of the speaker 68 on the stage floor.

The imaged speaker 68 is viewed by an audience of one or a multitude. The names of "observer," "user," "viewer," "audience," and the like are interchangeable as it relates to the present invention and all have in common that they observe the imaged speaker 68, or other described imaged person herein, amongst the stage environment. Further, the image screen 43 can display a background that the image speaker 68 is seen amongst and may interact with that background image. The image screen 43 may also be constructed in many layers creating depth illusions on stage. These multi-layered effects are compelling experiences which can image the imaged speaker 68 standing amongst a star field, a forest or whatever one can imagine. Also, the content displayed on the image screen 43 may be coordinated with content upon multiple layers of image displays on stage enabling compelling stories. It is to be expressly understood that all the described embodiments and features are applied to the stage may well apply to the black void illusion and applied to any type of display application, such as digital signage or a corporate telepresence room.

In all the above described configurations, the black void illusion is that of the imaged speaker 68 appearing real and on stage. Further, actors, a band, an orchestra, props, to name a few, can be placed in front of the image screen 43 further providing contextual realism to the imaged speaker 68. For example, a recorded singer may appear on stage with a live musical talent, such as a band or orchestra creating the illusion that the singer is present on stage interacting with and singing perfectly with the band or orchestra. Likewise, characters imaged upon the screen 43 can be seen with live acting talent in front of the image screen 43. Likewise, the imaged character on the image screen 43 may interact with live acting talent. The image screen may also be stage forward with actors, a band or orchestra to the left and the right and behind the imaged speaker 68. In such a case the image screen 43 may be in sections on stage, curved or angled, permitting live people on stage to appear to be behind the imaged speaker 68.

Also, it is a primary embodiment of the present invention to build and/or retrofit the described systems into movie theaters and incline movie seat theaters as an alternative venue to the large hotel multipurpose room 2. In such case, a new or existing movie theater with or without inclined seats serve as a new multi-purpose exhibition space. The black void illusion of the present invention lends itself perfectly to creating the appearance of imaged live or recorded people on stage when in fact they are video images seen in a movie theater. Front projection movie screens may create this illusion, as described previously, but is frustrated by the lack of contrast of the light colored front projection screen among other factors. This may be overcome by projecting upon screens that preserve a deep black level, such as black fabric and other front projection screen technologies. The image display 42 with its image screen 43, constructed of, for example LEDs, may be used to show movies at a movie theater instead of front projection. Or the display 42 may be used for events other than watching film so the lights in the room can be fully on. Some configurations may use common front projection screens for movies that mechanically retract revealing the image display 42 serving as a secondary screen option to create the black void illusion and other common video content.

The present invention uniquely increases the cost effectiveness of deploying LED display technology, as well as other display technologies described herein, into a movie theater since it can be used under full light for events other than film watching and also provides the black void illusion and other illusions of a live stage with imaged real people, live transmitted or recorded, on stage. Exhibitors and studios can now offer with the present invention a live stage appearing show before the movie begins, interludes during the movie, and after the movie. Also, special live stage appearing "movies" simulating a live performance is now possible. Additionally, stars can appear live via broadcast and videoconference to create a more compelling entertainment experience. Further, the formats of traditional movie and a live stage can be mixed throughout a performance. Further, real actors present in the theater can interact with live transmitted or recorded actors and characters on the image screen 43 and are lit on stage with stage lighting as described previously. Lastly, all of the uses, applications, and configurations described herein for the hotel multipurpose room 2 built for or retrofitted with the present invention are applicable to movie theaters and inclined seat movie theaters. Hence, the present invention enables a movie theater to be constructed with an LED image display 42 with an LED image screen 43 which permits two modes of use of displaying movies and the black void illusion described herein creating the appearance of life-size proportional people on stage and imaged live, recorded, broadcast or video conferenced.

It is to be expressly understood, all of the relevant embodiments of the present invention are intended to be installed into an inclined seat movie theater as well as a non-inclined seat movie theater. Such mechanical, optical and electrical systems, such as the stage floor, lighting, drapery, retracting drapery, show control, and any other common stage technology will be evident to those skilled in the art after fully understanding the disclosed embodiments related to the large hotel multipurpose room 2. For example, the stage lighting rig 124 may be self-supporting or be mounted to the side of the theater walls and hidden from audience view (not shown). Also, the left roll-up panel 84, the right roll up panel 86, and the center roll up panel 88 can be mechanically affixed to the ceiling or supported by columns (all not shown) and when lowered converts the movie theater into a theatrical live stage with a proscenium framing a stage opening where actors reside, or in this case any live person(s) on stage and any imaged person(s) appearing on the image screen 43. It is a primary embodiment of the present invention to convert and retrofit a movie theater with a rapid retracting proscenium so that the movie theater can be used in a first mode of use as a common movie theater, such as a typical multiplex with no proscenium, and as a live theater stage with full proscenium enabling the black void illusion. The stage with stage floor, in the movie theater may be constructed to easily set-up and dismantle or remains permanent in the theater and optionally mechanically retractable. Also a stage with stage floor may not exist as a functional stage and be one of simulated in the actual video image on the image screen 43 where the imaged speaker 68 appears to stand or a retracting prop stage made of fabric or other material that simulates a functional stage. The image of the simulated stage with stage floor, or at least the simulated floor portion of the stage, can be created to create a virtual stage with floor seen in the bottom portion of the image screen 43. Numerous video effects and animated effects can increase the realism of the image of the stage with stage floor where the imaged speaker appears to be standing. Techniques using shadows, reflections, light beams, depth perspective in shape and even color can all be used to create the image of a realistic stage and stage floor even though it does not physically exist (not shown). Also the prop stage with stage floor, as mentioned above, or even a real stage may have a selection of floor materials from shiny reflection to light absorbing material depending on the effect wanted for the imaged speaker 68 appearing to be on stage. All methods to roll up, fold, hingedly swing, retract, conceal, to name a few, to create the proscenium with theater drapery, panels, and LEDs are preferred, but not the only method or material to achieve the retracting proscenium. Also, the lower seats of the movie theater could be removed or remain and the stage is built on-top of the rarely used seats (not shown). Movie theaters are various sizes so each venue should have control of one or parts of the image display 42 on the image screen 43 to ensure the imaged speaker 68 is proportionally life-size. All of the benefits, embodiments, and features described for the hotel multi-purpose room installation, production, operation, distribution, and more described herein are applicable to the present movie theater invention. That also includes user created shows using online storyboarding tools and access to large augmented reality object libraries and stage light set-ups that are real and virtual (all previously described).

The Peppers Ghost illusion may also be applied to embodiments described herein for hotel multi-purpose rooms and movie theaters. The Pepper's Ghost illusion is improved upon by the present invention in numerous embodiments, yet provides performance challenges as compared to the direct view black void illusion as described herein. As seen in Prior Art FIG. 2, the Peppers Ghost illusion is extremely bulky and cumbersome. Attempting to retrofit the Peppers Ghost illusion into an inclined seat theater is highly problematic because the vertical viewing angle of the audience is obstructed by the angle of the stretched plastic film 26 (not shown). The present invention overcomes this drawback and permits the audience seated in inclined seats to have an unobstructed view by tilting the optic at a steeper angle and correspondingly to the reflected image source from below. The configuration is seen and discussed in FIGS. 78 and 79 and directly applicable to inclined seat movie theaters where the angled film 720 reflects the slanted image screen 736. The slanted image screen 736 may be any display including front projection with multiple projectors which are used to create a large single image. The angle film may be stretched plastic or any other substrate that achieves the characteristics as described for FIGS. 78 and 79. All of the benefits, embodiments, and features described for the hotel multi-purpose room installation, production, operation, distribution, and more described herein are applicable to the present inclined seat movie theater invention, retrofitted to existing theaters or designed into new theaters, with the Pepper's Ghost illusion. Further, movies can be played on the system and the angled film 720 can be designed to retract for a direct view of a movie screen or fold down into a stage floor or upon the display source the angled film 720 reflects (not shown). Lastly, the angled film 720 can be configured to reflect an image display from above and also enable a high vertical viewing angle for people seated in an inclined seat theater.

Alternatively, as described for FIG. 149 open weave fabrics and various types of mesh, as well as other transparent image screens described herein, will create an impressive illusion of the image speaker 68 and objects floating on stage in a movie theater. This, as well as all direct front and rear projection embodiments described herein, are applicable to be retrofitted into movie theaters and incline seat movie theaters. All of the benefits, embodiments, and features described for the hotel multi-purpose room installation, production, operation, distribution, and more described herein are applicable to the present movie theater and inclined seat movie theater invention, retrofitted to existing theaters or designed into new theaters, with front and rear projection transparent screens.

The image speaker 68 may be any type of human image transmitted by means such as a live broadcast feed, a videoconference, and a recorded playback from a remote or local device. The image speaker 68 may be a singer or actor, live or recorded and interact with or perform in conjunction with live talent on stage, such as live singers, actors, a band or an orchestra. The imaged speaker 68 may be a live performance animation or recorded digitally created human. The digital human may also be a synthesized combination of a videographed human body with a digital head. The digitally created human may be a character with humanoid characteristics, such as a cartoon character. The imaged speaker 68 is also referred to in the text as an imaged person being generically any role of a person imaged by the present invention.

The image display 42 possessing the image screen 43 is ideally an LED screen which today represents the required specification of the present invention (see FIG. 4A). LED fine pitch displays are becoming more affordable. 1.9 mm pixel pitch LED displays or finer have proved adequate to display people proportionally life-size so long as the audience is about 20 feet away from the screen. Finer or less fine pitch displays are all relevantly applicable to the present invention. Most all LED displays now provide connectors between modules so that a very large surface area, largest enough for a movie theater screen, can be fabricated with no visible seams. True deep black levels are critical for the success of the black void illusion previously described. Advances in LED, making the actual emitter dark in color, greatly enhances the black level. Also, constructing LEDs with deep black levels are made possible by a black matrix mesh between the pixels, further enhancing the black levels. LEDs include any type of LED screens and all advancements to that display art. For example, chip on board LEDs, surface mount device LEDs, and micro LEDs are all under the category of an LED based image display 42. Sony Cledis LED technology certainly is applicable to the present invention because of its superior black level due to the fact that the micro LEDs allow much more black surface area. Samsung Cinema micro LED is also a superior choice type of LCD. Micro LED displays have a black surface area surrounding the micro LEDs greater than the area consumed by the micro LEDs. This increased black surface area is a critical factor in the true black performance of the display and providing the highest quality black void illusion described herein. As a result, the black void illusion can be enjoyed even in normal room lighting. No matter the LED technology a primary embodiment of the present invention is to incorporate a surrounding black area of mesh or paint or black color around individual LED lights to increase the black levels of the LED based image display 42 with its image screen 43 and thereby vastly improving the black void illusion of the present invention. Further, a primary embodiment of the present invention is to enable the black void illusion by using micro LED. Further, a primary embodiment of the present invention is the LED display screen, including micro LED screen, has a non-LED black surface area greater than a LED light source surface area. This applies to the image screen 43 of the display 42, or other display with screen described herein. Exotic coatings that enable super black qualities, such as Vanta Black, can as well be applied. Gloss and dull black finish may also be incorporated for particular effect that may improve the black level of the LED. The LED may be also support 3D which may or may not require an audience to wear glasses to support the 3D experience.

An embodiment of the present invention is to place lights at one more parts of the proscenium of the stage creating the observational phenomenon of the eye stopping down the black level to compensate for the brighter light and therein making the black void appear blacker. This technique to increase the apparent black levels of the image screen 43 is an embodiment of the present invention. For example, LEDs may make up the proscenium arch (left, right, and top of the stage opening) and may have video content (not shown). The light emanating from this may be sufficiently bright to increase the apparent black levels of the image screen 43 as observed by an audience. Also, the proscenium arch made of LEDs give additional depth cues and creative options for an event or show. Lastly, this may be scaled down to a meeting room size or even desk size with a light source surrounding the image screen 43. One example would be a futuristic portal that looks like a black void with surrounding lighting defining the portal in which to gaze into. The surrounding lights, whether LED or not, may also be retractable as described similarly in the text.

An embodiment of the present invention is the image display 42 with its image screen 43 is deployed on stage in sections and those sections placed closer or further way from the audience (not shown). In that case, each section has video objects, including the imaged speaker 68, which are surrounded in black and the edges of the layers of sections are unnoticeable since they are black-on-black. As a result, the black void becomes a multilayered 3D effect where, for example, video stage props/scenery elements can appear at differing depths of the stage from that of the imaged speaker 68 (not shown). Alternatively, multi-layered depth can be created with a curved or angled image display 42 with its image screen 43 at various distances away from the audience. Another embodiment of the present invention is physically moving the image display 42 by being mechanically positioned, flown in, carried in, or rolled onto stage and moved about creating a moving 3D depth illusion within the black void (not shown). Numerous impressive video effects could be created such as the imaged speaker 68, seen in the image screen 43, walking from back of the stage to the front of the stage and the image display 42 is matched in a mechanical rolling motion to match the walking of the imaged speaker 68.

All of the above are applicable to numerous stage applications and is well suited to create virtual scenery systems for one of many types of venues including performing arts theaters, amusement park theaters, and dark rides with the black void illusion, described herein, seen as people ride through an experience. Video objects imaged upon the image screen 43 are seen amongst the black void illusion and all appear additionally three dimensional when possessing at least one of a mass, a reflectance, a shading, a motion, and a light beam. The image screen 43 displays continuous black which by definition herein means creating the black void illusion which need not be entirely black but have portions that are black and portions that are illuminated with video objects but all combined do not readily make the audience aware of the image screen 43 by revealing the edge of the display or video content that reveals the flat image screen 43.

The black void illusion, described herein, may be modified for various applications. For touring concerts, the image display 42 may be massively large for an arena. In such a case, proportional life-size people can interact with animated objects or characters 20 feet tall or greater. In an arena, controlling the lights and creating a purpose built stage to ensure the image screen 43 remains black as possible is paramount to create the black void illusion. The image display 42 with image screen 43 displaying the black void illusion shows the imaged speaker 68 and volumetric video objects and may be built into a portable small stage and used, for example, for VIP security for corporate and government officials that need to appear in a hostile environment. The experience may, as well, be built into a large truck or truck trailer and the cargo hold has the present invention making it a quick set-up travelling stage. This black void depth illusion with the imaged speaker 68 and video objects, as described throughout the text, is applicable to be imaged in at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom; the imaged person is at least one of a politician, a teacher, a speaker, an entertainer, a doctor, a clergy person, a business person, a sitting person, and a standing person.

The present black void illusion invention and its variants have also been demonstrated as an embodiment of the present invention to create entire theatrical scenes isolating in the void images of both small and massive virtual props, such as buildings, rooms, and even outdoor scenes, such as a forest. Further, merged scenes can be created where real props can augment virtual props enhancing the depth of a three dimensional scene. For example, a virtual building can be created with depth perspective cues, such as one or two point perspectives, and those perspective cues could extend to a physical prop building adjacent to the image screen 43 (not shown). In such a case, the prop serves as a visual cue of a mid-ground of the depth of the stage. The imaged speaker 68 and live actors on stage can appear to interact with and within these merged scenes. In some artistic variations of these virtual scenes, and more specifically, these merged scenes that combine both the virtual and the real forming a seamless theatrical setting, need not be isolated completely in a black void and could even fill the expanse of the stage. Further, depth perspective and forced perspective cues can be done with carefully formulated animation and videography seen on the image screen 43 creating a simulated floor, a simulated floor that extends the existing stage floor, a simulated virtual imaged stage light, a simulated light behind the imaged speaker 68, and a simulated theatrical scene backdrop behind the imaged speaker 68.

FIG. 9 illustrates the magnification screen 88 floating amidst the black void of the image screen 43 and creating an image frame within the larger image screen 43. That portion of the screen may be a separate video signal that shows not only the magnification image of imaged speaker 68 but also can be any video or computer source. A primary embodiment of the present invention is to permit users to easily select a variety of artistic and depth perspective visualization of the screen 88. For example, the imaged speaker 86 may have a slide deck presentation on his computer. He can certainly display it in a common 2D format on the screen 43. However, the present invention enables the imaged speaker 68, a show controller or any person to show the video and/or computer source through an image processing unit that can frame the image source in one of many artistic designs and may add motion, reflection, shadows, and perspective. So the simple slide deck presentation now appears to be a solid dimensional object floating in the black void space of the stage. Some show image processors now have this capability and advances in real-time graphics processing using gaming engines, such as Unity and Unreal Enginem may be customized for this application. The image source from the personal computer is "pinned" into an animation combining the image source with the animated object is one possible method to achieve the desired results. Also, many computer and video sources can be animated and manipulated at the same time on the image screen 43. Hence, the image frame of the magnification screen 88 can show more than a magnified image of the speaker 68 and can have its video source in an animated real-time rendered object that takes the shape of that object. Pinning the video source into the real-time animated object effectively combines the video source and the object as one complete object that can be manipulated in size, shape, movement, and other animated features.

Beyond manipulating a simple video or personal computer source, gaming engines open up an entirely new world to create elaborate virtual and interactive content with the present invention. On stage, the imaged speaker 68 can control and literally walk through any virtual scene or a person live on-stage can appear to the audience to be in the virtual scene as well. All of this is now possible and a primary embodiment of the present invention. When combined with the black void illusion the experience creates compelling visual experiences which may incorporate self-illuminated props, image map projected props, and even a video floor coordinated with the virtual scene seen upon the image screen 43. Added to that a library of effects that can be easily called up and rendered in real-time permits novices to create the most advanced appearing stage presentations.

Further, new types of video games could use this larger than life platform and even professional and military training could be conducted with the present invention. Further, the gaming engine technology may also be used to create the virtual stage light 87, making it and many of them fully interactive and customizable for an event. Further, the virtual stage light 87 may be coordinated with a show control with real stage lights.

As described in FIG. 4A the display wall side of the room 3 may be the large hotel multi-purpose room 2 with the massive image display 42 positioned near it. The image display 42 is vertically oriented substantially straight up with its image screen facing the audience. It is to be clearly understood that the large hotel multi-purpose room 2 may be another room entirely different such as a movie theater, control room, performing arts stage, meeting room, office and so on. Also the display wall side of the room 3 is presented for understanding the orientation and the image display 42 which may be close to or far away from any structural wall. Also it is descriptive to assist with understanding the orientation of the audience or user to the image screen 43. The image display 42 covers a substantial portion of the wall it is placed near and "substantial" means a portion of the wall only with no further definition needed such as determining the exact portion of the wall that is covered. Lastly, the massive image display 42 need not be massive when applied to the numerous embodiments and configurations disclosed herein. For example, the present invention may be configured into a small conference system and placed on a desktop and the wall would simply be the wall behind the system opposite the audience/user. The present invention and its numerous inventive embodiments may be adapted to many other applications smaller or larger.

Those skilled in the art will appreciate that various adaptations and modifications of the just-described preferred embodiments can be configured without departing from the scope of the invention. The illustrated embodiments have been set forth only for the purposes of example and that should not be taken as limiting the invention. Therefore, it is to be understood that, within the scope of the appended claims, the invention may be practiced other than as specifically described herein.

The invention claimed is:

1. A display system, comprising:
    a vertically oriented LED image display with an image screen in a room with a group of observers, the image display positioned at a first wall of the room with the image screen facing the observers;
    a black continuous surface upon the image screen presenting no visual reference point and thereby unrecognizable to the observers as an image screen, the black continuous surface observed directly by the observers and not one of through and upon a reflective optic angled in relation to the vertically oriented image display; and
    an imaged person imaged on the image screen, said imaged person is proportionally life-size and that imaged person observed by the observers as residing in a depth of a black void.

2. The system of claim 1, wherein the display system is configured as at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom; the imaged person is at least one of a politician, a teacher, a speaker, an entertainer, a doctor, a clergy person, a business person, a sitting person, and a standing person.

3. The system of claim 1, further comprising: an interactive transmission system enabling the imaged person at a remote location and the observers in the room to interact by at least one of seeing and hearing each other.

4. A display system, comprising:
    a vertically oriented LED image display with an image screen in a room with a group of observers, the image display positioned at a first wall of the room with the image screen facing the observers;
    a black continuous surface upon the image screen presenting no visual reference point and thereby unrecognizable to the observers as an image screen, the black continuous surface observed directly by the observers and not one of through and upon a reflective optic angled in relation to the vertically oriented image display; and
    an object imaged upon the image screen amongst the continuous black upon the image screen, the object possessing at least one of a mass, a reflectance, a shading, a motion and a light beam and observed by the observers as a dimensional real object residing in a depth of a black void.

5. The system of claim 4, wherein the display system is configured as at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom.

6. The system of claim 4, further comprising: an interactive transmission system enabling an imaged person on the image screen at a remote location and the observers in the room to interact by at least one of seeing and hearing each other.

7. A display system, comprising:
    a vertically oriented LED image display with an image screen in a room with a group of observers, the image display positioned at a first wall of the room with the image screen facing the observers;
    a black continuous surface upon the image screen presenting no visual reference point and thereby unrecognizable to the observers as an image screen, the black continuous surface observed directly by the observers and not one of through and upon a reflective optic angled in relation to the vertically oriented image display;
    an imaged person imaged on the image screen, said imaged person is proportionally life-size and that imaged person observed by the observers as residing in a depth of a black void; and
    an interactive transmission system enabling the imaged person at a remote location and the observers in the room to interact by at least one of seeing and hearing each other.

8. The system of claim 7, wherein the display system is configured as at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom; the imaged person is at least one of a politician, a teacher, a speaker, an entertainer, a doctor, a clergy person, a business person, a sitting person, and a standing person.

9. A display system, comprising:
- a vertically oriented LED image display with an image screen in a room with a group of observers, the image display positioned at a first wall of the room with the image screen facing the observers;
- a black continuous surface upon the image screen presenting no visual reference point and thereby unrecognizable to the observers as an image screen, the black continuous surface observed directly by the observers and not one of through and upon a reflective optic angled in relation to the vertically oriented image display;
- a surrounding black substrate extending, in at least one of a left, a right, a top and a bottom, beyond a perimeter of the image screen, and filling a substantial portion of the first wall, the surrounding black substrate being seamlessly adjacent to the image screen to form a continuous black surface with the image screen; and
- an imaged person imaged on the image screen, said imaged person is proportionally life-size and that imaged person observed by the observers as residing in a depth of a black void.

10. The system of claim 9, wherein the display system is configured as at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom; the imaged person is at least one of a politician, a teacher, a speaker, an entertainer, a doctor, a clergy person, a business person, a sitting person, and a standing person.

11. The system of claim 9, further comprising: an interactive transmission system enabling the imaged person at a remote location and the observers in the room to interact by at least one of seeing and hearing each other.

12. A display system, comprising:
- a large format vertically oriented LED image display with an image screen in a room with a group of observers, the image display positioned at a first wall of the room with the image screen facing the observers;
- a black continuous surface upon the image screen presenting no visual reference point and thereby unrecognizable to the observers as an image screen, the black continuous surface observed directly by the observers and not one of through and upon a reflective optic angled in relation to the vertically oriented image display;
- an object prop placed near the image screen and between the image screen and the audience, the object prop serving as a visual cue of a mid-ground; and
- an imaged person imaged on the image screen, said imaged person is proportionally life-size and that imaged person observed by the observers as residing in a depth of a black void.

13. The system of claim 12, wherein the object prop is a podium of which the imaged person is observed by the observers to be standing at.

14. The system of claim 12, wherein the object is a table of which the imaged person is observed by the observers to be sitting at.

15. The system of claim 12, further comprising: an interactive transmission system enabling the imaged person at a remote location and the observers in the room to interact by at least one of seeing and hearing each other.

16. The system of claim 12, further comprising a camera for videoconferencing affixed to the object prop.

17. The system of claim 12, wherein the display system is configured as at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom; the imaged person is at least one of a politician, a teacher, a speaker, an entertainer, a doctor, a clergy person, a business person, a sitting person, and a standing person.

18. A display system, comprising:
- a vertically oriented LED image display with an image screen in a room with a group of observers, the image display positioned at a first wall of the room with the image screen facing the observers;
- a black continuous surface upon the image screen presenting no visual reference point and thereby unrecognizable to the observers as an image screen, the black continuous surface observed directly by the observers and not one of through and upon a reflective optic angled in relation to the vertically oriented image display;
- a foreground object positioned between the observers and the image screen, the image screen observed by the observers behind the foreground object and blocking from observation a portion of the black continuous surface; and
- an imaged person imaged on the image screen, said imaged person is proportionally life-size and that imaged person observed by the observers as residing in a depth of a black void.

19. The system of claim 18, wherein the display system is configured as at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom; the imaged person is at least one of a politician, a teacher, a speaker, an entertainer, a doctor, a clergy person, a business person, a sitting person, and a standing person.

20. The system of claim 18, further comprising: an interactive transmission system enabling the imaged person at a remote location and the observers in the room to interact by at least one of seeing and hearing each other.

21. A display system, comprising:
- a vertically oriented LED image display with an image screen in a room with a group of observers, the image display positioned at a first wall of the room with the image screen facing the observers; and an object prop placed near the image screen and between the image screen and the observers, the object prop serving as a visual cue of a mid-ground; and an imaged person imaged on the image screen, said imaged person is proportionally life-size and that imaged person observed by the observers residing amongst the object prop, wherein the object is a table of which the imaged person is observed by the observers to be sitting at.

22. The system of claim 21, further comprising: an interactive transmission system enabling the imaged person at a remote location and the observers in the room to interact by at least one of seeing and hearing each other.

23. The system of claim 21, further comprising: a camera for videoconferencing affixed to the object prop.

24. The system of claim 21, wherein the display system is configured as at least one of a meeting room display, a podium display, a kiosk display, a classroom display, a retail display, a desktop display, a portable display, and a large format display located in the room that is at least one of a hotel room, a hotel multi-purpose room, a convention center room, a theater room, a theater with inclined seats room, a cruise ship room, a house of worship room, a concert venue room, a meeting room, a presentation room, a studio room, and a classroom; the imaged person is at least one of a politician, a teacher, a speaker, an entertainer, a doctor, a clergy person, a business person, a sitting person, and a standing person.

25. An image display system, comprising:
a personal computing device with a device display operated by a client user for accessing online a live event show creation application, the application programmed to enable the user to observe an illustrated representation with a reasonably proportional matching aspect ratio of a remote display image screen upon the user's device display;

a content library for accessing a plethora of video images, said video Images organized to create an event show by the user in the illustrated representation of a correct aspect ratio of the remote display image screen and observed by the user on the device display;

a data storage for storing the event show and said show accessible by the user; and a video playback device for displaying the event show upon the image screen and additionally combining in the event show at least one of a video image of a proportionally life-size person, a magnification image of a person contained within an image frame, a video source contained within an image frame, and computer source contained within an image frame.

26. The system of claim 25, wherein the image frame pins at least one of the magnification image, the video source and the computer source into an animated object and that image frame can be shaped to that object in real-time.

27. A large format image display system comprising:
a multi-purpose hotel meeting room configurable with an audience in the room facing toward a first wall with a vertically oriented LED image display possessing an image screen covering a substantial portion of that first wall, said image screen facing the audience and in a first mode of use observable by the audience;

a concealing substrate positioned between the audience and the image screen in a second mode of use blocking the audience from observing the image screen;

a retracting mechanism for positioning the concealing substrate away from being between the image screen and the audience in the first mode of use and in the second mode of use positioning between the audience and the image screen; and a proportional life-size image of a person displayed on the image screen with at least one of the person's feet located near a bottom perimeter of the image screen with said screen located at a room floor height, the person's feet located near the bottom perimeter of the image screen with said screen located at a stage floor height, and the person's feet located on the image screen adjacently near a stage flooring.

28. The system of claim 27, wherein a local person stands on at least one of the room floor and the stage floor, said local person interacting with the proportionally life-sized imaged person whose image originates from at least one of a recording, a live broadcast transmission and a videoconference.

29. A large format image display system comprising:
a multi-purpose hotel meeting room configurable with an audience in the room facing toward a first wall with a vertically oriented LED image display possessing an image screen covering a substantial portion of that first wall, said image screen facing the audience and in a first mode of use observable by the audience;

a concealing substrate positioned between the audience and the image screen in a second mode of use blocking the audience from observing the image screen;

a retracting mechanism for positioning the concealing substrate away from being between the image screen and the audience in the first mode of use and in the second mode of use positioning between the audience and the image screen; and a decorative element matching of the concealing substrate with a decorative elements of the room so as to create a continuity of a room décor, the decorative element matching consisting of at least one of color, pattern, texture, design and material.

30. A large format image display system comprising:
a multi-purpose hotel meeting room configurable with an audience in the room facing toward a first wall with a vertically oriented LED image display possessing an image screen covering a substantial portion of that first wall, said image screen facing the audience and in a first mode of use observable by the audience;

a concealing substrate positioned between the audience and the image screen in a second mode of use blocking the audience from observing the image screen;

a retracting mechanism for positioning the concealing substrate away from being between the image screen and the audience in the first mode of use and in the second mode of use positioning between the audience and the image screen; and a lighting array for illuminating at least one of a portion of the room, a stage, a props, and a person, said lighting array arranged to prevent its light impinging the image screen and the lighting array positioned between the image screen and the concealing substrate.

31. A large format image display system comprising:
a multi-purpose hotel meeting room configurable with an audience in the room facing toward a first wall with a vertically oriented LED image display possessing an image screen covering a substantial portion of that first wall, said image screen facing the audience and in a first mode of use observable by the audience;

a concealing substrate positioned between the audience and the image screen in a second mode of use blocking the audience from observing the image screen;

a retracting mechanism for positioning the concealing substrate away from being between the image screen and the audience in the first mode of use and in the second mode of use positioning between the audience and the image screen; and a foreground object placed at least one of left and right of the image screen and positioned between the audience and the image screen creating a visible cue to the audience the object is front of the image screen, said foreground object consisting of at least one of a prop, a stage lights, a light, a truss, a scrim, a fabric, a second image screen, a physical object, a portion of the concealing substrate, a portion of the concealing substrate that retracts, and the concealing substrate.

32. The system of claim 31, wherein the foreground object is concealed by the concealing substrate in at least one of the first and second modes of use.

33. The system of claim 32, wherein the image screen displays a continuous color black forming a black void viewed by the audience behind the foreground object and images in a portion of the image screen at least one of a person and an image object with the object having at least one of reflectance, shading, and motion.

34. A large format image display system comprising:
a multi-purpose hotel meeting room configurable with an audience in the room facing toward a first wall with a vertically oriented LED image display possessing an image screen covering a substantial portion of that first wall, said image screen facing the audience and in a first mode of use observable by the audience; and a concealing system for concealing the image screen from the audience in a second mode of use, said concealing system consisting of at least one of a retracting substrate matching a décor of the room, and an image displayed upon the image screen that matches the décor of the room.

35. A display system, comprising:
a vertically oriented LED image display with an image screen in a room with a group of observers, the image display positioned at a first wall of the room with the image screen facing the observers;

a black continuous surface upon the image screen presenting no visual reference point and thereby unrecognizable to the observers as an image screen, the black continuous surface observed directly by the observers and not one of through and upon a reflective optic angled in relation to the vertically oriented image display; and an object imaged upon the image screen amongst the continuous black upon the image screen, the object possessing at least one of a mass, a reflectance, a shading, a motion and a light beam and observed by the observers as a dimensional real object comprising a virtual scene and residing in a depth of a black void.

36. The system of claim 35 further comprising at least one of a person positioned between the observers and the image display and an imaged person imaged upon the image screen which is transmitted to the image display from at least one of a recorded playback system and from a remote location where the person is videographed live in at least one of a live broadcast and a videoconference.

37. A display system, comprising:
a vertically oriented LED image display with an image screen in a room with a group of observers, the image display positioned at a first wall of the room with the image screen facing the observers;

a black continuous surface upon the image screen presenting no visual reference point and thereby unrecognizable to the observers as an image screen, the black continuous surface observed directly by the observers and not one of through and upon a reflective optic angled in relation to the vertically oriented image display;

an object prop placed near the image screen and between the image screen and the observers, the object prop serving as a visual cue of a mid-ground of a stage; and an object imaged upon the image screen amongst the continuous black upon the image screen, the object possessing at least one of a mass, a reflectance, a shading, a motion and a light beam and observed by the observers as a dimensional real object residing in a depth of a black void, and the imaged dimensional real object and object prop are coordinated to create a merged virtual scene.

38. The system of claim 37 further comprising at least one of a person positioned between the observers and the image display and an imaged person imaged upon the image screen which is transmitted to the image display from at least one of a recorded playback system and from a remote location where the person is videographed live in at least one of a live broadcast and a videoconference.

39. A display system, comprising:
a vertically oriented LED image display with an image screen in a room with a group of observers, the image display positioned at a first wall of the room with the image screen facing the observers;

a black continuous surface upon the image screen presenting no visual reference point and thereby unrecognizable to the observers as an image screen, the black continuous surface observed directly by the observers and not one of through and upon a reflective optic angled in relation to the vertically oriented image display; and an imaged person imaged on the image screen in a first mode of use, said imaged person is proportionally life-size and that imaged person observed by the observers as residing in a depth of a black void, and in a second mode of use presenting a movie by at least one of imaging upon the image screen and upon a retracting font projection screen positioned between the image display and the observers.

40. The system of claim 39 further comprising at least one of a person positioned between the observers and the image display and an imaged person imaged upon the image screen which is transmitted to the image display from at least one of a recorded playback system and from a remote location where the person is videographed live in at least one of a live broadcast and a videoconference.

41. The system of claim 39 further comprising a stage retrofitted into an inclined seat movie theater and adjacent to the lower portion of the image display.

42. The system of claim 39 further comprising a retractable proscenium to convert a movie theater where the image display resides into a live theater stage.

43. The system of claim 39 further comprising a stage with an array of stage lights to illuminate a live person on a stage.

* * * * *